United States Patent [19]
Matsubara et al.

[11] Patent Number: 6,130,685
[45] Date of Patent: *Oct. 10, 2000

[54] METHOD FOR RECORDING AN IMAGE WITH MULTIPLE SCANNINGS OF A RECORDING HEAD HAVING GROUPS OF NOZZLES

[75] Inventors: Miyuki Matsubara, Tokyo; Hiromitsu Hirabayashi, Yokohama; Shigeyasu Nagoshi, Kawasaki; Noribumi Koitabashi, Yokohama; Hitoshi Sugimoto, Kawasaki; Fumihiro Gotoh, Yokohama; Masaya Uetuki, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/732,112

[22] Filed: Oct. 15, 1996

Related U.S. Application Data

[62] Division of application No. 08/040,298, Mar. 30, 1993.

[30] Foreign Application Priority Data

| Mar. 31, 1992 | [JP] | Japan | 4-77410 |
| Mar. 31, 1992 | [JP] | Japan | 4-77443 |
| May 20, 1992 | [JP] | Japan | 4-127050 |
| Jul. 3, 1992 | [JP] | Japan | 4-176970 |
| Jul. 24, 1992 | [JP] | Japan | 4-198660 |
| Jul. 24, 1992 | [JP] | Japan | 4-198683 |

[51] Int. Cl.[7] ............................................. B41J 2/145
[52] U.S. Cl. ................................. 347/41; 347/43
[58] Field of Search ......................... 347/15, 41, 43, 347/37

[56] References Cited

U.S. PATENT DOCUMENTS 4,313,124  1/1982  Hara ............................................. 347/57
4,345,262  8/1982  Shirato et al. ............................... 347/10
4,459,600  7/1984  Sato et al. .................................. 347/47

(List continued on next page.)

FOREIGN PATENT DOCUMENTS

| 0046118 | 2/1982 | European Pat. Off. . |
| 0300743 | 1/1989 | European Pat. Off. . |
| 0430451 | 6/1991 | European Pat. Off. . |
| 0455389 | 11/1991 | European Pat. Off. . |
| 0476860 | 3/1992 | European Pat. Off. . |
| 0526186 | 2/1993 | European Pat. Off. . |
| 0546853 | 6/1993 | European Pat. Off. . |
| 54-056847 | 5/1979 | Japan . |
| 55-113573 | 9/1980 | Japan . |
| 58-194541 | 11/1983 | Japan . |
| 59-123670 | 7/1984 | Japan . |

(List continued on next page.)

OTHER PUBLICATIONS

Yukio Murata, Handbook of Color Techniques, K.K. Sogogijutsu Centre, pp. 117–127 (No English translation).
"All–Points–Addressable Printing Improvement," IBM Technical Disclosure Bulletin, vol. 28, No. 8, pp. 3255–3256, Jan. 1986.

Primary Examiner—John Barlow
Assistant Examiner—Craig A. Hallacher
Attorney, Agent, or Firm—Fitzpatrick, Cella, Harper & Scinto

[57] ABSTRACT

A plurality of recording heads for ejecting inks of different colors are reciprocally moved relative to a recording medium, and printing operations are performed by executing main scans in forward and backward scans of the recording heads. In this case, an area printable in a single main scan is recorded by performing a plurality of main scans using a plurality of thinning patterns in which an m×n pixel group is defined as a unit pixel group, and the pixel groups are arranged at non-neighboring positions, and which have a complementary arrangement relationship therebetween. A high-quality color image free from time difference nonuniformity, and density nonuniformity caused by, e.g., variations of recording elements is obtained at high speed.

8 Claims, 90 Drawing Sheets

U.S. PATENT DOCUMENTS

| | | |
|---|---|---|
| 4,463,359 | 7/1984 | Ayata et al. ............................... 347/56 |
| 4,540,295 | 9/1985 | Okunishi et al. .................... 346/76 PH |
| 4,553,867 | 11/1985 | Nakai ..................................... 400/323 |
| 4,558,333 | 12/1985 | Sugitani et al. .......................... 347/62 |
| 4,723,129 | 2/1988 | Endo et al. ............................... 347/56 |
| 4,740,796 | 4/1988 | Endo et al. ............................... 347/56 |
| 4,748,453 | 5/1988 | Lin et al. .................................. 347/41 |
| 4,965,593 | 10/1990 | Hickman ................................. 347/12 |
| 4,967,203 | 10/1990 | Doan et al. .............................. 347/41 |
| 5,359,355 | 10/1994 | Nagoshi et al. ........................... 347/9 |
| 5,430,469 | 7/1995 | Shioya et al. ............................ 347/15 |
| 5,442,385 | 8/1995 | Moon et al. ............................. 347/43 |
| 5,477,248 | 12/1995 | Sugimoto et al. ....................... 347/43 |
| 5,500,661 | 3/1996 | Matsubara et al. ...................... 347/41 |
| 5,512,923 | 4/1996 | Bauman .................................. 347/15 |
| 5,604,520 | 2/1997 | Matsubara et al. ...................... 347/43 |
| 5,745,145 | 4/1998 | Hirabayashi et al. ................. 347/183 |

FOREIGN PATENT DOCUMENTS

| | | | |
|---|---|---|---|
| 59-138461 | 8/1984 | Japan . | |
| 60-071260 | 4/1985 | Japan . | |
| 60-107975 | 6/1985 | Japan . | |
| 63-264358 | 11/1988 | Japan . | |
| 1-281944 | 11/1989 | Japan ..................................... | 347/15 |
| 4-361049 | 12/1992 | Japan . | |
| WO90-010541 | 9/1990 | WIPO . | |

FIG. 8
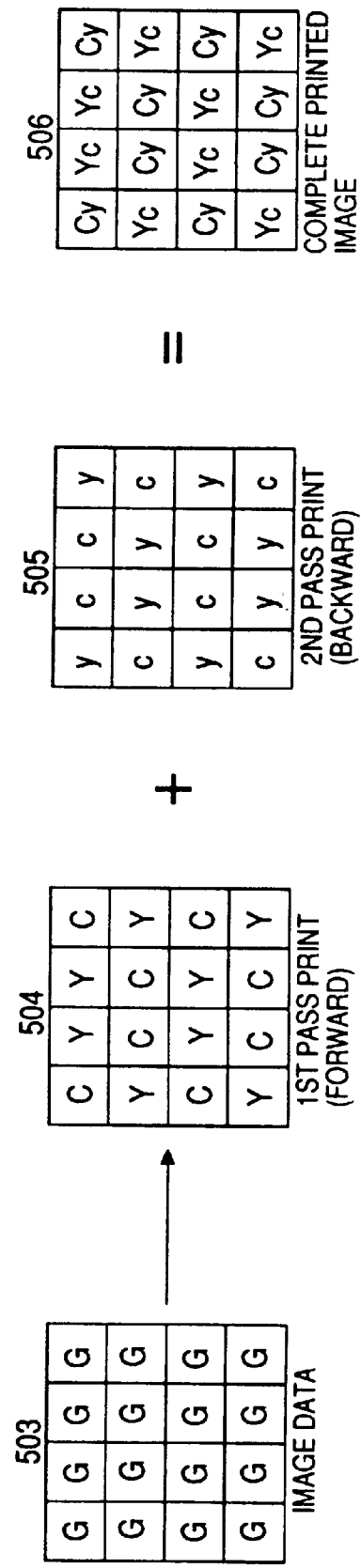

FIG. 18
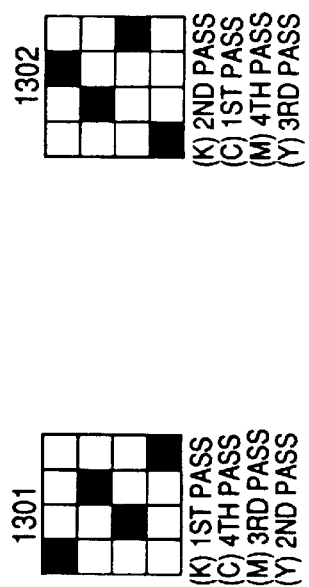
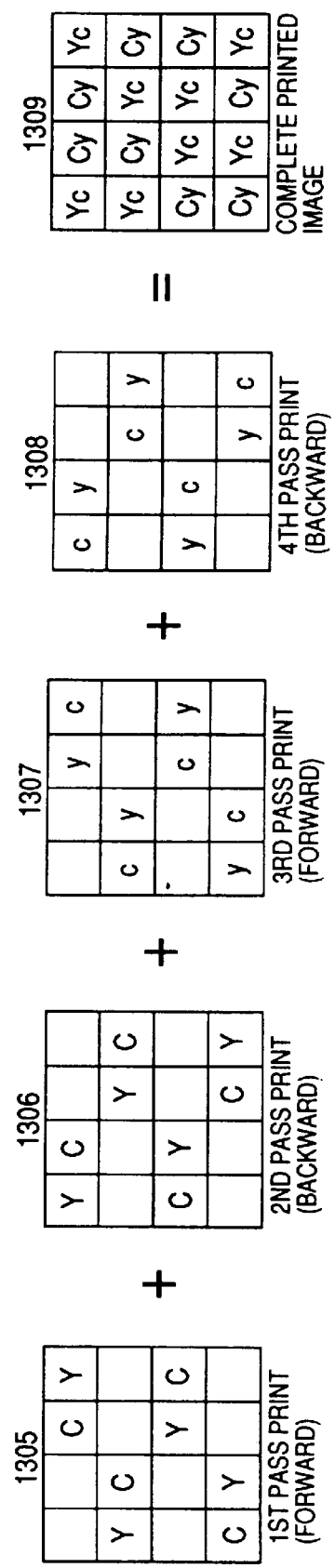

FIG. 32
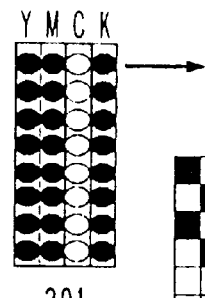
301
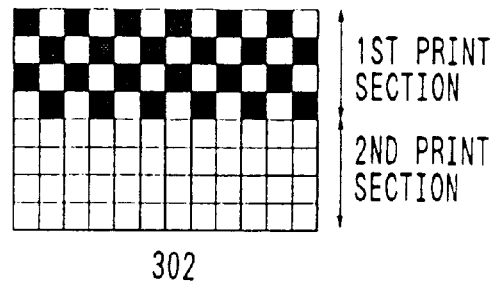
302
1ST PRINT SECTION
2ND PRINT SECTION
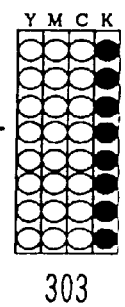
303
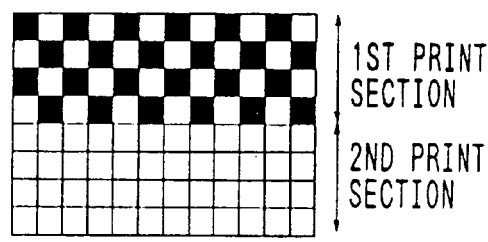
1ST PRINT SECTION
2ND PRINT SECTION
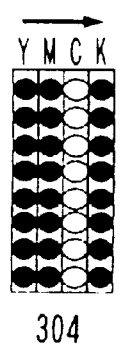
304
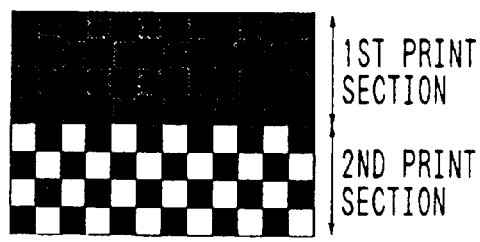
1ST PRINT SECTION
2ND PRINT SECTION
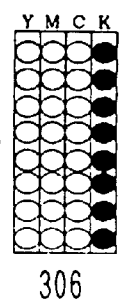
306
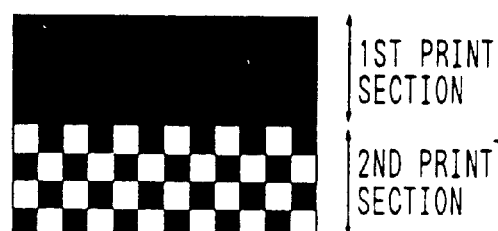
1ST PRINT SECTION
2ND PRINT SECTION FIG. 35
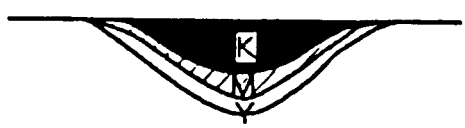
201                203
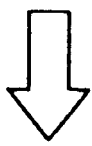
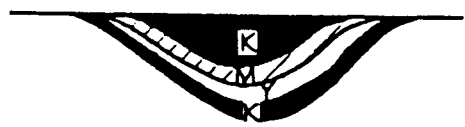
202                204

FIG. 40

| DOT SIZE/PIXEL DISTANCE | | 1.00 | 1.10 | 1.20 | 1.30 | 1.40 | 1.50 | 1.60 | 1.70 | 1.80 | 1.90 |
|---|---|---|---|---|---|---|---|---|---|---|---|
| 1×1 | EXTRUSION RATE | 0.00 | 6.17 | 18.01 | 34.08 | 53.96 | 71.52 | 82.70 | 90.66 | 96.02 | 99.07 |
| | THEORETICAL COLOR DISTANCE | 0.00 | 0.35 | 1.02 | 2.04 | 3.05 | 4.07 | 4.63 | 5.08 | 5.42 | 5.64 |
| | REAL COLOR DISTANCE | 0.00 | 0.34 | 0.98 | 1.86 | 2.94 | 3.90 | 4.51 | 4.95 | 5.24 | 5.40 |
| 2×2 | EXTRUSION RATE | 0.00 | 3.08 | 9.00 | 17.04 | 26.98 | 37.11 | 45.34 | 52.70 | 59.36 | 65.40 |
| | THEORETICAL COLOR DISTANCE | 0.00 | 0.23 | 0.57 | 1.03 | 1.48 | 2.17 | 2.63 | 2.97 | 3.43 | 3.66 |
| | REAL COLOR DISTANCE | 0.00 | 0.17 | 0.49 | 0.93 | 1.47 | 2.02 | 2.47 | 2.87 | 3.24 | 3.57 |
| 4×1 | EXTRUSION RATE | 0.00 | 3.85 | 11.25 | 21.30 | 33.72 | 46.72 | 57.67 | 67.71 | 77.03 | 85.72 |
| | THEORETICAL COLOR DISTANCE | 0.00 | 0.23 | 0.69 | 1.25 | 1.94 | 2.63 | 3.32 | 3.89 | 4.47 | 4.92 |
| | REAL COLOR DISTANCE | 0.00 | 0.21 | 0.61 | 1.16 | 1.84 | 2.55 | 3.15 | 3.69 | 4.20 | 4.68 |
| 8×1 | EXTRUSION RATE | 0.00 | 3.47 | 10.03 | 19.17 | 30.35 | 42.59 | 53.49 | 63.89 | 73.87 | 83.49 |
| | THEORETICAL COLOR DISTANCE | 0.00 | 0.23 | 0.57 | 1.14 | 1.71 | 2.40 | 3.08 | 3.66 | 4.24 | 4.81 |
| | REAL COLOR DISTANCE | 0.00 | 0.19 | 0.55 | 1.05 | 1.66 | 2.32 | 2.92 | 3.48 | 4.03 | 4.55 |
| 3×3 | EXTRUSION RATE | 0.00 | 2.06 | 6.00 | 11.36 | 17.99 | 25.04 | 31.11 | 36.77 | 42.09 | 47.13 |
| | THEORETICAL COLOR DISTANCE | 0.00 | 0.12 | 0.35 | 0.69 | 1.03 | 1.48 | 1.82 | 2.06 | 2.40 | 2.74 |
| | REAL COLOR DISTANCE | 0.00 | 0.11 | 0.33 | 0.62 | 0.98 | 1.37 | 1.70 | 2.01 | 2.30 | 2.57 |
| 4×3 | EXTRUSION RATE | 0.00 | 1.80 | 5.25 | 9.94 | 15.74 | 21.98 | 27.44 | 32.58 | 37.46 | 42.12 |
| | THEORETICAL COLOR DISTANCE | 0.00 | 0.12 | 0.35 | 0.57 | 0.91 | 1.25 | 1.59 | 1.82 | 2.17 | 2.40 |
| | REAL COLOR DISTANCE | 0.00 | 0.10 | 0.29 | 0.54 | 0.86 | 1.20 | 1.50 | 1.78 | 2.04 | 2.30 |
| 4×4 | EXTRUSION RATE | 0.00 | 1.54 | 4.50 | 8.52 | 13.49 | 18.89 | 23.66 | 28.19 | 32.51 | 36.67 |
| | THEORETICAL COLOR DISTANCE | 0.00 | 0.12 | 0.35 | 0.46 | 0.80 | 1.14 | 1.37 | 1.60 | 1.82 | 2.06 |
| | REAL COLOR DISTANCE | 0.00 | 0.08 | 0.25 | 0.46 | 0.74 | 1.03 | 1.29 | 1.54 | 1.77 | 2.20 |
| 8×2 | EXTRUSION RATE | 0.00 | 1.93 | 5.63 | 10.56 | 16.86 | 23.70 | 29.83 | 35.70 | 41.35 | 46.82 |
| | THEORETICAL COLOR DISTANCE | 0.00 | 0.12 | 0.35 | 0.57 | 0.91 | 1.37 | 1.71 | 2.06 | 2.40 | 2.63 |
| | REAL COLOR DISTANCE | 0.00 | 0.11 | 0.31 | 0.58 | 0.92 | 1.29 | 1.63 | 1.95 | 2.26 | 2.55 |
| 6×6 | EXTRUSION RATE | 0.00 | 1.03 | 3.00 | 5.68 | 8.99 | 12.67 | 16.00 | 19.20 | 22.31 | 25.33 |
| | THEORETICAL COLOR DISTANCE | 0.00 | 0.12 | 0.23 | 0.35 | 0.58 | 0.69 | 0.91 | 1.14 | 1.25 | 1.37 |
| | REAL COLOR DISTANCE | 0.00 | 0.06 | 0.16 | 0.31 | 0.49 | 0.69 | 0.87 | 1.05 | 1.22 | 1.38 |
| 8×8 | EXTRUSION RATE | 0.00 | 0.77 | 2.25 | 4.26 | 6.76 | 15.17 | 19.09 | 22.85 | 26.47 | 29.97 |
| | THEORETICAL COLOR DISTANCE | 0.00 | 0.00 | 0.12 | 0.23 | 0.35 | 0.91 | 1.14 | 1.25 | 1.48 | 1.71 |
| | REAL COLOR DISTANCE | 0.00 | 0.04 | 0.12 | 0.23 | 0.37 | 0.83 | 1.04 | 1.25 | 1.44 | 1.63 |

FIG. 45
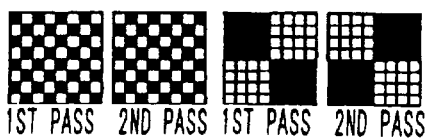
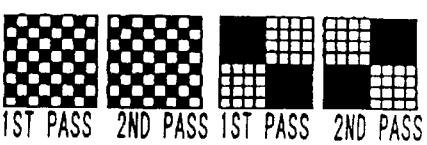
IMAGE DATA
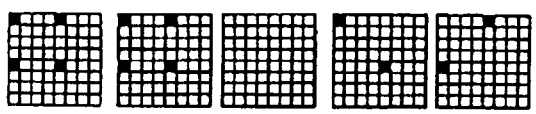
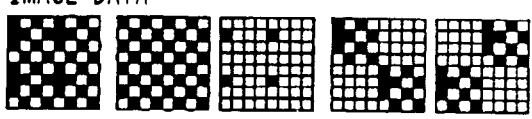
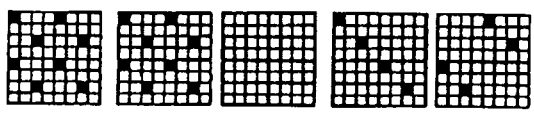
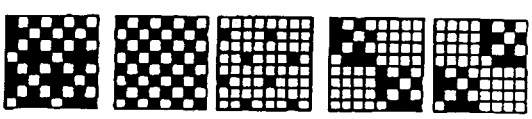
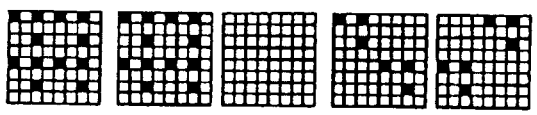
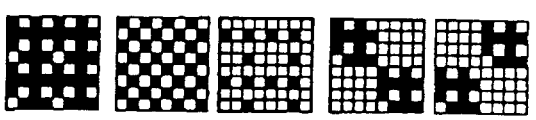
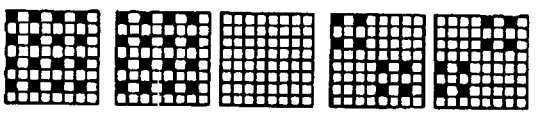
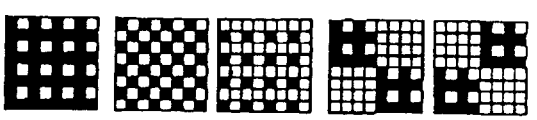
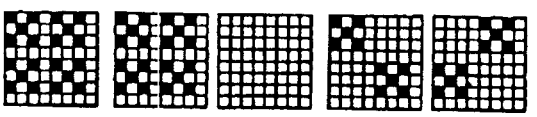
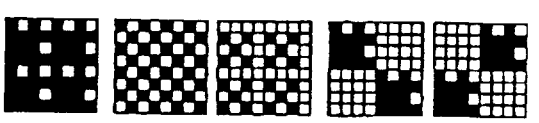
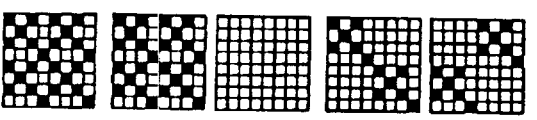
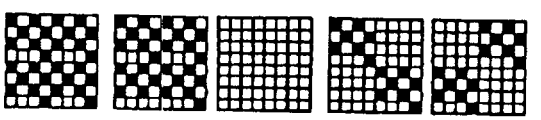

5TH SCAN

1ST SCAN (FORWARD)          2ND SCAN (BACKWARD)

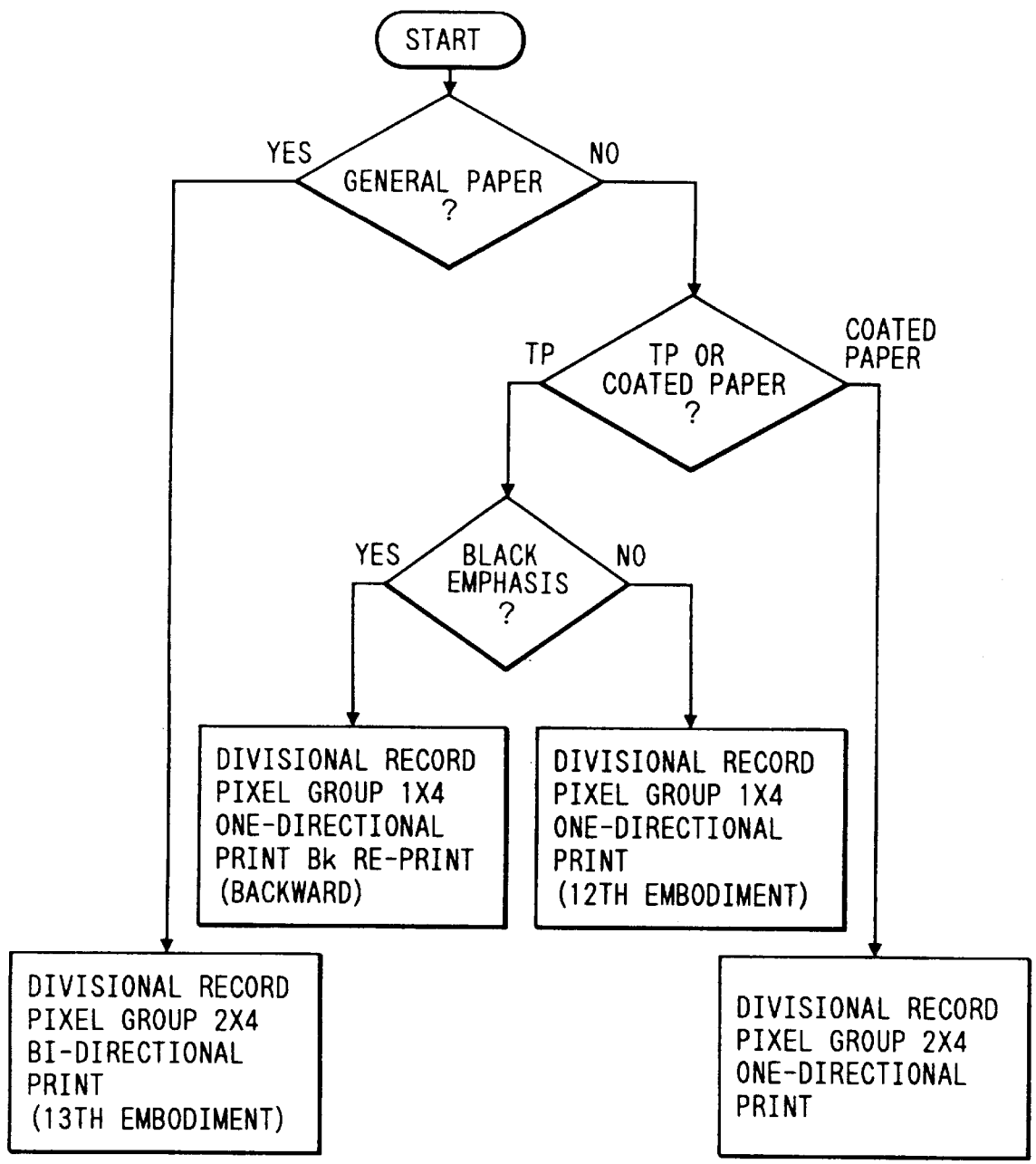

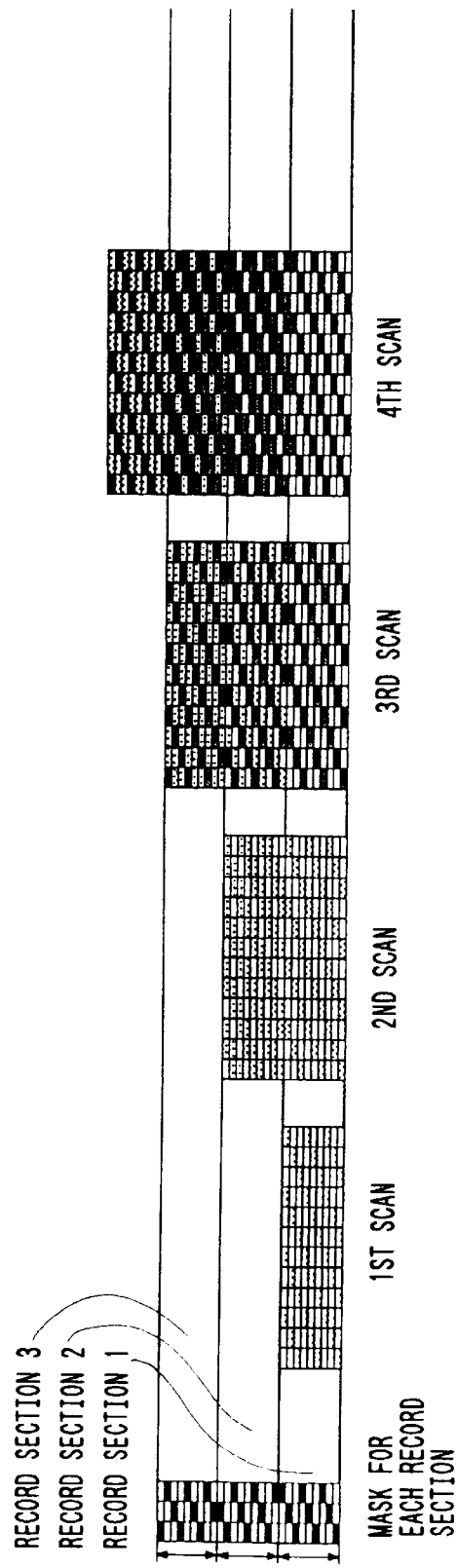

FIG. 58
| DIVISIONAL RECORD PIXEL GROUP & NUMBER OF RECORD DIVISIONS | RECORD MASK FOR 1ST RECORD SECTION | RECORD MASK FOR 2ND RECORD SECTION | RECORD MASK FOR 3RD RECORD SECTION | CONNECTION LINE ESTIMATION |
|---|---|---|---|---|
| 1×1 2-DIVISION |  |  | | POOR |
| 1×2 2-DIVISION |  |  | | POOR |
| 1×1 3-DIVISION |  |  |  | UNSATISFACTORY |
| 1×2 3-DIVISION |  |  |  | ACCEPTABLE |
| 1×3 3-DIVISION |  |  |  | ACCEPTABLE |
| 1×4 3-DIVISION |  |  |  | GOOD |

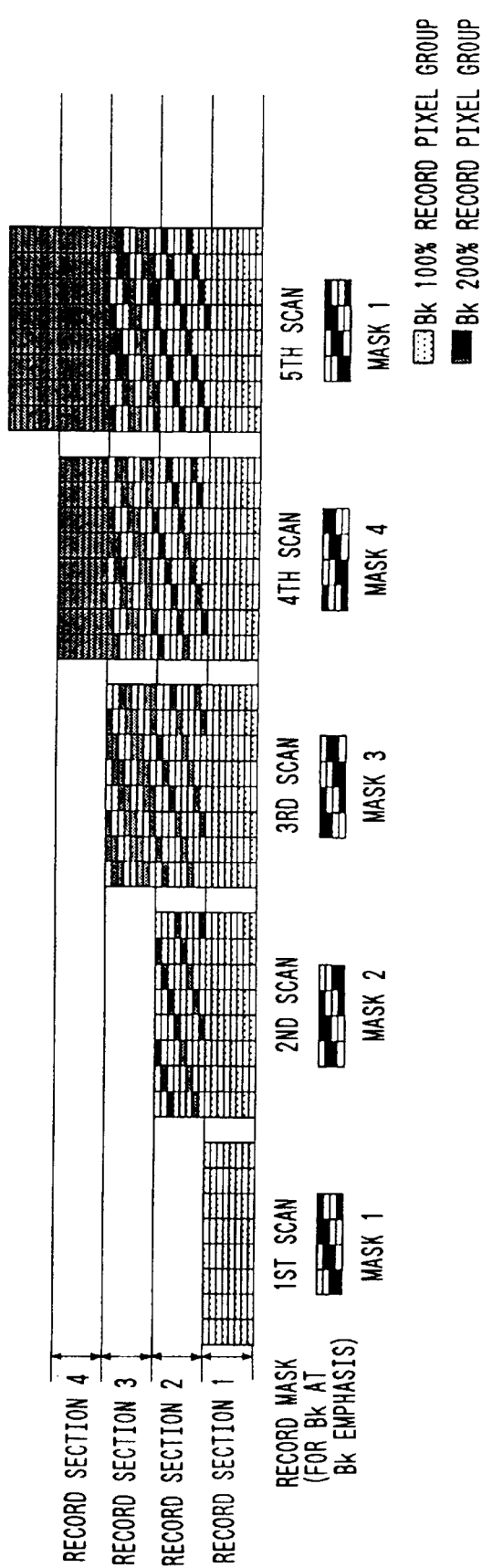

1ST RECORD SCAN
1ST IMAGE AREA

2ND RECORD SCAN
1ST IMAGE AREA

3RD RECORD SCAN
1ST IMAGE AREA
BOUNDARY AREA
2ND IMAGE AREA

4TH RECORD SCAN
1ST IMAGE AREA
BOUNDARY AREA
2ND IMAGE AREA

1ST RECORD SCAN
1ST IMAGE AREA

2ND RECORD SCAN
1ST IMAGE AREA

3RD RECORD SCAN
1ST IMAGE AREA
BOUNDARY AREA
2ND IMAGE AREA

4TH RECORD SCAN
1ST IMAGE AREA
BOUNDARY AREA
2ND IMAGE AREA

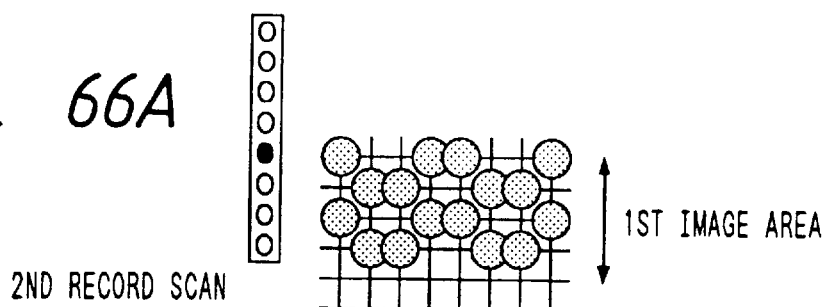
FIG. 66A  2ND RECORD SCAN — 1ST IMAGE AREA
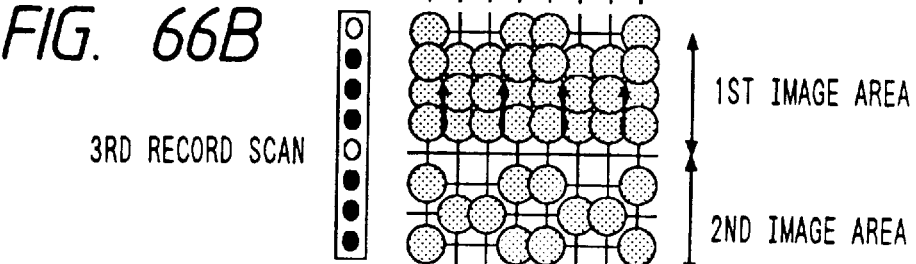
FIG. 66B  3RD RECORD SCAN — 1ST IMAGE AREA / 2ND IMAGE AREA
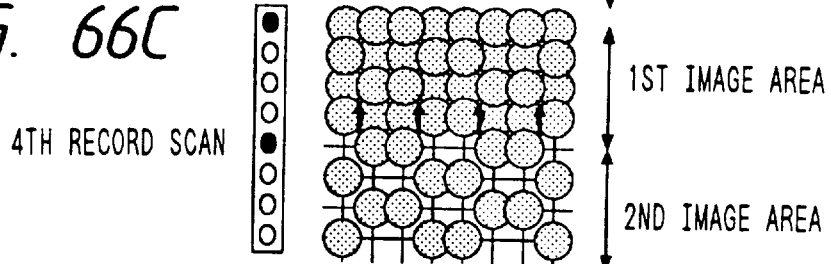
FIG. 66C  4TH RECORD SCAN — 1ST IMAGE AREA / 2ND IMAGE AREA
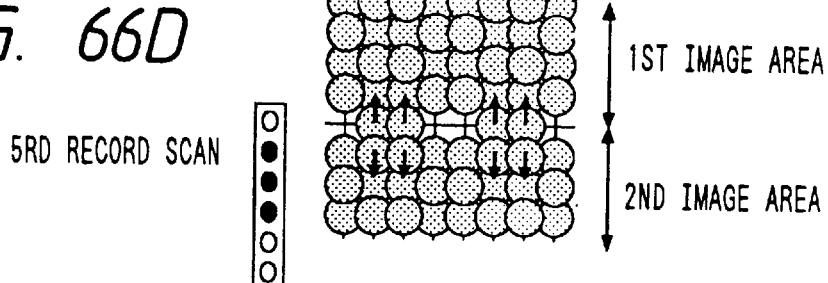
FIG. 66D  5RD RECORD SCAN — 1ST IMAGE AREA / 2ND IMAGE AREA
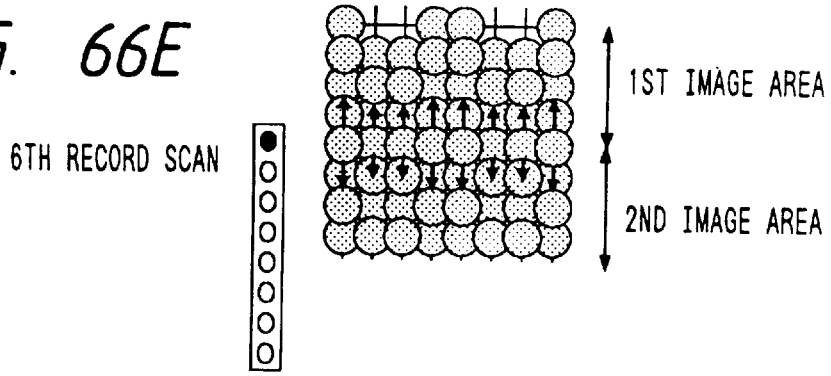
FIG. 66E  6TH RECORD SCAN — 1ST IMAGE AREA / 2ND IMAGE AREA

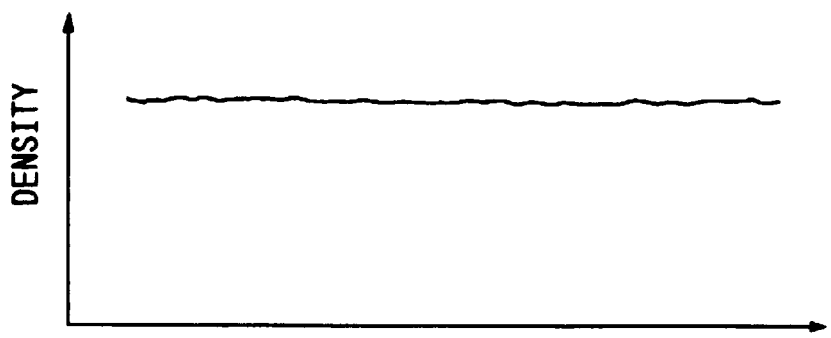
FIG. 71C PRIOR ART
FIG. 71B PRIOR ART
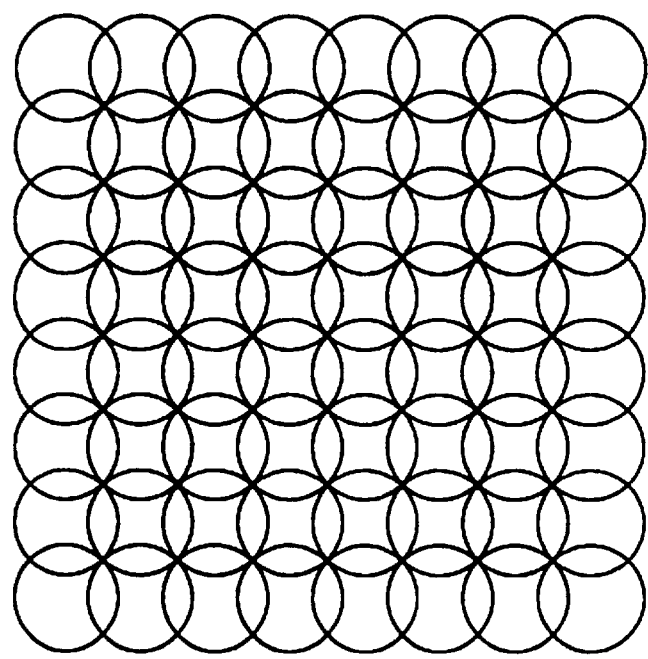
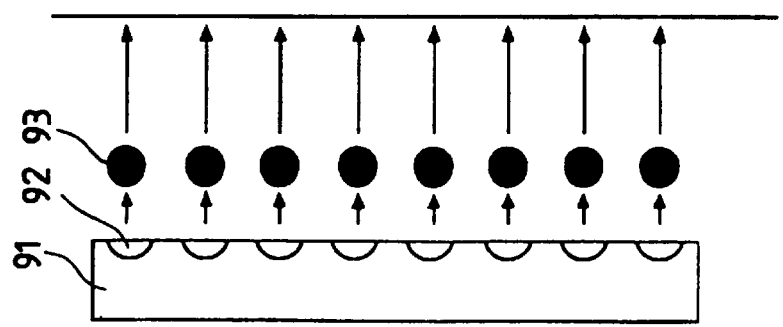
FIG. 71A PRIOR ART

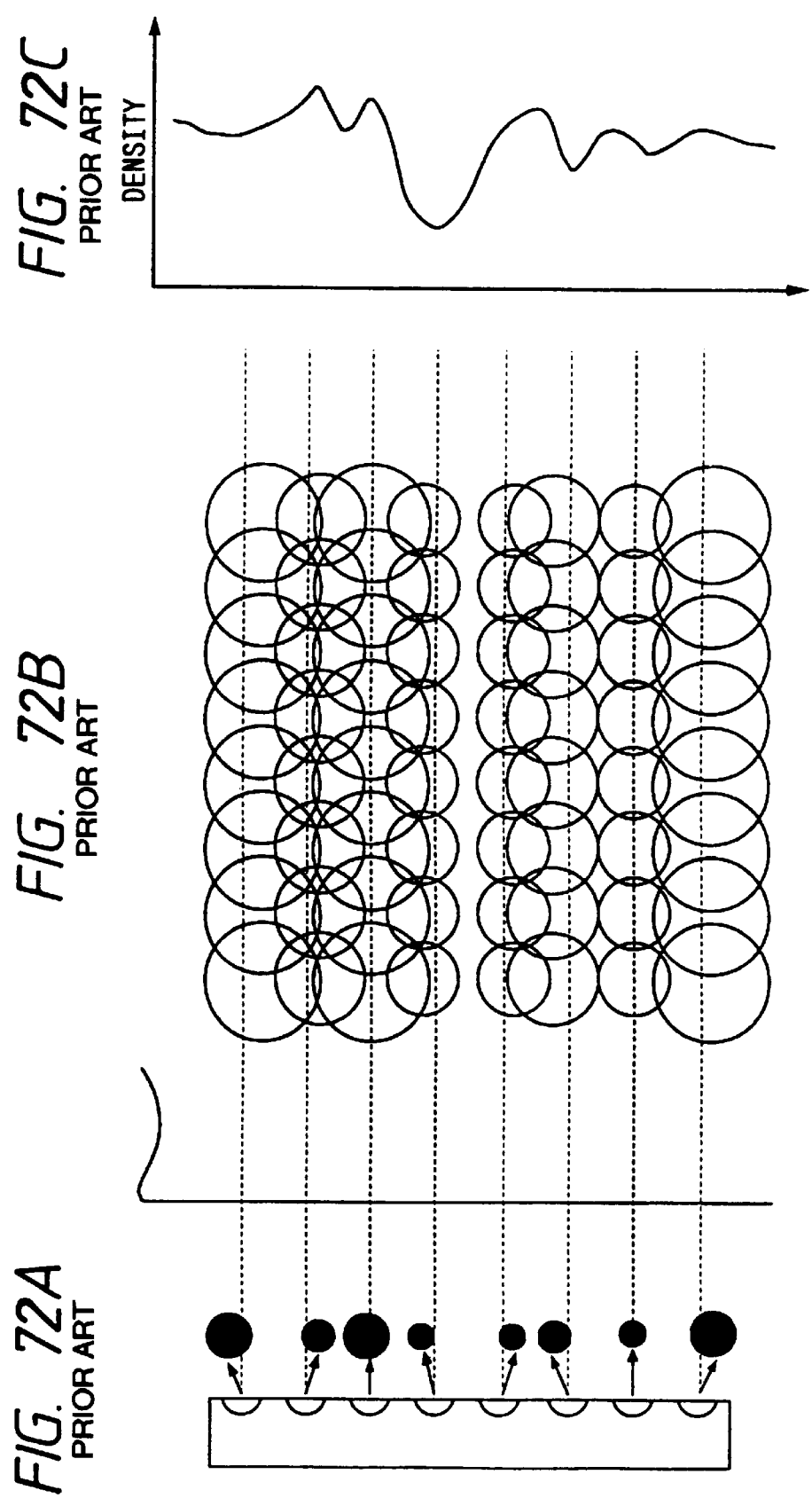

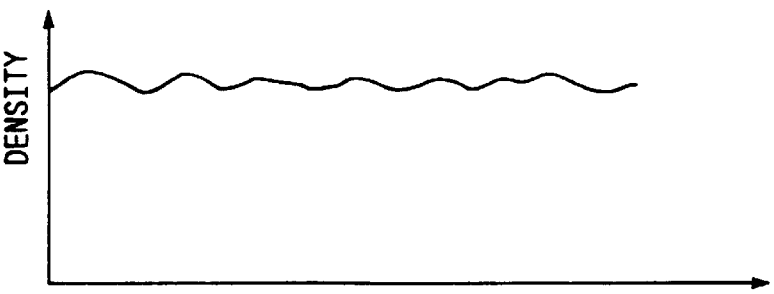
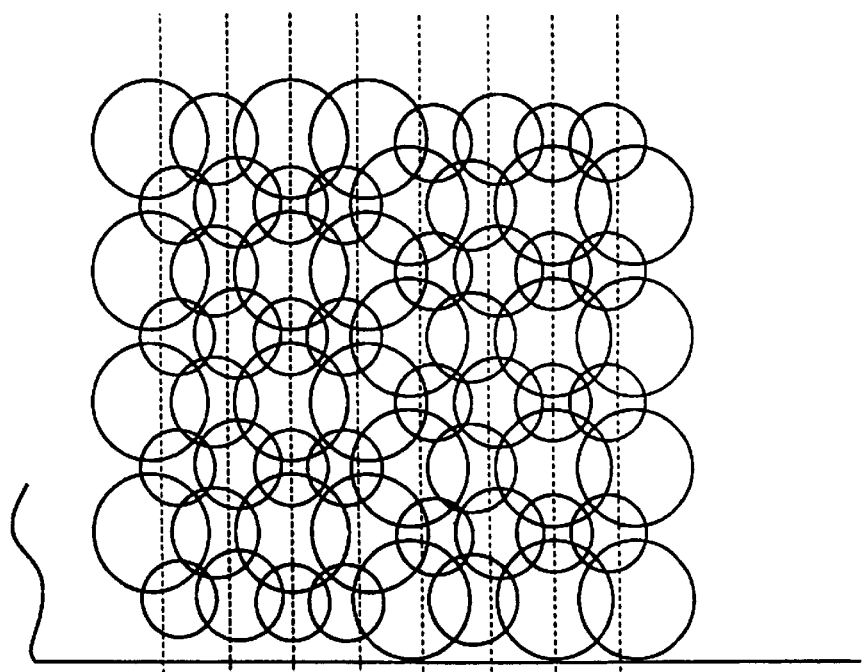
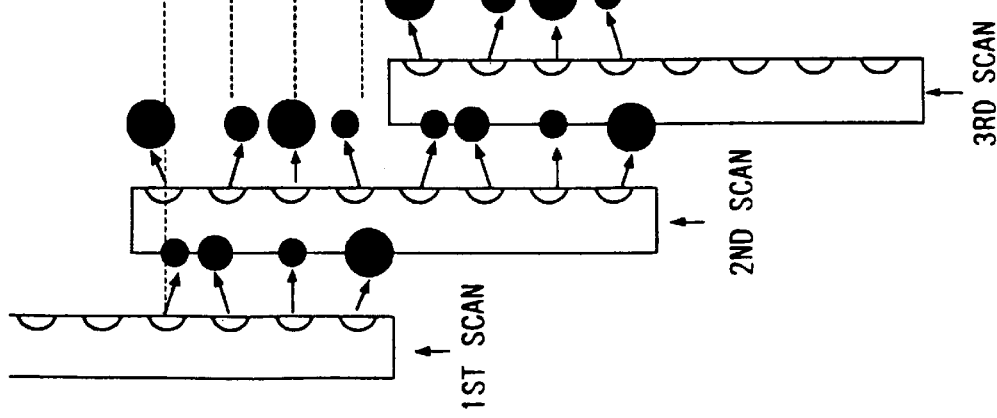
FIG. 73C PRIOR ART
FIG. 73B PRIOR ART
FIG. 73A PRIOR ART

CHECKER

REVERSE CHECKER

FIG. 79
PRIOR ART
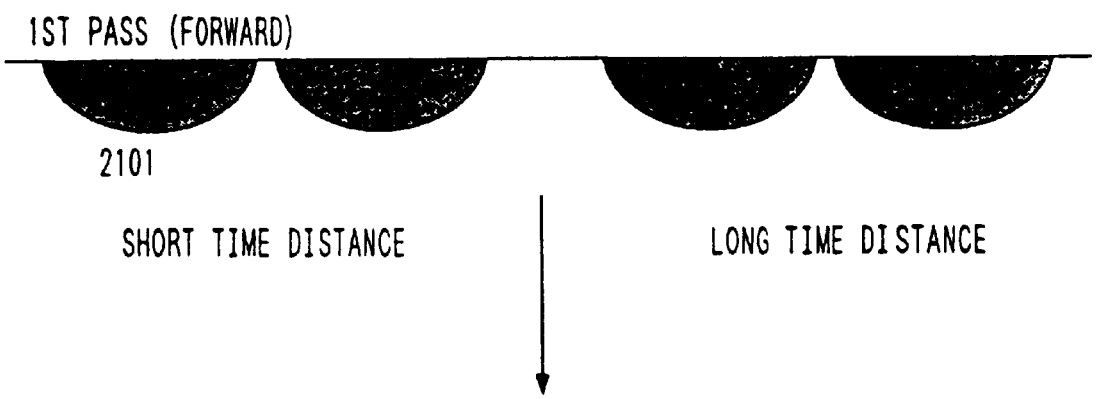
1ST PASS (FORWARD)
2101
SHORT TIME DISTANCE | LONG TIME DISTANCE
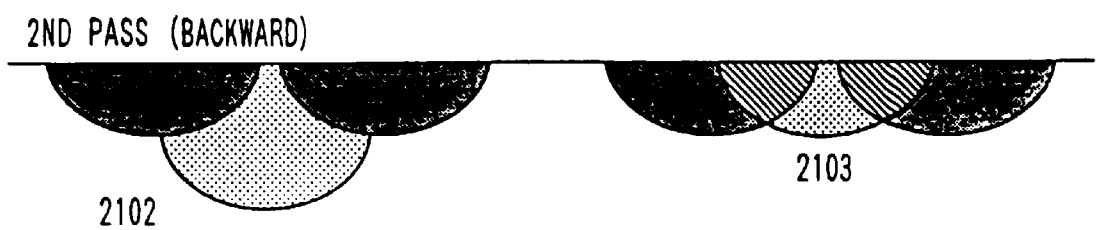
2ND PASS (BACKWARD)
2102　　　2103
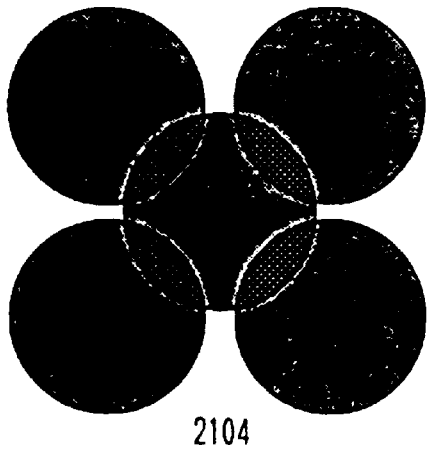
2104
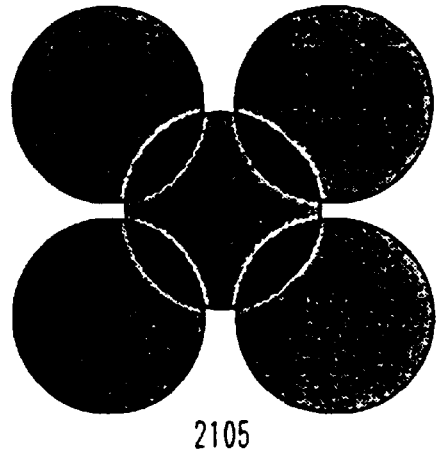
2105

FIG. 85
PRIOR ART
| BINARIZING PATTERN | | 1ST PASS PRINT | 2ND PASS PRINT |
|---|---|---|---|
| 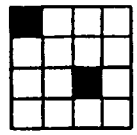 | | 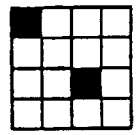 | 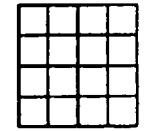 |
| 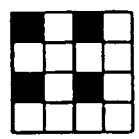 | | 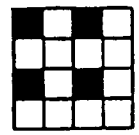 | 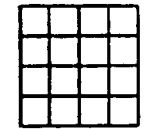 |
| 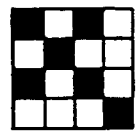 | THINNING PATTERN | 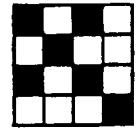 | 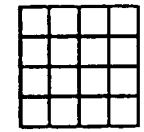 |
|  | 501 (FOR 1ST PASS) | 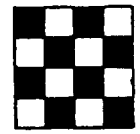 | 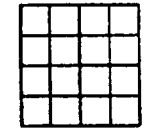 |
| 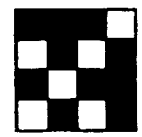 | 502 (FOR 2ND PASS) | 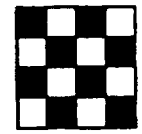 | 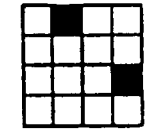 |
| 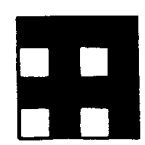 | | 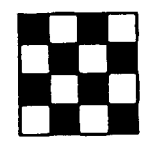 | 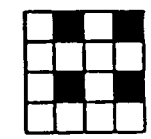 |
|  | | 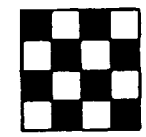 | 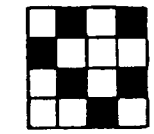 |
|  | | 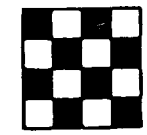 | 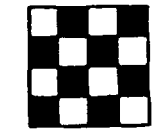 |

FIG. 86
PRIOR ART
| BINARIZING PATTERN | | 1ST PASS PRINT | 2ND PASS PRINT |
|---|---|---|---|
| 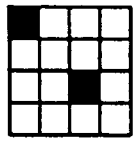 | | 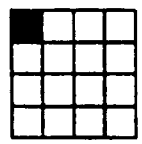 | 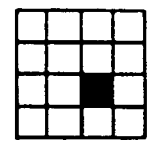 |
| 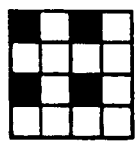 | | 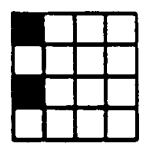 | 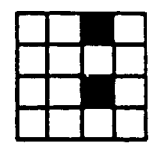 |
| 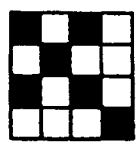 | THINNING PATTERN | 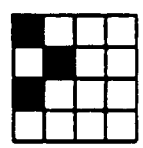 | 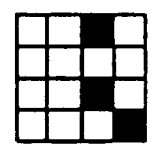 |
| 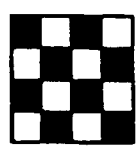 | 601 (FOR 1ST PASS) | 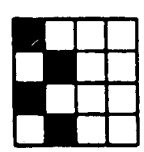 | 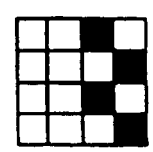 |
| 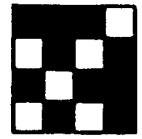 | 602 (FOR 2ND PASS) | 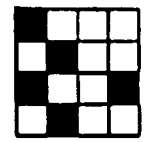 | 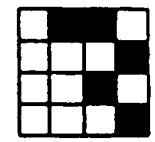 |
|  | |  | 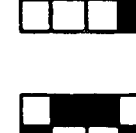 |
|  | |  |  |
|  | | 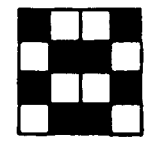 | 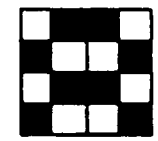 |

FIG. 87
PRIOR ART
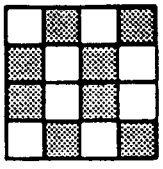
201
CYAN (C) 1ST PASS
YELLOW (Y) 1ST PASS
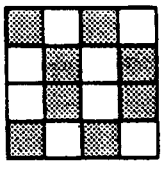
202
CYAN (C) 2ND PASS
YELLOW (Y) 2ND PASS
206 COMPLETE PRINTED IMAGE
=
205 2ND PASS PRINT (BACKWARD)
+
204 1ST PASS PRINT (FORWARD)
203 IMAGE DATA

FIG. 89
PRIOR ART
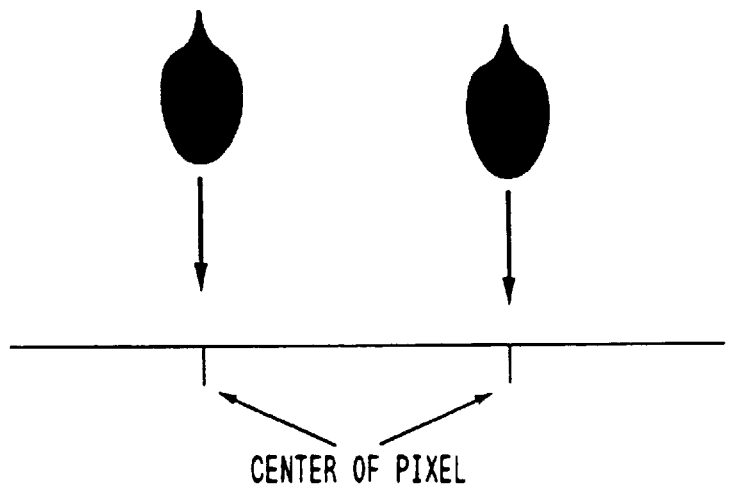
CENTER OF PIXEL
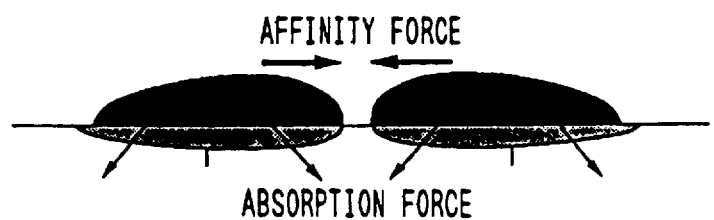
AFFINITY FORCE
ABSORPTION FORCE
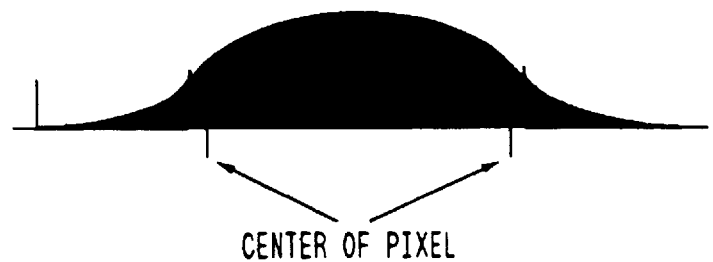
CENTER OF PIXEL

1ST RECORD SCAN IMAGE AREA

2ND RECORD SCAN IMAGE AREA

CONNECTION AREA

1ST RECORD SCAN
1ST IMAGE AREA

2ND RECORD SCAN
1ST IMAGE AREA
2ND IMAGE AREA

3RD RECORD SCAN
1ST IMAGE AREA
2ND IMAGE AREA
3RD IMAGE AREA

METHOD FOR RECORDING AN IMAGE WITH MULTIPLE SCANNINGS OF A RECORDING HEAD HAVING GROUPS OF NOZZLES

This application is a division of application Ser. No. 08/040,298, filed Mar. 30, 1993.

BACKGROUND OF THE INVENTION

1. Field of the Invention

The present invention relates to an ink jet recording method and apparatus, which record an image on a recording medium by ejecting ink droplets according to image data.

2. Related Background Art

With spread of copying machines, information equipment such as wordprocessors, computers, and the like, and communication equipment, an apparatus for performing digital image recording using an ink jet recording head has become increasingly popular as one of recording apparatuses for such equipment. A recording apparatus of this type uses a head prepared by integrating a plurality of ink ejection orifices and ink channels as a recording head (to be referred to as a multi-head hereinafter) in which a plurality of recording elements are integrated and aligned for the purpose of an increase in recording speed. Furthermore, a color recording apparatus normally comprises a plurality of multi-heads.

Unlike in a monochrome printer for printing characters alone, when a color image is to be printed, various characteristics such as color development characteristics, gradation characteristics, uniformity, and the like are required. In particular, as for the uniformity, a small variation in units of nozzles, which is generated during a multi-head manufacturing process, influences the ejection amount or ejection direction of an ink of each nozzle, and consequently deteriorates image quality as a density nonuniformity of a printed image.

An example of the density nonuniformity will be explained below with reference to FIGS. 71A to 72C. In FIG. 71A, a multi-head 91 is constituted by eight multi-nozzles 92 for ejecting ink droplets 93. Normally, the multi-nozzles 92 ideally eject the ink droplets in a uniform amount and in a uniform direction, as shown in FIG. 71A. If such ejection is performed, dots having a uniform size land on a sheet surface, as shown in FIG. 71B, and a uniform image free from the density nonuniformity can be obtained as a whole (FIG. 71C).

However, in practice, each nozzle suffers from a variation, as described above. If a print operation is performed in the same manner as described above, ink droplets having various sizes are ejected from the nozzles in various directions, as shown in FIG. 72A, and land on a sheet surface, as shown in FIG. 72B. As shown in FIG. 72B, a blank portion, which does not satisfy an area factor of 100%, conversely, a portion where dots unnecessarily overlap each other, and a white line (at the center of FIG. 72B) periodically appear in the head main scan direction. The group of dots which landed in the state shown in FIG. 72B has a density distribution shown in FIG. 72C in the nozzle alignment direction, and consequently, such a phenomenon is normally observed as a density nonuniformity by human eye.

As a countermeasure against such density nonuniformity, the following method has been proposed. The method will be described below with reference to FIGS. 73A to 74C. According to this method, in order to complete a print area shown in FIGS. 71A to 72C, the multi-head 91 is scanned (main scan) three times, and a half area in units of four pixels is completed by two passes. In this case, the eight nozzles of the multi-head are divided into two groups respectively including upper four nozzles and lower four nozzles. Dots to be printed by one nozzle in a single scan are obtained by thinning out given image data to about a half according to a predetermined image data arrangement. In the second scan, dots corresponding to the remaining half image data are printed, thus completing the area in units of four pixels. The above-mentioned recording method will be referred to as a divisional recording method hereinafter.

When such a recording method is used, even if a head equivalent to the multi-head shown in FIG. 72A is used, since the influence of the nozzles to a printed image is reduced to half, an image shown in FIG. 73B is printed, and black and white lines observed in FIG. 72B do not become conspicuous. Therefore, the density nonuniformity is remarkably eliminated as compared to FIG. 72C, as shown in FIG. 73C.

Upon execution of such recording, image data is divisionally thinned out to predetermined complementary arrangements in the first and second scans. As the image data arrangement (thinning pattern), a checker pattern in which dots are printed on every other pixel in the vertical and horizontal directions is normally used, as shown in FIG. 74A. Therefore, a unit print area (in units of four pixels) is completed by the first scan for printing dots in a checker pattern and the second scan for printing dots in a reverse checker pattern.

FIGS. 74A, 74B, and 74C explain how to complete a predetermined record area using the checker and reverse checker patterns by the multi-head having eight nozzles like in FIGS. 71A to 73C. In the first scan, dots are recorded in a checker pattern ● using lower four nozzles (FIG. 74A). In the second scan, a sheet is fed by four pixels (½ the head length), and dots are recorded in a reverse checker pattern ○ (FIG. 74B). Furthermore, in the third scan, the sheet is fed by four pixels (½ the head length), and dots are recorded in the checker pattern again (FIG. 74C). In this manner, when the sheet feed operation in units of four pixels, and recording operations of the checker and reverse checker patterns are alternately performed, a record area in units of four pixels is completed for each scan.

As described above, since the print area is completed by two different groups of nozzles, a high-quality image free from the density nonuniformity can be obtained.

Such a recording method has already been disclosed in Japanese Laid-Open Patent Application No. 60-107975 and U.S. Pat. No. 4,967,203, and these references describe that this method is effective to remove the density nonuniformity and connection lines. The former reference discloses that "the invention is characterized by comprising means for forming an overlapping portion by overlapping two adjacent main scans by setting a sheet feed width of each main scan to be smaller than the width of the main scan, and means for printing dots of the overlapping portion so as not to overlap each other in the two main scans". According to this reference, as described above, a thinning mask is defined as one for "alternately printing odd and even rows in every other column" in one case. However, in another case, odd rows are printed in the first scan, and even rows are printed in the second scan. In still another case, odd and even rows are randomly printed in each scan. Thus, the thinning mask and the sheet feed width are not completely limited.

In contrast to this, the latter U.S. Pat. No. 4,967,203 discloses that

"a) in the first pass, dots are printed at alternate pixel positions, which are not two-dimensionally adjacent to each other, of only the upper half of a first band, b) in the second pass, dots are printed on pixel positions, which are not printed in the first pass, in the first band, and at alternate pixel positions, which are not two-dimensionally adjacent to each other, in the lower half of the first band, and c) in the third pass, dots are printed at pixel positions, which are not printed in the first and second passes, in the first band, and at the same time, the first pass print operation in the next band."

In this manner, in this reference, a thinning mask used in divisional recording is limited to an alternate pixel arrangement in which pixels are not two-dimensionally adjacent to each other.

As an arrangement to be additionally described in this reference, a recording method wherein a pseudo pixel (super pixel) as a group of several pixels is formed for the purpose of gradation expression and multi-color expression, and an alternate thinning print operation at two-dimensionally non-adjacent pixel positions in units of pseudo pixels (super pixels) is disclosed. It is described that according to this method, "once a system for realizing the method is installed in a software program or printer firmware, since the program can be called by the numbers of color combinations designated in association with super pixels, high print quality can be achieved without unnecessarily complicating an operation for creating a computer program for generating a large number of colors", and simplified programming for achieving multi-color expression is listed as one effect. It is also described that since each super pixel is intended to be perceived as a single uniform color, color blurring within each super pixel is harmless.

The above-mentioned divisional recording requires considerable time cost per page, and the throughput is inevitably lowered. In this case, in order to shorten the print time, a method of reciprocally print-scanning a carriage is proposed. According to this method, since all carriage scans each for returning the carriage to the home position without performing any record operation after one record scan can be omitted, the record time per page can be reduced to almost half. In practice, the reciprocal print operation is popularly adopted as a monochrome print method. However, in a color ink jet apparatus having the arrangement of the present invention, the reciprocal print method is not put into practical applications yet for the following reasons.

FIG. 75 is a sectional view of a normally used recording ink and a landing state of the ink printed on a medium (paper sheet). FIG. 75 illustrates a state wherein two different color inks (dots) are absorbed (recorded) at almost neighboring positions to have a time distance therebetween. It is to be noted that, in an overlapping portion of two dots, the subsequently recorded dot tends to extend under the previously recorded dot in the sheet depth direction. Such a phenomenon is caused for the following reason. That is, in a process wherein a dyestuff such as a dye in the ejected ink is physically and chemically coupled to a recording medium, since the coupling capacity between the recording medium and the dyestuff is finite, the previously ejected ink dyestuff is preferentially coupled to the recording medium as along as there is no large coupling force difference depending on the types of dyestuffs, and remains in a large amount near the surface portion of the recording medium. Conversely, the subsequently ejected ink dyestuff is not easily coupled to the surface portion of the recording medium, and is fixed after it sinks deep in the sheet depth direction.

In this case, even when two different inks are printed at a single landing point, a priority color varies depending on the print order of the two different inks, and consequently, two different colors are expressed for visual characteristics of man. For example, assume that four color heads are arranged in the order of black, cyan, magenta, and yellow from the right, and main scans are performed by reciprocally moving the heads in the head alignment direction (right-and-left direction). In a forward scan, the heads are moved rightward, and simultaneously perform recording. At this time, since the recording order on a sheet surface follows the alignment order of the heads, for example, when a green (cyan+yellow) signal is input to a given area, inks are absorbed by each pixel in the order of cyan and yellow. Therefore, as described above, in this scan, the previously absorbed cyan serves as the priority color, and a cyanish green dot is formed. Conversely, in a backward scan after a sheet feed operation is performed in the sub-scan direction, the heads perform recording while being moved in a direction opposite to the forward scan. Therefore, the print order is reversed, and in this scan, a yellowish green dot is formed. When such scans are repeated, cyanish green dots and yellowish green dots are recorded according to the forward and backward movements of the recording heads. If each scan does not use the divisional print method and the sheet feed operation is performed by the head width after each of the forward and backward scans, a cyanish green area and a yellowish green area alternately appear by the head width, and a green image which should be a uniform image, is considerably deteriorated.

However, this defect can be slightly conquered using the conventional divisional recording method. More specifically, in the divisional recording method, as has been described above with reference to FIGS. 74A to 74C, cyanish green dots are recorded in the forward scans (FIGS. 74A and 74C), and yellowish green dots are recorded in the backward scan (FIG. 74B). Therefore, the color tone of a given area is relaxed by the dots having the two different color tones.

The arrangement and effect for eliminating color nonuniformity in units of bands by mixing dots having two different color tones in a given area, as described above, have already been disclosed in U.S. Pat. No. 4,748,453. In this reference, although the sheet feed amount is not limited, dots are complementarily recorded at two-dimensionally alternate pixel positions in two (first and second) or more record scans, thereby preventing beading of inks on a medium such as an OHP sheet. In addition, when a color image is recorded, the ink landing order for color-mixed pixels is reversed between the first and second scans (reciprocal recording), thereby preventing color banding (color nonuniformity). Since this reference has as its principal object to prevent beading between neighboring pixels, it is characterized in that dots are recorded at two-dimensionally alternate (non-adjacent) pixel positions in a single scan.

Japanese Laid-Open Patent Application No. 58-194541 by the same applicant (Canon K. K.) as the present invention discloses a technique wherein a plurality of recording element arrays are arranged parallel to each other, upon execution of a main scan for recording a dot matrix by reciprocally moving the recording element arrays in a direction perpendicular to the recording element arrays, dot s fewer than all dots in at least one of rows and columns of the recording dot matrix are intermittently recorded in a forward main scan, and remaining dots in at least one of rows and columns of the recording dot matrix are intermittently recorded in a backward main scan, so that the forward and backward main scans have different overlay recording orders of overlay recording dots using the plurality of recording element arrays. In this reference as well, there is no limitation such that the sheet feed width is set to be smaller than a normal width unlike in the previously described divisional recording, and the effect of this reference is to prevent deterioration of image quality caused by color mis-registration (color nonuniformity) of a recorded image caused by overlay recording of color inks.

Since this reference has as its principal object to prevent color mis-registration, dot positions to be recorded in each scan are not particularly limited. In the embodiments of this reference, a horizontal thinning pattern used for alternately recording dots in only the vertical direction, and a vertical thinning pattern alternately repeated in only the horizontal direction are described in addition to checker patterns (checker and reverse checker patterns).

Also, Japanese Laid-Open Patent Application No. 55-113573 discloses an arrangement for performing reciprocal recording using checker patterns (checker and reverse checker patterns) although it is not limited to a color printer. This reference inhibits continuous print operations of neighboring dots, thereby preventing a dot distortion caused by printing a neighboring dot before a previously printed dot is dried. Therefore, in this reference, a thinning mask is limited to a checker pattern like in U.S. Pat. No. 4,748,453.

The three references presented above have as their objects to prevent color nonuniformity and beading in reciprocal recording. Therefore, these references do not employ an arrangement in which "the sheet feed amount between adjacent scans is set to be equal to or smaller than a normal head width", which arrangement is employed for the purpose of preventing the density nonuniformity caused by variations of nozzles, unlike in the divisional recording method described in this specification.

As described above, when the divisional recording method is adopted in reciprocal recording, since two different groups of recording pixels formed in the opposite ejection orders of color inks can be uniformly arranged in a record area, it is expected that multi-color bi-directional recording, which easily causes color nonuniformity normally, can be realized.

However, even when the above-mentioned divisional recording using the checker and reverse checker patterns is performed, the defect of color nonuniformity is not perfectly removed yet. The reason for this will be described below. In general, the amount of an ink droplet is designed so that ink spreads wider than an area for each pixel on a sheet surface. This is to eliminate any blank portion in an area corresponding to a print duty of 100%. Therefore, even when the divisional recording method is executed, although recording pixels themselves are printed at only 50%, an almost 100% area of a recording medium (recording sheet) is covered by dots, as shown in FIG. 76. FIG. 77 is a sectional view of the sheet surface in this case. In FIG. 77, a checker print operation is performed on a blank sheet in the first pass (forward scan), and a reverse checker print operation is performed in the second pass (backward scan). Reference numeral 2001 indicates a state of inks immediately after the print operation in the first pass (forward scan). In this state, a solid black portion represents a cyan ink, and a hatched portion represents a yellow ink. Since the yellow and cyan inks are printed at an identical position to have a very small time distance therebetween, when they are absorbed by the sheet, the cyan ink is less blurred in a high-density state, and the yellow ink is largely blurred to extend to portions under and around the cyan ink in a low-density state. Also, at this time, the absorbing range of these inks extends over neighboring pixel positions, and as shown in FIG. 76, almost the entire sheet surface is filled with the ink dots.

In the second pass (backward scan) performed under this condition, dots land on the sheet surface on which neighboring ink dots are absorbed, as indicated by reference numeral 2003. Since the second pass is a backward scan, the yellow ink is printed first, and the cyan ink is printed second (2002). When the inks are absorbed in this state, an absorbing state in which both the colors do not clearly appear on the surface is finally formed, as indicated by reference numeral 2003. In a completed image, the density of the cyan ink, which was printed first, is emphasized most strongly, and a green image having cyan as a priority color tone is formed on this print area. Conversely, in a print area which has a backward scan as the first pass, and is adjacent to the above-mentioned print area, the situations of the cyan and yellow inks are reversed, and a green image having yellow as a priority color tone is formed.

FIG. 78 illustrates a state wherein the above-mentioned two print areas appear. As can be seen from FIG. 78, the lower half nozzles of the heads determine the priority color of each area, and the priority color is reversed between the forward and backward scans. Since two areas having the different priority colors are alternately formed, color nonuniformity still appears in the divisional print method, and deteriorates an image, thus preventing practical applications of the reciprocal print operations.

Most of image data are sent as actual signals after multi-value data representing certain gradation levels are binarized by a predetermined binarization method such as a dither method to have a predetermined pattern. Therefore, the number of pixels recorded in the first pass may be considerably different from the number of pixels recorded in the second pass depending on a thinning mask.

Such a phenomenon will be described below with reference to FIGS. 81(A) to 84. In this case, four multi-heads each having eight nozzles are used. The four colors are cyan (c), magenta (m), yellow (y), and black (k). As recording image data, an intermediate color (yellowish green) image obtained by overlaying the c and y inks respectively at print duties of 62.5% and 100% as shown in FIG. 81(A) is printed. A pixel indicated by a pin stripe pattern is a pixel on which c and y dots are printed, and a pixel indicated by a hatching pattern is a pixel on which only a y dot is printed. When the intermediate color shown in FIG. 81(A) is to be printed using a checker mask, c and y dots are printed at a duty of 50% on all possible pixel positions allowed by the checker mask (FIG. 81(B)) in the first pass. In the second pass, c and y dots are printed at the remaining duties, i.e., respectively at duties of 12.5% and 50%. When these passes shown in FIGS. 81(B) and 81(C) are observed in units of recording heads (colors), the c and y heads respectively eject the inks, as shown in FIGS. 81(D) and 81(E), and FIGS. 81(F) and 81(G).

FIG. 82 illustrates the ejection positions of the c and y recording heads in the first scan of the divisional recording method, and a dot formation state on a recording medium as a result of recording. In FIG. 82, a pin stripe pattern represents that both the c and y heads eject the inks on an identical pixel, and a hatched pattern represents that only the y head ejects the ink. In the first scan, each recording head uses four nozzles in a record section (1), and records dots in a checker pattern. As a result, dots in each of which the c and y inks overlap each other are formed in the checker pattern on the recording medium. The sheet is fed by an L/2 width, and the dots recorded in the first scan are moved to a record section (2).

FIG. 83 illustrates the ejection positions in the second scan, and a dot formation state on the recording medium as a result of recording.

In this scan, each head prints dots in a reverse checker pattern using both the record sections (1) and (2). As a result, dots formed by the record section (2) overlap the dots recorded in the checker pattern in the first scan, thus completing recording. The sheet is fed by another L/2 width, so that the dots formed by the recording section (2) are moved outside the record section, and the dots formed by the record section (1) are moved to the record section (2).

As described above, when a dot is printed to overlap the previously recorded dot, the subsequently recorded dot tends to extend under the previously recorded dot in the sheet width direction in the overlapping portion (FIG. 75).

Therefore, FIG. 83 expresses the overlapping portions, so that the dots recorded in the second scan extend under the dots recorded in the first scan.

FIG. 84 illustrates the ejection positions in the third scan, and a dot formation state on the recording medium as a result of recording.

In this scan, each head prints dots in the checker pattern opposite to the second scan using both the record sections (1) and (2). As a result, dots formed by the record section (2) overlap the dots recorded in the reverse checker pattern in the second scan, thus completing recording.

However, at this time, the portion corresponding to the record section (2), and the portion outside the record section, on which recording has been completed in the second scan, have different color tones, and cause color nonuniformity although they have same ejected ink amount.

A cause for this phenomenon is considered as follows. That is, since the dots are formed in the checker pattern first on the portion outside the record section, many dots formed by ejecting the c and y inks on identical pixel positions are present on the surface portion of the recording medium. In contrast to this, on the portion corresponding to the record section (2), since many dots formed by only the y ink are present on the surface portion of the recording medium, this portion forms yellowish green in which the yellow color tone is relatively strong.

As a method of eliminating the above-mentioned defect, a method wherein the number of pixels per color landed in each scan is averaged by adopting the divisional thinning arrangement, which is asynchronous with the arrangement of image data for gradation expression in an area gradation method, so as to eliminate a color tone difference of the scans, is proposed. As shown in FIGS. 85 and 86, in, e.g., a so-called Bayer type area gradation method of the dither method, thinning patterns 601 and 602 shown in FIG. 86 are used in place of thinning patterns 501 and 502 shown in FIG. 85, so that the first and second passes have the same number of landed pixels, thereby obtaining a good image.

However, such a method cannot be applied to the bi-directional print method, which is expected to further improve the throughput. On the contrary, color nonuniformity appears even on a color-mixed image, which is obtained by mixing two colors at the same duty, and does not pose any problem in the one-directional print method. Such a phenomenon is caused since the alignment order of the heads with respect to the moving direction of the carriage is reversed between the forward and backward scans, and hence, the ink landing order is completely reversed between the forward and backward scans.

The fundamental factor depends on a blurring state occurring when two different color inks land on an identical pixel position, as has been described above. However, such a phenomenon appears not only when two different color inks are printed on an identical pixel position, but also when dots printed on neighboring pixel positions are blurred considerably. This phenomenon appears more conspicuously as the pass interval is increased. This is because such a blurring phenomenon depends on the ink absorbing state of the sheet surface when the second dot lands. That is, a landing state obtained when the second dot is printed on the sheet surface on which the ink is completely absorbed is different from a landing state obtained when the second dot lands on a position adjacent to the first dot before the first ink droplet is completely absorbed, i.e., before the absorbed ink is blurred. In the latter case, the landing states of the two dots are similar to each other.

An example of such phenomenon will be described below as a bi-directional 2-pass print method of an ink jet recording apparatus. For the sake of simplicity, a state of a green image obtained by printing cyan and yellow dots at duties of 100% within a 4×4 matrix will be exemplified. FIGS. 87 and 88 are views for explaining the conventional bi-directional print method, and illustrate the landing states of color dots in the first pass (forward scan) and the second pass (backward scan) when thinning masks 201 and 202 are used.

The mask pattern 201 is used in the first pass, and the mask pattern 202 is used in the second pass. In the same pass, cyan and yellow dots, and even other color dots are printed using the same mask. A print state to be obtained when green image data 203 is input to all pixels will be described below.

The heads are aligned in the order of black, cyan, magenta, and yellow with respect to the forward moving direction of the carriage. Therefore, in the first pass (forward scan), in order to form the green image 203, cyan dots are printed first, and yellow dots are printed after a short delay time (204). Conversely, in the second pass (backward scan), yellow dots are printed first, and thereafter, cyan dots are printed (205).

In FIG. 88, a state 401 corresponds to an ink state immediately after the first pass print when viewed in a sheet section. In the state 401, a solid black portion represents the cyan ink, and a hatched portion represents the yellow ink. Since the yellow ink is printed at the same position as the cyan ink to have a very small time distance, it lands to overlap the cyan ink. When these inks are absorbed by the sheet in this state, a state 402 is attained. Since the cyan ink lands before the yellow ink to contact the sheet surface, it is less blurred, and has a high density. However, the yellow ink to be absorbed immediately after the cyan ink is absorbed on the sheet surface on which the cyan ink has already permeated. For this reason, the yellow ink is largely blurred to extend under and around the cyan ink, and has a low density. The state 204 in FIG. 87 corresponds to this print state when viewed from above the sheet surface. In the state 204, a capital letter represents an ink color having a high density and serving as a priority color, and a small letter represents an ink color having a low density. In this case, the high-density cyan (C) dots and the low-density yellow (y) dots are printed at pixel positions of the mask 201 in the first pass. At this time, the absorbing range of these inks extends to the neighboring pixel position, as can be seen from the state 402, and in this state, the sheet surface is almost filled with the ink dots.

In the second pass performed under this condition, the ink dots are printed on the sheet surface on which neighboring ink dots have already been absorbed, as indicated by a state 403. In this case, since the reciprocal print operations are to be executed, the yellow ink is printed first, and the cyan ink is printed later in the second pass. When the inks are absorbed in this state, finally, they do not clearly appear on the surface portion, as indicated by a state 404. Therefore, as indicated by the state 205 as well, both the cyan and yellow inks are largely blurred and have a low density. Thus, in a complete printed image, the density of only the cyan ink printed in the first pass is emphasized, and a green image having cyan as a priority color tone is formed on this print area (206).

Conversely, in a print area adjacent to the above-mentioned print area, in which the mask for the backward scan (the second pass for the above-mentioned print area) is used in the first pass, the situations of the cyan and yellow inks are reversed, and a green image having yellow as a priority color tone is formed. Such two different print areas are alternately formed, color nonuniformity appears and deteriorates image quality, thus preventing practical applications of the bi-directional print method.

Therefore, in a printer designed for both a normal paper sheet and a coating paper sheet, only a one-directional print operation is performed in correspondence with the coating paper sheet although the printer can further improve the throughput for a normal paper sheet.

Furthermore, the defect caused by blurring of an ink to the neighboring pixel position is observed not only as the color nonuniformity but also in monochrome reciprocal print operations. Such a defect will be explained below. FIG. 79 shows the absorbing state of a monochrome ink in the first and second passes like in FIG. 77. In FIG. 79, a state 2101 represents a landing state immediately after the first pass print, and states 2102 and 2103 represent landing states after the second pass print when viewed in a sheet section. In the state 2102, the second pass print is performed immediately after the first pass print, and in the state 2103, the second pass print is performed after a certain delay time after the first pass print. These two states cause different absorbing states of the ink recorded in the second pass to the sheet surface. That is, in the state 2102, the ink is absorbed deep in the sheet depth direction, while in the state 2103, the ink printed in the second pass extends on the sheet surface. These states are also confirmed from the rear sheet surface side. That is, the ink in the state 2103 considerably penetrates the sheet to the rear surface side as compared to the state 2102. These states also appear as a density difference on the sheet surface (2104 and 2105).

The time distance generated by reciprocally scanning the carriage is sufficient with respect to the order of the time difference that causes the density difference between the above-mentioned states. This factor appears as a new defect upon execution of the reciprocal print operations. This defect will be described below with reference to FIG. 80.

In FIG. 80, the head performs a forward scan in the direction of an arrow from a position 2201 to perform recording corresponding to a first scan width. After the head performs recording for one line, a sheet is fed by a width ½ the scan width, and the head then performs a backward scan in the opposite direction in turn from a position 2202 shown in FIG. 80. Furthermore, after the sheet is fed by the same width as described above, the head performs the forward scan again from a position 2203 to perform recording in the direction of the arrow. Recording intervals of the second pass at positions ① to ⑥ of the print area completed at this time are compared. More specifically, at positions ③ and ④, after the first pass print is completed, the second pass print is performed immediately after the sheet is fed by a ½ width. In contrast to this, at positions ① and ⑥, after the first pass print, the second pass print is performed after an elapse of a time required for reciprocally scanning the carriage once. At positions ② and ⑤, the two print operations are performed at just an intermediate time distance. Therefore, as has already been described above with reference to FIG. 79, the positions ① and ⑥ have the highest density, the positions ② and ⑤ have the next highest density, and the positions ③ and ④ have the lowest surface density since the ink is absorbed deepest. Therefore, the density nonuniformity appears on the left-hand side area where the positions ① and ④ repetitively appear at an interval of the ½ width in the vertical direction, and on the right-hand side area where the positions ③ and ⑥ repetitively appear at the interval of the ½ width in the vertical direction, thus deteriorating image quality.

As described above, the blurring state to non-print pixel positions in the first pass causes dependency of the density on the recording interval between the first and second passes, and it can be understood from this respect as well that actual applications of the reciprocal print method have been impossible so far. In the above description, monochrome recording has been exemplified. This phenomenon also appears together with color nonuniformity in mixed-color recording, as has already been described above, and in this case, it is recognized as right and left different color nonuniformity portions or different color tones.

In one-directional recording as well, the following factor is known as a defect influencing the recording time distance. When the recording apparatus performs a head recovery scan to maintain its own driving scans during recording or waits for transfer of recording data, the carriage is temporarily set in a rest state. Such a rest state causes density nonuniformity which occurs irregularly on the order still larger than that of the time distance nonuniformity described above. More specifically, when the carriage is set in a rest state after the first pass print is completed, and the second pass print is performed after some time distance, a corresponding record area has a higher density than other areas. The density nonuniformity caused by such a factor will be referred to as rest nonuniformity to be distinguished from the time distance nonuniformity.

As described above, when the divisional recording or the bi-directional print method is realized to achieve high image quality and high-speed image formation in an ink jet recording apparatus for performing image formation by scanning recording heads in a direction different from the nozzle alignment direction of one head, image defects such as color nonuniformity, rest nonuniformity, and time distance nonuniformity remain unremoved.

As a recording medium for such an ink jet recording apparatus, a special-purpose paper sheet having a coating layer, which is manufactured in consideration of color development characteristics, fixing characteristics, and the like of an ink, is known. In recent years, however, demand for use of various media such as a normal paper sheet, TP paper for an OHP, and the like is increasing. With this demand, the recording apparatus itself is demanded to achieve adaptation (high image quality) to various media. However, since ink adaptability varies depending on media, when the above-mentioned print method is used for all media, some media may suffer from various defects. In particular, the TP paper has a particularly low ink absorption speed as compared to other media, and the affinity force between ink droplets, which land on the sheet surface but are not completely absorbed, overcomes the absorption force of the coating layer on the TP paper. Therefore, when two or more such ink droplets are present at neighboring positions, as shown in FIG. 89, the ink droplets draw each other, and are coupled to form a large ink droplet at a position displaced from their original landing positions. Such a phenomenon is unique to a recording medium such as the TP paper having a low ink absorption speed, and is called "beading".

Such a phenomenon does not always occur in units of dots. The recording state of an area recorded by simultaneous scans by a conventional serial type print method in which a recording head having a predetermined recording width is moved in the main scan direction, and a sheet is fed in the sub-scan direction after the main scan is completed will be examined below in respect to a wider area with reference to FIGS. 90A to 90C. If ink droplets are printed at a low density (low duty) so as not to contact each other, they do not influence each other, and can maintain independent states so that the center of each dot is located at the center of the pixel. However, when ink droplets are printed at a high density (high duty) so as to contact each other, each ink droplet is apt to join contacting neighboring ink droplets. Therefore, a series of ink droplets located at the end portion are drawn to the center of the scan width of the recording head by a very strong affinity force, and the density at their real landing positions becomes considerably lower than the density to be obtained (FIG. 90A).

After the above-mentioned first scan, the second scan is performed on an area contiguous with the first scan area. In this area as well, the affinity force of ink droplets acts, and ink droplets at the end portion are drawn to the center of the second scan width by the same phenomenon as that in the first scan described above. As a result, the density of the end portion is lowered (FIG. 90B).

When such scans are continuously performed, the end portions having a low density are formed adjacent to each other between two each adjacent recording areas of the first and second scans, and a plurality subsequent scans. These end portions form white lines between two each recording areas, and impair the uniformity of the entire image, thus considerably deteriorating image quality (FIG. 90C).

A recording medium such as TP paper having a low ink absorption speed has been described. Even in a recording medium such as coated paper having high ink absorbency, an image defect occurs on a connection area between two adjacent scans although a phenomenon in this case is different from the above-mentioned one. Even in general paper, since some sheets have poor ink absorbency like in the TP paper but some other sheets have absorbency equivalent to the coated paper, an image defect inevitably occurs on a connection area.

Since the coated paper is designed to quickly absorb an ink in the sheet surface, no ink drawing phenomenon (e.g., beading) occurs unlike in the TP paper. However, a density difference appears depending on the ink landing/absorption timing. FIG. 91A is a sectional view showing a state wherein an ink droplet of a predetermined amount lands on and is absorbed by the sheet surface, and FIG. 91B is a sectional view showing a state wherein two ink droplets obtained by equally dividing the above-mentioned amount land on and are absorbed by the sheet surface at a time interval. As can be seen from FIGS. 91A and 91B, if the ink amount remains the same, when the ink is divisionally recorded several times in a small amount each at a time interval, the ink tends to remain more on the surface portion of the sheet, and hence, the surface density is increased. Such a phenomenon also appears on a connection area between adjacent record scans.

FIG. 91B shows a state wherein images on two image areas are completed by two scans. Since an ink dot is designed to have a size larger than one pixel area, two or more dots overlap each other on all areas. At a boundary portion, since the extrusion portion is divisionally recorded by two scans at a time interval, a connection line having a higher density than that of other areas is undesirably formed. Also, the time interval between adjacent record scans is not always constant due to a different data transfer time, a recovery operation of the recording apparatus main body, and the like. When the recording head stands by at the home position after some record scans are completed, the density of the connection area is further increased, and image quality is further deteriorated. The density nonuniformity appearing in such a carriage rest state will be referred to as rest nonuniformity hereinafter.

When the above-mentioned divisional recording method is used, the defects described above on TP paper, coated paper, and the like can be avoided to some extent. More specifically, according to the divisional recording method, since an image in a single area is completed by two different groups of nozzles, the density nonuniformity in the single image area can be prevented, while a connection line in units of scans using neighboring nozzles at the end portions can be slightly moderated by the divisional recording method. On the TP paper, since a boundary portion of an image area on which record scans have been completed is contiguous with an area on which recording has been completed at least at a duty of 50%, an ink affinity force in a single image area is not so strong. On the coated paper, since two record scans are performed for each area at a time interval, the density is increased as a whole, and an increase in density of the connection area alone can be prevented.

With the above-mentioned divisional recording method, it has been attempted to form an image free from a sheet feed connection line, blurring at a boundary between different colors, nozzle nonuniformity, or beading on a recording medium such as TP paper having a low ink absorption speed or on a medium such as coated paper having a high ink absorption speed.

However, even in the divisional recording method for executing the two-divided record scans, especially, the sheet feed connection line cannot be satisfactorily eliminated. In particular, beading or a sheet feed connection line is far from being removed by the divisional recording method using as few as two passes. A state of a connection line appearing upon execution of the divisional recording method will be explained below.

FIGS. 92A to 92C are views for explaining a divisional print operations for completing an image by two scans. In FIGS. 92A to 92C, an image is recorded by a head consisting of eight nozzles, for the sake of simplicity. In a first record scan (FIG. 92A), dots are recorded on a first image area in a checker pattern at a duty of 50%, as shown in FIG. 92A. At this time, no dots are recorded on a second image area. If dots are recorded at neighboring positions, they draw each other, and cause, e.g., beading, as has been described above with reference to FIG. 89 or FIGS. 90A to 90C. However, in this case, since the dots are recorded at non-neighboring positions, they remain at real pixel positions. In FIGS. 92A to 92C, assume that these ink droplets are not completely absorbed by the medium yet due to the low absorption speed of the recording medium, and remain on the surface as liquid droplets.

In a second record scan (FIG. 92B), dots are recorded at pixel positions on the first image area, which positions are not subjected to recording in the first record scan. At the same time, dots are recorded on the second image area at non-neighboring positions, as shown in FIG. 92B. At this time, the dots recorded on the second image area maintain their pixel positions without drawing each other like in the first record scan. However, on the first image area, since the absorption speed of the medium is low, the ink droplets recorded in the first record scan still remain on the medium surface as liquid droplets. Therefore, in the current second record scan, since the ink droplets are recorded at positions adjacent to the above-mentioned remaining ink droplets, these ink droplets draw each other, and tend to move toward the center of the first image area. The affinity force of the first image area influences a pixel array, contiguous with the first image area, in the second image area. Dots on this pixel array are adjacent to the dots at the end portion of the first image area at an instance when the second record scan is performed and the first image area is completed, and are drawn toward the first image area by the strong affinity force of the completed first image area. Therefore, dots on the pixel array, closest to the first image area, of the second image area, are displaced from their real pixel positions, and this portion forms a white line having a low density.

A third record scan will be described below. In this scan, dots are recorded at non-neighboring pixel positions in a third image area while completing the second image area, like in the second record scan. The ink affinity force is generated in the second image area like in the second record scan, and ink droplets in the second image area and inks at the end portion of the third image area are drawn toward the center of the second image area (FIG. 92C). At this time, a pixel array at the end portion on the first image area side in the second image area is adjacent to not only those in the second image area but also to a non-absorbed pixel array in the first image area. Therefore, both a force toward the center of the second image area and a force toward the center of the first image area act on this pixel array at the end portion. However, the first image area includes the ink droplets recorded in the first record scan, and the second image area includes ink droplets currently recorded in the third record scan. Therefore, since the second image area has a larger absolute amount of non-absorbed ink droplets on the medium than the first image area, the force toward the second image area is stronger than the force toward the first image area, and the dots at the end portion are drawn toward the second image area. Therefore, a connection white line is formed between the completed first and second image areas.

Such a pixel drawing phenomenon at the end portion caused by an ink affinity force is gradually weakened as the number of divisions of the divisional recording method is increased. However, as long as the divisional recording is performed, adjacent image areas during printing inevitably have a difference in degree of print completion more or less. At an instance when an area having a high degree of print completion has reached a duty at which dots are recorded at neighboring positions, the area draws dots at the end portion of the neighboring area having a low degree of print completion, and forms a white line. Therefore, an increase in the number of divisions can never be a fundamental solution to the connection lines. On the contrary, if the number of divisions is increased, since the number of record scans per unit area is increased, another problem, i.e., an increase in recording time cost, is posed.

On coated paper, the divisional recording method worsens image quality in terms of rest nonuniformity. In the divisional recording method in which a single image area is completed by two scans, if a rest time is inserted between the two scans, the density of the corresponding image area is undesirably increased, and a high-image density band appears in a recorded image.

As described above, no image which can satisfactorily eliminate connection lines can be obtained on a medium such as TP paper having a low ink absorption speed and on a medium such as coated paper having a high ink absorption speed.

SUMMARY OF THE INVENTION

The present invention has been made in consideration of the above situation, and has as its object to provide an improved ink jet recording method and apparatus.

It is another object of the present invention to provide an ink jet recording method and apparatus, which can obtain a high-quality image at high speed.

It is still another object of the present invention to provide an ink jet recording method and apparatus, which can obtain a high-quality image free from recording time difference nonuniformity and color nonuniformity.

It is still another object of the present invention to provide an ink jet recording method and apparatus, which can improve the throughput by efficiently selecting a bi-directional print mode and a one-directional print mode.

It is still another object of the present invention to provide an ink jet recording method and apparatus, which can obtain an image free from density nonuniformity, and including an emphasized specific color without lowering the throughput.

It is still another object of the present invention to provide an ink jet recording method and apparatus, which can record a high-quality image independently of the types of recording media.

It is still another object of the present invention to provide an ink jet recording method and apparatus, which record an image on a single area by executing a plurality of main scans on the area using, in turn, a plurality of complementary divisional thinning arrangements in units of (m×n) pixel groups.

It is still another object of the present invention to provide an ink jet recording method and apparatus, which complete recording on a predetermined area by a plurality of main scans while executing thinning print operations, so that at least one color in a single main scan is printed in a different arrangement from those of the other colors.

It is still another object of the present invention to provide an ink jet recording method and apparatus, which record images of a plurality of colors including a specific color in a forward scan of a reciprocal print mode, and record an image of the specific color in the backward scan.

It is still another object of the present invention to provide an ink jet recording method and apparatus, which select one of a one-directional print mode and a bi-directional print mode in correspondence with a recording medium.

It is still another object of the present invention to provide an ink jet recording method and apparatus, which can obtain a smooth, high-quality image free from sheet feed connection lines by uniformly distributing ink connection areas onto an image in segmented states in which the areas cannot be visually observed by man.

It is still another object of the present invention to provide an ink jet recording method and apparatus, which prevent formation of a connection line between two adjacent record scans by increasing the number of dots to be recorded at pixel positions in a boundary area in the last record scan for a unit image area.

The above and other objects will become apparent from the following description taken in conjunction with the accompanying drawings.

BRIEF DESCRIPTION OF THE DRAWINGS

FIG. 8 is a view for explaining thinning masks and images in the 2-pass bi-directional print mode;

FIG. 18 is a view for explaining a case wherein a green image is recorded according to the third embodiment of the present invention;

FIG. 32 is a view for explaining a recording method according to the sixth embodiment of the present invention;

FIG. 35 is a view showing a state of an ink layer of a recording medium in the seventh embodiment;

FIG. 40 is a table showing the relationship between the ink dot extrusion rate and the color distance;

FIG. 45 is a view for explaining recording states of binarized data by a dither method in a case of divisional recording using the mask having the thinning arrangement in units of pixels, and in a case of divisional recording using the mask having the thinning arrangement shown in FIG. 37;

FIG. 56 is a flow chart showing a print mode switching routine;

FIG. 57 is a view showing a recording state according to the 14th embodiment of the present invention;

FIG. 58 is a table showing connection line comparison/estimation results on the basis of the number of record divisions and the size of the divisional record pixel group;

FIG. 61 is a view showing a black ink recording state in a black emphasis mode in the 15th embodiment;

FIGS. 66A to 66E are views for explaining an ink drawing state in the 18th embodiment;

FIGS. 71A to 71C are views showing an ideal print state of an ink jet printer;

FIGS. 72A to 72C are views showing a print state suffering from density nonuniformity;

FIGS. 73A to 73C are views for explaining divisional recording;

FIG. 79 is a view for explaining a density nonuniformity state caused by a time distance;

FIG. 85 is a view showing image data obtained by a predetermined area gradation method and thinning print threshold values;

FIG. 86 is a view showing image data obtained by a predetermined area gradation method and thinning print threshold values;

FIG. 87 is a view for explaining a bi-directional print method;

FIG. 89 is a view for explaining the principle of beading;

DETAILED DESCRIPTION OF THE PREFERRED EMBODIMENTS

Figure 1:
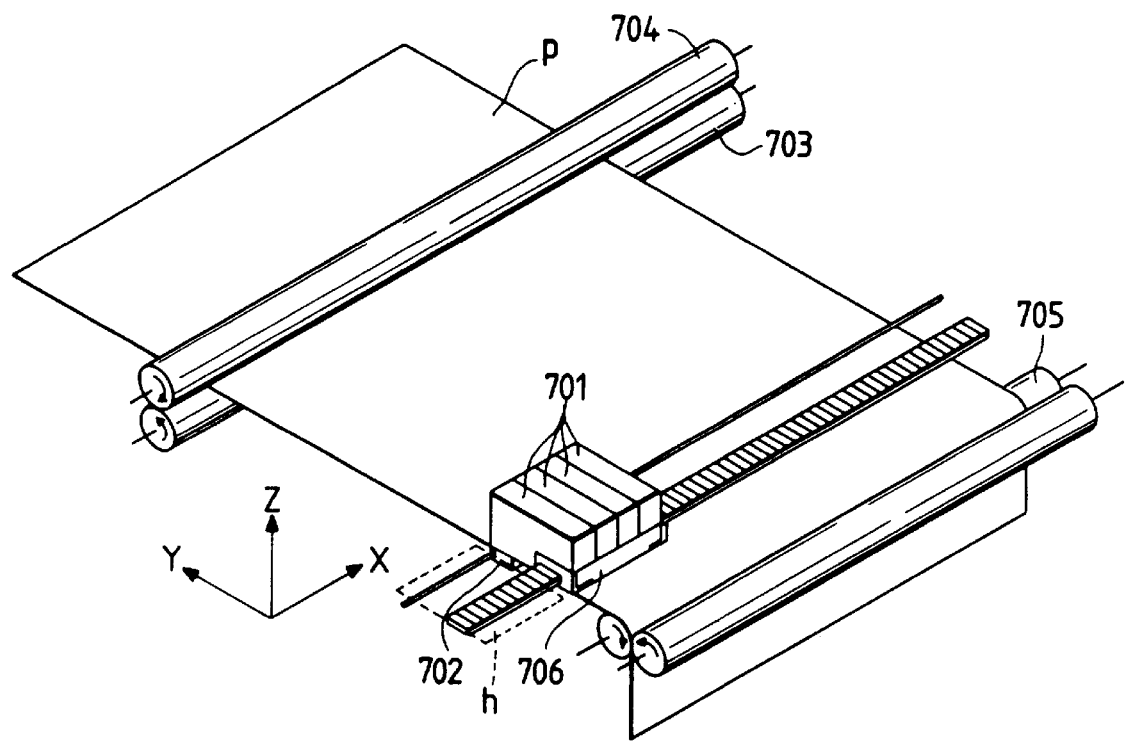
FIG. 1 is a schematic perspective view showing an arrangement of an ink jet recording apparatus to which the present invention can be applied.

The preferred embodiments of the present invention will be described in detail hereinafter with reference to the accompanying drawings. FIG. 1 is a schematic perspective view showing an arrangement of a color ink jet recording apparatus to which the present invention can be applied.

Figure 2:
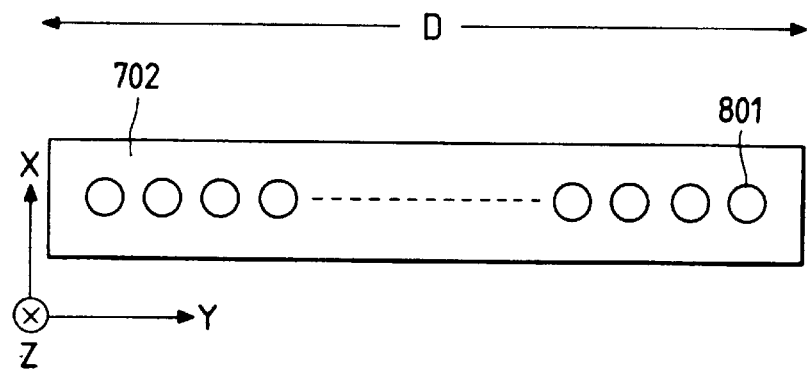
FIG. 2 is a view showing a recording head.

In FIG. 1, each of ink cartridges 701 is constituted by an ink tank for storing a corresponding one of four color inks, i.e., black (K), cyan (C), magenta (M), and yellow (Y) inks, and a multi-head 702 corresponding-to one of these colors. FIG. 2 shows the state of multi-nozzles aligned on each multi-head when viewed from the Z-direction. In FIG. 2, multi-nozzles 801 are aligned on the multi-head 702.

In FIG. 2, the multi-nozzles 801 are aligned parallel to the Y-axis. However, the multi-nozzle array may be slightly inclined on the X-Y plane in FIG. 2. In this case, when the head is moved in the moving direction X, the nozzles perform print operations while shifting their timings.

Referring back to FIG. 1, a sheet feed roller 703 is rotated in the direction of an arrow in FIG. 1 together with an auxiliary roller 704 while pressing a print sheet P, thereby feeding the print sheet P in the Y-direction. Sheet supply rollers 705 are used for supplying the print sheet, and also serve to press the print sheet P in the same manner as the sheet feed roller 703 and the auxiliary roller 704. A carriage 706 supports the four ink cartridges, and moves these cartridges along with a print operation. When no print operation is performed, or when a recovery operation of the multi-heads is to be performed, the carriage 706 waits at a home position h indicated by a dotted line in FIG. 1.

In this embodiment, the recording head of each ink jet cartridge ejects ink droplets by causing a change in state in the ink using heat energy.

The four ink jet cartridges carried on the carriage 706 are aligned to overlay inks in the order of black, cyan, magenta, and yellow inks in the forward movement of the carriage. An intermediate color can be realized by properly overlaying C, M, and Y color ink dots. More specifically, red can be realized by overlaying M and Y, blue can be realized by overlaying C and M, and green can be realized by overlaying C and Y.

In general, black can be realized by overlaying three colors, i.e., C, M, and Y. However, in this case, black has poor color development characteristics. Since it is difficult to overlay these colors with high precision, a chromatic edge is formed around a black dot. In addition, an ink print density per unit time becomes too high. For these reasons, the black ink is independently ejected.

Figure 3:
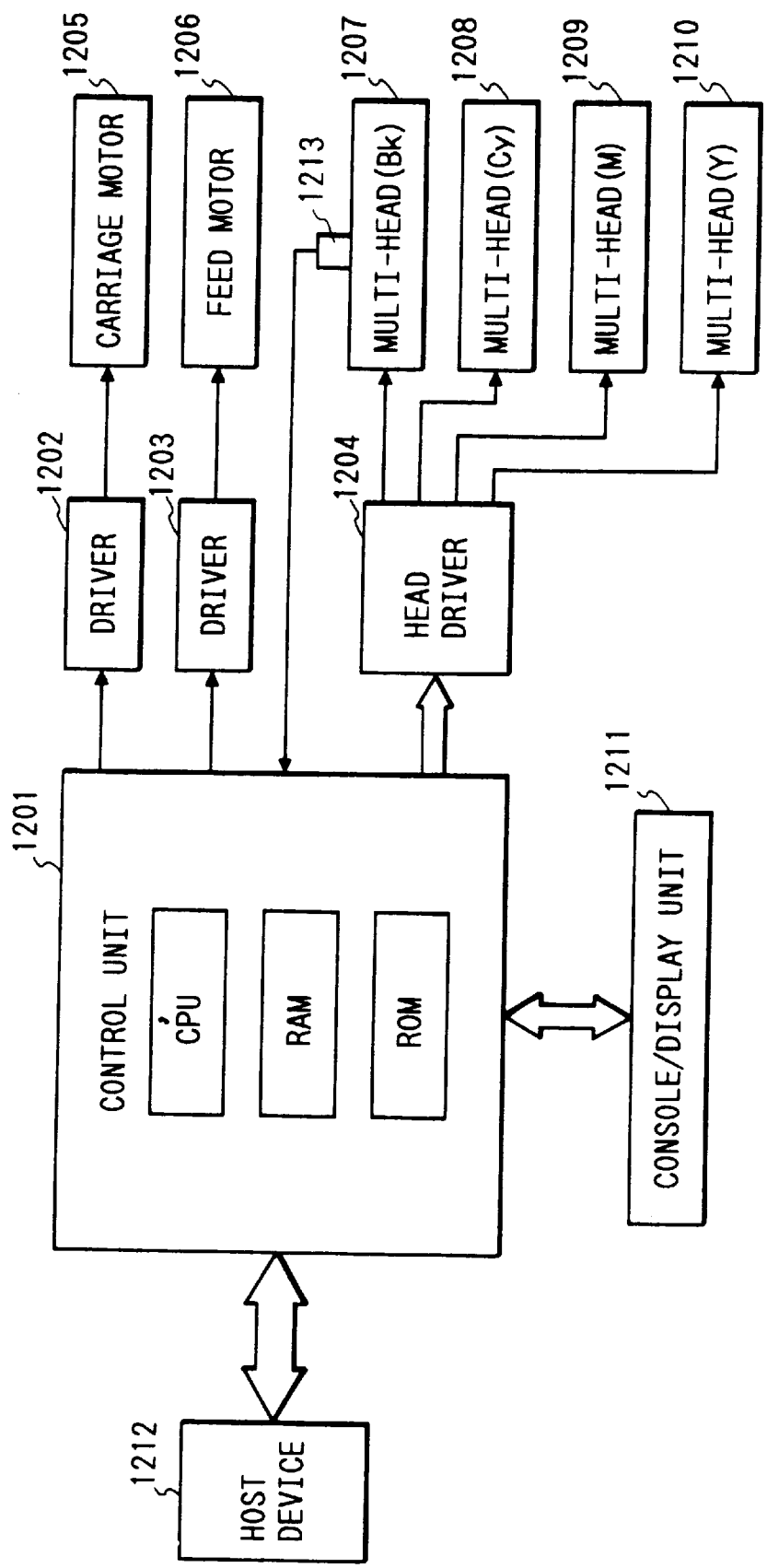
FIG. 3 is a block diagram showing a control unit of the ink jet recording apparatus shown in FIG. 1.

FIG. 3 is a block diagram showing a control unit of the ink jet recording apparatus shown in FIG. 1. In FIG. 3, a control unit 1201 is mainly constituted by a CPU, a ROM, a RAM, and the like, and controls the respective sections of the apparatus according to a program stored in the ROM. A driver 1202 drives a carriage motor 1205 for moving (main-scanning) the carriage 706 in the X-direction on the basis of a signal from the control unit 1201. A driver 1203 drives a feed motor 1206 for feeding (sub-scanning) a recording medium in the Y-direction by driving the sheet supply rollers 705 and the sheet feed roller 703 on the basis of a signal from the control unit 1201. A driver 1204 drives color multi-heads 1207 to 1210 (corresponding to the heads 702 in FIG. 1) on the basis of print data from the control unit 1201. A console/display unit 1211 is used for performing various key inputs and various displays. A host device 1212 supplies print data to the control unit 1201. A temperature sensor 1213 detects the temperature of the black multi-head 1207.

When a print start command is input, the carriage 706 located at the home position in FIG. 1 before a print operation is started performs a print operation for all colors on a record area on the sheet surface using the n multi-nozzles 801 of the multi-heads 702 while being moved forward in the X-direction. When the data print operation up to the sheet surface end portion is completed, and the carriage reaches a reverse position, the carriage then starts backward movement toward the home position, and performs a print operation of black data alone. Also, the sheet is fed in the Y-direction according to the width of the recording area by rotating the sheet feed roller 703 in the direction of the arrow. In this manner, when the print operation using the multi-heads and the sheet feed operation (sub-scan) are repetitively executed, data is printed on one sheet surface.

Embodiments of a recording method executed by the ink jet recording apparatus with the above-mentioned arrangement will be described hereinafter.

First Embodiment

The first embodiment of the present invention will be described below. In this embodiment, upon execution of image recording, a user selects a print mode by manually operating a media selector in the console/display unit 1211 depending on whether a recording sheet is general paper or special-purpose paper such as TP paper (or coated paper). Normally, since the TP paper has lower absorbency than other recording sheets although it has no feature of blurring unlike in the coated paper, a long time is required until the ink is completely absorbed. Therefore, when the print time per unit area is short like in the bi-directional print mode, boundary blurring between different colors may occur. For this reason, the TP paper is not suitable for a print mode attained by a small number of passes. Therefore, when the coated paper or TP paper is selected by the media selector, a 4-pass one-directional print mode is selected.

On the other hand, since the reciprocal print method can be executed for the normal sheet, as described above, when the normal sheet is selected by the media selector, a 2-pass bi-directional print mode with a high throughput is selected as a standard mode.

The details of print scans will be described below with reference to the accompanying drawings. FIGS. 4 to 9 show the 2-pass bi-directional print mode as the normal sheet standard mode. FIGS. 4 to 7 show a state wherein the same thinning masks are used for the black and yellow inks, thinning masks, which compensate for the black and yellow masks, are used for the cyan and magenta inks, and print operations are executed while exchanging these masks in units of passes. For the sake of simplicity, each multi-head 702 has eight nozzles, and FIGS. 4 to 7 show first to fourth scans in which reciprocal print operations and a sheet feed operation by an L/2 width with respect to a head length L are performed, together with the landing orders of pixels. The four colors are aligned with respect to the sheet surface in the order shown in FIGS. 4 to 7, and are recorded in the landing order according to the head scan direction indicated by an arrow in units of scans.

Figure 4:
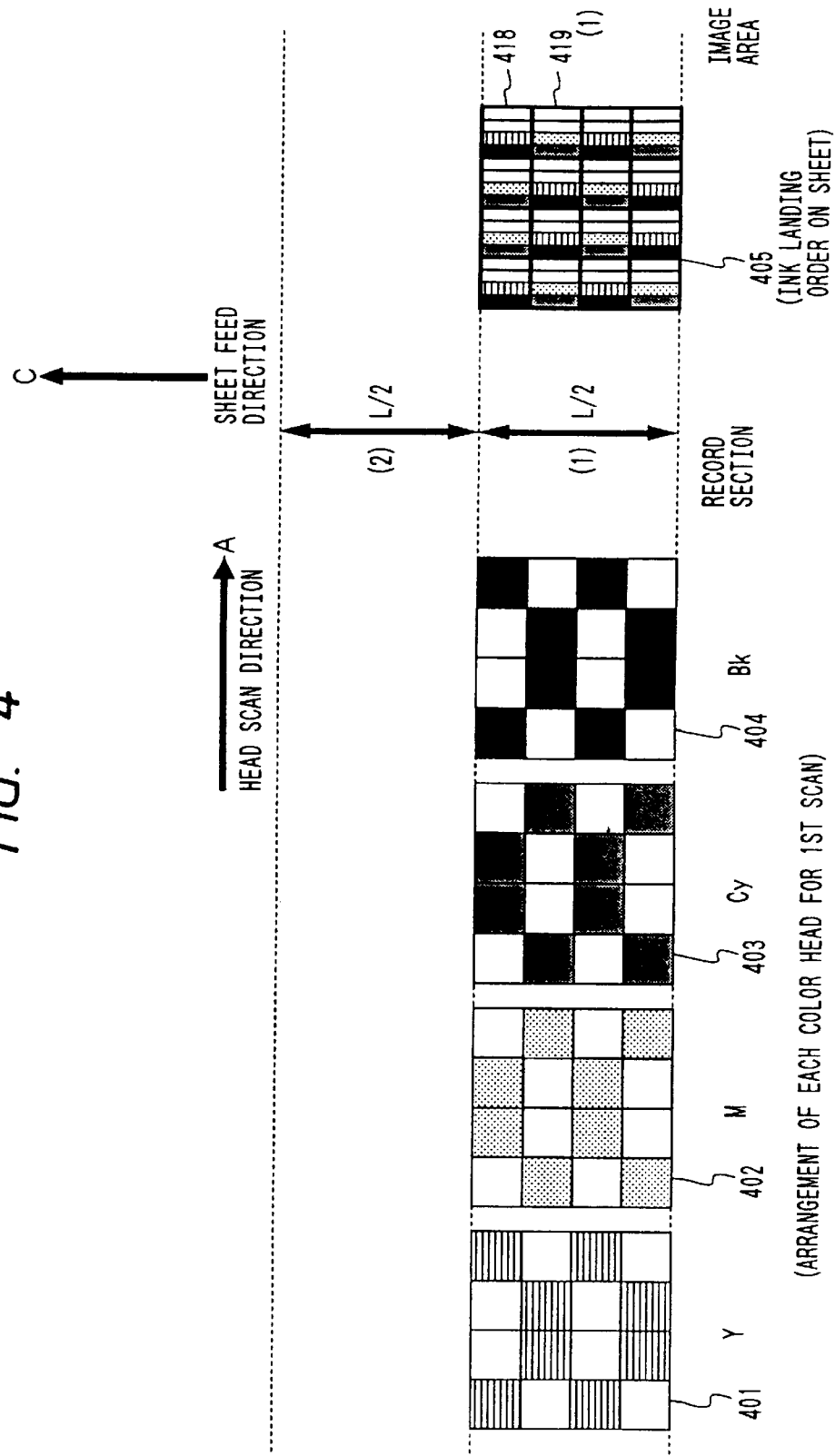
FIG. 4 is a view for explaining a first scan in a 2-pass bi-directional print mode according to the first embodiment of the present invention.

FIG. 4 shows the color masks and the ink landing order on the sheet surface in the first scan. In the first scan, the color inks are ejected onto an area (1) on the normal sheet using lower half four nozzles of the eight nozzles of each head while scanning the four color multi-heads in the direction of an arrow A by the carriage 706. In this case, the print operation is performed using masks 401 to 404 corresponding to the four colors, as shown in FIG. 4, and ink dots sequentially land on pixels in the area (1) on the sheet surface, as indicated by reference numeral 405. Thereafter, the sheet is fed by L/2 corresponding to the half length of each multi-head in the direction of an arrow C. Note that the ink dots land on the pixels on the sheet surface in the order from the left-hand side to the right-hand side. For example, in the first scan, the ink dots land on a pixel 418 in the order of K→Y and the ink dots land on a pixel 419 in the order of C→M.

Figure 5:
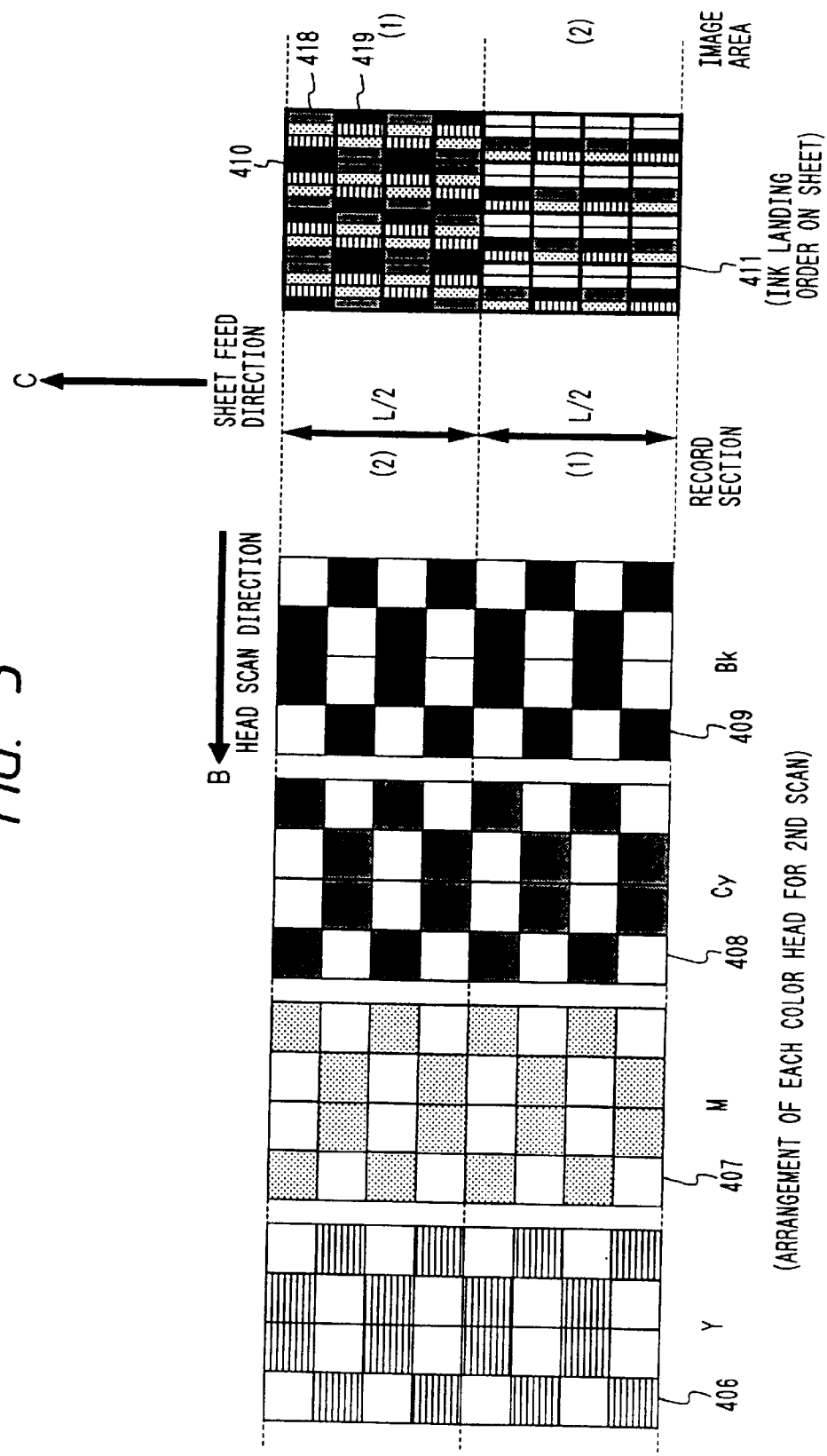
FIG. 5 is a view for explaining the second scan in the 2-pass bi-directional print mode.

FIG. 5 shows the color masks and the ink landing order on the sheet surface in the second scan. In the second scan, color ink dots are ejected onto areas (1) and (2) on the normal sheet using all the nozzles (eight nozzles) of each head while scanning the four color multi-heads in the direction of an arrow B opposite to the direction of the arrow A by the carriage 706. Note that masks 406 to 409 respectively have complementary patterns with respect to the above-mentioned masks 401 to 404 (FIG. 4).

In the second scan, the ink dots sequentially land on pixels in the area (1), as indicated by reference numeral 410, and the ink dots sequentially land on pixels in the area (2), as indicated by reference numeral 411. Thereafter, the sheet is fed by another L/2 in the direction of the arrow C. With the second scan, the print operation on the area (1) is completed. In the first and second scans, the ink dots land on the pixel 418 in the area (1) in the order of K→Y→M→C, and ink dots land on the pixel 419 in the order of C→M→Y→K.

Figure 6:
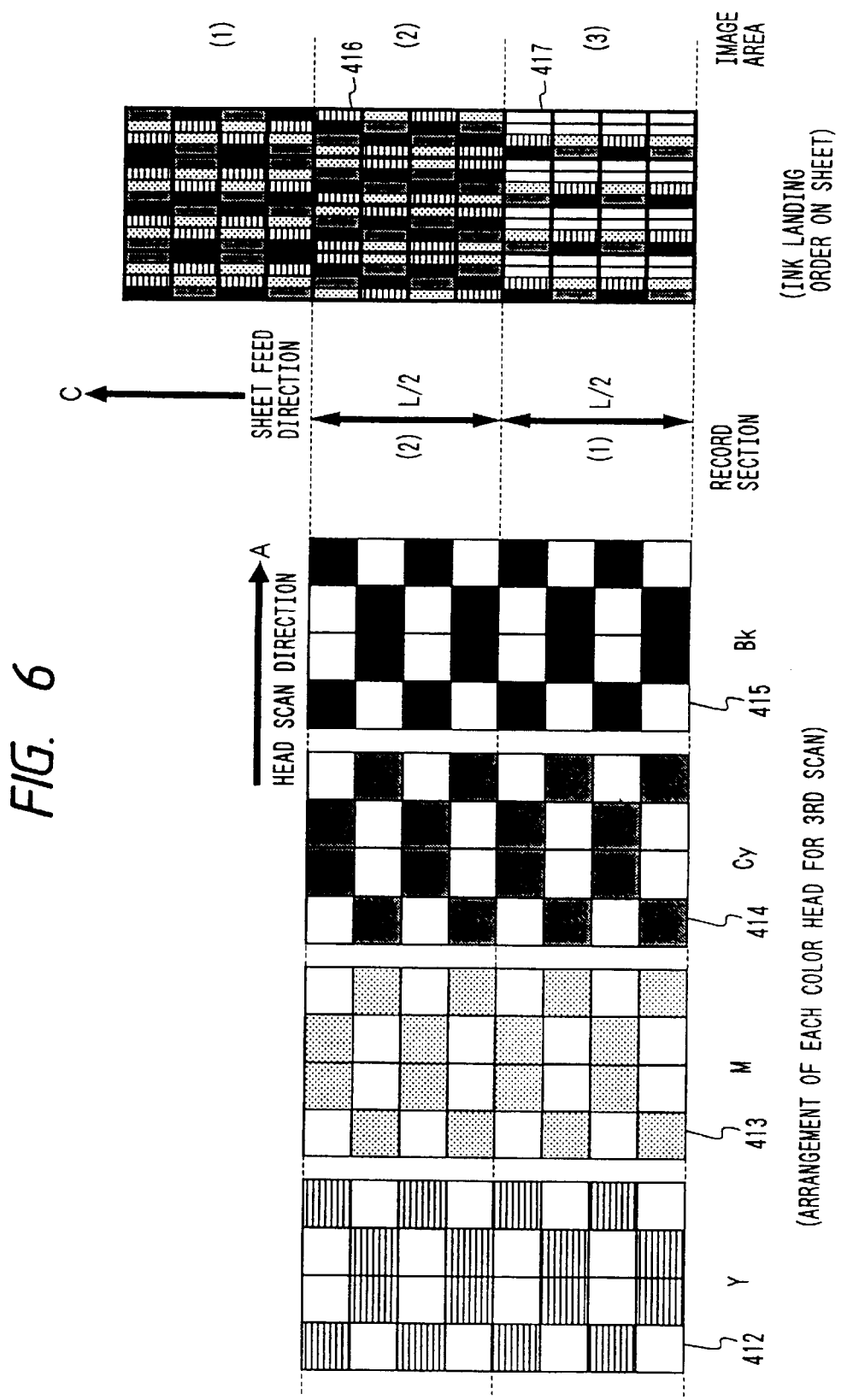
FIG. 6 is a view for explaining the third scan in the 2-pass bi-directional print mode.

FIG. 6 shows the color masks and the ink landing order on the sheet surface in the third scan. In the third scan, the color inks are ejected onto areas (2) and (3) on the normal sheet using all the nozzles (eight nozzles) of each head while scanning the four color multi-heads in the direction of the arrow A by the carriage 706. In this case, the print operation is performed using masks 412 to 415 corresponding to the color inks. These masks 412 to 415 respectively have the same arrangement as those obtained by repeating the above-mentioned masks 401 to 404 (FIG. 4) in the sub-scan direction, and complement the masks 406 to 409 (FIG. 5).

In the third scan, ink dots sequentially land on pixels in the area (2) on the sheet surface, as indicated by reference numeral 416, and ink dots sequentially land on pixels in the area (3), as indicated by reference numeral 417. Thereafter, the sheet is fed by another L/2 in the direction of the arrow C. With the third scan, the print operation on the second area (2) is completed.

Figure 7:
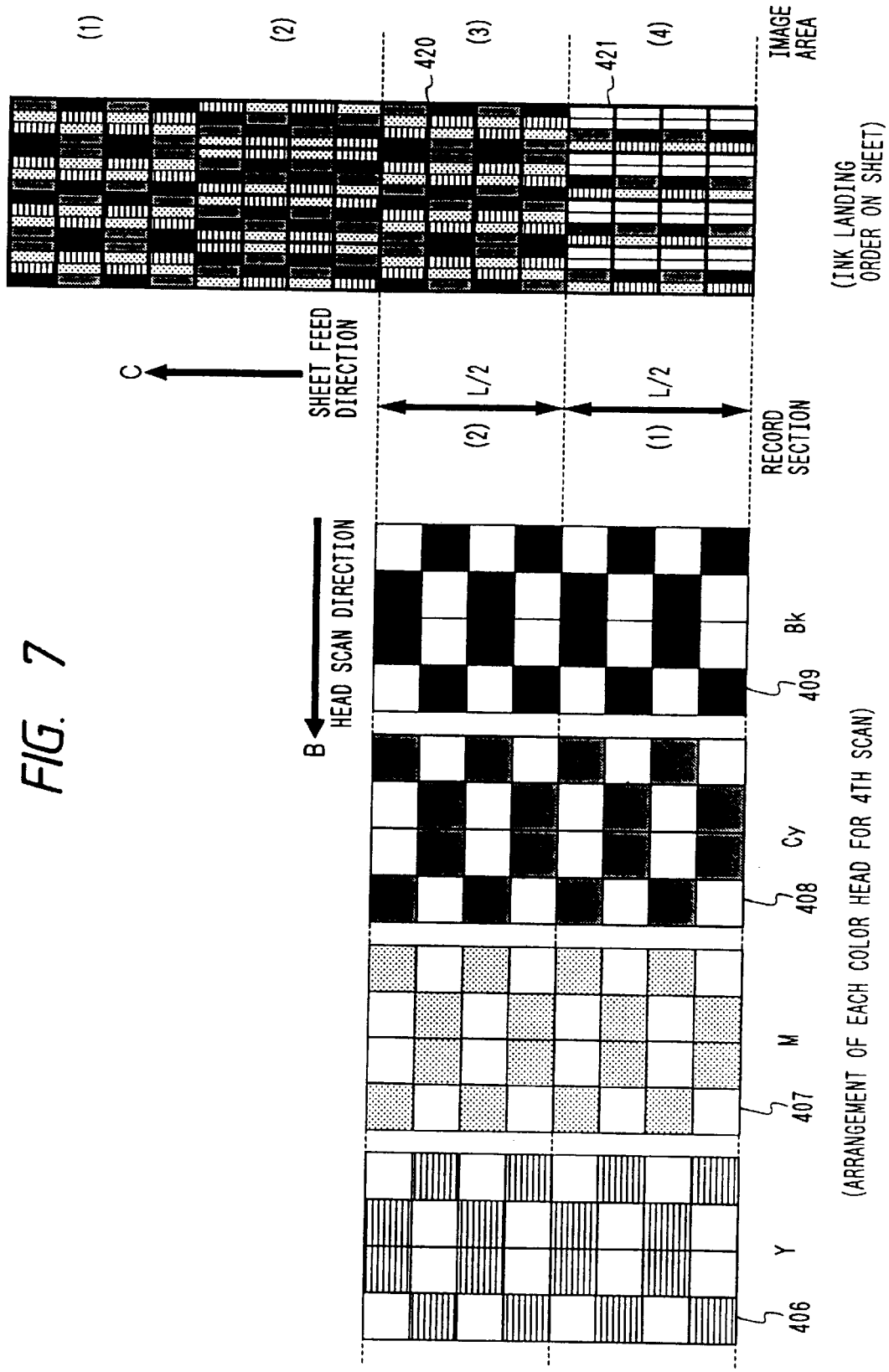
FIG. 7 is a view for explaining the fourth scan in the 2-pass bi-directional print mode.

FIG. 7 shows the color masks and the ink landing order on the sheet surface in the fourth scan. In the fourth scan, the color inks are ejected onto areas (3) and (4) on the sheet surface using all the nozzles (eight nozzles) of each head while scanning the color multi-heads in the direction of the arrow B like in the second scan by the carriage 706. In this case, the print operation is performed using the same masks 406 to 409 as those in the second scan in correspondence with the colors.

In the fourth scan, ink dots sequentially land on pixels in the area (3) on the sheet surface, as indicated by reference numeral 420, and ink dots sequentially land on pixels in the area (4), as indicated by reference numeral 421. Thereafter, the sheet is fed by another L/2 in the direction of the arrow C. With the fourth scan, the print operation on the second area (3) is completed.

Thereafter, print operations are similarly performed on the areas on the sheet surface. On the last area, the print operation is performed using the upper half four nozzles of each multi-head, thus completing the print operation of one page of the normal sheet.

FIG. 8 shows the printed state of a green image in which color nonuniformity tends to be particularly conspicuous upon execution of the above-mentioned print method. In FIG. 8, thinning masks 501 and 502 are used in correspondence with the passes. In a pass shown in FIG. 8, cyan and yellow dots have landing points on different pixels. More specifically, the cyan mask for the first pass is the same as the yellow mass for the second pass, and the cyan mask for the second pass is the same as the yellow mask for the first pass. That is, complementary masks are exchanged for each pass. Therefore, these two color ink droplets are never simultaneously printed on the same landing point in a single pass.

When image data 503 is printed using these masks, landing states 504 and 505 are obtained. Note that a capital letter indicates a high-density dot, and a small letter indicates a low-density dot. In the first pass, cyan dots land on the sheet surface slightly earlier than the yellow dots. However, at this time, the yellow ink droplets land on positions different from the pixel positions where the cyan dots land before the cyan ink droplets are completely absorbed. This state corresponds to a state 601 in FIG. 9. At this time, the yellow ink droplets land on and are absorbed by a blank sheet at substantially an equivalent level to that of the cyan ink, and hence, have substantially the same density as that of the cyan ink droplets in the landing state (504, 602).

Figure 9:
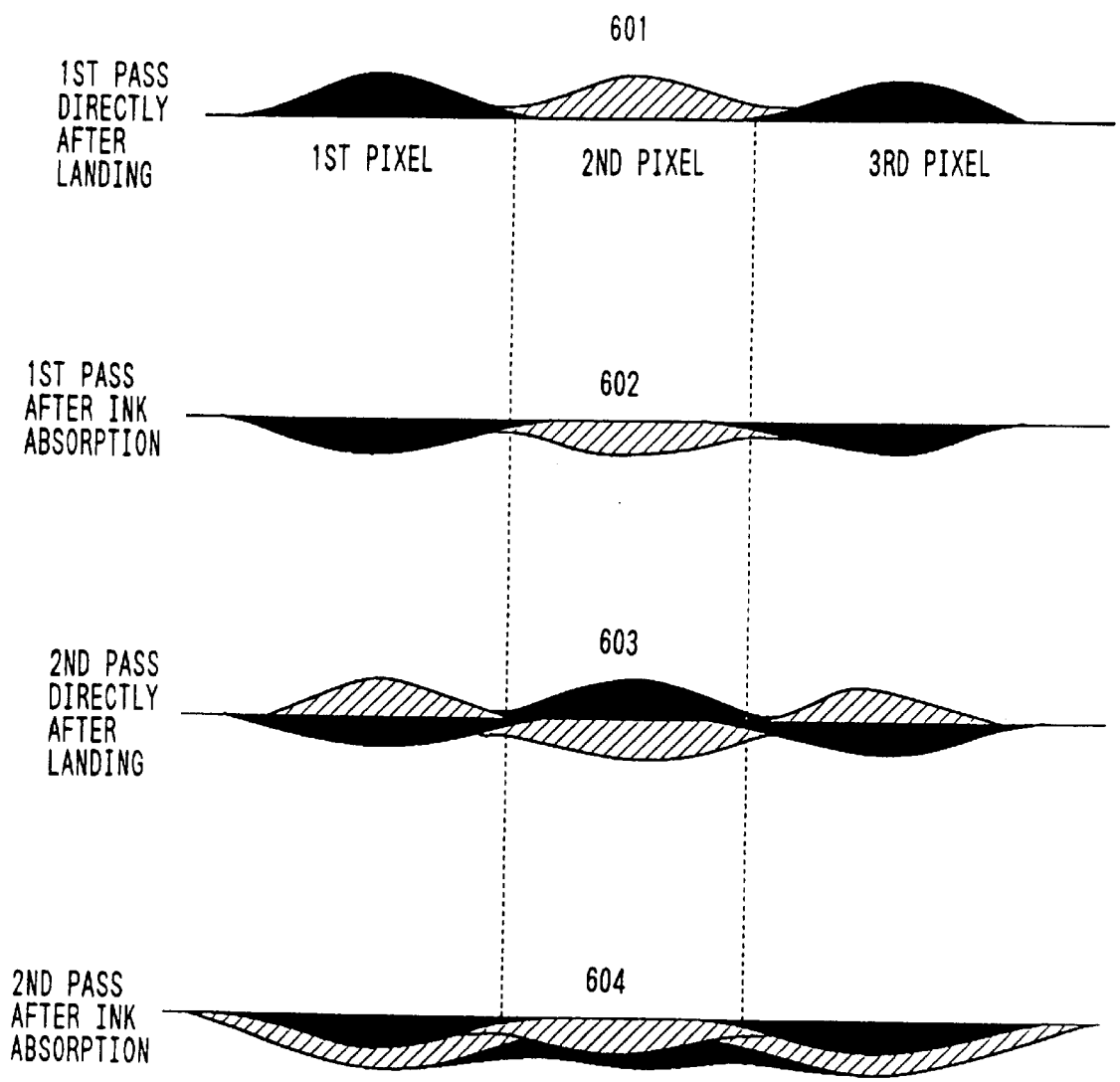
FIG. 9 is a sectional view showing states of an ink layer of a recording medium in the 2-pass bi-directional print mode.

In the state obtained so far, since the sheet surface is completely covered with the ink dots, the cyan and yellow inks have no difference between their blurred states even in the second pass, and as a complete printed image, a green image which maintains uniformities of the cyan and yellow dots can be obtained on the entire image area, as indicated by states 506 and 604 in FIGS. 8 and 9. Such a print state can be similarly obtained in both the forward and backward scans, and therefore, the bi-directional print method, which is free from unbalanced color tones between two each adjacent record sections and hardly causes a color nonuniformity phenomenon, can be realized.

Upon execution of the bi-directional print method, it is effective to prevent color nonuniformity by recording ink colors, which may easily cause conspicuous color nonuniformity, in equivalent landing states in units of scans. In this embodiment, for this purpose, the cyan and yellow inks are printed using different thinning masks. If a mask for printing the cyan and yellow dots on an identical pixel is used, these two colors have unbalanced color tones in the forward and backward scans, and may possibly cause color nonuniformity. In this embodiment, the cyan and yellow inks have been described. However, in practice, the black and magenta inks are added to these inks. Therefore, at least two of these four inks must not land on an identical pixel in a single pass. In this case, as shown in FIGS. 4 to 7, for example, the color inks can be grouped, so that two colors (e.g., cyan and yellow, or magenta and yellow), which particularly easily cause conspicuous color nonuniformity, use different masks. When the 2-pass bi-directional print method is realized using the above-mentioned means, a high-quality image free from color nonuniformity can be formed on the normal sheet to have the same throughput as that obtained by a one-directional 1-pass print method.

The 4-pass one-directional print method upon selection of the coated paper or TP paper will be described below with reference to FIGS. 10 to 14. For the sake of simplicity, each multi-head 702 consists of 16 nozzles, and FIGS. 10 to 14 show first to fifth scans of the print states of this method.

Figure 10:
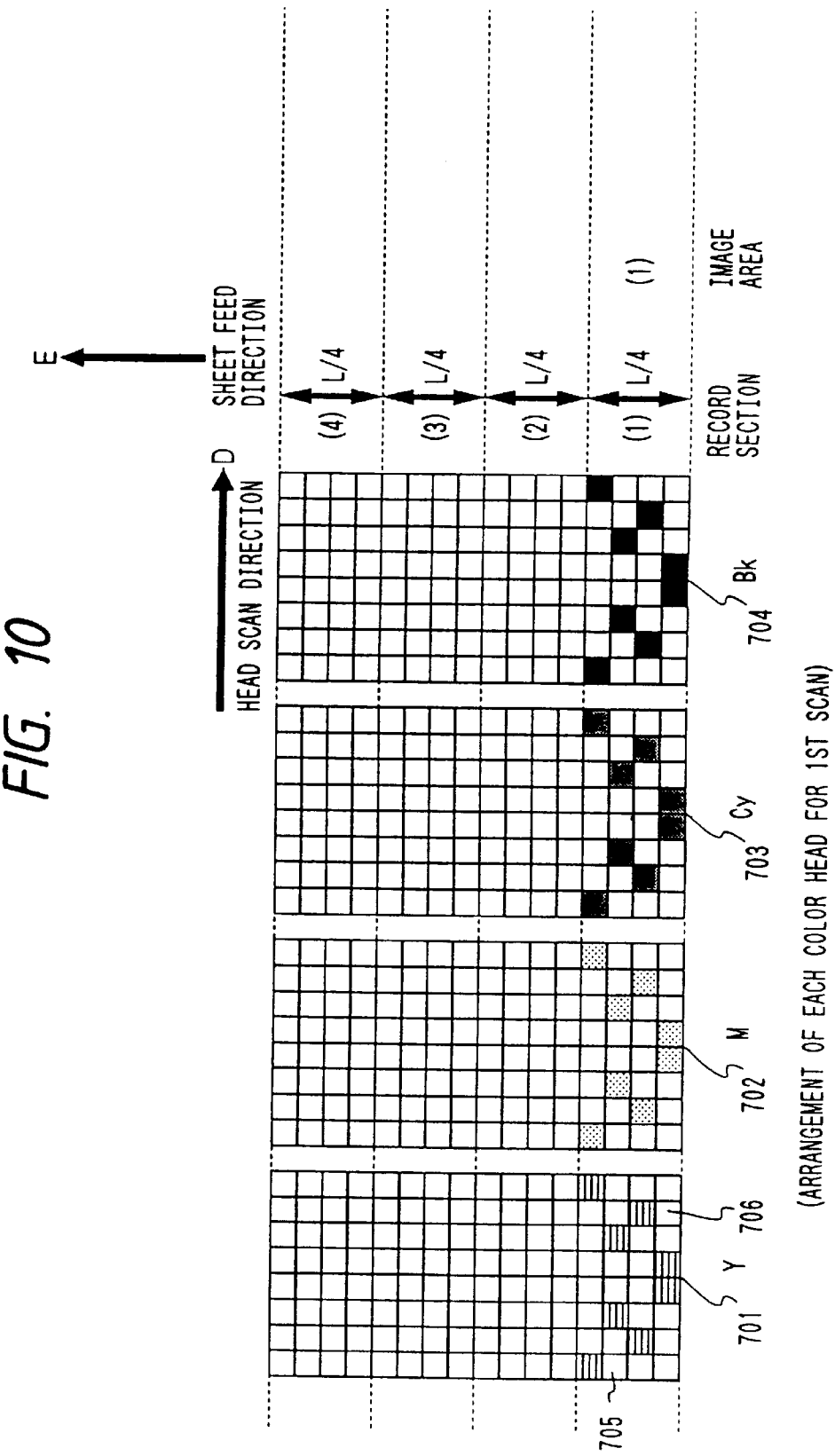
FIG. 10 is a view for explaining a first scan in a 4-pass one-directional print mode according to the first embodiment of the present invention.

FIG. 10 shows the relationship between the color masks and image areas on the sheet surface in the first scan. In the first scan, the color inks are ejected onto an area (1) on the coated paper or TP paper using four nozzles, located at the most up-stream side with respect to the sheet feed direction, of each head while scanning the four color multi-heads in the direction of an arrow D by the carriage 706. In this case, the print operation is performed using 25% thinning masks 701 to 704 corresponding to the colors, as shown in FIG. 10. For example, the mask 701 is obtained by juxtaposing a mask 705 having a 4×4 pixel area, and a mask 706 obtained by inverting the mask 705 in the main scan direction, and this pattern arrangement is common to all the colors. After the print operation on the area (1) using these masks, the sheet is fed by a width L/4 corresponding to a ¼ length of each multi-head.

Figure 11:
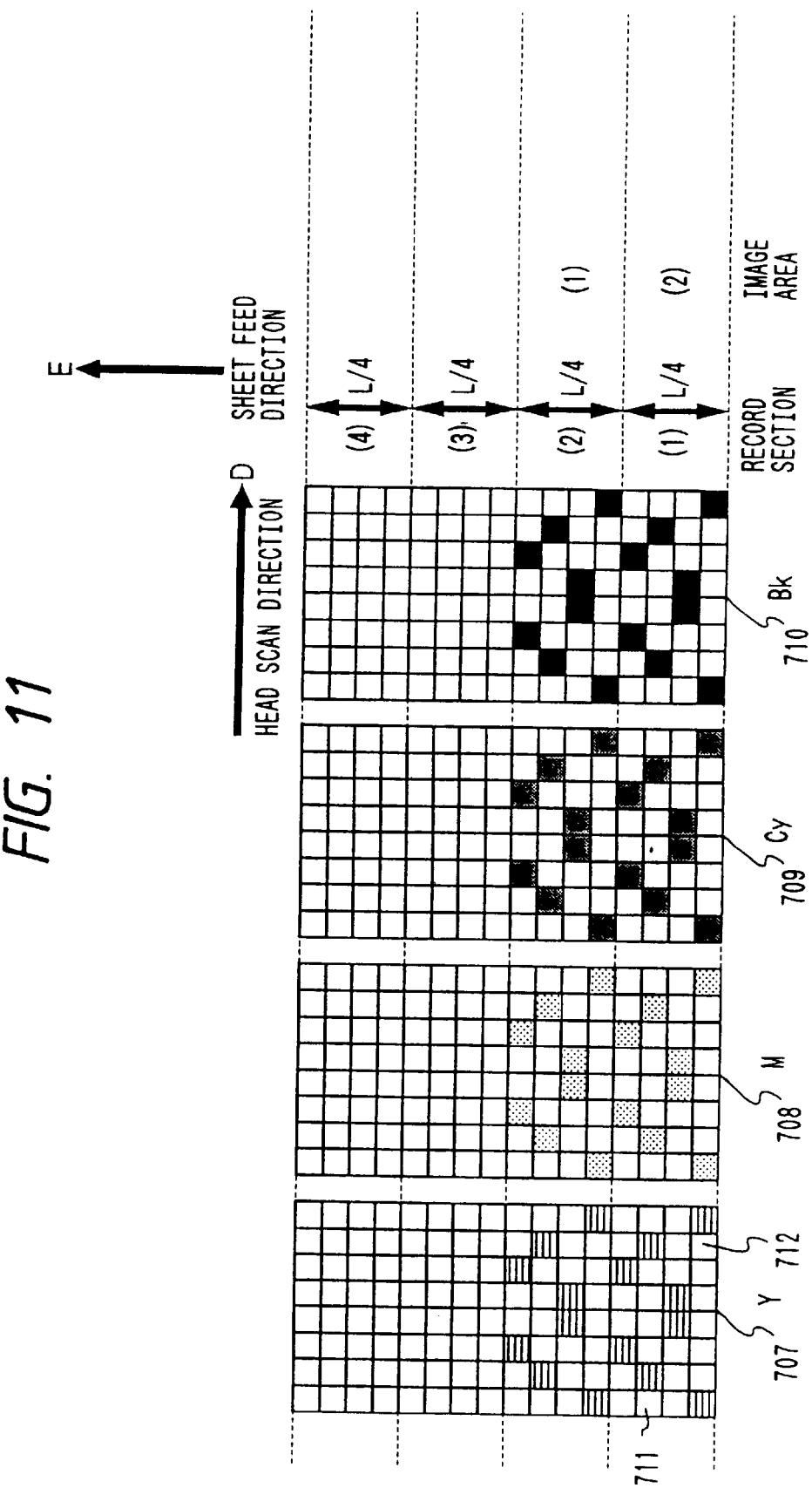
FIG. 11 is a view for explaining a second scan in the 4-pass one-directional print mode.

FIG. 11 shows the relationship between the color masks and image areas on the sheet surface in the second scan. In the second scan, the color inks are ejected onto areas (1) and (2) on the sheet surface using eight nozzles (lower half nozzles), located at the upstream side with respect to the sheet feed direction, of the 16 nozzles of each head, while scanning the four color multi-heads in the direction of the arrow D by the carriage 706. In this case, the print operation is performed using 25% thinning masks 707 to 710 corresponding to the colors, as shown in FIG. 11. For example, the mask 707 is obtained by repeating, in the sub-scan direction, a mask obtained by juxtaposing a mask 711 having a 4×4 pixel area and a mask 712 obtained by inverting the mask in the main scan direction. The masks 707 to 710 have complementary dot pattern arrangements with respect to those of the masks 701 to 704. After the print operation on the areas (1) and (2), using these masks, the sheet is fed by another L/4 width.

Figure 12:
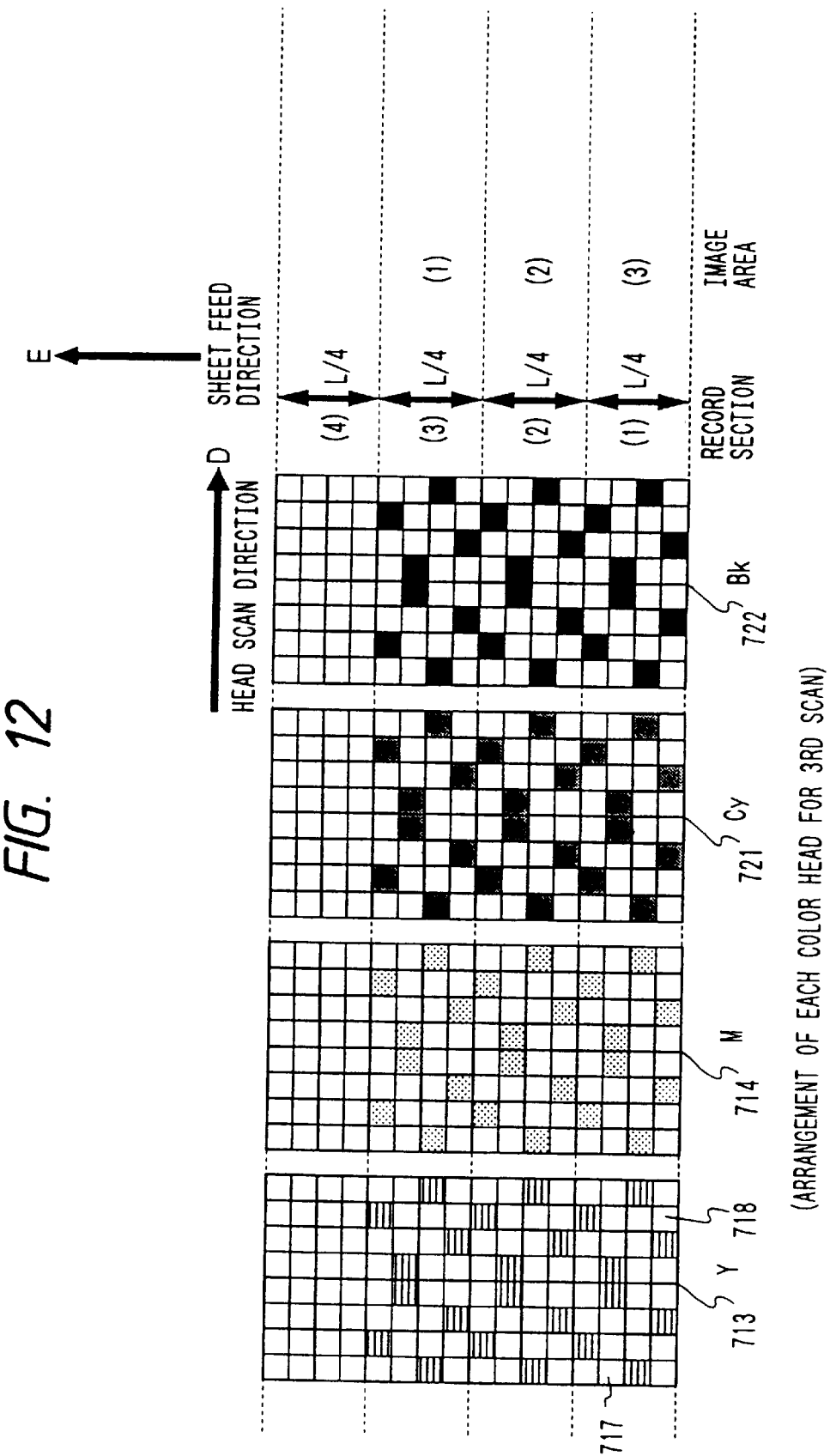
FIG. 12 is a view for explaining a third scan in the 4-pass one-directional print mode.

FIG. 12 shows the relationship between the color masks and image areas on the sheet surface in the third scan. In the third scan, the color inks are ejected onto areas (1), (2), and (3) on the sheet surface using 12 nozzles, located at the upstream side with respect to the sheet feed direction, of each head, while scanning the four color multi-heads in the direction of the arrow D by the carriage 706. In this case, the print operation is performed using 25% thinning masks 713 to 716 corresponding to the colors, as shown in FIG. 12. For example, the mask 713 is obtained by repeating, in the sub-scan direction, a mask obtained by juxtaposing a mask 717 having a 4×4 pixel area and a mask 718 obtained by inverting the mask in the main scan direction. The masks 713 to 716 have complementary dot pattern arrangements with respect to those of the masks 701 to 704 and the masks 707 to 710. After the print operation on the areas (1), (2), and (3) using these masks, the sheet is fed by another L/4 width.

Figure 13:
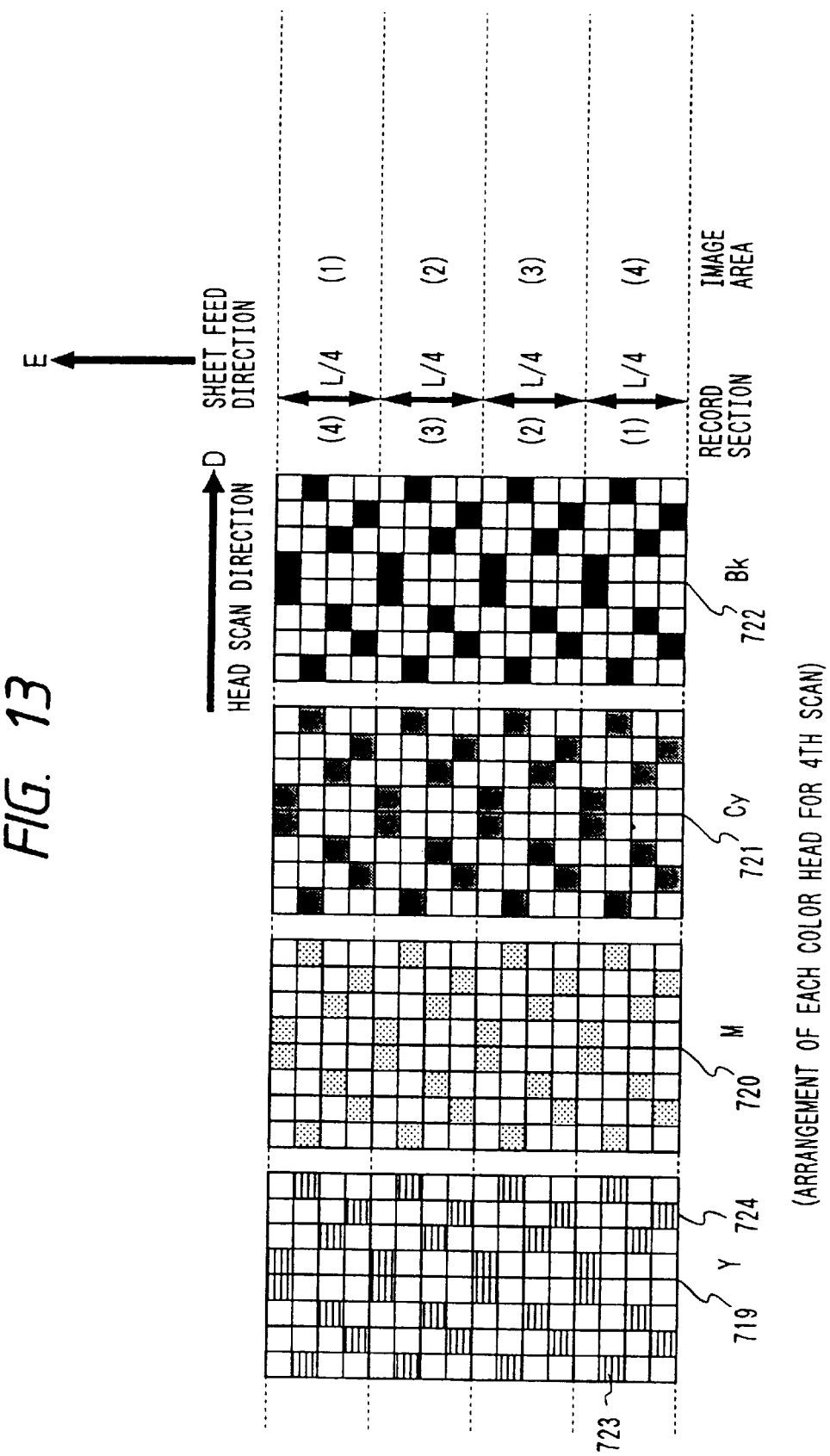
FIG. 13 is a view for explaining a fourth scan in the 4-pass one-directional print mode.

FIG. 13 shows the relationship between the color masks and image areas on the sheet surface in the fourth scan. In the fourth scan, the color inks are ejected onto areas (1), (2), (3), and (4) on the sheet surface using all the nozzles (16 nozzles) of each head, while scanning the four color multi-heads in the direction of the arrow D by the carriage 706. In this case, the print operation is performed using 25% thinning masks 719 to 722 corresponding to the colors, as shown in FIG. 13. For example, the mask 719 is obtained by repeating, in the sub-scan direction, a mask obtained by juxtaposing a mask 723 having a 4×4 pixel area and a mask 724 obtained by inverting the mask in the main scan direction. The masks 719 to 722 have complementary dot pattern arrangements with respect to those of the masks 701 to 704, the masks 707 to 710, and the masks 713 to 716. After the print operation on the areas (1) to (4) using these masks, the sheet is fed by another L/4 width. With these first to fourth scans, the print operation on the area (1) is completed.

Figure 14:
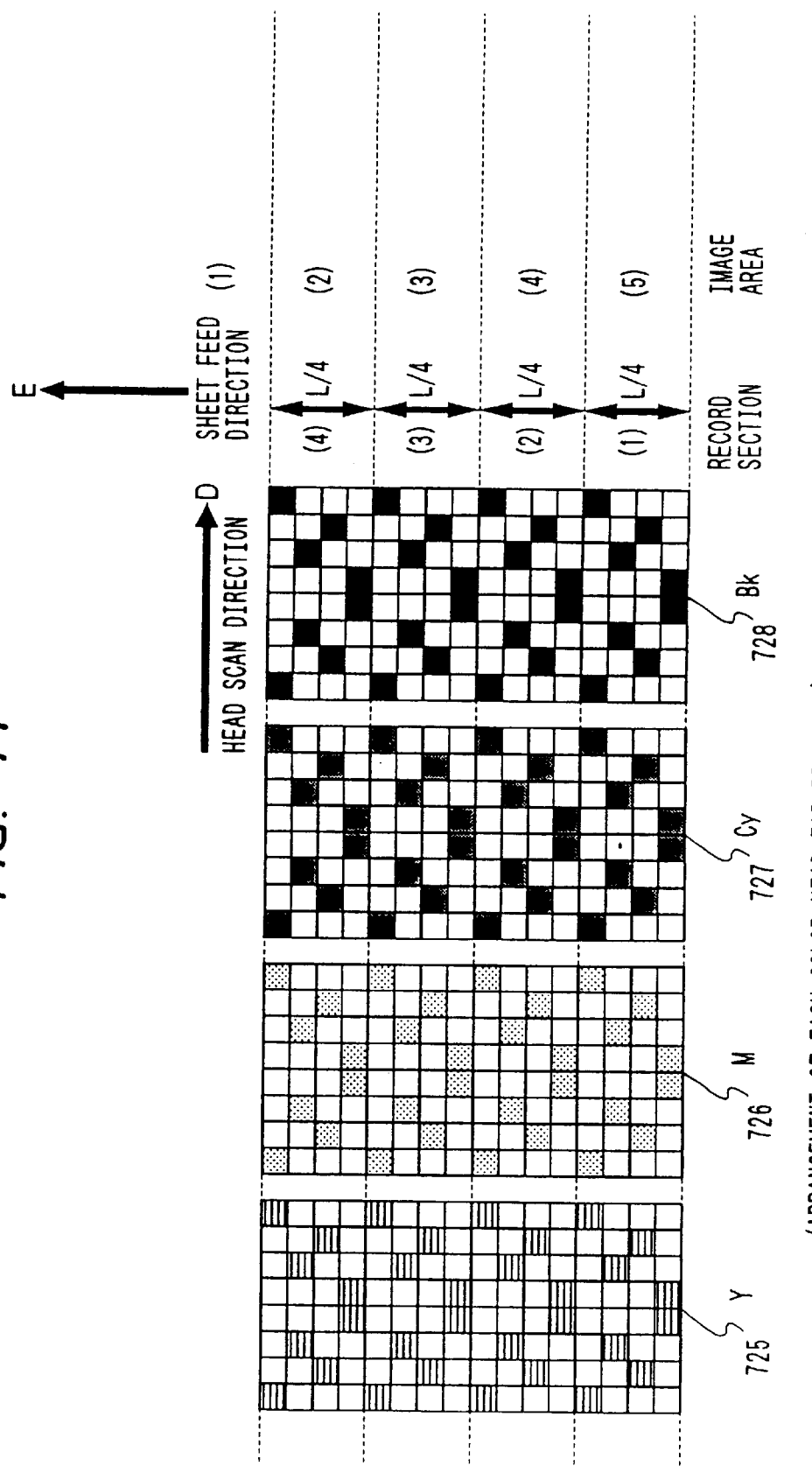
FIG. 14 is a view for explaining a fifth scan in the 4-pass one-directional print mode.

FIG. 14 shows the relationship between the color masks and image areas on the sheet surface in the fifth scan. In the fifth scan, the color inks are ejected onto areas (2) to (5) on the sheet surface using all the nozzles (16 nozzles) of each head, while scanning the four color multi-heads in the direction of the arrow D by the carriage 706. In this case, masks 725 to 728 used in this scan are obtained by repeating the masks 701 to 704 used in the first scan in the sub-scan direction. After the print operation on the areas (2) to (5) using these masks, the sheet is fed by another L/4 width. Thereafter, print operations are similarly performed on the areas on the sheet surface. The print operation is performed on an area (n−2) using 12 nozzles, on the downstream side with respect to the sheet feed direction, of the 16 nozzles of each multi-head, the print operation is performed on an area (n−1) using 8 nozzles (upper half nozzles) on the downstream side with respect to the sheet feed direction, and the print operation is performed on the last area (n) using four nozzles on the most downstream side with respect to the sheet feed direction, thus completing the print operations for one page.

In this manner, this print method completes each image area by four one-directional scans per record area using the 25% thinning masks while feeding the sheet by an L/4 width after each scan unlike in the above-mentioned 2-pass bi-directional print method. In this manner, when the 4-pass print mode is executed, since one area in the main scan direction is printed using four different groups of nozzles, density nonuniformity caused by variations of the nozzles can be eliminated as compared to the two-pass mode, and a smooth, high-quality image can be obtained. As shown in FIGS. 10 to 14, in this method, the four color inks always use the same thinning masks. In the one-directional print mode, the ink landing order does not cause color nonuniformity since it is not reversed between forward and backward scans unlike in the bi-directional print mode.

Furthermore, in this method, the 25% thinning mask is used in a large, i.e., 4×8 pixel range. This is to obtain an image having higher image quality in a countermeasure against the density nonuniformity caused by nozzle variations, as has been described above in the paragraphs of the prior art. In order to eliminate the above defect, dots aligned in the main scan direction are preferably printed while being uniformly distributed to nozzles equal to the number of passes. Therefore, for this purpose, it is preferable to use a mask, which is elongated in the main scan direction, has no periodicity, and is asynchronous with a binarization pattern that normally has periodicity. The mask shown in FIGS. 10 to 14 is obtained by inverting a 4×4 mask in the main scan direction, and has no periodicity in the main scan direction. The density nonuniformity caused by nozzle variations can be effectively eliminated as well as color nonuniformity up to a low duty since the mask is elongated in the main scan direction.

When the 4-pass print mode, which completes a unit image area little by little, is used, different color inks can be prevented from being undesirably mixed on the sheet surface after the print operation even on a recording medium such as TP paper having a low ink absorption speed, and an image defect, i.e., blurring, hardly occurs.

This print mode has an inferior throughput to that of the 2-pass bi-directional print mode as the normal sheet standard mode, but can expect remarkably high image quality. Therefore, even when print operations are performed on the normal sheet, a user may decide to use the 4-pass one-directional print mode to obtain an image having higher quality.

According to this embodiment, as described above, a user selects, by the media selector, one of the 4-pass one-directional print mode with which a high-quality image is slowly formed in four passes so as to obtain a smooth image on coated paper or TP paper having good color development characteristics or on the normal sheet, and the 2-pass bi-directional print mode with which an image having standard quality is formed on general paper with high throughput, thus obtaining an image having image quality and the throughput required by the user.

Second Embodiment

In the second embodiment, automatic selection between the one-directional and bi-directional print modes in a black emphasis print mode will be described below. In this embodiment, a black emphasis mode can be performed as a lower-order mode in the TP or coated paper print mode (4-pass one-directional print mode) of the first embodiment.

Normally, since inks are less blurred on TP paper than other recording media, a dot landing on the TP paper has a smaller size than that of a dot landing on other recording media, and consequently, the density is lowered or a conspicuous line is undesirably formed. In particular, this defect is outstanding in a black image, and only a black image is normally printed at a duty of 200% as a countermeasure against the above-mentioned defect. Also, on coated paper, a black emphasis print mode may often be executed to obtain a clear black image and to obtain high-contrast black characters and ruled lines. Since the necessity of the black emphasis mode varies depending on an image to be printed, a user is allowed to select the black emphasis mode using a mode selector in the console/display unit 1211, as needed, in this embodiment.

During execution of the 4-pass one-directional print mode, how to execute black emphasis is determined by the automatic selection of this embodiment. Two print methods are available, and one of these methods is obtained by adding a backward black emphasis scan to the 4-pass one-directional print mode of the first embodiment. This method is a reciprocal print method in practice, i.e., is a black emphasis print method that places an importance on the throughput. The other method is an 8-pass one-directional scan mode including new black emphasis scans, and is selected when a black head temperature t is higher than a predetermined value T0. This method is designed to prevent an excessive ejection amount due to the temperature rise in the bi-directional print mode and to prevent an image defect caused by the excessive ejection amount.

Figure 15:
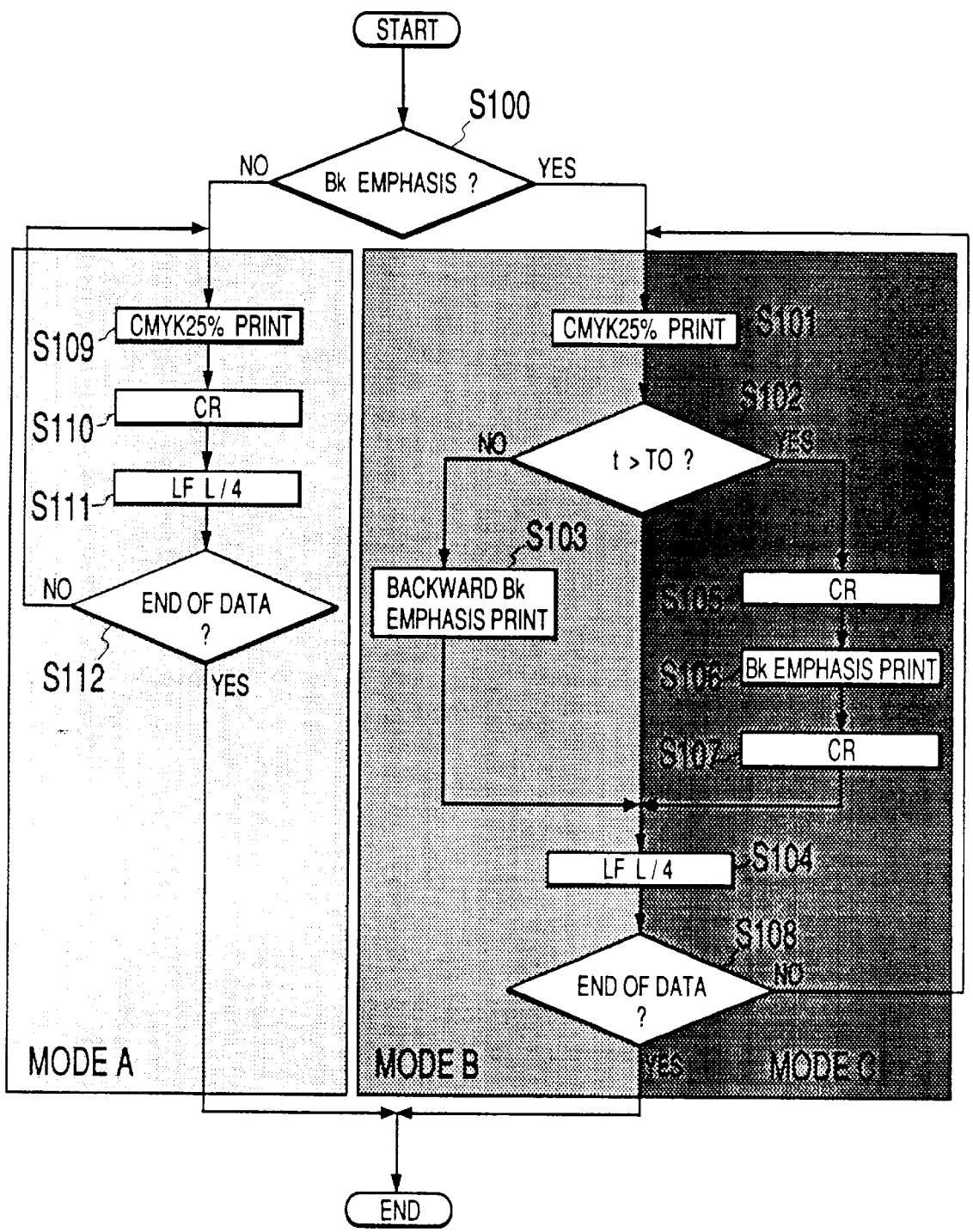
FIG. 15 is a flow chart showing a print mode selection routine according to the second embodiment of the present invention.

FIG. 15 is a flow chart showing these print sequences. In FIG. 15, the normal 4-pass one-directional print mode without black emphasis is represented by a mode A, a mode including a backward black emphasis scan as one of black emphasis modes is represented by a mode B, and a one-directional print mode including new black emphasis passes to have a total of eight passes is represented by a mode C. Since the print method in the mode A has already been described in the first embodiment, the modes B and C will be described below.

Figure 16:
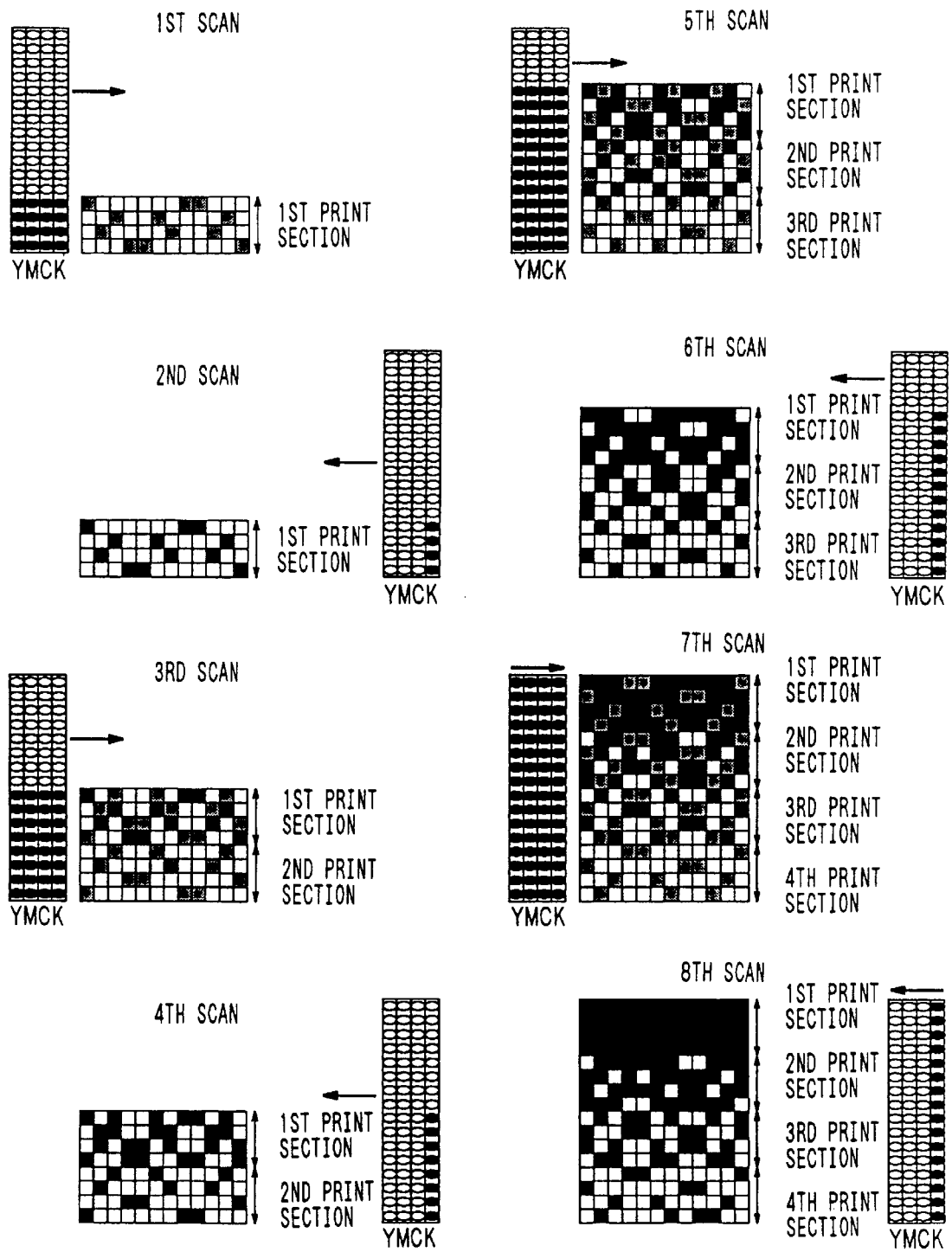
FIG. 16 is a view for explaining a 4-pass black emphasis print mode.
Figure 17:
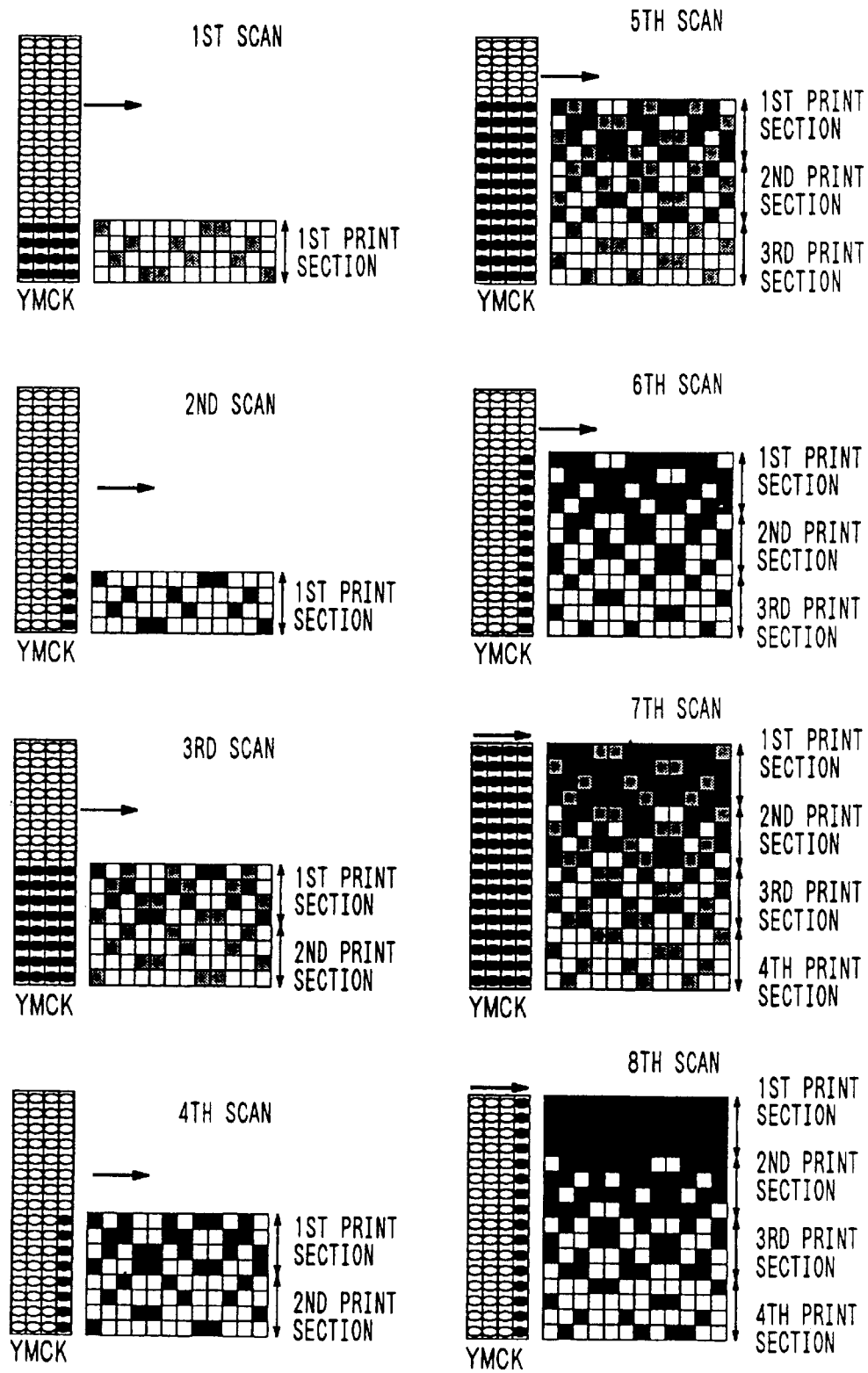
FIG. 17 is a view for explaining an 8-pass black emphasis print mode.
Figure 19:
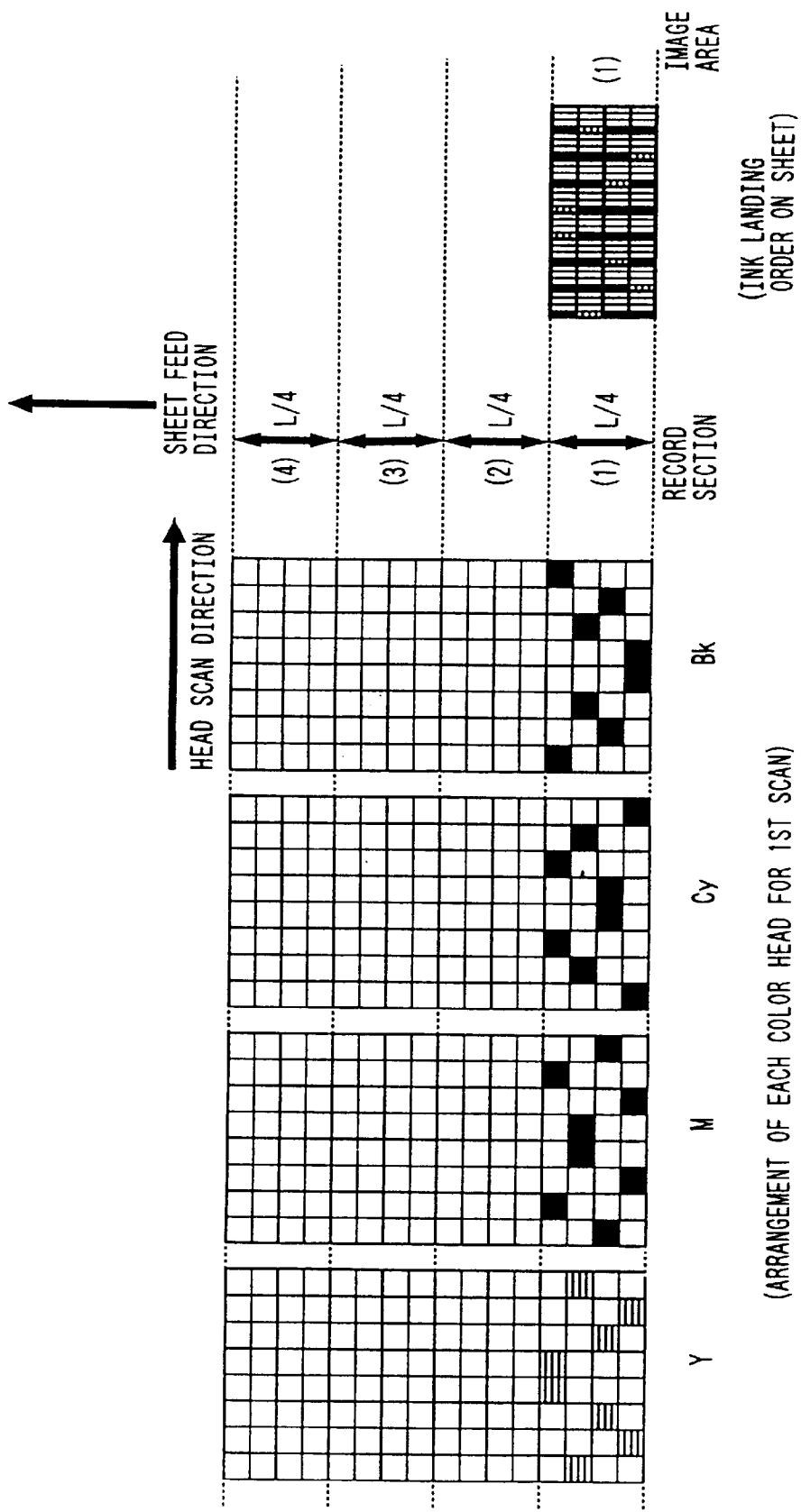
FIG. 19 is a view for explaining divisional recording in the third embodiment.
Figure 20:
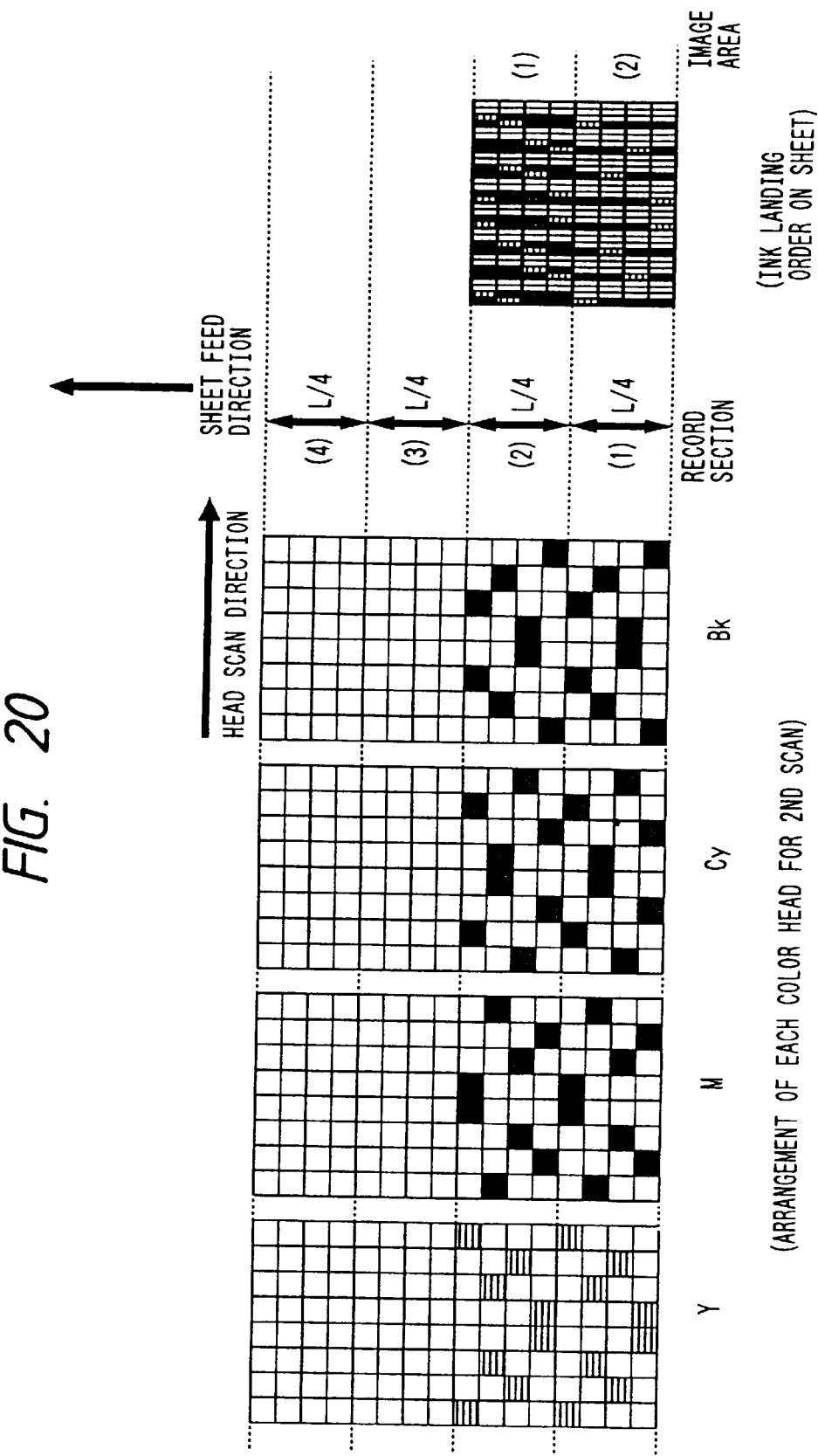
FIG. 20 is a view for explaining divisional recording in the third embodiment.
Figure 21:
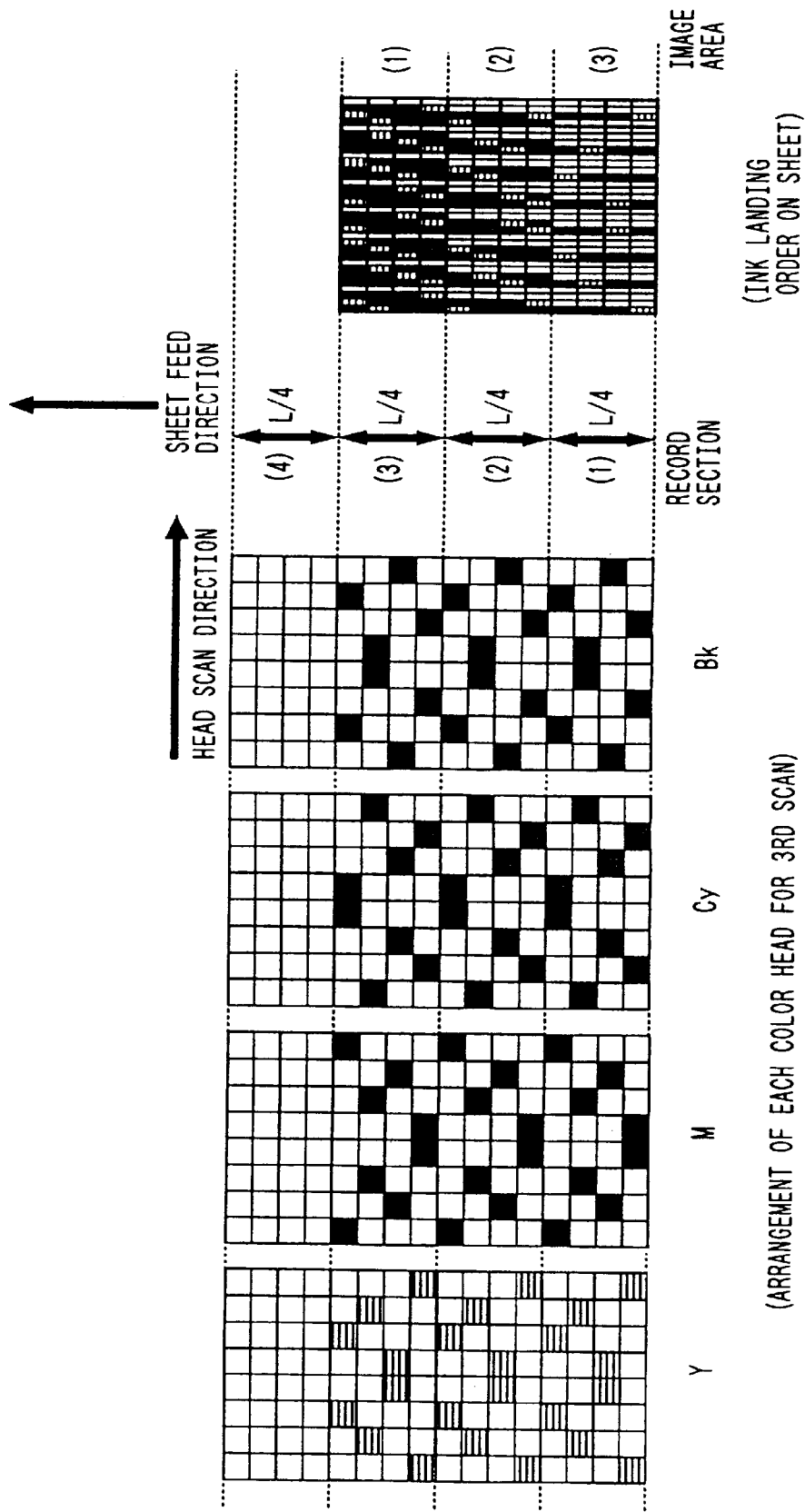
FIG. 21 is a view for explaining divisional recording in the third embodiment.
Figure 22:
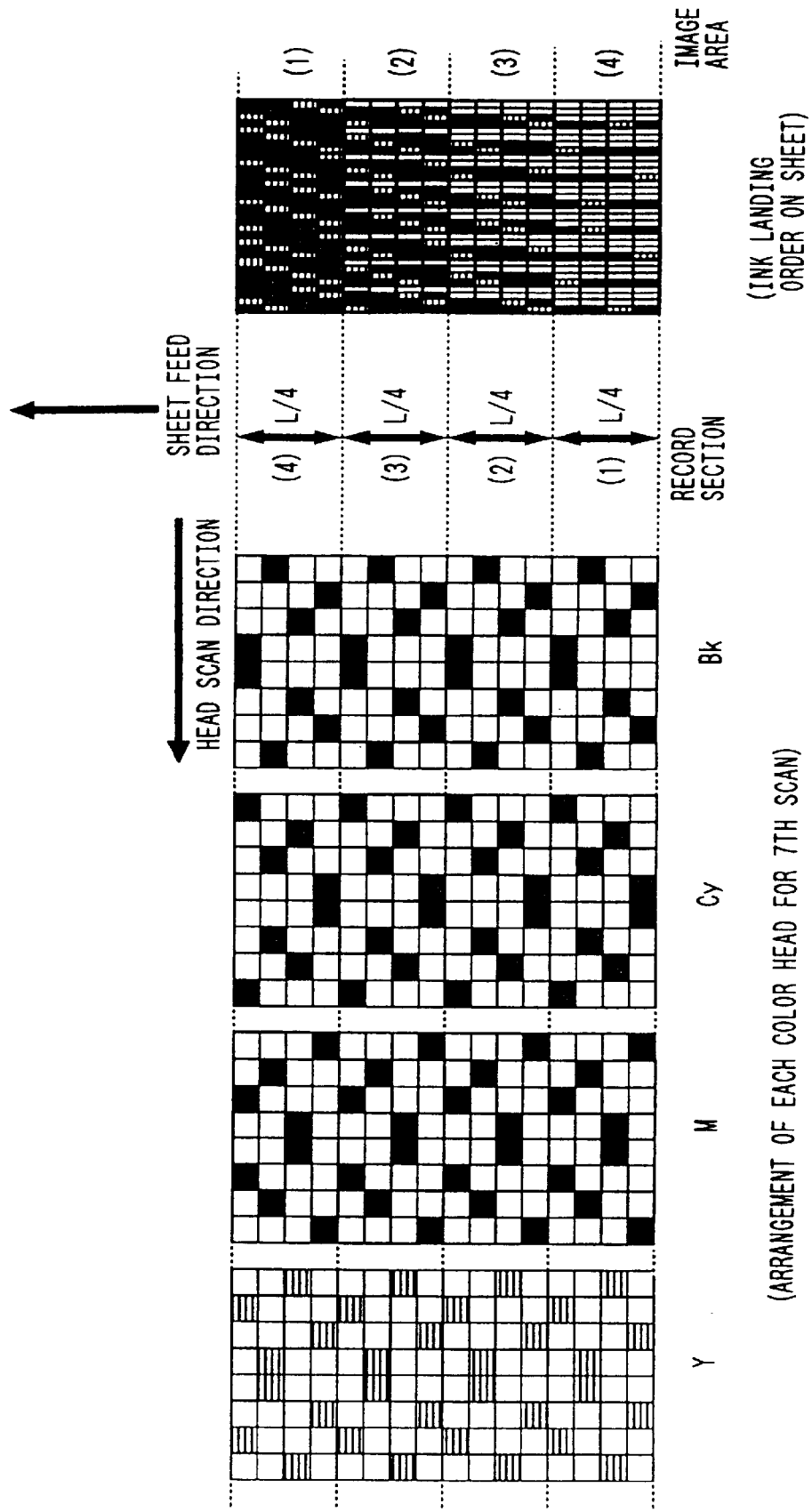
FIG. 22 is a view for explaining divisional recording in the third embodiment.
Figure 23:
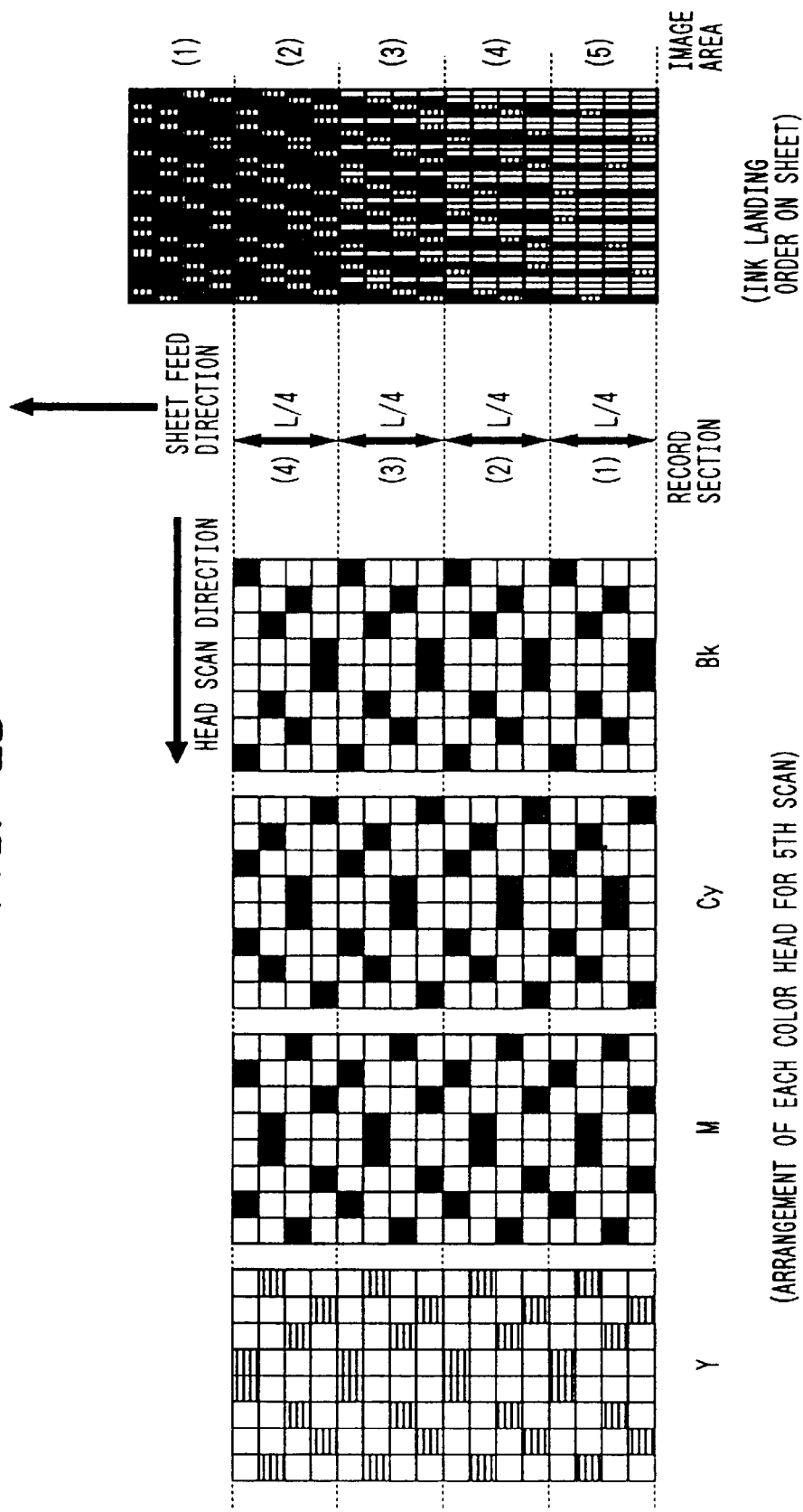
FIG. 23 is a view for explaining divisional recording in the third embodiment.
Figure 24:
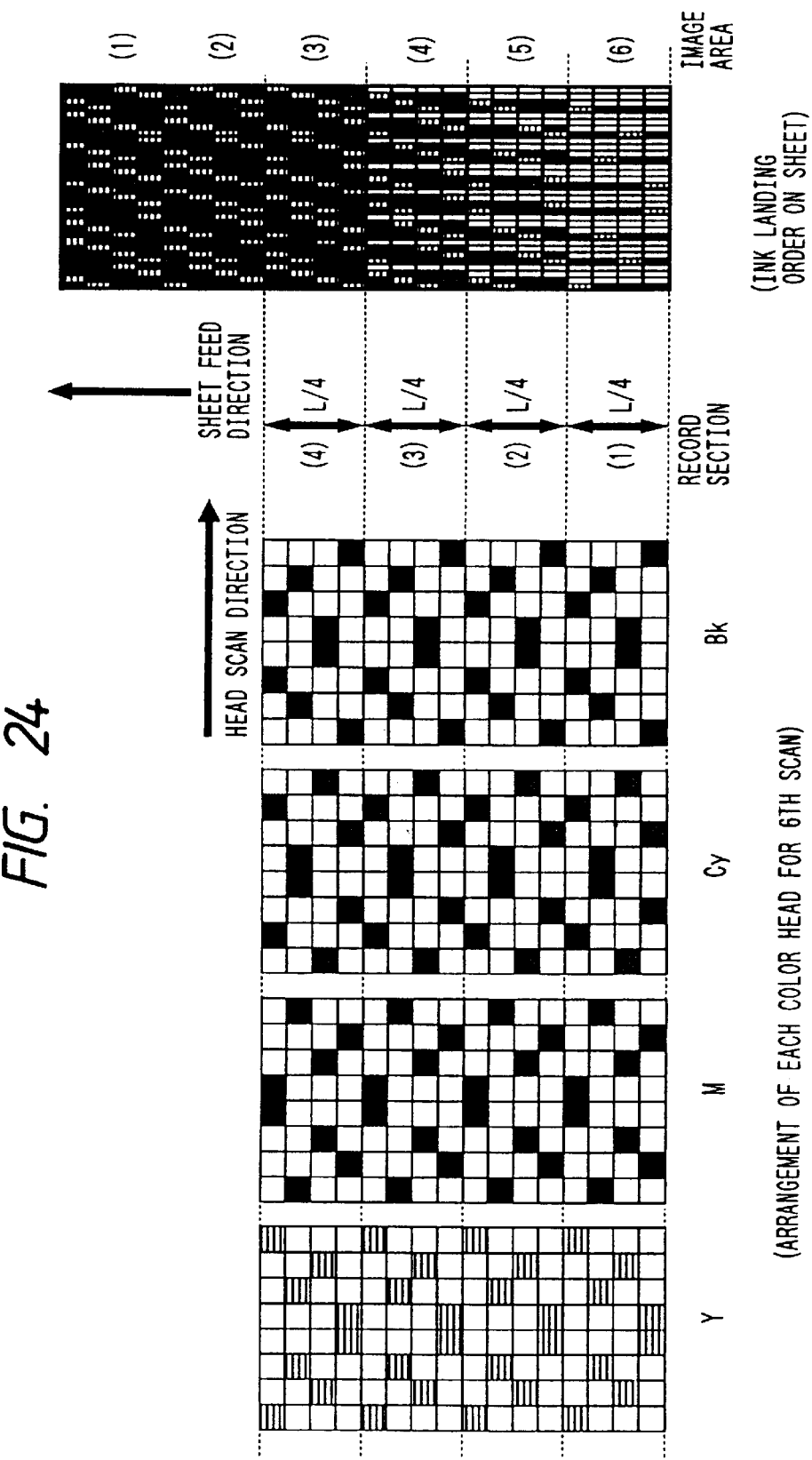
FIG. 24 is a view for explaining divisional recording in the third embodiment.
Figure 25:
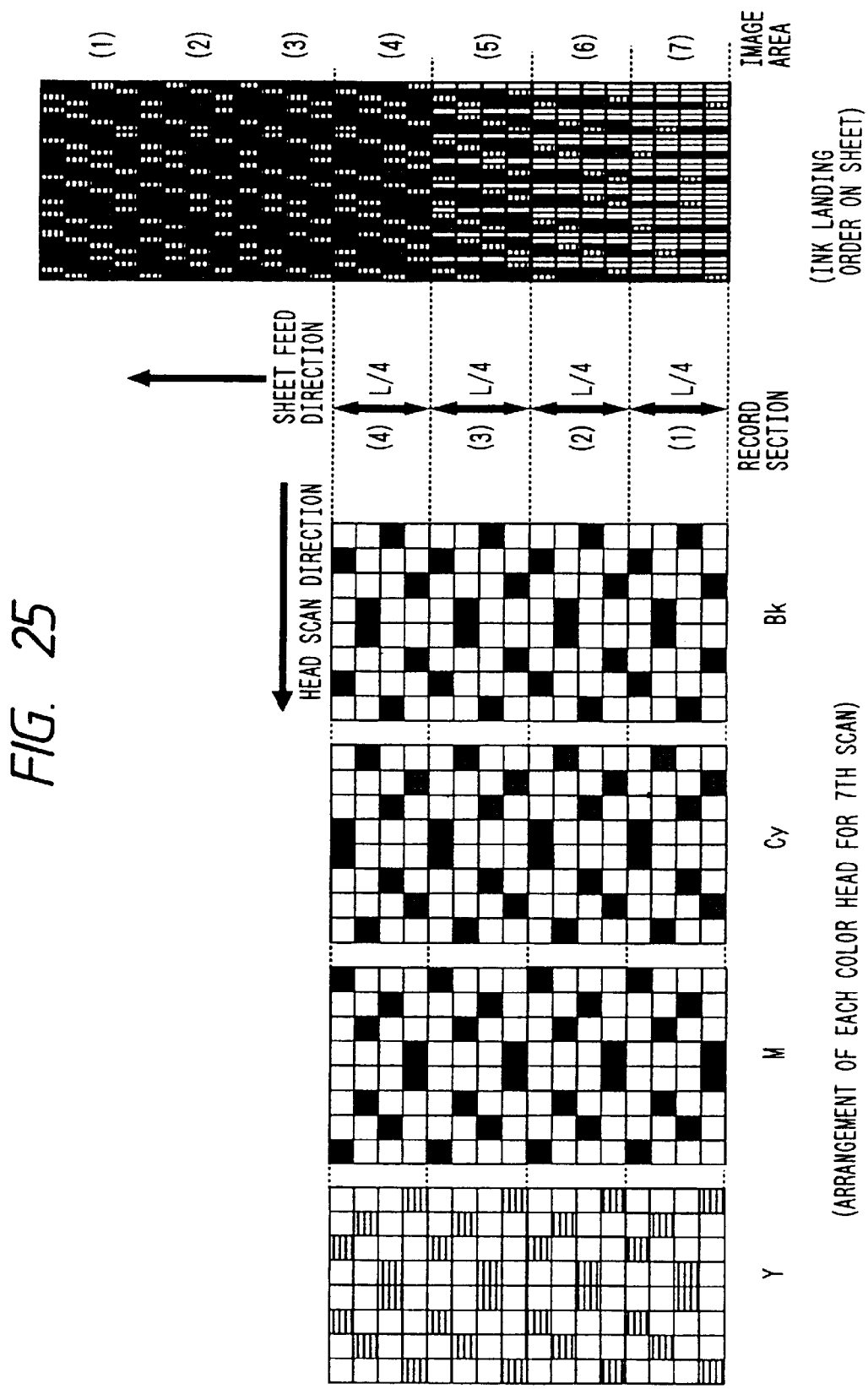
FIG. 25 is a view for explaining divisional recording in the third embodiment.

FIGS. 16 and 17 respectively show the print methods in the modes B and C using 16-nozzle heads. In each of the modes B and C, a unit image area is completed by eight scans. Masks used in these modes are the same as those shown in FIGS. 10 to 13. In the mode B, the C, M, Y, and K dots are printed in each forward scan, and an emphasis print operation of only black dots is performed in the corresponding backward scan using the same thinning mask as that in the forward scan. On the other hand, in the mode C shown in FIG. 17, after the C, M, Y, and K dots are printed, the carriage 706 is returned by an idle print scan, and thereafter, a scan for the black emphasis print operation is performed in the forward direction. For this reason, the mode C requires a longer print time than the mode B by the carriage return time. However, in the mode B, since only the black head continuously performs the reciprocal print scans, defects such as an excessive ejection amount caused by over-heating of the black head, unbalanced color tones from other color multi-heads, and the like may occur.

Therefore, in this embodiment, the temperature of the black head is checked based on the output from the temperature sensor 1213 in each scan, and when the temperature falls outside an ejection amount range, in which the above-mentioned image defects may occur, the print operations are performed in the mode B. When it is determined that the temperature falls within the above-mentioned ejection amount range, the print method is switched to the mode C from the next scan.

Referring back to FIG. 15, when a print start command is input, it is first checked if the current print mode is a black emphasis mode (S100). If it is determined that the current mode is not a black emphasis mode (No in step S100), the control enters the mode A, and the 25% 4-pass one-directional print mode is repeated up to the end of data (S109 to S112). Contrary to this, if it is determined that the current mode is a black emphasis mode (Yes in step S100), a 25% print operation is performed by one scan (S101), and the temperature of the black head is checked without returning the carriage (S102). At this time, if the temperature of the black head is equal to or lower than a predetermined ejection temperature T0, above which the image defects may occur, a black emphasis backward print operation is performed (S103). Upon completion of this print operation, the sheet is fed by an L/4 width (S104), thus completing one scan including the BK emphasis operation as the mode B. On the other hand, if the temperature of the black head is higher than T0, the carriage is returned without performing a print operation so as to prevent a further temperature rise of the head (S105). Then, a black emphasis forward print operation is performed (S106), and thereafter, the carriage return operation (S107) and the L/4 sheet feed operation (S104) are performed, thus completing one scan including the black emphasis operation as the mode C. Steps S101 to S107 are repeated up to the end of data (S108).

In this manner, the temperature of the black head is checked in the modes B and C in each scan, and the print mode is automatically switched between the modes B and C according to the temperature. Therefore, since the main body automatically switches the print mode in correspondence with an internal print condition, i.e., the temperature rise of the head, a user can obtain a stable image with a throughput as high as possible.

In this embodiment, the head temperature is detected only in the black emphasis mode. However, even in the reciprocal print mode without executing black emphasis like in the first embodiment or in the mode A of this embodiment, the print mode may, for example, be switched between the one-directional and bi-directional print modes by detecting the temperatures of the four color heads.

In this manner, the head temperature is properly detected, and the print mode is automatically switched between the one-directional and bi-directional print modes according to the detected temperature, thus always obtaining a stable image with a throughput as high as possible.

As described above, in the color ink jet recording apparatus which can execute both the one-directional and bi-directional print modes, since a print mode is selected according to a predetermined discrimination system arranged in the ink jet recording apparatus, efficient print operations corresponding-to coated paper and general paper, and other factors can be realized.

Third Embodiment

In the above embodiment, the 2-pass bi-directional print mode and the 4-pass one-directional print mode can be selected. Furthermore, a 4-pass bi-directional print mode may be allowed to be selected by the media selector.

In this embodiment, a case will be exemplified below with reference to FIG. 18 wherein a unit image area is completed by four main scans (four passes) by reciprocally scanning the carriage twice. In this embodiment, thinning print operations are performed using four different masks each having four dots of print pixels in a 4×4=16 pixels, and these print pixels have a complementary relationship. For the sake of simplicity, each head has 16 nozzles, and a sheet is fed by an L/4 width with respect to a head length L after each main scan. As for one color, these four different masks are used in turn in four passes. As the characteristic feature of this embodiment, the same mask is not used for two or more colors in a single scan. More specifically, in FIG. 18, each color selects masks 1301 to 1304 in turn in units of passes.

With this method, since no two colors commonly use the same mask in a single scan unlike in the above embodiment, the above-mentioned defects can be removed not only from a specific combination of colors which easily cause particularly conspicuous color nonuniformity, but also from all mixed colors. States 1305 to 1308 correspond to ink landing states of a 100% green image in the corresponding passes when the above-mentioned print method is used, like in FIG. 8. In the first and second passes, since the cyan and yellow dots are always printed at different landing points on blank pixels, high-density dots free from blurring can be obtained (C, Y). Since the print area on the sheet surface is filled with dots at 100% after the second pass, low-density dots, which are considerably blurred, are printed in the third and subsequent passes (c, y). Although the blurred states of color dots printed in four passes are gradually worsened, and their densities are gradually lowered, since the cyan and yellow dots always land on different pixels, the conditions for these two colors are almost equal to each other in any pass.

Therefore, the color tone can be prevented from being shifted closer to cyan or yellow, and no color nonuniformity occurs.

Furthermore, since this embodiment is an effective means for all the ink colors, as described above, even when any two colors are to be mixed or three-color mixed data is input, the respective color dots can land on the sheet surface under equal conditions, and color nonuniformity can be effectively prevented as well.

This embodiment is not only effective for the color nonuniformity but also further effective for the density nonuniformity caused by nozzle variations as an original object to be solved by the divisional print method as compared to the first embodiment. In the first embodiment, one dot line in the main scan direction is completed by two nozzles, while in this embodiment, one dot line is completed by four nozzles. For this reason, a smoother image can be obtained.

In order to further enhance this effect in the 4-pass print mode, a 4 (sub-scan direction)×8 (main scan direction) pixel mask may be used, as shown in FIGS. 19 to 25. In order to remove the density nonuniformity caused by nozzle variations, dots aligned in the main scan direction are preferably printed while being uniformly distributed to nozzles equal to the number of passes. Therefore, for this purpose, it is preferable to use a mask, which is elongated in the main scan direction, has no periodicity, and is asynchronous with a binarization pattern that normally has periodicity. The mask of this embodiment is obtained by juxtaposing the mask shown in FIG. 18 and a mask obtained by inverting the mask shown in FIG. 18 in the main scan direction, and has no periodicity in the main scan direction. The density nonuniformity caused by nozzle variations can be effectively eliminated as well as color nonuniformity up to a low duty since the mask is elongated in the main scan direction.

As described above, when the four color thinning masks are used in turn in units of passes in the 4-pass bi-directional print mode, a smooth image free from color nonuniformity can be obtained in a low time cost state, i.e., in the bi-directional print mode.

In the above-mentioned first embodiment and this embodiment, the thinning masks are selected in consideration of the reciprocal print method based on an equal area gradation method for all the colors, so that two or more dots of one color are not printed on a single pixel in one scan. However, even in, e.g., the one-directional print mode, when different area gradation methods are adopted in units of colors, and when data are input to have different data arrangements, proper thinning masks may be different from each other in units of colors, as has already been described above in the paragraphs of the background of the invention with reference to FIGS. 81 to 84 and FIGS. 85, 86, and 75. Therefore, the present invention is also effective for a case wherein different thinning masks are formed in accordance with the corresponding area gradation methods for the purpose of preventing color nonuniformity or density nonuniformity caused by nozzle variations even in the one-directional print mode.

Fourth Embodiment

In the fourth embodiment, a 4-pass black emphasis bi-directional print mode will be described below. This mode may be further allowed to be selected by the media selector. In this embodiment, a black emphasis operation particularly required when the inks are printed on, e.g., an OHP sheet, is added to the third embodiment. This embodiment has as its object to obtain an image having a high black density with a throughput equal to that of the third embodiment by using a black mask having a different thinning ratio from those of the remaining colors.

Figure 26:
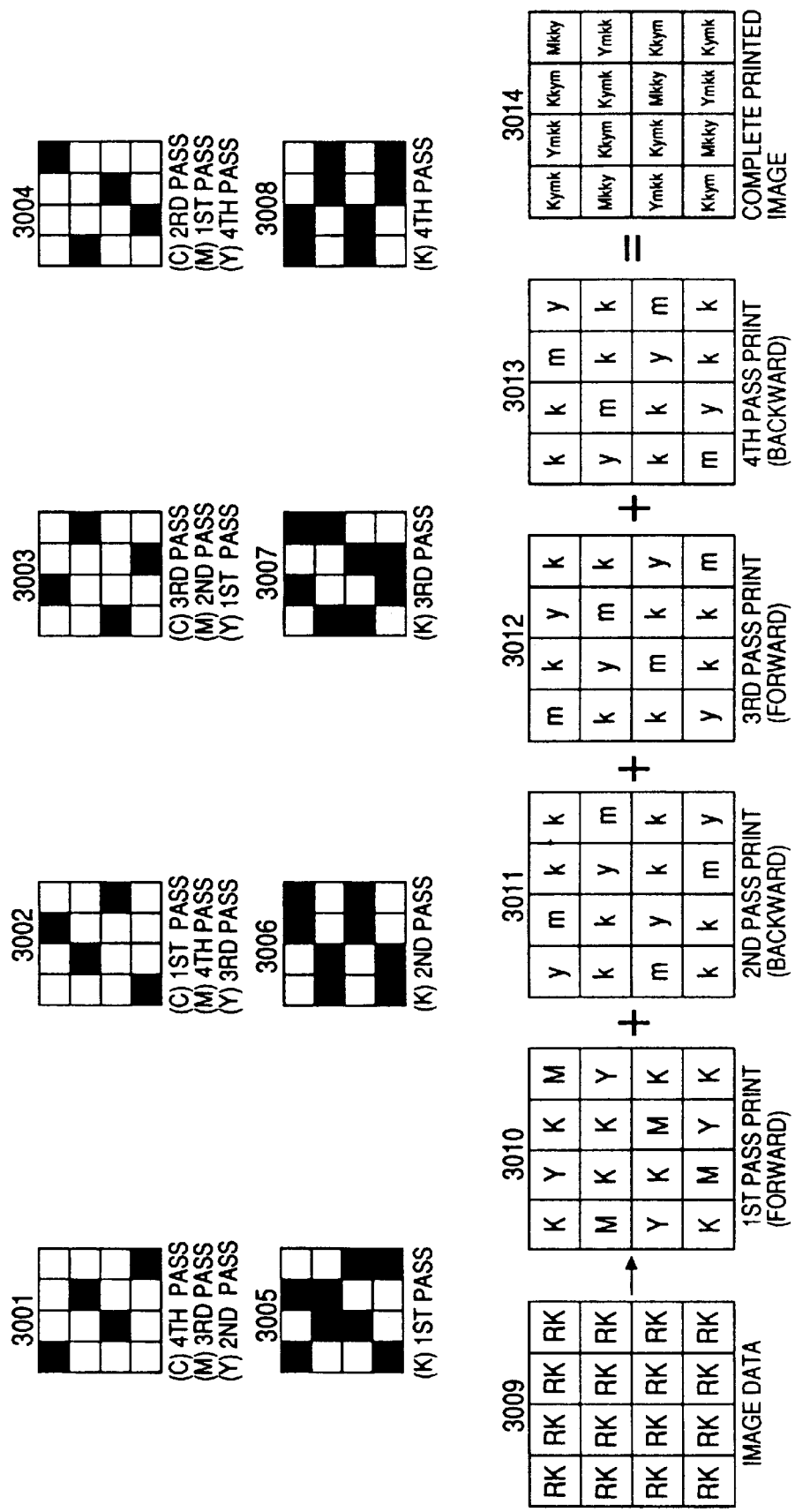
FIG. 26 is a view for explaining a case wherein an RK image is recorded in the fourth embodiment in which black emphasis is performed.

FIG. 26 shows the print method of this embodiment like in FIG. 8 of the first embodiment and FIG. 18 of the third embodiment. As for the C, M, and Y inks, 25% print operations are performed in the respective passes using the same masks at the same timings as those in the third embodiment, and an image having the same quality as that in the third embodiment can be obtained for these three colors. On the other hand, as for the black ink, thinning masks 3005 to 3008 are used in correspondence with the passes. These masks are formed especially in consideration of a black-red (RK) color-mixed image. Of three-mixed colors, an RK image using magenta, yellow, and black suffers from particularly conspicuous color nonuniformity. Therefore, in this embodiment, magenta and yellow dots are inhibited from being simultaneously printed on a pixel, where a black dot is printed, in each single pass. More specifically, of masks 3001 to 3004, two masks, which do not simultaneously use M and Y colors for a single pixel position in each pass, are combined to obtain a black mask having a thinning ratio of 50%.

In this manner, black dots can land on every pixel at a duty of 200%, and an image having a high black density can be obtained while maintaining the relationship among black, magenta, and yellow to be equivalent to that in the third embodiment.

In FIG. 26, patterns 3009 to 3014 represent how to print the print data of an RK image at a duty of 100% under the above-mentioned conditions. The pattern 3009 represents RK image data input to a 4×4 pixel area, and the patterns 3010 to 3013 represent the print states of the data 3009 in the first to fourth passes. In these patterns, the priority color of each pixel is represented by a capital letter like in the first and third embodiments. With this method, since black, magenta, and yellow dots are printed on different pixels in each pass, color nonuniformity caused by the arrangement of heads unique to the bi-directional print mode can be eliminated.

In FIG. 26, the pattern 3014 represents the ink landing states on the respective pixels after the print operations are completed. In this pattern, the priority color is also represented by a capital letter. In eight pixels half the 4×4, i.e., 16 pixels, black as a color to be emphasized serves as the priority color, and the remaining half pixels are equally divided into four each pixels respectively having as their priority colors, magenta and yellow. Such an RK image has a higher black density than that obtained when the respective color dots are printed at equal thinning ratios by the method described in, e.g., the third embodiment. In the above embodiment, an image area obtained by printing the pattern 3010 in the first pass has been described. However, in practice, there are a print area on which the pattern 3011 is printed in the first pass, a print area on which the pattern 3012 is printed in the first pass, and a print area on which the pattern 3013 is printed in the first pass. However, if the masks of this embodiment are used, the ratio of priority colors (eight black pixels, four magenta pixels, and four yellow pixels) in the 16 pixels is always left unchanged regardless of the pattern of the first pass of the print area. Therefore, the defect such as color nonuniformity will never occur in a combination of K, M, and Y like in the relationship among C, M, and Y.

In the above description, it has been demonstrated that no color nonuniformity occurs in the combination of C, M, and Y, and in the combination of K, M, and Y. However, the relationship between K and C (black and cyan) is not clarified yet. The print relationship between these two colors will be described below.

Figure 27:
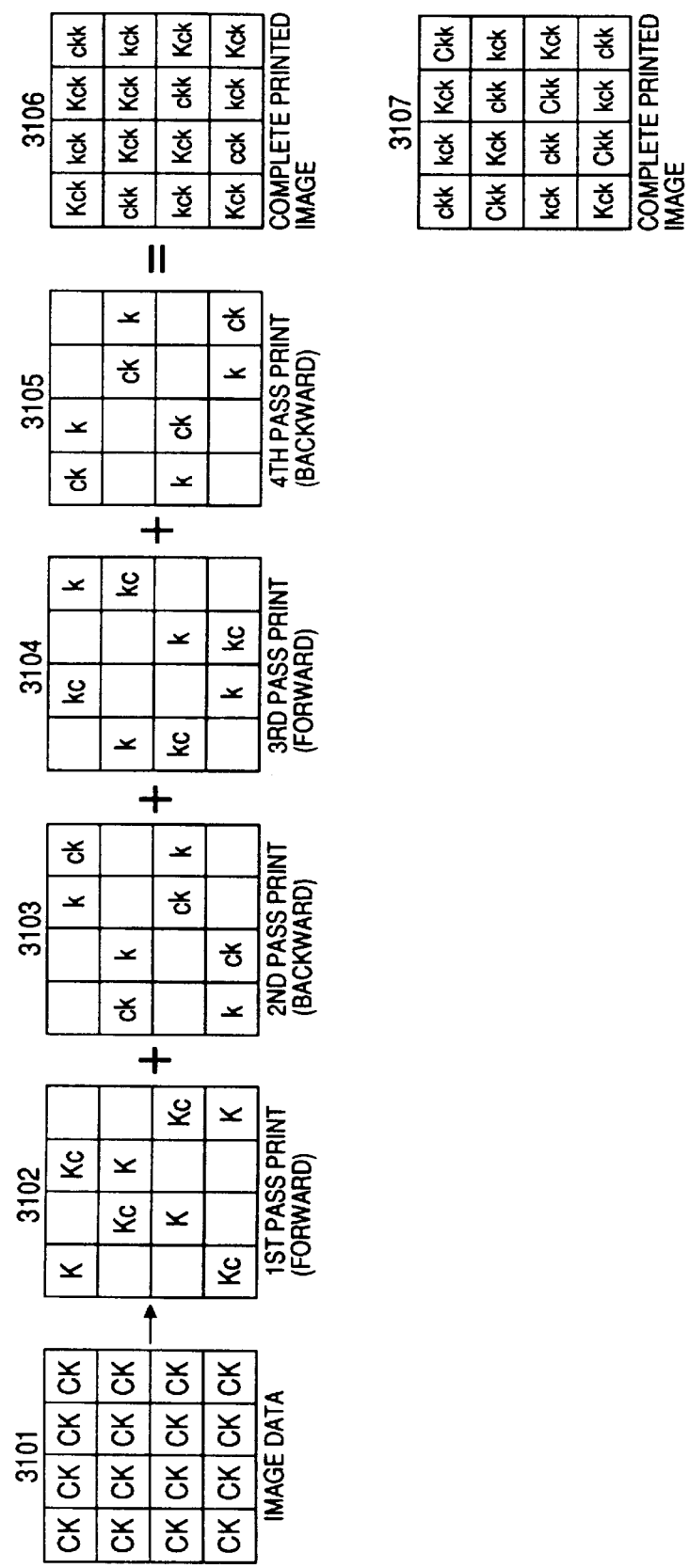
FIG. 27 is a view for explaining a case wherein a CK image is recorded in the fourth embodiment.

Cyan print positions in the masks 3001 to 3004 are completely included in the black print positions shown in the masks 3005 to 3008. Therefore, when print data 3101 shown in FIG. 27 is input, print states 3102 to 3105 are attained in the first to fourth passes. In this case, when the bi-directional print mode is executed, the color tone of the area is determined by a color, which serves as the priority color in the first pass, as has already been described in the paragraphs of the background of the invention. Therefore, in this case, in a print area started from a forward scan, black completely becomes the priority color, and there are no pixels having cyan as the priority color (3106).

On the other hand, in a print area started from a backward scan, four pixels have black as the priority color, and another four pixels have cyan as the priority color (3107). Therefore, this print area has a slightly stronger cyan color tone than the print area 3106. As has been described above, if the combination of these two colors (cyan and black) easily causes conspicuous color nonuniformity, print areas having two different color tones alternately appear in a band shape, and an image defect, i.e., color nonuniformity, may occur.

However, in practice, the combination of the black and cyan does not cause conspicuous color nonuniformity with respect to the visual sense of man. In consideration of this fact, in this embodiment, the above-mentioned thinning masks are used for preferentially removing the influence of the combinations of yellow and black (YK), and magenta and black (MK), which easily cause conspicuous color nonuniformity.

Figure 28:
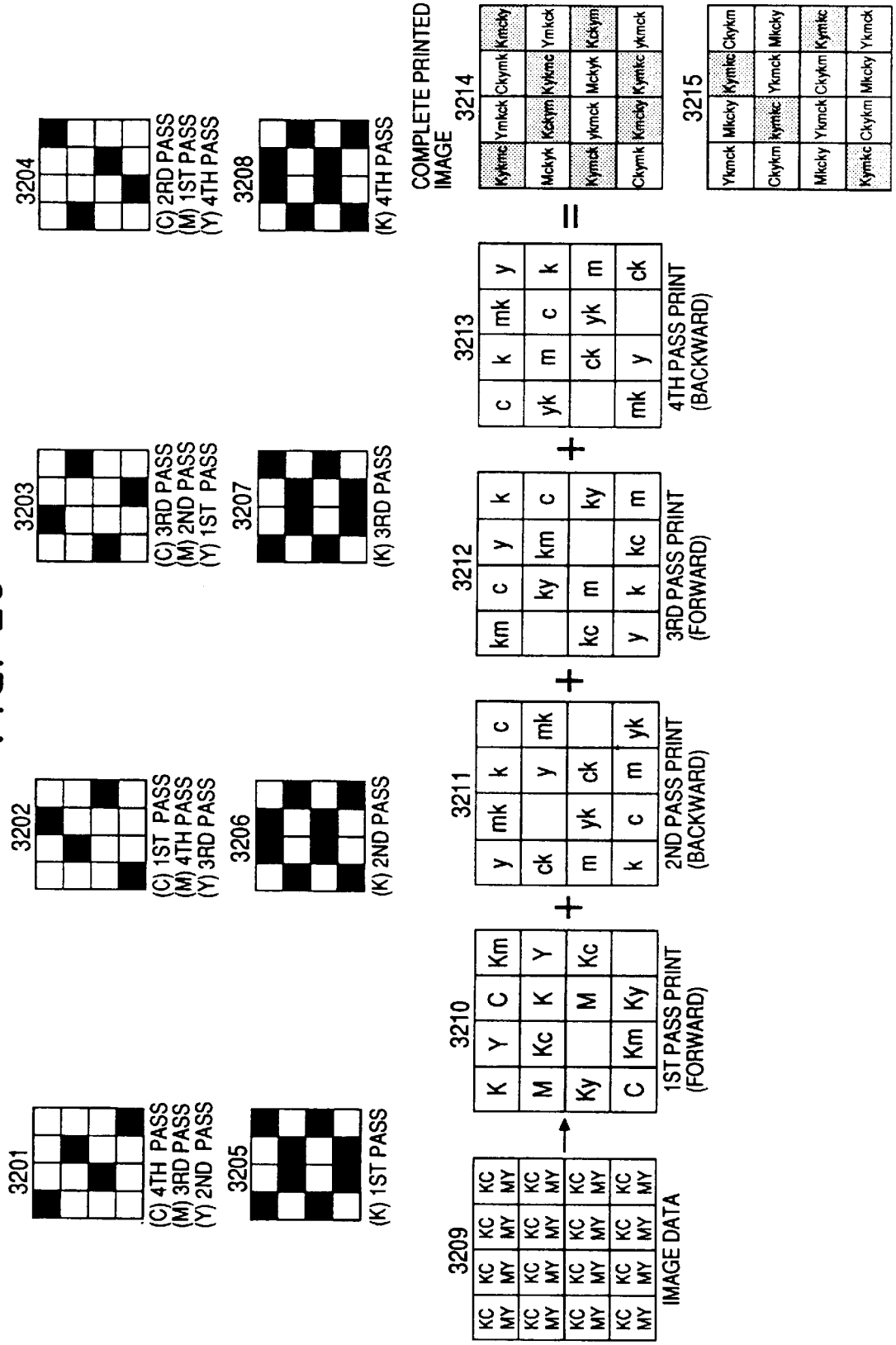
FIG. 28 is a view for explaining a case wherein a KCMY image is recorded in the fourth embodiment.

However, when the combination of cyan and black also causes conspicuous color nonuniformity like in other combinations of colors due to a difference in characteristics of recording media or inks, masks, which equally consider color nonuniformity of the respective colors, as shown in, e.g., FIG. 28, may be used. When such masks are used, although the respective colors are equally affected by color nonuniformity, particularly conspicuous color nonuniformity in a black-emphasized high-density image can be prevented. For example, patterns 3209 to 3214 represent the print states of K, C, M, and Y images using the above-mentioned masks. As can be seen from these patterns, a print area started from a forward scan and a print area started from a backward scan have different numbers of priority pixels. The former area includes eight black pixels, and two each cyan, magenta, and yellow pixels (3214), while the latter print area includes four each black, cyan, magenta, and yellow pixels (3215). In this manner, when the area started from the forward scan and the area started from the backward scan have different priority colors, i.e., different color tones, such a difference may cause color nonuniformity. However, when the color nonuniformity is equally distributed to the respective colors, this method is effective according to the degree of color nonuniformity.

In this embodiment, black dots are always printed at a duty of 50%. As has been described above, one print area in the main scan direction is completed by two nozzles per pixel, i.e., a total of four different nozzles in the four passes. Therefore, a high-density image can be obtained while maintaining the effect of preventing nozzle variations to be equivalent to that in the second embodiment.

Figure 29:
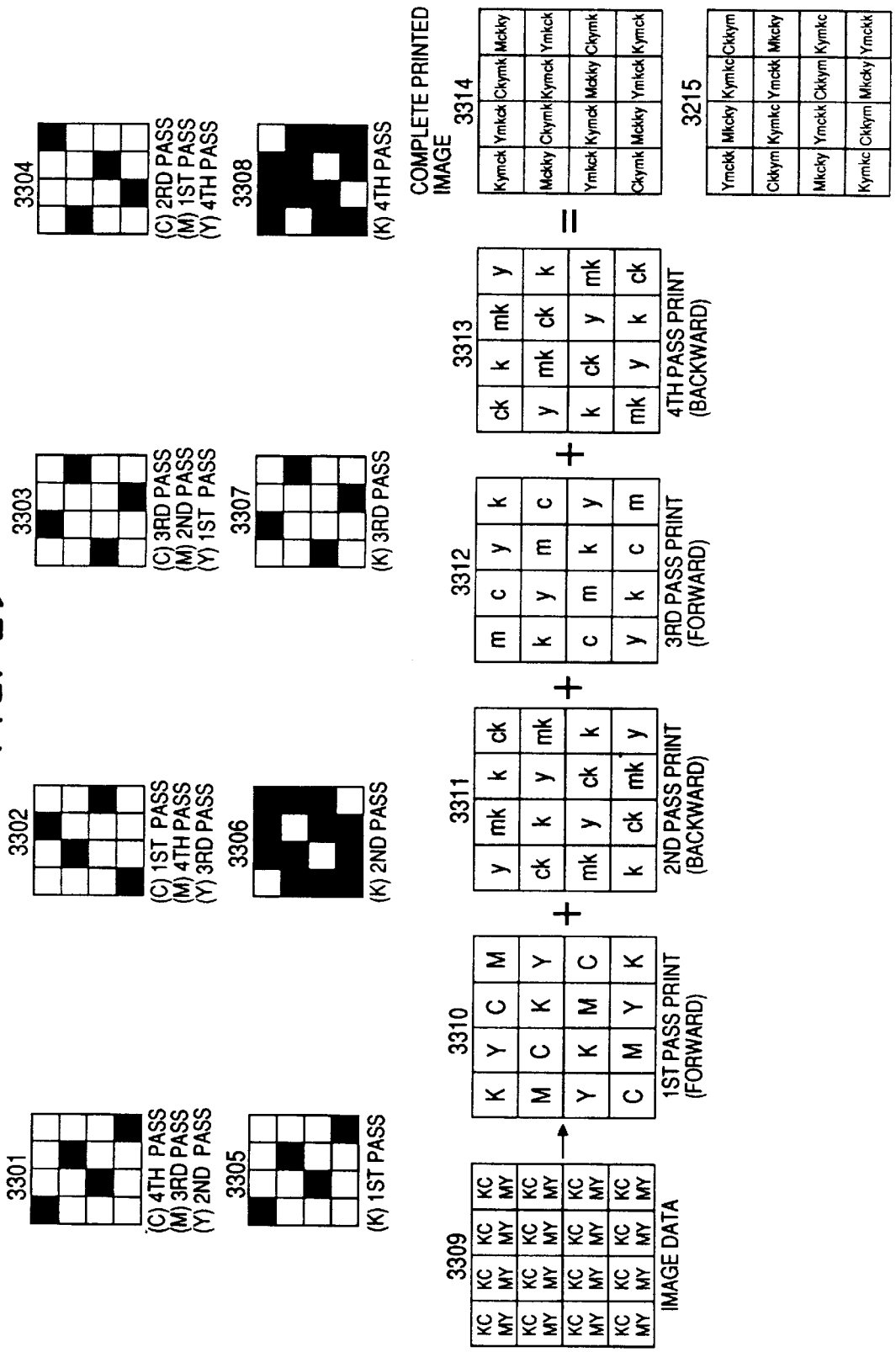
FIG. 29 is a view for explaining a case wherein a KCMY image is recorded in the fourth embodiment.

In addition, as a method of completely equalizing the numbers of priority colors in forward and backward scans, a method using black masks having different thinning ratios in the forward and backward scans, as shown in FIG. 29, is also available. When black dots are printed at a duty of 50% in each of four passes, the black dot must always be printed on a pixel, where another color dot is printed, in any pass. Therefore, it is impossible to equally distribute the priority colors in the reciprocal print mode. However, as shown in FIG. 29, in a forward scan in which the black head scans first, the thinning ratio is set to be a duty of 25%, and in another forward scan in which black hardly becomes a priority color, the thinning ratio of black dots is set to be 75%, so that the number of pixels serving as priority colors can be equally distributed to the respective colors and passes in both the forward and backward scans. With this method, a smooth image whose unit area in the main scan direction is printed by four different groups of nozzles to have black dots emphasized to a duty of 200% can be obtained like in the method of this embodiment. However, since black dots are simultaneously printed at a duty of 75% in the backward print scan, this method is not suitable for an image, which may particularly cause a defect such as boundary blurring. However, if there is no fear of such a defect, this method is most effective as a countermeasure against color nonuniformity in the black emphasis reciprocal print mode having a high throughput.

As described above, in the 4-pass bi-directional print mode, the black masks having the thinning ratios of 50% (or 25%+75%), and the C, M, and Y masks having the thinning ratios of 25%, and different in units of colors are used, and the C, M, and Y thinning masks are sequentially used in turn in units of passes, thus obtaining a smooth image free from color nonuniformity and having a high black density in a low time cost state, i.e., in the bi-directional print mode.

Fifth Embodiment

As the black emphasis print mode, another black emphasis print mode may be further allowed to be selected by the mode selector in addition to the 4-pass one-directional or bi-directional print mode.

A 1-pass black emphasis print mode will be described below as the fifth embodiment. In this embodiment, after all the black, cyan, magenta, and yellow heads complete print operations by a print section width corresponding to one scan in the first pass, the carriage is returned to the home position without feeding a sheet. During this carriage return operation, only the black head performs the second ejection on the pixels on which the black dots landed in the forward scan.

Figure 30:
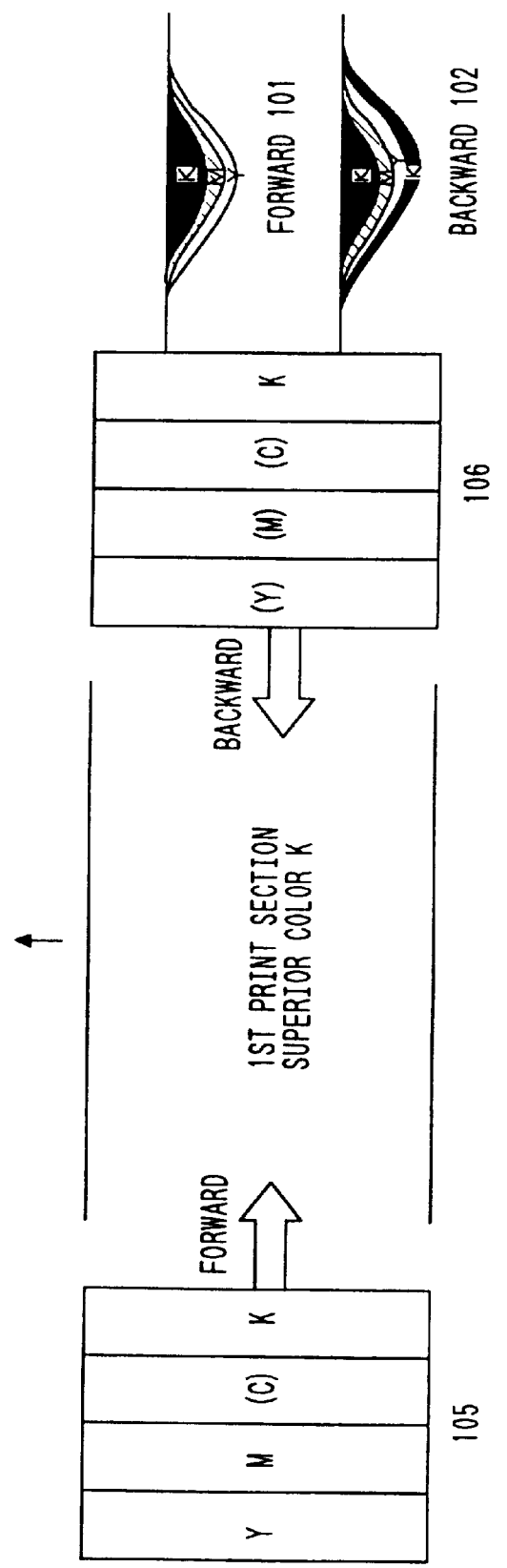
FIG. 30 is a view for explaining a recording method according to the fifth embodiment of the present invention.

FIG. 30 shows this print state. In this case, a case will be explained below wherein an RK (magenta, yellow, black) image is printed on all pixels in a predetermined area like in the above embodiment. Initially, the heads are located at a position 105, and perform print operations on a first print area corresponding to the length of each multi-head while being moved in the direction of an arrow until they reach a position 106. At this time, since the inks land in the order of K, M, and Y, an ink layer 101 on the sheet surface is obtained, and a superior color in this case is black. The carriage is moved to the position 105 without feeding the sheet from the position 106. In this scan, only the black head performs a print operation. At this time, since black dots land on the pixels each having the ink layer 101, a landing state 102 is obtained after landing, and a superior color is also black.

Figure 31:
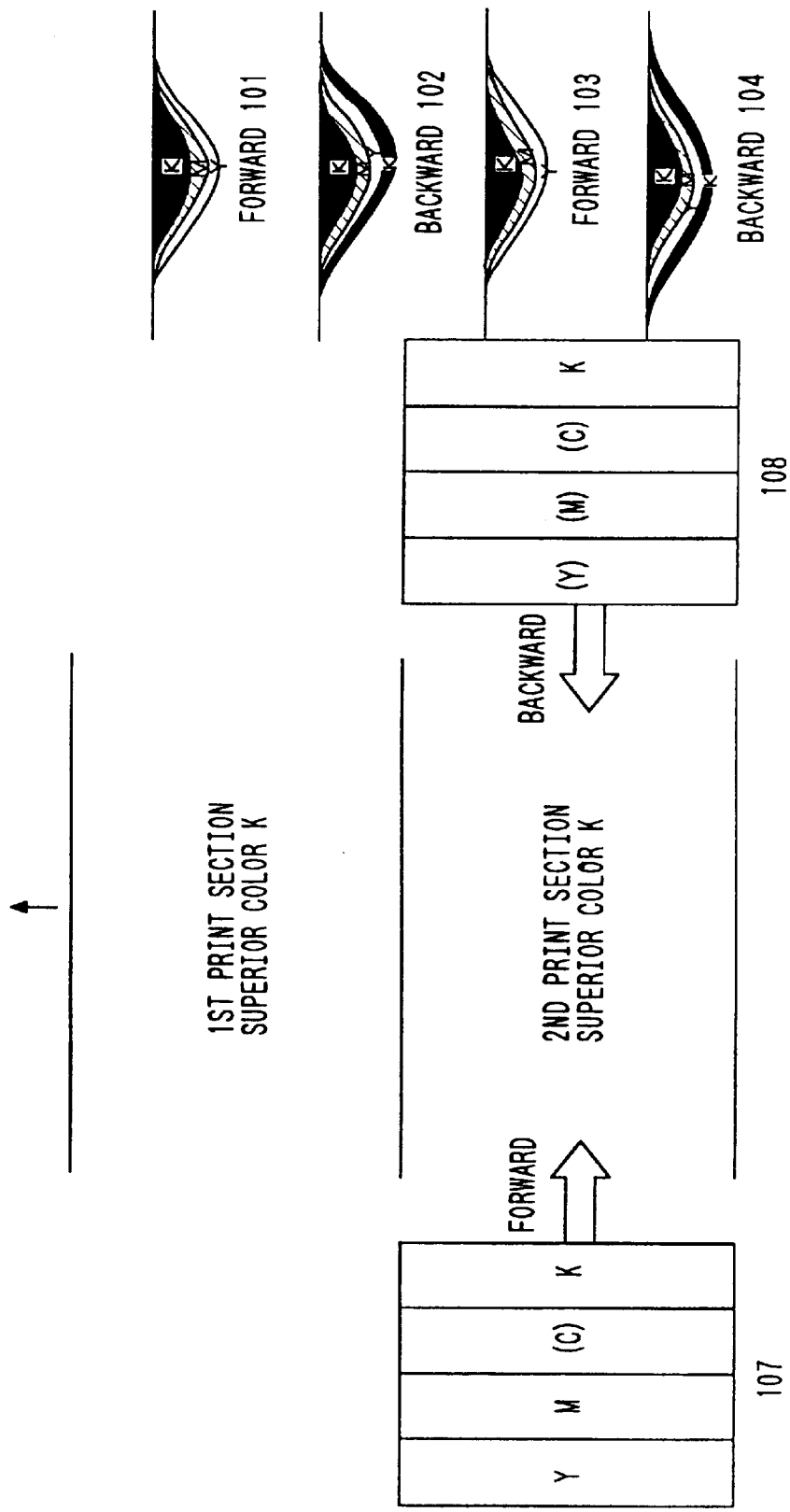
FIG. 31 is a view for explaining the recording method of the fifth embodiment.

Next, the sheet is fed by the print section width. FIG. 31 shows this state. The heads stand by at a position 107. Then, the inks land on a second print section in the order of K, M, and Y like in the first print section, thereby obtaining an ink layer 103 equal to that of the first print section. Thereafter, only the black head performs a print operation from a position 108 in the direction of an arrow. At this time, an ink layer 104 is obtained, and is equal to that of the first print section. Therefore, a superior color will not be changed in units of print section widths unlike in the prior art described previously.

Like in this reciprocal print mode for black emphasis, when print operations are performed using all the color heads in the forward scan and using only the black head in the backward scan, black can be emphasized in a blurring-free state without reversing the superior colors in units of print section widths, and an image can be completed to have a throughput equal to that in the normal 1-pass print mode having no emphasis print scan.

Sixth Embodiment

A 2-pass black emphasis print mode will be described below as the sixth embodiment. In this embodiment, the above-mentioned divisional recording method is executed to remove color nonuniformity of the colors caused by nozzle variations in especially a color image, and reciprocal print operations of only black ink is performed to emphasize a black image. In this embodiment, for the sake of simplicity, each multi-head has eight nozzles.

In this embodiment, a case will be exemplified below wherein an RK image is printed at a duty of 100% like in the fifth embodiment. FIG. 32 shows print states in this mode like in FIGS. 30 and 31. For the sake of simplicity, a print area is completed by a four-nozzle width in each scan using the multi-heads each having eight nozzles. In states 301, 303, 304, and 306, nozzles painted in black indicate those used in the print operations.

In the first scan, the multi-heads stand by at a position 301 in the sub-scan direction with respect to a sheet surface 302. The K, M, and Y heads perform print operations on gray pixels on the sheet surface 302 using the corresponding nozzles while being scanned in the direction of an arrow. At this time, since the four color heads are aligned in the order of K, C, M, and Y with respect to the scan direction, the inks are printed on one landing point in the order of K, M, and Y. At this time, on the sheet surface of a first print area, as shown in a state 401 in FIG. 33, a pixel having an ink layer and a pixel on which no ink lands are alternately aligned at neighboring positions. Since the ejection amount of one dot, which lands on the sheet surface at this time, is designed to extend beyond one pixel, the dot permeates to the neighboring pixel position, and almost forms the first layer of the neighboring pixel.

In the second scan, only the black head performs a print operation from a position 303 in the opposite direction. At this time, dots land on only the pixels on which the black ink dots landed in the first scan (forward scan). Therefore, each ink layer in the first print area has a state 402 in FIG. 33.

Next, the third scan is performed. Prior to the third scan, a sheet is fed by a distance corresponding to four nozzles (½ the total number of nozzles), and the multi-heads stand by at the left side on the sheet surface and at a position 304 in the sub-scan direction. Then, the heads perform print operations in the order of K, M, and Y on gray pixels on a sheet surface 305 while being scanned in the direction of the arrow like in the first scan. At this time, pixels to be printed include the remaining pixels on the first print area, which are not printed in the first scan, and half pixels on a blank second print area.

Figure 33:
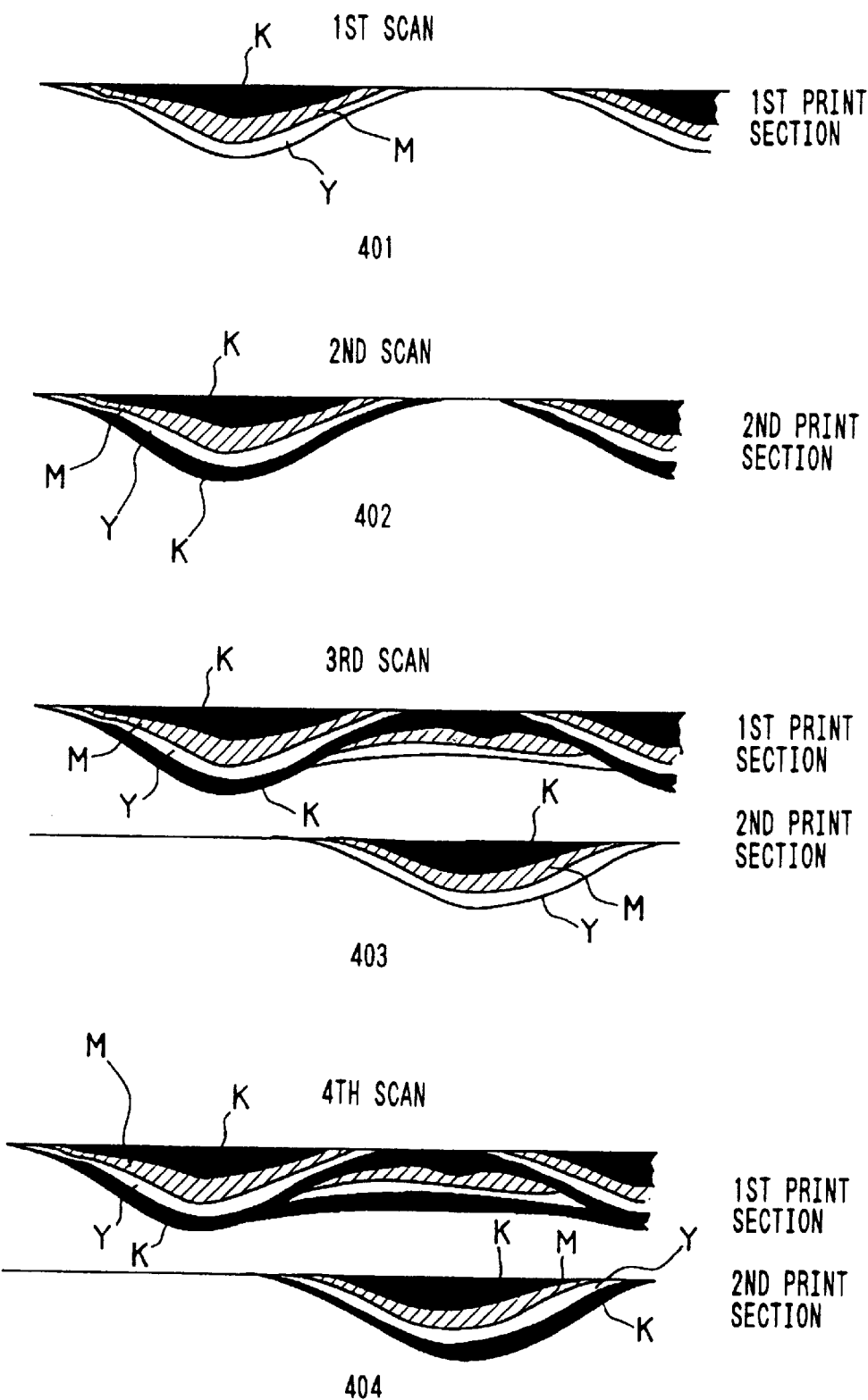
FIG. 33 is a view showing a state of an ink layer of a recording medium in the sixth embodiment.

At this time, the first and second print areas have ink landing states 403 in FIG. 33. Since the inks blurred from the neighboring pixel position form layers in the first and second scans, an area, appearing on a sheet surface portion, of each pixel landing on the first print area is reduced as compared to a pixel landing on a blank sheet. The second print area has the same ink landing state as that on the first print area after the first scan.

In the fourth scan, only the black head performs a print operation while being moved from a position 306 in FIG. 32 in the arrow. At this time, the black dots land on only pixels positions on which black dots landed in the immediately preceding scan (third scan) like in the second scan. After the above-mentioned print operations, the sheet surface section has a state 404 in FIG. 33, and the print operations on the first print area are completed in the illustrated state. The second print area has the same state as that after the second scan of the first print area is completed, and thereafter, the same print scans as described above are repeated twice to obtain the same landing state of the ink layer as that on the first print area. Therefore, on the first and second print areas, a smooth image can be obtained by the divisional print method without causing color nonuniformity, which may occur in the bi-directional print mode.

Like in the above-mentioned reciprocal print mode for black emphasis, when the two-pass divisional print operations are performed using all the color heads in the forward scan and using only the black head in the backward scan, black can be emphasized in a blurring-free state without reversing superior colors in units of print area widths, and an image can be completed to have a throughput equal to that in the normal 2-pass divisional print mode having no emphasis print scan.

Seventh Embodiment

The seventh embodiment of the present invention will be described below. In this embodiment, the sixth embodiment is further extended, and is characterized in that every time the forward and backward print scans of the sixth embodiment are executed, a sheet is fed by a distance corresponding to ¼ the total number of nozzles. This embodiment uses masks different from those in the sixth embodiment. With this method, the black emphasis divisional print method can be further improved while maintaining almost the same throughput as in the sixth embodiment, and a smooth image in which density nonuniformity caused by nozzle variations are further reduced can be obtained.

Figure 34:
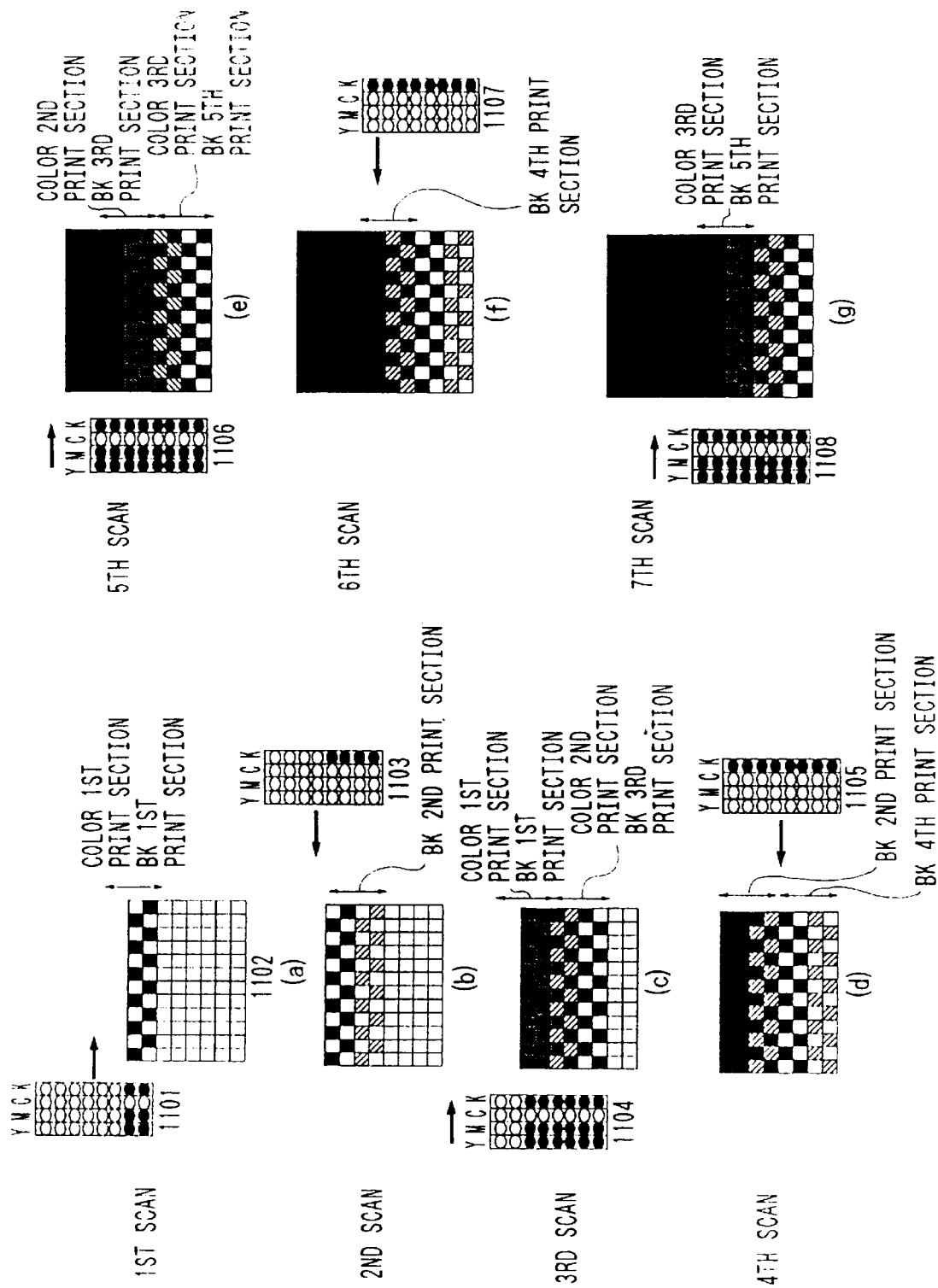
FIGS. 34(a) to 34(g) are views for explaining a recording method according to the seventh embodiment of the present invention.

In this embodiment, a case will be exemplified wherein an RK image is printed at a duty of 100% like in the fifth and sixth embodiments. FIGS. 34(*a*) to 34(*g*) show print states in this mode like in FIG. 32. As in the sixth embodiment, each multi-head has eight nozzles. However, in this embodiment, a print area is completed in units of ¼ widths of eight nozzles, i.e., 2-nozzle widths in each scan. In FIGS. 34(*a*) to 34(*g*), nozzles painted in black indicate those used in the print operations.

In the first scan, as shown in FIG. 34(*a*), the multi-heads stand by at a position 1101 in the sub-scan direction with respect to a sheet surface 1102. The K, M, and Y heads perform print operations on gray pixels on the sheet surface 1102 using the corresponding nozzles while being scanned in the direction of an arrow. At this time, since the four color heads are aligned in the order of K, C, M, and Y with respect to the scan direction, inks land on one landing point in the order of K, M, and Y, and form ink layers 201 shown in FIG. 35. At this time, on the sheet surface of a color first print area, ink landing pixels half a total number of pixels in this area and the remaining non-landing pixels are mixed like in the sixth embodiment.

Prior to the second scan, a sheet is fed by a width corresponding to two nozzles, and the heads and the sheet surface have the positional relationship of the second scan, as shown in FIG. 34(b). Only the black head performs a print operation from a position 1103 in the opposite direction by a width (four-nozzle width) of a Bk second print area. At this time, black dots land on black-painted pixels which have already been subjected to printing in the first scan in the 2-nozzle width overlapping the print area of the first scan (forward scan), and hatched pixels about half a total number of pixels in the remaining two-nozzle width area. At this time, in the print operation on pixels in the former area, black dots land on pixels where K, M, and Y dots have already landed, while in the print operation on the latter area, black ink dots land on a blank area. Therefore, upon completion of the second scan, two different ink layers 202 and 203 (FIG. 35) are formed in the corresponding two-nozzle width areas.

Next, the third scan is performed. Prior to the third scan, the sheet is fed by another 2-nozzle width, and the multi-heads stand by at a position 1104 on the left side of the sheet surface, as shown in FIG. 34(c). The heads perform print operations on gray pixels on the sheet surface in the order of K, M, and Y like in the first scan while being scanned in the direction of the arrow. At this time, ink dots land on the remaining non-printed pixels on thee color first print area, and pixels half a total number of pixels on the color second print area, as indicated by gray pixels in FIG. 34(c).

In the fourth scan, after the sheet is fed by another 2-nozzle width, only the black head performs a print operation from a position 1105 while being scanned in the direction of the arrow, as shown in FIG. 34(d). At this time as well, black dots land on pixels in the 6-nozzle width, where ink dots landed in the immediately preceding scan (third scan), and on pixels half a total number of pixels on a blank 2-nozzle width area. After this print operation, the ink landing state on the sheet surface corresponds to the fourth scan shown in FIG. 34(d). Thus, the print operations on the upper 2-nozzle width area on the first print area are completed, and all the pixels in this area have ink layers 202 shown in FIG. 35.

Furthermore, the fifth scan is similarly performed from a position 1106 shown in FIG. 34E, and the print operation on the next 2-nozzle width area is completed, as shown in FIG. 34(e). However, this area includes pixels on which the black dots landed first in the second scan, and K, M, and Y dots landed in the fifth scan, and pixels on which K, M, and Y dots landed in the third scan, and thereafter, black dots landed in the fourth scan, half by half. Each of the former pixels has ink layers 204 in FIG. 35, and each of the latter pixels has ink layers 202 in FIG. 35. Both the layers have black first layers serving as a superior color although they have different second black layer positions as an emphasized color. As described above, the color tone varies depending on the ink landing order. In this case, the color tone is controlled by the first layer, i.e., the first landing ink color. Therefore, the second and subsequent ink landing layers do not always form complete layers shown in FIG. 35 in practice, and the colors are mixed. For this reason, the colors of the second and subsequent layers hardly influence the color tone on the sheet surface portion. Therefore, almost no color tone difference is observed from the ink layers 202 and 204 shown in FIG. 35, and these layers do not cause color nonuniformity.

In this manner, upon repetition of the sheet feed operation by a 2-nozzle width and the print operation, the print operations are completed in turn from the first scan to the seventh scan. At this time, in print operations of black as a color to be emphasized including black emphasis scans, one pixel width in the main scan direction is completed by a total of four different nozzles. Therefore, according to this embodiment, since the density nonuniformity of the black ink, which is easily influenced by nozzle variations, can be eliminated by four different nozzles, a remarkably smooth image can be obtained.

As described above, when the sheet feed operation is performed by a width ¼ the total number of nozzles in units of scans, and the 50% divisional print operations are performed using all the color heads in the forward scan and using only the black head in the backward scan, black can be emphasized in a blurring-free state without reversing superior colors in units of print area widths, and a high-quality image free from density nonuniformity can be obtained while maintaining a throughput to be equal to that in the normal 2-pass divisional print mode.

As described above, in the reciprocal print method, since the print operations are performed using all the color heads, i.e., K, C, M, and Y heads in the forward scan, and the emphasis print operation is performed using only the black head again in the backward scan, a high-quality image having a high black density can be obtained to have the same throughput as that in a normal color print mode.

Eighth Embodiment

In the above embodiments, the thinning masks in units of pixels are used. Alternatively, the above-mentioned divisional recording method may be executed using thinning masks in units of m×n (m and n are positive integers and at least one of them is equal to or larger than 2) pixel groups.

Figure 36:
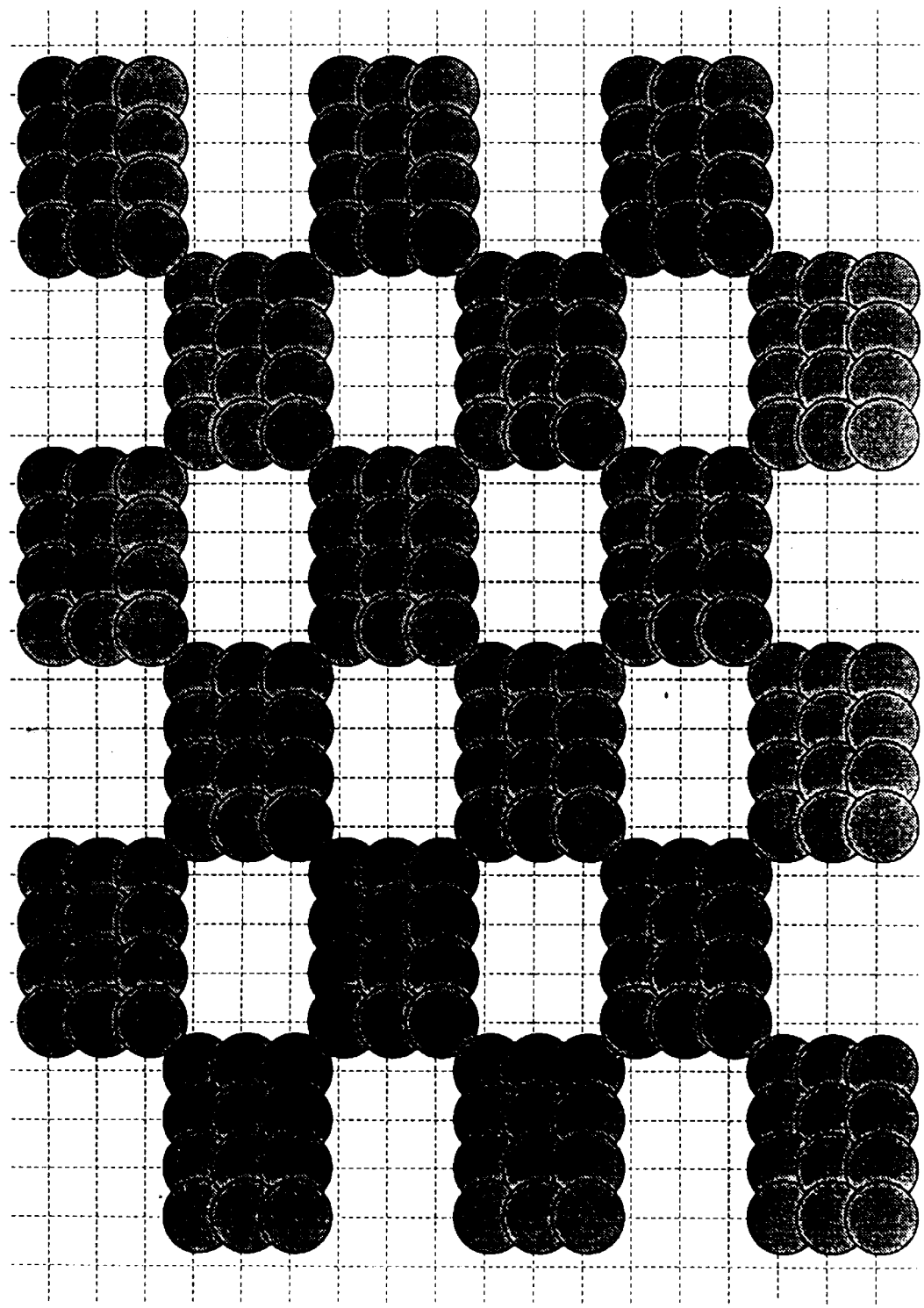
FIG. 36 is a view showing a thinning arrangement of divisional recording according to the eighth embodiment of the present invention.
Figure 37:
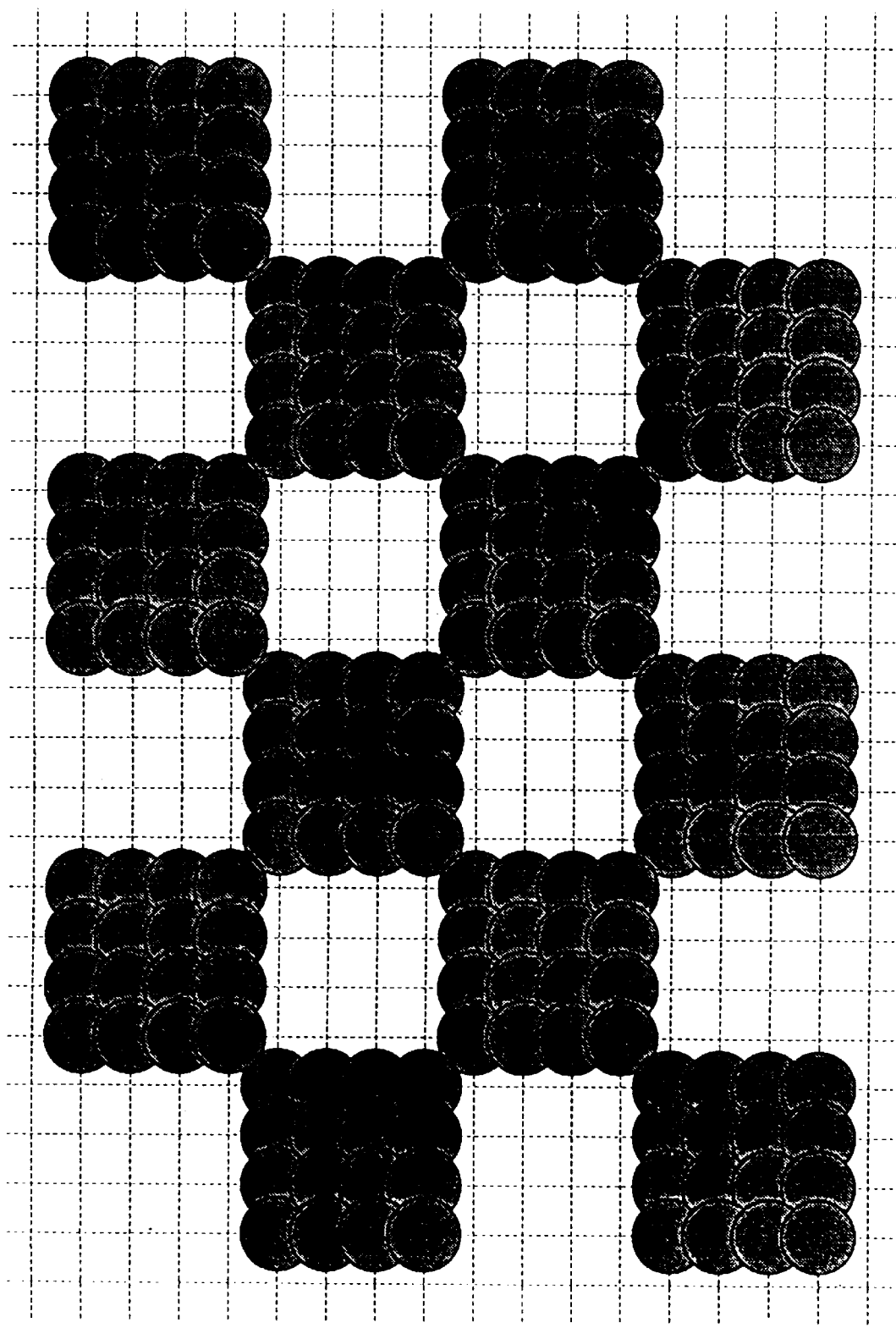
FIG. 37 is a view showing another thinning arrangement of divisional recording.
Figure 76:
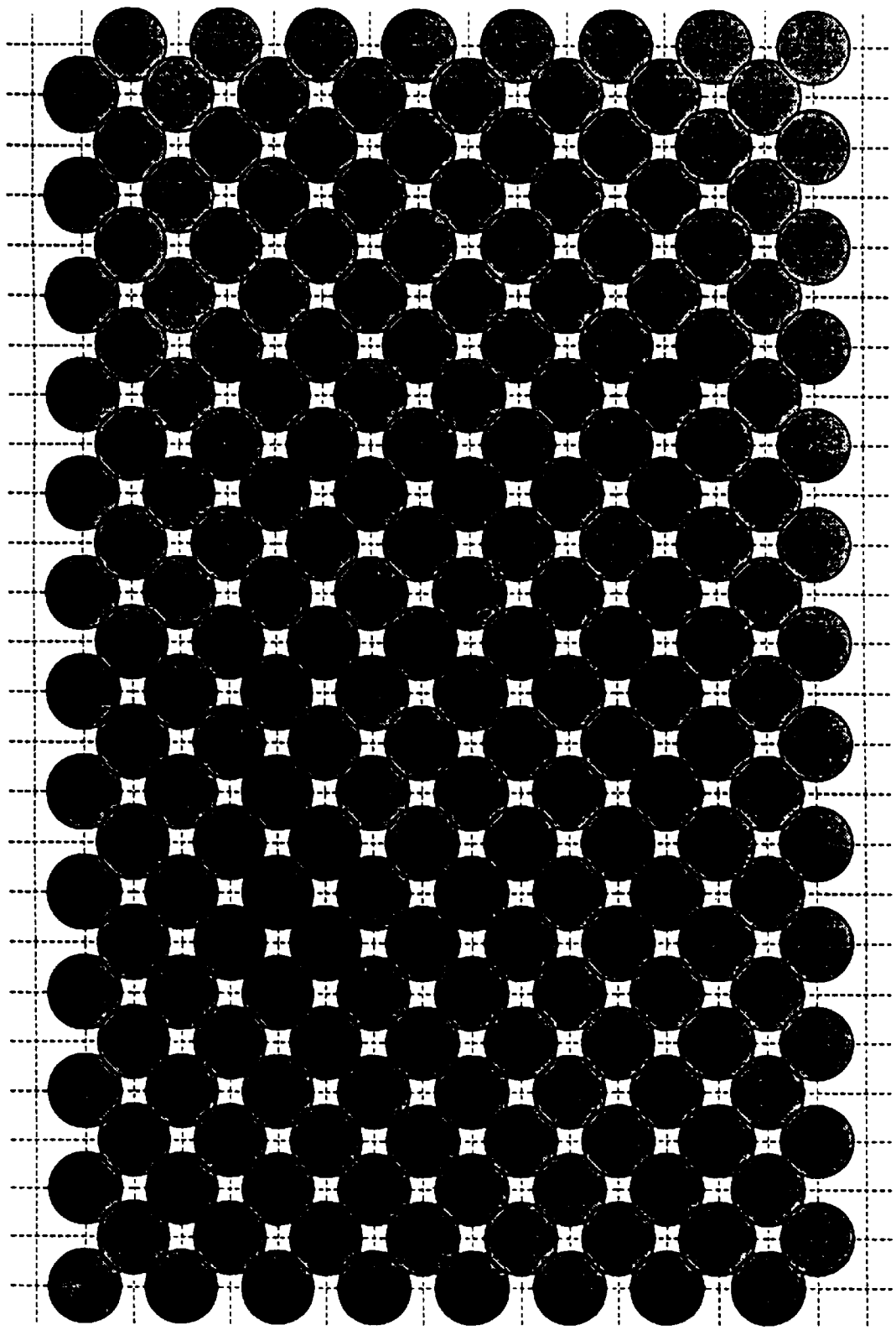
FIG. 76 is a thinning arrangement used in conventional divisional recording.

The eighth embodiment of the present invention will be described below. FIGS. 36 and 37 best illustrate the present invention in comparison with FIG. 76, and show ink landing states after the first scan in a certain area like in FIG. 76. Conventionally, dots recorded in a single scan land on alternate non-neighboring pixel positions (FIG. 76). However, in this embodiment, all pixels are grouped into 4×3 groups (FIG. 36) or 4×4 groups (FIG. 37), so that dots on pixels in a single pixel group are recorded in a single pass, and the pixel groups are recorded at non-neighboring positions in a single pass. In this manner, as can be seen from FIGS. 36 and 37, although the dot overlapping area in each group is increased, the ink coverage area of the first recording color is decreased accordingly, and hence, a blank portion on which ink dots of second and subsequent recording colors can land is increased. Therefore, even when the ink landing order is changed between the forward and backward scans, the space factor of the priority color in the first scan is decreased, and the space factor of the priority color in the second scan is increased accordingly. For this reason, an imbalance between the two priority colors can be eliminated, and a color tone difference among areas, which repetitively appear in units of sheet feed widths, can also be eliminated.

Figure 38:
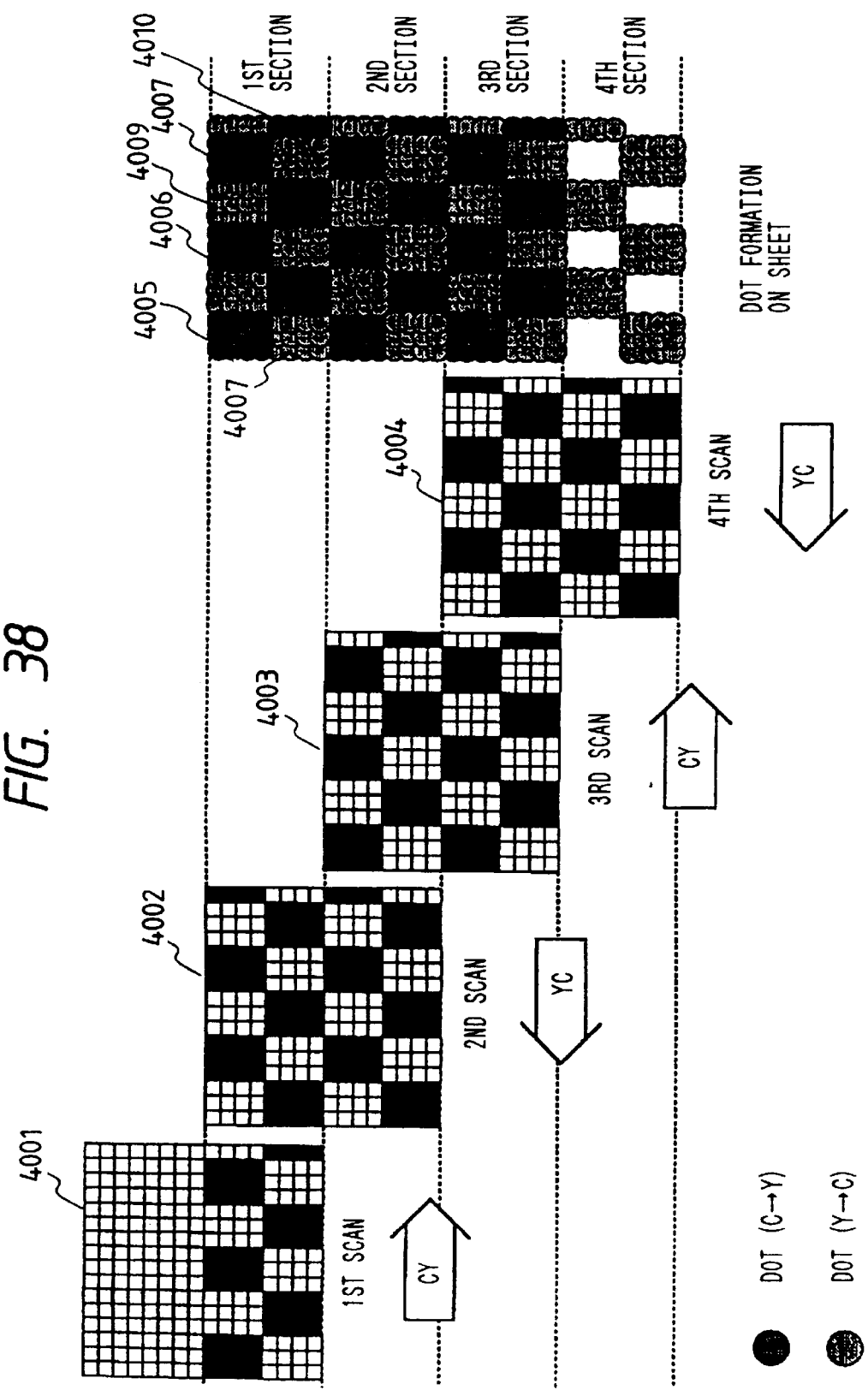
FIG. 38 is a view showing a recording state using a mask having the thinning arrangement shown in FIG. 36.

A recording method using a divisional thinning pattern in units of 4×3 pixel dot groups shown in FIG. 36 as the first pattern of this embodiment will be described below. FIG. 38 shows a recording state of this embodiment to be compared with the prior art shown in FIG. 78. In this case, a head consisting of 16 nozzles is used, and bi-directional print operations are executed while feeding a sheet by an 8-nozzle width. Data to be recorded in this case, is a 100% green image consisting of cyan and yellow. FIG. 38 exemplifies a case wherein dots each having a dot size of 110 μm are recorded at a pixel density of 360 dpi.

In the first scan by moving the carriage 706 forward, dots are printed on a first area on a recording medium according to a divisional thinning pattern 4001 using the lower half nozzles (eight nozzles) of each of the Y and C multi-heads 702. In the first scan, ink dots are ejected in the order of C→Y onto areas 4006 to 4010 on the recording medium, which correspond to pixel groups painted in black in the pattern 4001. After the first scan, a sheet feed operation (sub-scan operation) is performed by a distance according to a length half that of the multi-head.

In the second scan by moving the carriage backward, dots are printed on first and second areas on the recording medium according to a divisional thinning pattern 4002 using all the nozzles of the Y and C multi-heads 702. The pattern 4002 complements the pattern 4001. In the second scan, ink dots are ejected in the order of Y→C onto areas on the recording medium, which correspond to pixel groups painted in black in the pattern 4002. Upon completion of the second scan, the sheet feed operation is performed by a distance according to the length half (eight nozzles) the multi-head.

In the third scan by moving the carriage forward, dots are printed on second and third areas on the recording medium according to a divisional thinning pattern 4003 using all the nozzles of the Y and C multi-heads 702. The pattern 4003 has the same arrangement as that of the pattern 4001, and complements the pattern 4002. In the third scan, ink dots are ejected in the order of C→Y onto areas on the recording medium, which correspond to pixel groups painted in black in the pattern 4003. Upon completion of the third scan, the sheet feed operation is performed by a distance according to the length of eight nozzles.

In the fourth scan by moving the carriage 706 backward, dots are printed on third and fourth areas on the recording medium according to a divisional thinning pattern 4004 using all the nozzles of the Y and C multi-heads. The pattern 4004 has the same arrangement as that of the pattern 4002, and complements the pattern 4003. In the fourth scan, ink dots are ejected in the order of Y→C onto areas on the recording medium, which correspond to pixel groups painted in black in the pattern 4004. Upon completion of the fourth scan, the sheet feed operation is performed by another 8-nozzle distance.

Thereafter, the above-mentioned processing is repeated, and the last record area is printed using the upper half nozzles of each multi-head, thus ending the recording operation on the single-recording medium.

Figure 78:
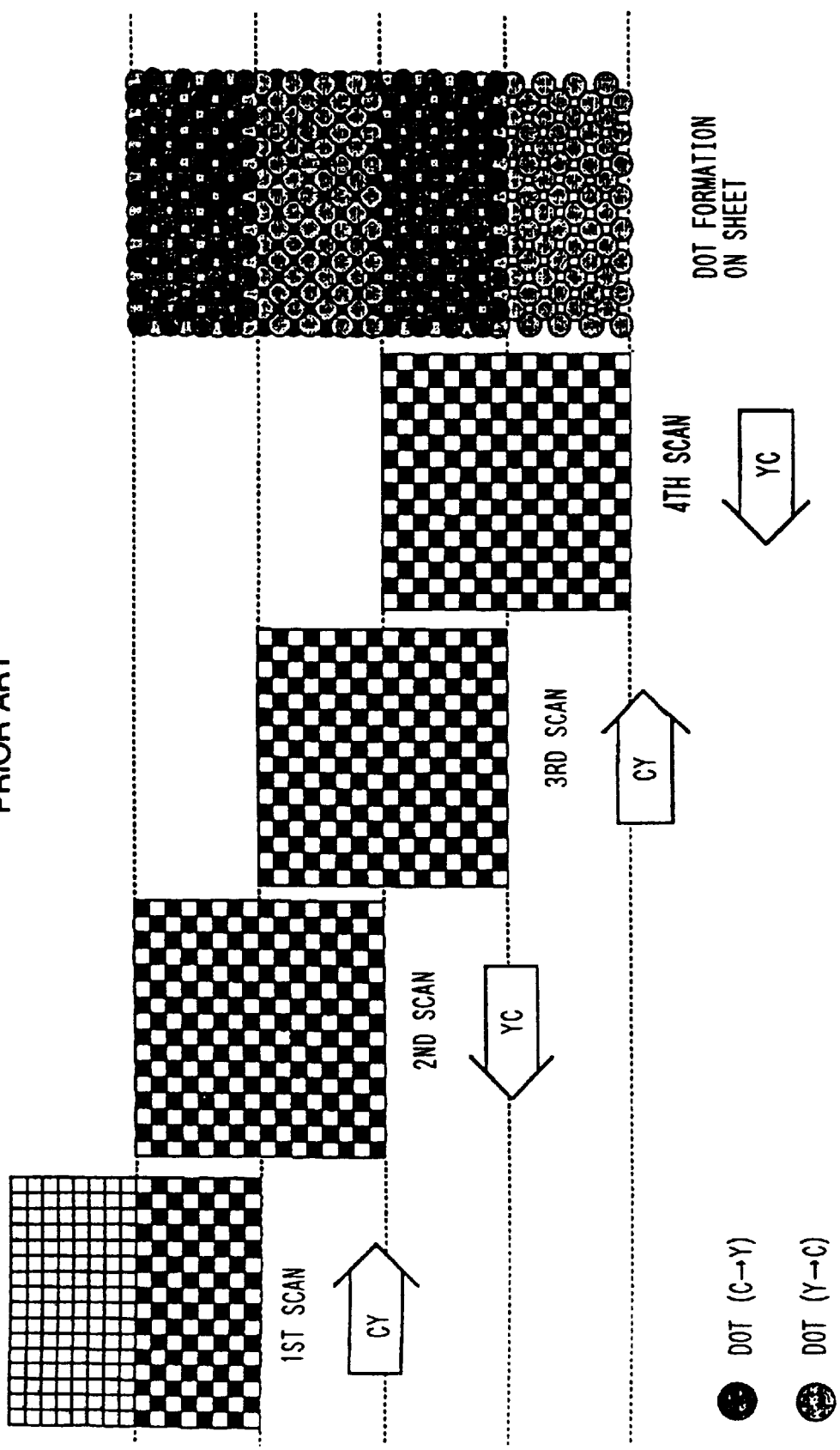
FIG. 78 is a view for explaining color nonuniformity caused by the conventional divisional recording.
Figure 80:
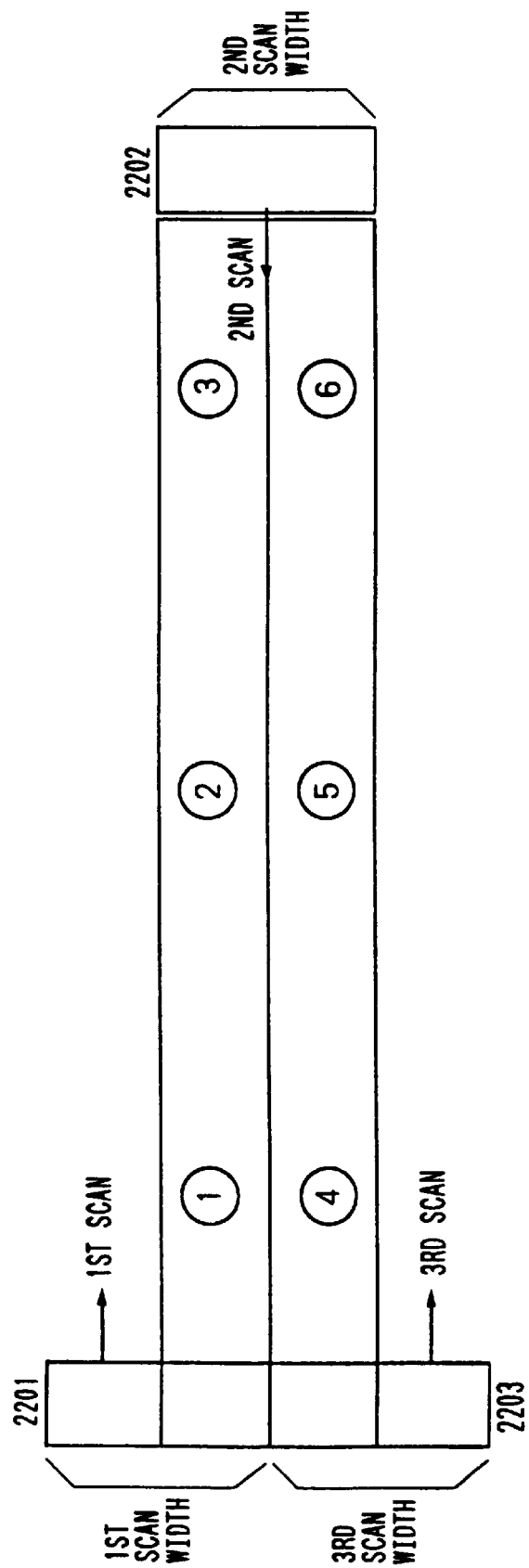
FIG. 80 is a view for explaining a cause of time distance nonuniformity.
Figure 81:
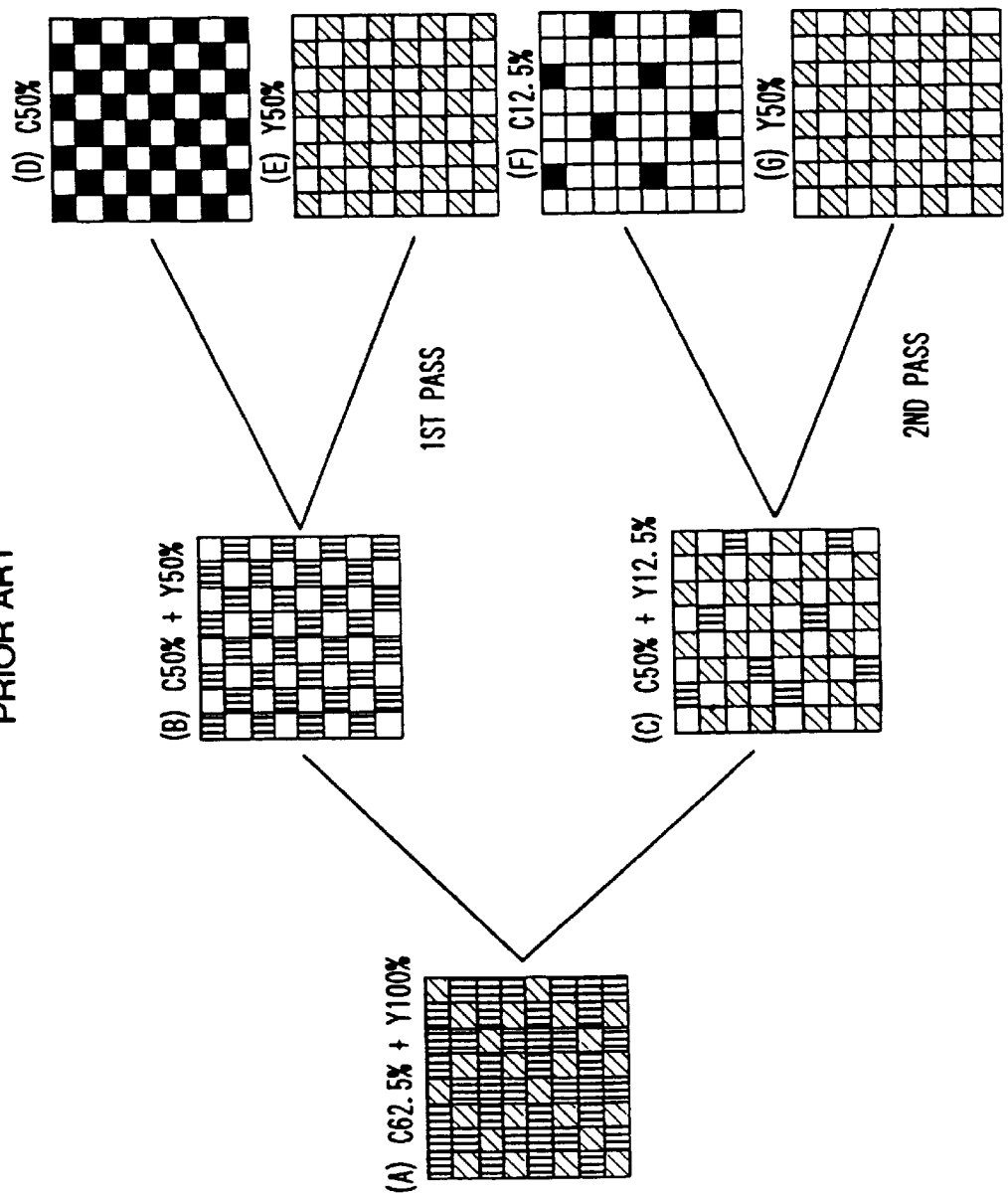
FIGS. 81(A) to 81(G) are views for explaining a case wherein intermediate color image data is divisionally recorded.
Figure 82:
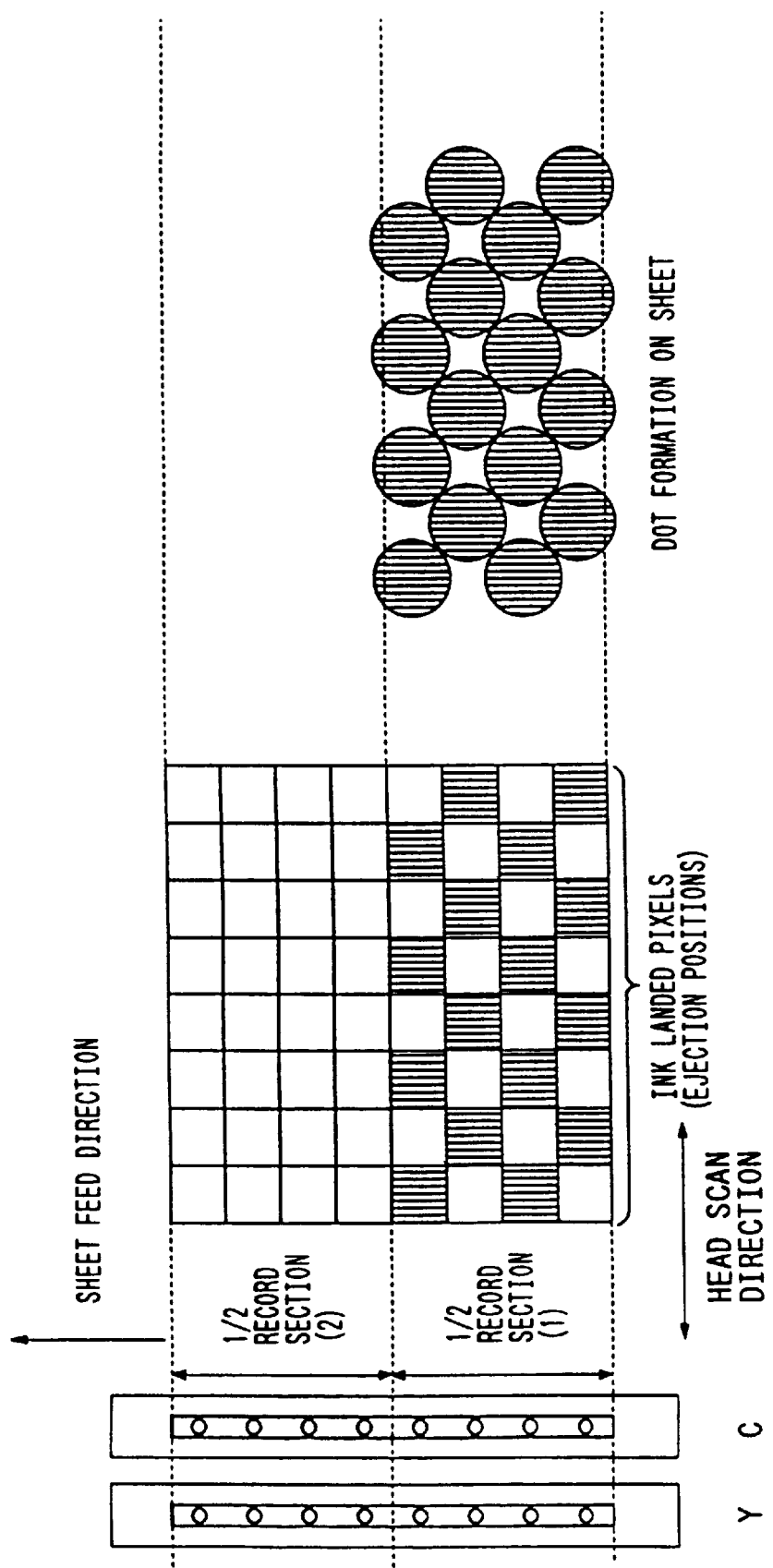
FIG. 82 is a view showing a print state in a first pass of the divisional recording.
Figure 83:
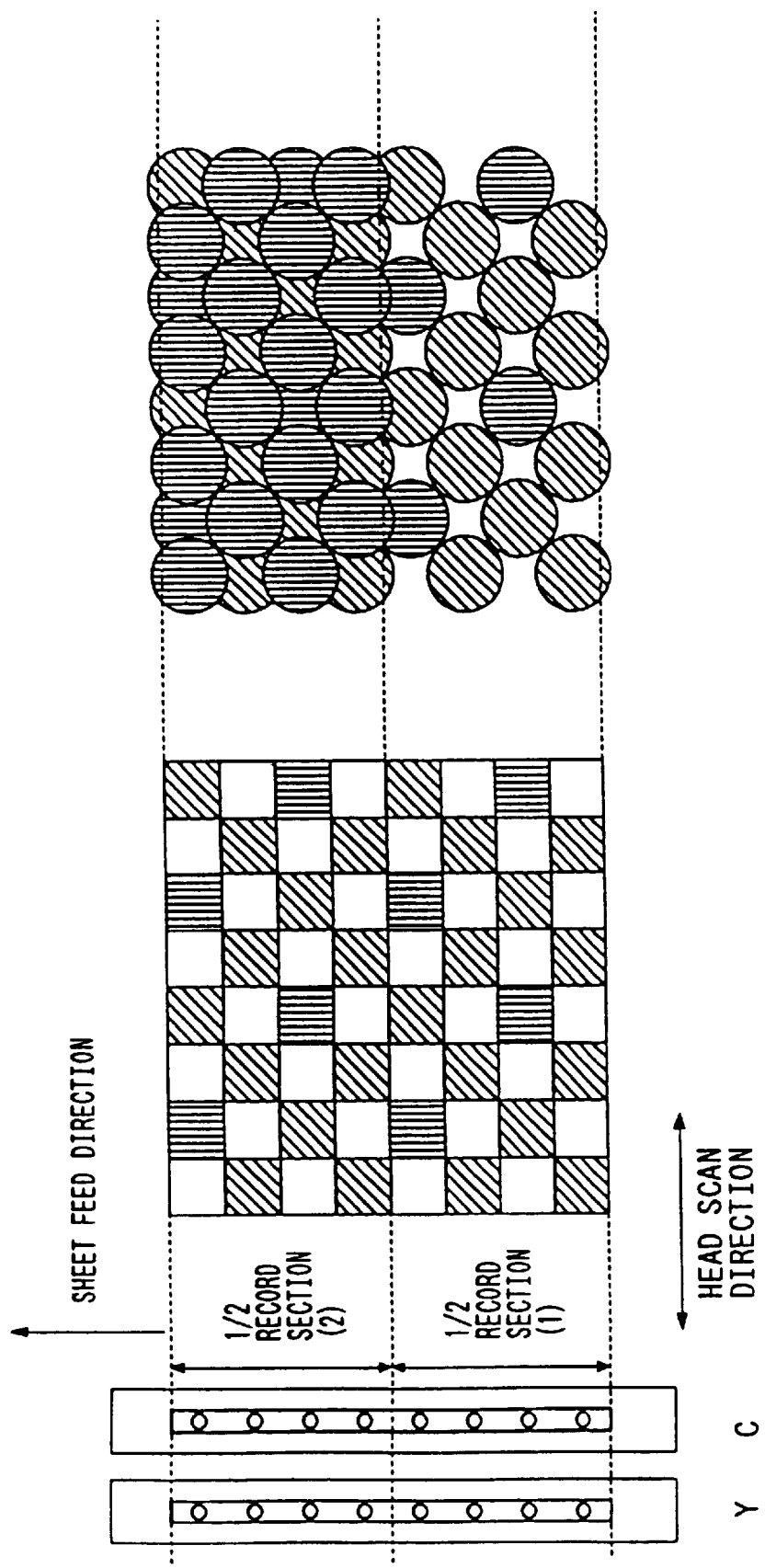
FIG. 83 is a view showing a print state in a second pass of the divisional recording.
Figure 84:
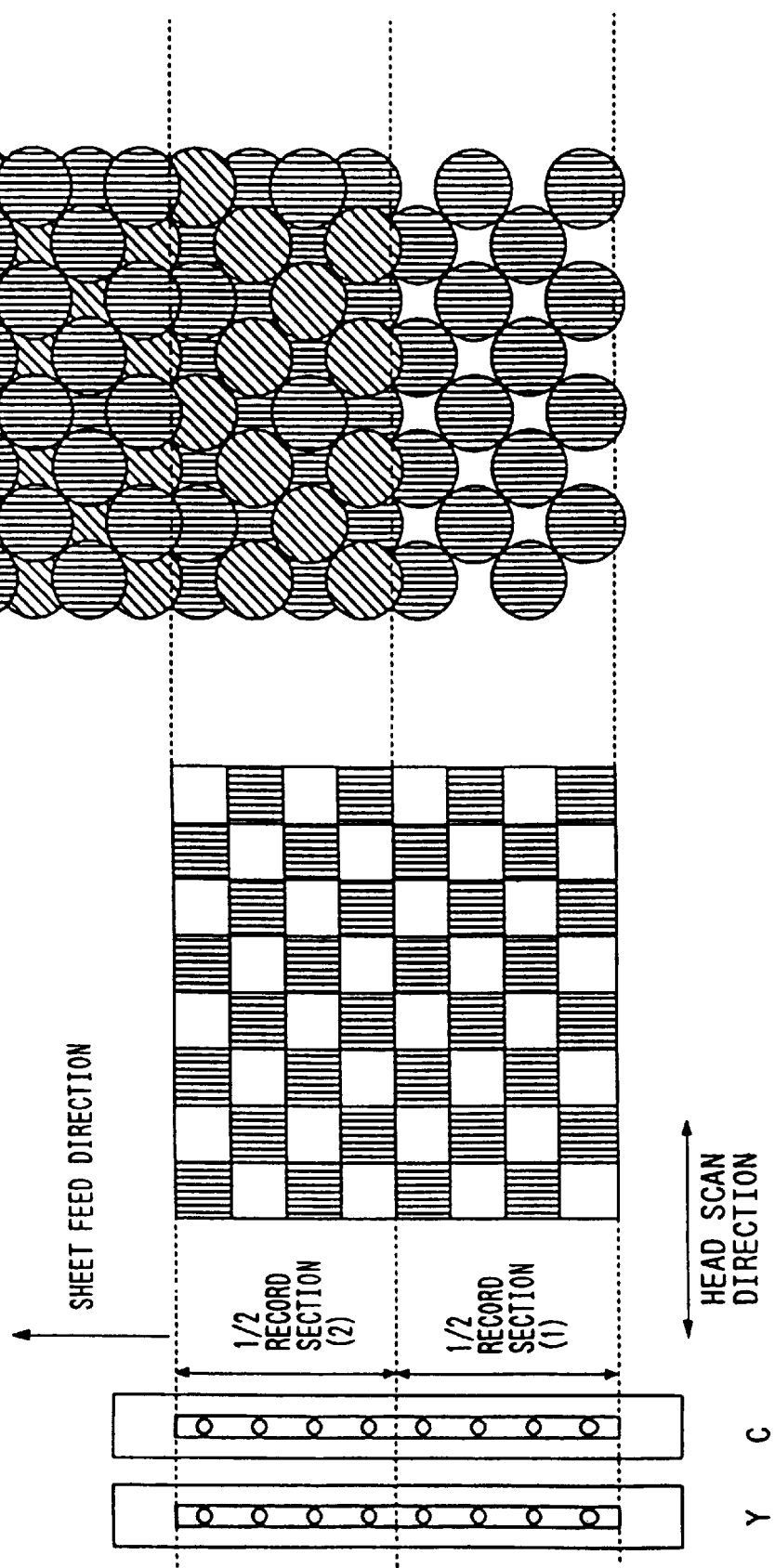
FIG. 84 is a view showing a print state in a third pass of the divisional recording.
Figure 88:
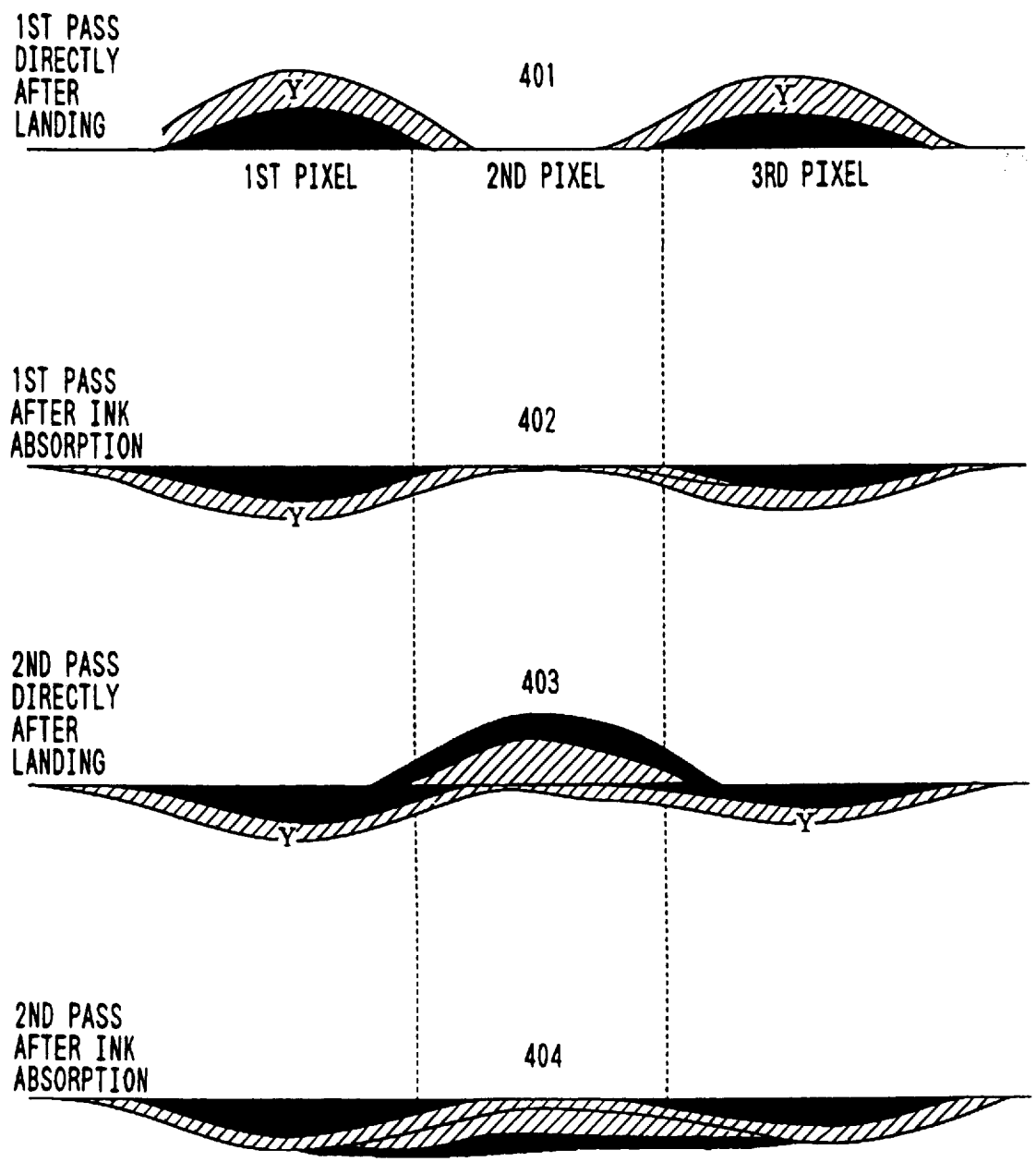
FIG. 88 is a sectional view of a color-mixed portion on a sheet surface by the print method shown in FIG. 87.

In FIG. 78 showing the prior art, since a recording mask in each scan has a checker pattern, each dot having a size larger than one pixel is largely blurred to the neighboring pixel positions, and causes density nonuniformity having different priority colors in units of feed widths. In contrast to this, in FIG. 38 of this embodiment, since a checker mask in units of 4×3 pixel groups is used, the ink dots are blurred in each dot group, but blurring of ink dots to another group is limited, and a difference between priority colors of two adjacent image areas can be suppressed as compared to the prior art. In this arrangement method of pixel groups, since the pixel groups need only be formed not to be blurred to another group, all the colors need not always be recorded in equal arrangements. Therefore, the same arrangement method may be used for all the colors, or different arrangement methods may be used in units of colors. The ninth and 10th embodiments using different arrangement methods will be described later.

In this embodiment, the mask in units of 4×3 dot groups is used as a thinning mask. When pixels are grouped into m×n pixel groups like in this embodiment, the proper values of m and n vary depending on conditions such as a pixel density, an ink ejection amount, a recording medium, or the like given for each case. If m and n are too small under the above conditions, the effect of this embodiment cannot be obtained. Conversely, if a dot group is as large as one resolved by human eye, a color tone difference between neighboring groups is sensed, and a coarse image is formed.

FIG. 40 is a table showing the extrusion rate obtained when divisional recording is performed using a rectangular thinning mask in units of n×m pixel groups with respect to the ratio of the dot size to a predetermined pixel pitch, and a color distance (or difference) between record areas with respect to each extrusion rate. The extrusion rate indicates the rate of extrusion of dots recorded in the first scan to a non-print area to be subjected to recording in the second scan. The color distance between record areas indicates a color distance between neighboring record areas obtained when a green image consisting of cyan and yellow is divisionally recorded like in FIGS. 38, 39, and 78, in correspondence with the extrusion rate.

As can be seen from FIG. 40, the extrusion rate is decreased as the number of dots in a dot group is increased. If the number of pixels (the number of dots) remains the same, the extrusion rate is decreased as the pixels define a shape closer to a square. A real color distance corresponding to each extrusion rate is a measurement value obtained by real recording and a color distance meter. Furthermore, a theoretical color distance is calculated from spectrum distributions of two different reference green images in correspondence with the extrusion rate.

A calculation method of the theoretical color distance value will be briefly described below.

① First, the spectrum distributions of a green image recorded in the order of cyan and yellow and a green image recorded in the order of yellow and cyan are obtained (measured).

② The spectrum distribution of a unit area where the two different green images complement each other at variable ratios is calculated by additive color mixing using the results of ①.

③ The tristimulus values of the XYZ system are calculated from the above spectrum distribution.

④ The tristimulus values are converted to values on the CIE 1976 (L*a*b*) space.

⑤ Color distances between neighboring areas corresponding to extrusion rates are calculated by a CMC color difference formula from the values of green images corresponding to the extrusion rates and the values of green images whose extrusion values are reversed between cyan and yellow.

The CMC color distance used here is the latest method of various color distance formulas, which method is designed to cause a color distance obtained from the normally used CIE 1976 (L*a*b*) color distance formula to further approach a visual color distance of man.

Figure 77:
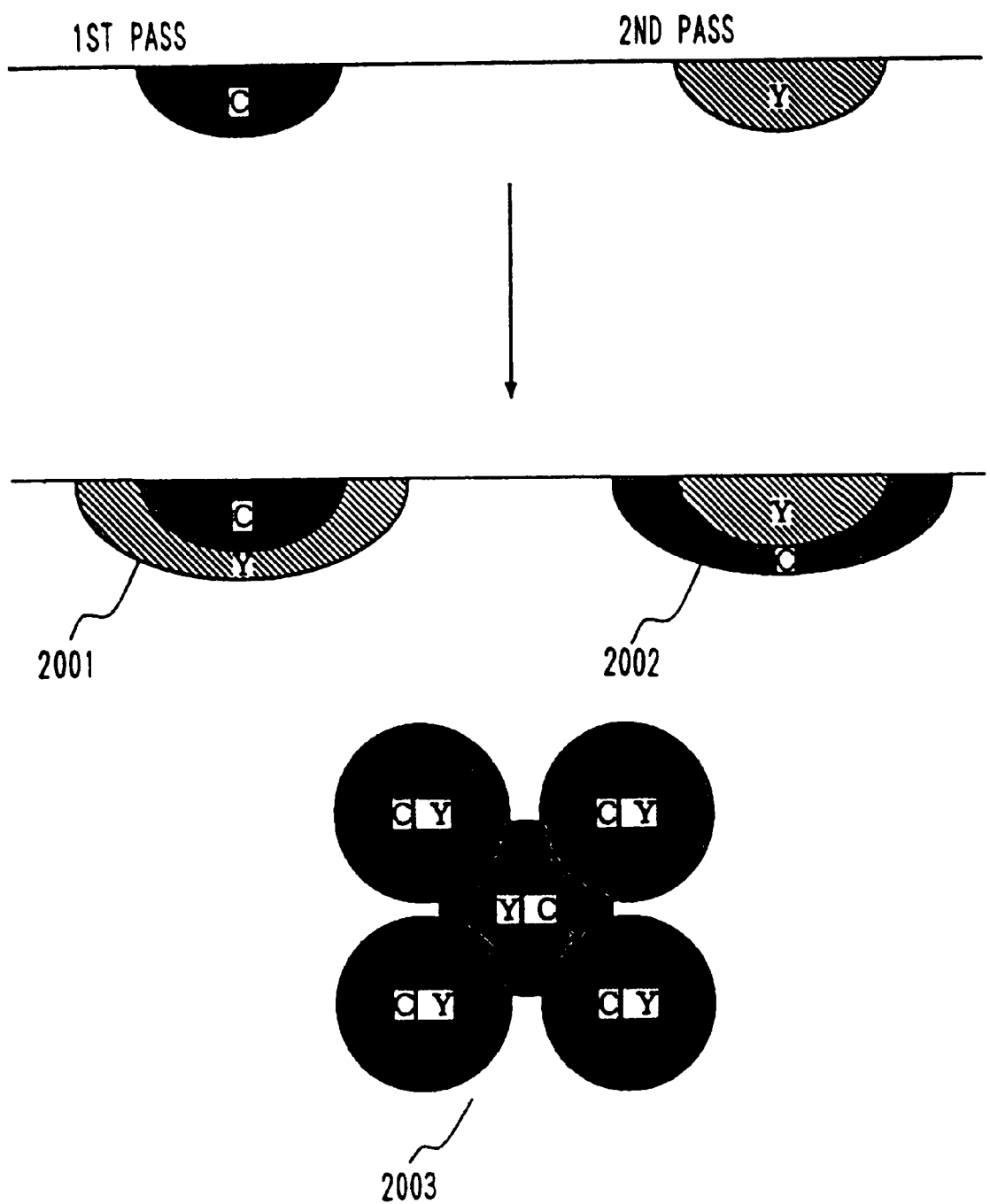
FIG. 77 is a sectional view of a sheet surface for explaining a color nonuniformity state.

The CMC color distance method will be briefly described below. In the CMC color distance formula, of the expression axes of CIE L* (lightness), and a* and b* (chromaticities), a* and b* are developed to a cylindrical function ($L^*C^*_{ab}H°_{ab}$) for three-dimensionally expressing $C^*_{ab}$ (metric saturation) and $H°_{ab}$ (metric hue angle), while $L^*$ (metric lightness) is left unchanged. Upon expression of the metric lightness $L^*$, the metric saturation $C^*_{ab}$, and the metric hue angle $H°_{ab}$, the respective dimensions extend along independent attributes of the visual sense as compared to the conventional ($L^*a^*b^*$) function consisting of the lightness and the chromaticities. Therefore, each attribute can be visually independently evaluated, and a countermeasure (weighting) can be easily taken in accordance with each attribute. When the color distance between two points is calculated later, three experimentally obtained weighting coefficients $1S_L$, $cS_C$, and $S_H$ are used in the normal color distance formula, thus realizing conversion to $\Delta E=\{(\Delta L^*/1S_L)^2+(\Delta C^*/cS_C)^2+(\Delta H^*/S_H)^2\}^{1/2}$. As formulas for obtaining the correction coefficients, the following formulas are obtained as a result of statistic examinations (Yukio Murata, "Handbook of Color Techniques", K. K. Sogogijutsu Center):

When $L^*<16$ for standard colors,
$S_L=0.511$
When $L^* \geq 16$,
$S_L=0.040975L_1^*/(1+0.01765L_1^*)$
$S_C=0.0638C_1^*/(1+0.0131C_1^*)+0.638$
$S_H=S_C(Tf+1-f)$
$f=[(C_1^*)^4/\{(C_1^*)^4+1900\}]^{1/2}$
When $h_1$ falls within a range from 164° to 345°,
$T=0.56+|10.2\cos(h_1+168)|$
When $h_1$ falls outside the above range,
$T=0.36+|0.4\cos(h_1+35)|$ In FIG. 40, the theoretical color distance and the corresponding real color distance always have a small difference therebetween. This difference is caused since the theoretical color difference is calculated by the perfect additive color mixing of two different green images in the process ② in the above description. The additive color mixing is a method wherein colors (spectrum distributions) of a plurality of non-overlapping small regions present in a unit region are added to each other according to the ratio of areas of the small regions, and the sum spectrum distribution is set as a color of the unit region. In the recording state of the ink jet recording apparatus used in the present invention, as has been described above in association with the CY and YC dots in FIG. 77, a subsequently recorded dot extends Under the previously recorded dot, and the theoretical color distance of a dot-overlapping area is calculated based on the previously recorded dot color alone. However, in practice, the tone color of the overlapping portion of two different color dots is not always completely controlled by only the tone color of the previously dot recorded. The color tone of the subsequently recorded dot should be added to the tone color of the overlapping area by subtractive color mixing although it influences the color tone only slightly. Therefore, the calculated theoretical color distances of areas are always larger than corresponding real color distances. However, as shown in FIG. 40, if a difference between the two color distances is almost constant, a proper size of a mask can be estimated by a calculation even when different inks or recording media are used.

According to the panel test results, a critical color distance between colors, which are perceived as equal colors by the normal visual sense of man, is about 1.0 to 1.8. When two different colors having a color distance therebetween larger than the above-mentioned value are located at neighboring positions, a boundary is observed between these colors, and the two colors are sensed as different areas. In FIG. 40, the above-mentioned critical color distance region is indicated by two stages of boundary lines. As is understood from FIG. 40, the extrusion rate corresponding to the critical color distance is about 25% to 33%. More specifically, a condition for preventing color nonuniformity is that the extrusion amount of each ink dot to a non-print area becomes ⅓ and more preferably ¼ or less the pixel width.

In this embodiment, a dot size of 110 μm is used with respect to a pixel density of 360 dpi, and a thinning mask in units of 4×3 pixel groups is used. At this time, the ratio of the dot size to the pixel density is about 1.5, the extrusion rate is 21.98%, and the theoretical and real color distances are respectively 1.25 and 1.20. Thus, these values are included in a region which does not cause color nonuniformity.

In contrast to this, when a thinning mask shown in FIG. 76 is used, the extrusion rate of ink dots in the first scan to a non-print area is 71.52%, and the color distance is 3.90. These values considerably exceed the critical values. As is understood from the above description, it is preferable to increase the thinning mask size so as to improve color nonuniformity in units of each two adjacent areas.

Figure 41:
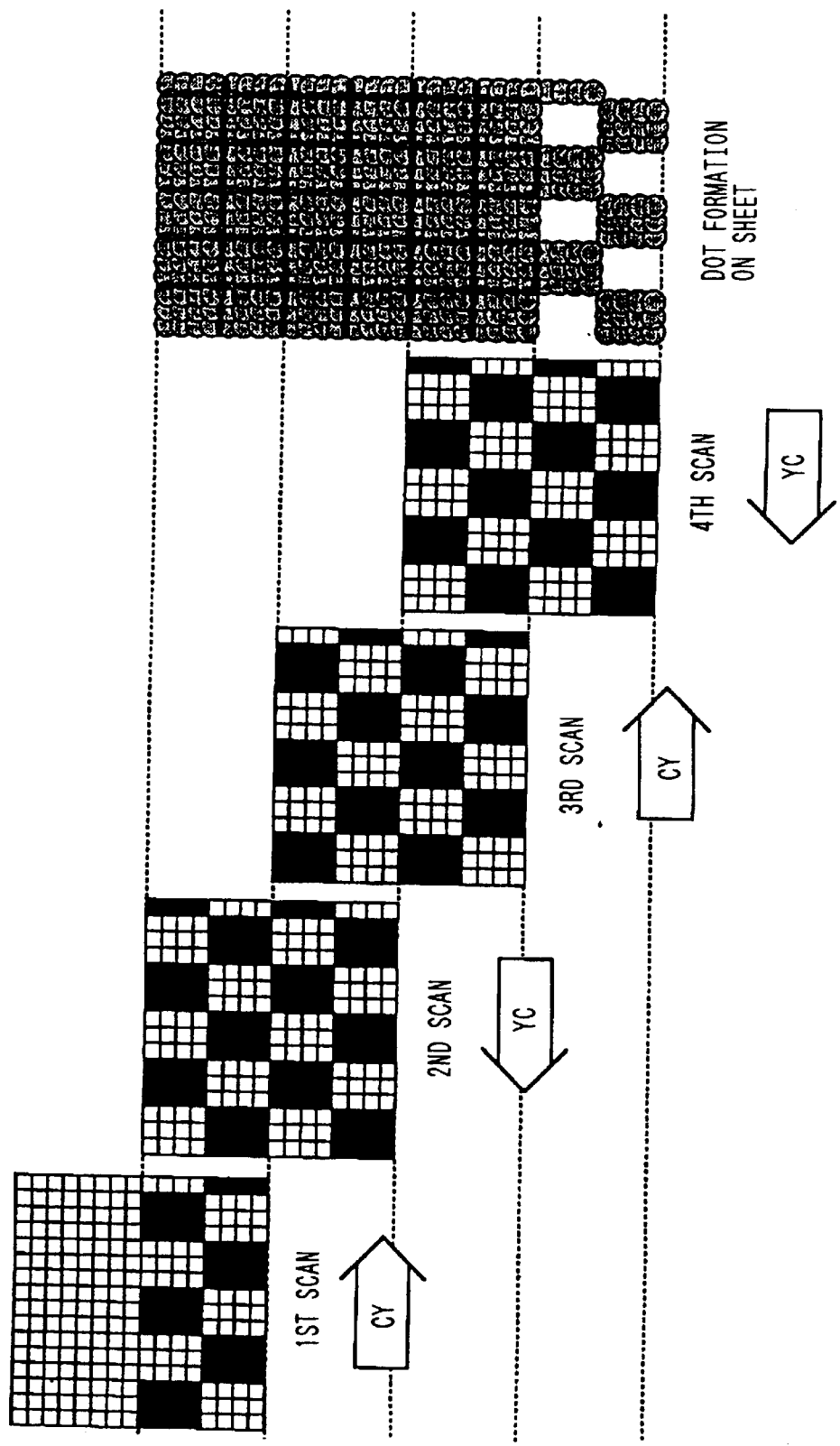
FIG. 41 is a view showing an area influenced by a reciprocal time distance in divisional recording using the mask having the thinning arrangement shown in FIG. 36.
Figure 43:
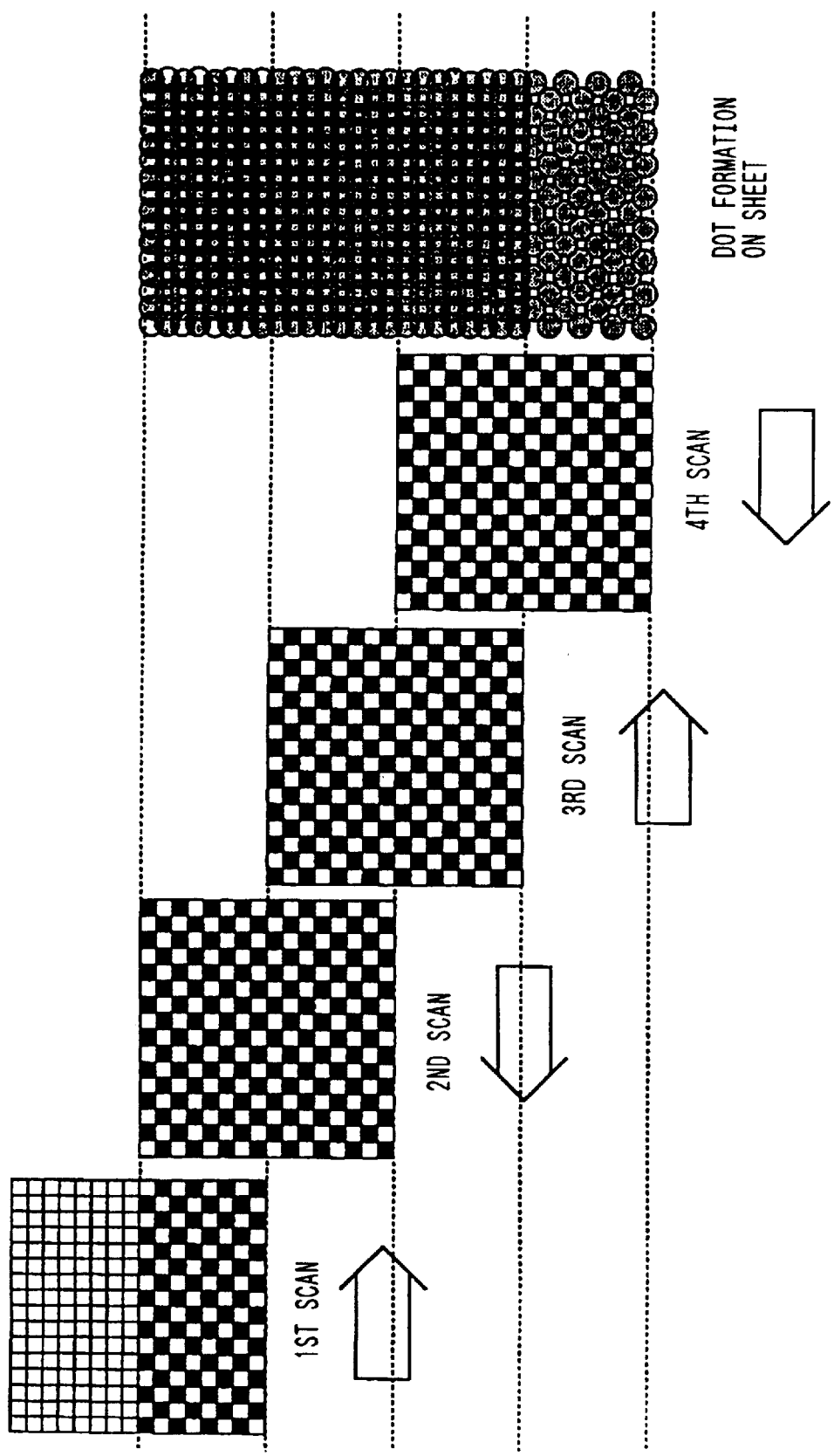
FIG. 43 is a view showing an area influenced by a reciprocal time distance in divisional recording using a mask having a thinning arrangement in units of pixels.

This embodiment is also effective for time distance non-uniformity or rest nonuniformity observed in a monochrome image. As has already been described in the prior art, the time distance nonuniformity is observed when a dot in the second pass is recorded on an area where a dot in the first pass extrudes and is blurred. Therefore, when the dots in the first pass are located adjacent to each other, and the extrusion rate is decreased like in this embodiment, the 2-pass recording method can be executed under substantially the same condition as the 1-pass recording method, and factors which depend on a time distance generated upon overlapping of dots can be eliminated. FIG. 41 shows areas where the time distance nonuniformity occurs when divisional recording is performed using masks in units of 4×3 dot groups, and illustrates the above-mentioned effect by emphasizing the overlapping portion between the first and second scans. As can be apparent from comparison with a case using conventional checker and reverse checker masks in units of dots shown in FIG. 43, the total area of the overlapping portions with respect to record areas of this embodiment is apparently smaller than that of the prior art. As described above, this embodiment is effective for the color nonuniformity and the time distance nonuniformity or rest nonuniformity, which may also occur in a monochrome recording mode, as the thinning mask size is increased.

However, as described above, when the mask is unnecessarily large, the color distance between adjacent dot groups in a single print area begins to be observable, an image is roughened, and image quality tends to deteriorate. According to the experimental decision, when the mask size is about 0.2 mm, an image is slightly roughened, and when it exceeds 0.5 mm, a defect on the image is observed. In this embodiment, since the 4×3 dot group is used with respect to 360 dpi, the mask has a size of 0.28 mm (sub-scan direction)×0.21 mm (main scan direction), and sufficiently satisfies the above conditions. As described above, when the recording method shown in FIG. 36 is executed using the 4×3 thinning mask under the conditions of this embodiment, a smooth image free from color nonuniformity, time distance nonuniformity, and rest nonuniformity can be obtained in the bi-directional print mode.

Figure 44:
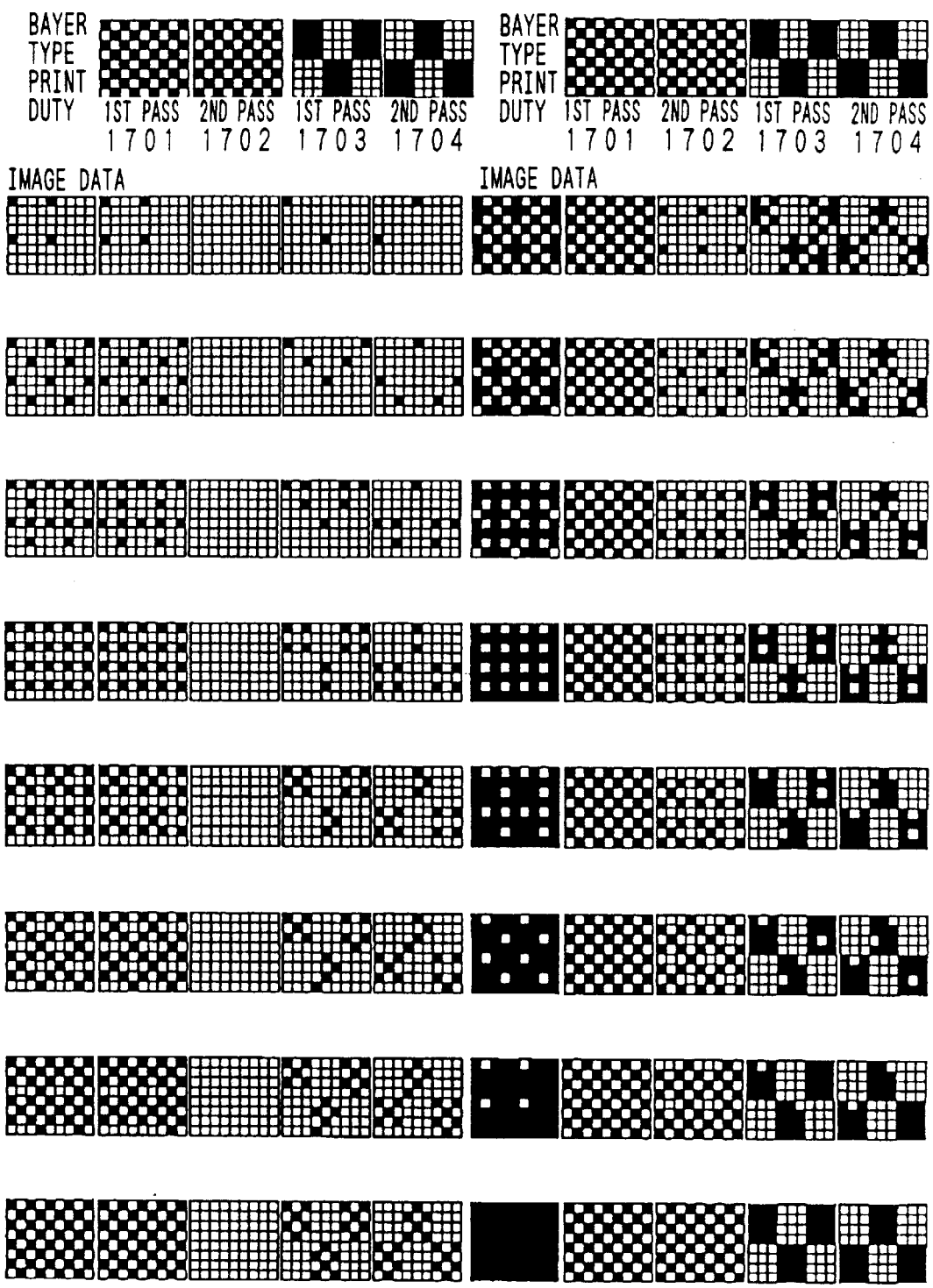
FIG. 44 is a view for explaining recording states of binarized data by a dither method in a case of divisional recording using the mask having the thinning arrangement in units of pixels, and in a case of divisional recording using the mask having the thinning arrangement shown in FIG. 36.

Basically, the effect of the divisional recording method cannot be obtained unless record pixels in a unit area are almost equally recorded in two scans. In the above-mentioned cases, since an image at a duty of 100% is recorded, the same numbers of pixels can be recorded in two passes in both this embodiment and the prior art. However, real image data sent as a signal is normally obtained by binarizing multi-value data representing a certain gradation level by a predetermined binarization method to have a predetermined pattern. This embodiment is effective for a dither method, which is most popularly used as one of the binarization methods. FIG. 44 shows this example. In this case, the Bayer type dither method is used as a binarization method. FIG. 44 shows how to distribute image data to two passes upon comparison between the conventional divisional recording method and the divisional recording method of this embodiment when images whose duties are increased in units of ¹/₁₆ (⁴/₆₄) are input to an 8×9 area. In patterns 1701 and 1702, record pixels respectively allowed in the first and second scans of the conventional divisional recording method are indicated by black dots. Similarly, patterns 1703 and 1704 show record pixels according to the divisional recording method of this embodiment. When binarized image data shown on the left-hand side of patterns is input, patterns on the right-hand side of the data indicate pixels to be recorded in two scans of the two recording methods. As can be seen from FIG. 44, in the conventional divisional recording method, a print operation is completed by one scan alone up to ⁸/₁₆, i.e., a duty of 50%. Even after the duty exceeds 50%, the numbers of record pixels in two passes are largely unbalanced, and the two passes have the same numbers of pixels only when the duty reaches 100%. In this case, at a low duty equal to or lower than 50%, data for one pixel width in the main scan direction of the head are recorded by the same nozzle, and the original object of the divisional recording method cannot be achieved at all, i.e., density nonuniformity caused by nozzle variations cannot be removed. The numbers of record pixels in the first and second scans are still unbalanced even in a high-duty area where duty exceeds 50% (⁹/₁₆), and as compared to this embodiment wherein the numbers of record pixels in two scans are equalized at any duty, an image is expected to deteriorate in terms of the density nonuniformity. This problem is posed not only in the bi-directional print mode but also in the one-directional print mode. As a problematic phenomenon caused by the same cause as described above, i.e., the unbalanced numbers of record pixels in two scans, when recording is performed using two color inks having different duties, color nonuniformity caused by the ink landing order described in the prior art occurs in addition to the density nonuniformity. This problem is a phenomenon which also occurs in the one-directional print mode like the density nonuniformity caused by nozzle variations, and can be solved as long as the same numbers of record pixels are equally distributed to the two passes. When the thinning mask in units of 4×3 dot groups of this embodiment is used, the number of dots is equally divided into two scans. Therefore, the color nonuniformity can be prevented. Also, since dots aligned in the main scan direction are recorded by two scans, i.e., two different nozzles, this embodiment is effective for the density nonuniformity caused by nozzle variations.

As described above, when the 4×3 dot groups are used as the thinning mask in the ink jet recording apparatus for recording dots each having a dot size of about 110 μm at a recording density of 360 dpi, a smooth, high-quality image free from color nonuniformity, time distance nonuniformity, rest nonuniformity, and nozzle nonuniformity can be obtained.

Figure 39:
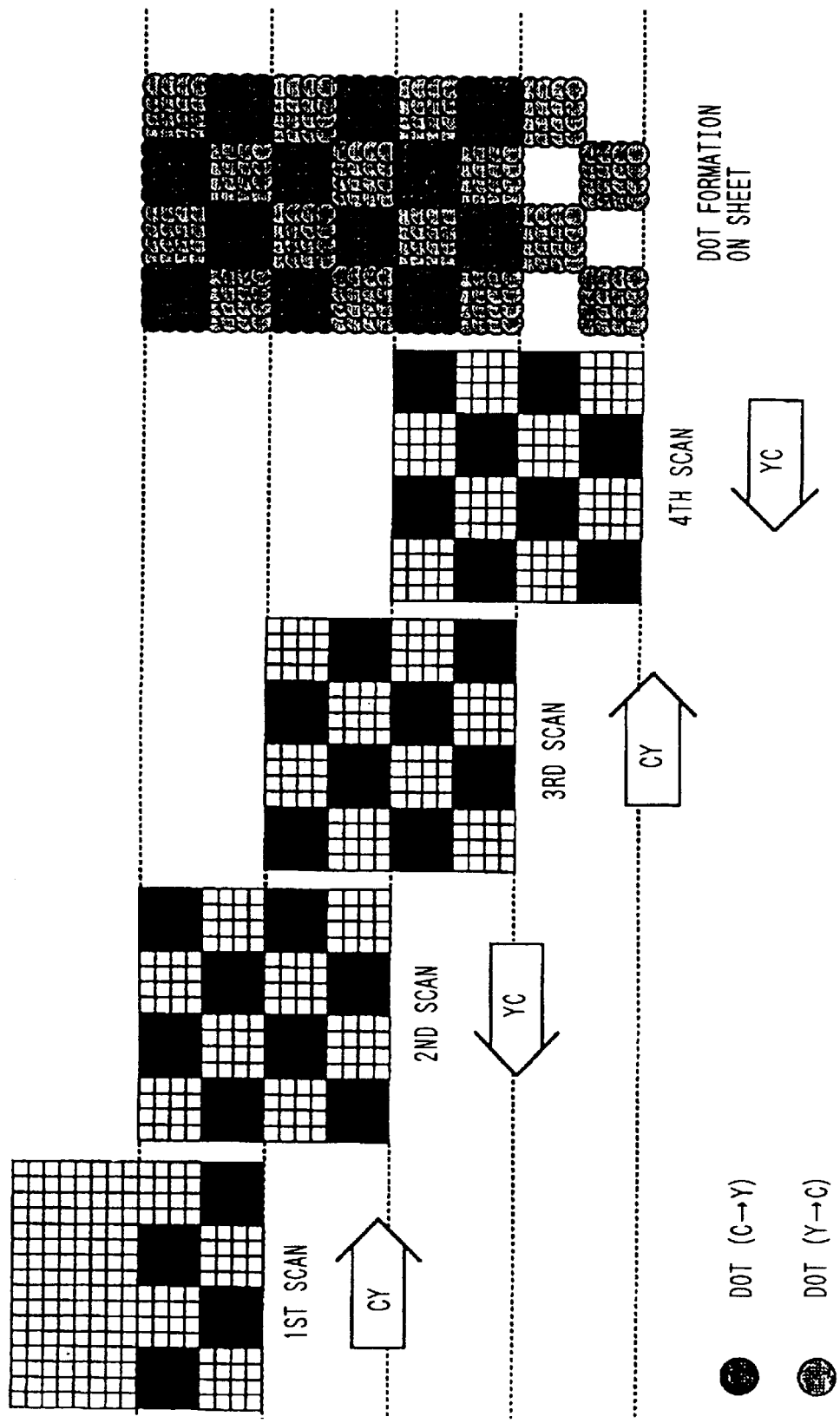
FIG. 39 is a view showing a recording state using a mask having the thinning arrangement shown in FIG. 37.
Figure 42:
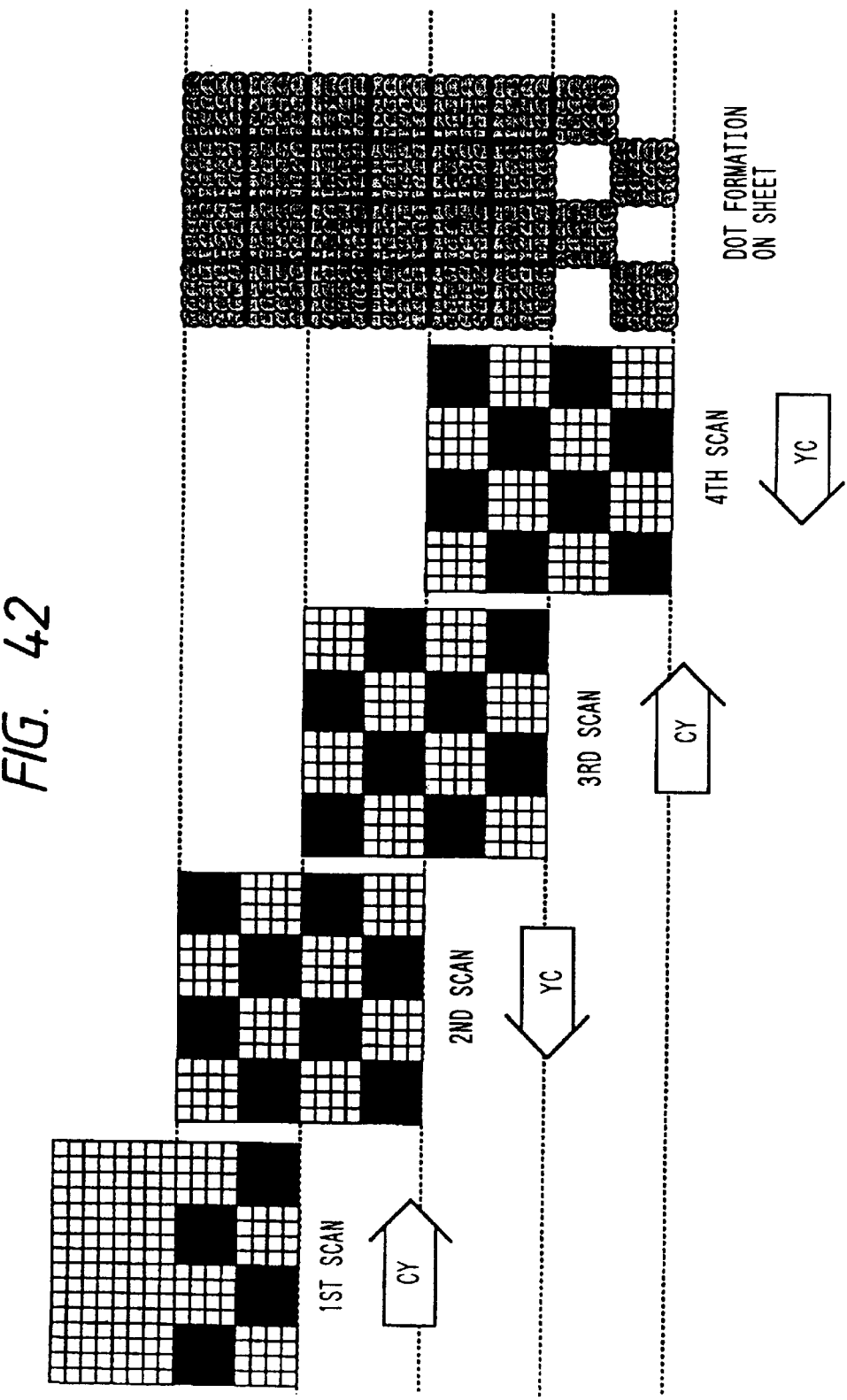
FIG. 42 is a view showing an area influenced by a reciprocal time distance in divisional recording using the mask having the thinning arrangement shown in FIG. 37.

A thinning mask in units of 4×4 dot groups as the second pattern of this embodiment will be described below. As is apparent from FIG. 40, when a mask in units of 4×4 dot groups is used, the extrusion rate is 18.89%, and the real color distance between adjacent record areas is 1.03. Therefore, the mask in units of 4×4 dot groups can eliminate the color distance more satisfactorily than the above-mentioned thinning mask in units of 4×3 pixel groups. Since the number of pixels in the mask is increased, the roughness of an image tends to be slightly worsened. However, since the mask size is about 0.28 mm×0.28 mm, the above-mentioned roughness is not observed as an image defect. FIG. 39 shows the divisional recording state using this mask. The recording operation in this case is the same as that in FIG. 38, and a detailed description thereof will be omitted. As compared to a case using the mask in units of 4×3 dot groups shown in FIG. 38, color nonuniformity caused by dot extrusion can be further eliminated. FIG. 42 shows states of time distance nonuniformity and rest nonuniformity for the purpose of comparison with FIGS. 41 and 43. Of these figures, FIG. 42 using the mask in units of 4×4 dot groups has the smallest overlapping portion, and is most effective for time distance nonuniformity and rest nonuniformity.

Furthermore, FIG. 45 shows pixel positions recorded in two scans like in FIG. 44 when data binarized by the dither method is divisionally recorded using the mask in units of 4×4 dot groups. In FIG. 45 as well, since the first and second scans always have equal numbers of dots, the same effect obtained by the above-mentioned mask in units of 4×3 dot groups can be obtained for color nonuniformity caused by the unbalanced numbers of recorded dots in the two scans. However, the effect for density nonuniformity caused by nozzle variations is slightly different. As shown in FIG. 45, when the mask having four pixels in the main scan direction is used, dots aligned in the main scan direction are always equally divided into two scans. Contrary to this, when the mask in units of 4×3 dot groups shown in FIG. 42 is used, dots aligned in the main scan directions are always recorded by two different nozzles (two scans), but the numbers of dots recorded in two scans are slightly unbalanced. Therefore, when the mask in units of 4×4 dot groups is used, a better image in association with nozzle nonuniformity can be expected than the mask in units of 4×3 dot groups although image roughness caused by the mask size is slightly worsened.

The mask in units of 4×4 dot groups is often effective in this respect not only for the Bayer type method shown in FIG. 45 but also for other dither methods. This is for the following reason. In binarization methods such as dither methods, a unique pixel arrangement is determined by each method (not limited to the Bayer method) in a predetermined (e.g., 4×4 or 8×8) square area in correspondence with the duty. Even in an 8×8 matrix, a 4×4 matrix is often used as a submatrix, and the submatrices are two-dimensionally juxtaposed two by two, as shown in FIG. 45. This matrix is used for realizing area gradation therein, and is designed to always output an equal pixel arrangement if equal data is input. For example, in the case of the Bayer type method shown in FIG. 45, pixel arrangements shown at the left end of FIG. 45 are determined to have a one-to-one correspondence with respective gradation levels. Therefore, when equal image data are input to all matrices like in recording of a uniform pattern, all the matrices two-dimensionally arranged on a recording image record dots in equal pixel arrangements, and form uniform images. These plurality of arranged matrices are equivalent to each other, and have the same number of dots at all duties. In a submatrix, although the number of dots at all duties are not always equal to each other, dot arrangements are distributed so as to minimize the unbalance of the numbers of dots.

In this method, the matrix or submatrix is entirely included in 4×4 dot groups, and neighboring matrices or submatrices can be prevented from being recorded in a single record scan. Therefore, since the same number of recording data having equal arrangements are input to respective matrices for image data at any duty, the numbers of dots in units of record scans have no difference therebetween. In this respect, this method is effective for various binarization methods.

In the above description, the two different thinning masks have been introduced as the eighth embodiment. Upon determination of these masks, various factors such as the relationship between the extrusion rate and color nonuniformity shown in FIG. 40, the ink landing state on a recording medium, a binarization correspondence state, and the like must be considered. As the shape of the mask, the above-mentioned square mask such as a 4×4 mask may be used, or the rectangular mask such as a 4×3 mask may be used. As has been described above, the square mask is most effective for color uniformity among mask shapes including a predetermined number of pixels. Also, the mask having a four-pixel width in the main scan direction is particularly effective for the binarization methods.

However, like in the mask in units of 4×3 pixel groups used in this embodiment, when the mask has an odd-number pixel width such as three pixels, five pixels, or the like in the main scan direction, dots aligned in the main scan direction are recorded by two different nozzles even at any low duty. Like in the mask having a 4-pixel width in the main scan direction, when a mask includes one period (four pixels in FIG. 45) of a unit matrix for performing gradation expression, the number of pixels to be recorded in two scans in the main scan direction is always equally divided into two scans. However, for example, at a ⅟₆₄ duty at which only one pixel in an 8×8 matrix is recorded, all pixels aligned in the main scan direction are recorded in a single record scan using one nozzle. In contrast to this, the thinning mask having a 3-pixel width in the main scan direction is asynchronous with the period of a unit matrix, normally having a $2^n$ period, for gradation expression, and can always record pixels using two different nozzles at any duty.

Also, the thinning mask may have various numbers of pixels in the sub-scan direction. In order to realize the effect of the calculated extrusion rate on the entire area, and to equalize connection portions in units of scans to other portions, the number of nozzles of the recording head must always be dividable by the number of pixels in the sub-scan direction. When the number of nozzles of the recording head is as small as, e.g., eight nozzles, the number of pixels is set to have an upper limit. Since the present invention cannot be achieved unless at least two pixel groups are present in eight nozzles, a maximum of four pixels are determined as an upper limit.

In this manner, as thinning patterns for realizing the present invention, various patterns including various numbers of pixels in the main scan direction, various numbers of pixels in the sub-scan direction, various total numbers of pixels in masks, and various mask shapes are available according to recording conditions and various requirements.

As a patent similar to the present invention, U.S. Pat. No. 4,967,203, which has already been described in the prior art, is known. In this patent as well, of pixels arranged on a sheet surface, several neighboring pixels (m×n pixels) are defined as one group (super pixel), so that a plurality of alternate non-neighboring groups are recorded in the first scan, and the remaining groups are recorded in the second scan. However, while an image to be recorded is limited to a multi-color image or a multi-gradation image, this patent describes a recording method using equal arrangement methods for all colors, and has as its object to accurately express a gradation level or color tone determined in each group. Therefore, this patent encourages color mixing within each group (super pixel), while it describes prevention of blurring between neighboring groups as an effect.

In contrast to this, since the present invention has as its principal object to remove defects in reciprocal recording such as color nonuniformity, time difference nonuniformity, and the like, all the colors need not always use equal arrangements of record pixel groups. As will be described later in the ninth and 10th embodiments, the different mask patterns are rather often effective for the color nonuniformity since a difference between first and second recording inks can be eliminated. However, such a recording method causes a defect in the above-mentioned patent since it causes blurring between different colors.

Furthermore, the above-mentioned patent describes that a special image system for realizing the effect is installed in either one of a software program or printer firmware. In the above-mentioned patent, a pixel group consisting of m×n pixels is set as a pseudo pixel called a super pixel so as to perform multi-color expression. As a dot arrangement to be recorded in each super pixel, one of a plurality of predetermined color expression arrangements is selected according to an expression color requested by a number for one pseudo pixel. Therefore, the above patent discloses as one effect that "print quality can be improved without unnecessarily complicating an operation for creating a computer program for forming a large number of colors".

In contrast to this, pixels in an (m×n) pixel group of the present invention have no relationship associated with an image such as formation of a pseudo pixel. These pixels are not related to each other and are completely independent from each other, except that they are recorded at the same recording timing. As has been already described above as an effect of this embodiment, when the mask in units of 4×4 pixel groups of this embodiment is used, a unit matrix in binary gradation expression is completely included in the 4×4 pixel groups. Such an effect is not obtained by installing a special image system in either one of a software program or printer firmware as in the above patent. As described above, it is. sure that an arrangement for "simultaneously recording pixels in the unit matrix of binary expression" is adopted in a special case like in the 4×4 mask of this embodiment. However, the effect is obtained from this arrangement only when the recording method (thinning mask) of the recording apparatus used in the present invention is synchronously adapted to a dither pattern generally known as a binarization method.

Therefore, in order to realize the above-mentioned effect "adaptivity to binary signals" of this embodiment, the present invention does not require any special image processing system described in the above patent to a host side or a recording apparatus main body.

The present invention is not particularly limited to a multi-color image, and is sufficiently effective for a monochrome image since it can remove time distance nonuniformity and rest nonuniformity. From the above description, we consider that the present invention is different from the above-mentioned patent.

As described above, according to this embodiment, in a color ink jet recording apparatus, when a dot group consisting of m×n pixels such as a rectangular pattern consisting of 4×3 pixels or a square pattern consisting of 4×4 pixels is defined as a unit of a thinning mask, and the thinning mask is set to have a two-dimensional arrangement of the dot groups arranged at alternate non-neighboring positions, a high-quality, smooth image free from defects such as color nonuniformity, time distance nonuniformity, rest nonuniformity, and nozzle nonuniformity can be obtained in the multi-color and monochrome directional and one-directional print modes.

Ninth Embodiment

The ninth embodiment of the present invention will be described below. This embodiment is characterized in that different thinning masks in units of 4×4 dot groups are used in correspondence with colors. As image defects to be particularly solved by the present invention, color nonuniformity caused depending on the color ink landing order, and time distance nonuniformity and rest nonuniformity caused by a variation in time between adjacent scans have been described. However, the most conspicuous defect is the former color nonuniformity.

This embodiment particularly places an importance on this color nonuniformity, and is established to positively solve this defect. As a fundamental cause of color nonuniformity, the four color heads are aligned in a direction equal to the carriage scan direction. Since such an arrangement is adopted, the respective scans inevitably have different recording orders among colors. In the forward and backward scans in which the recording order is alternately reversed, and dots having different color tores are formed, the eighth embodiment described above is designed to perform these two scans under conditions as equal as possible.

Figure 46:
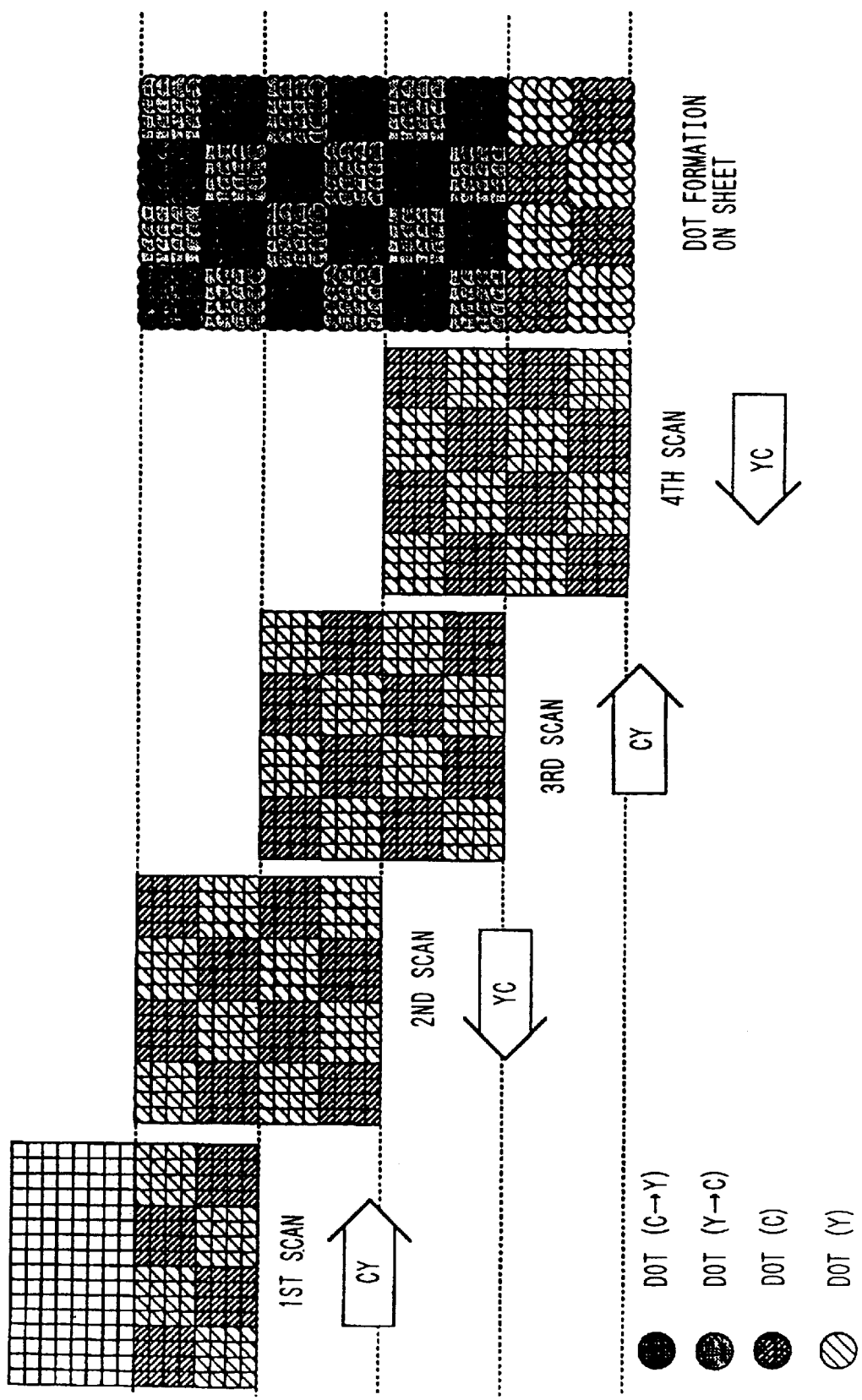
FIG. 46 is a view for explaining a recording state according to the ninth embodiment of the present invention.

In contrast to this, this embodiment has as its object to minimize a difference between priority colors among colors, and in order to achieve this object, checker masks are reversed in a combination of two colors, which easily cause conspicuous color nonuniformity. FIG. 46 shows states wherein recording is performed while exchanging, after each scan, cyan and yellow thinning masks, in each of which a 4×4 dot group is defined as a unit matrix, and neighboring matrices are thinned out in a checker pattern. As can be seen from FIG. 46, in this embodiment as well, unbalanced color tones among image areas can be eliminated like in FIG. 39 of the eighth embodiment. When different masks are used in units of colors like in this embodiment, since an ink (cyan in the forward scan or yellow in the backward scan) recorded first on a blank sheet is completely absorbed by the sheet surface after another color ink (yellow in the forward scan or cyan in the backward scan) is recorded in the same scan, the recording conditions of the colors in each scan are equalized, and a priority color difference hardly appears. In FIGS. 39 and 46, although no expression for characterizing the effect of this embodiment is made, a difference is observed between these figures in practice. In particular, when the roughness of an image is worsened by the thinning masks in units of 4×4 dot groups, the size of the mask itself is decreased, and the arrangement of this embodiment may be adopted.

Of course, in this embodiment, since each area must be completed by two carriage scans, it is impossible to use four color masks having patterns which do not overlap each other. However, the number of color combinations which cause color nonuniformity observed as an image defect is normally one or two. In this case, these two colors need only be set to be recorded using different masks. When color nonuniformity is evenly conspicuous in every color combination, color mask patterns may be shifted by several pixels from each other.

In this embodiment, since the masks are set to record all pixel groups of each area in the first scan, time distance nonuniformity caused by a time distance between the first and second scans is slightly worsened. Therefore, when the time distance nonuniformity is conspicuous, the method of the eighth embodiment is more effective, and this embodiment is effective for a case wherein color nonuniformity is conspicuous in a combination of specific two colors.

10th Embodiment

Figure 47:
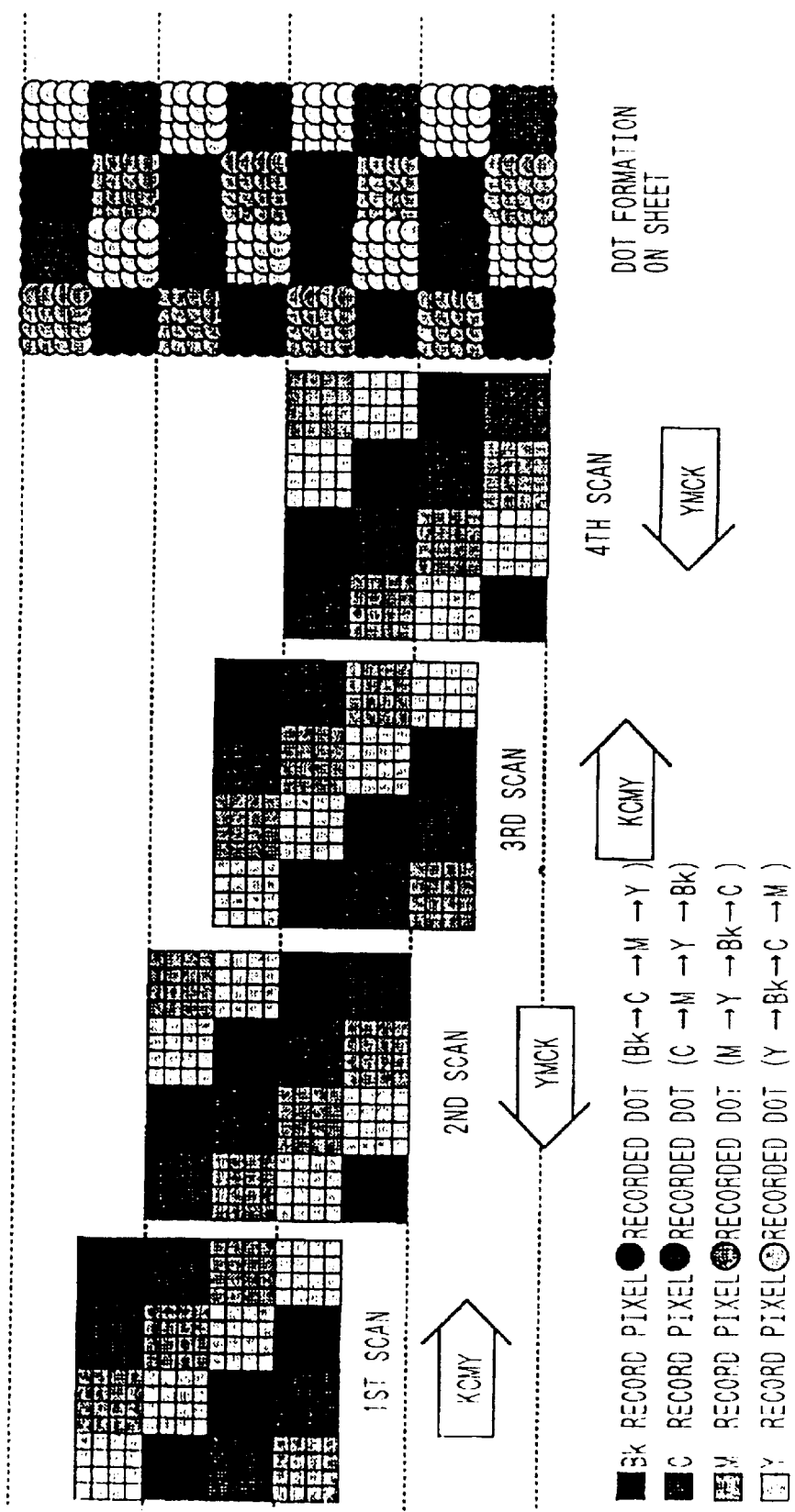
FIG. 47 is a view for explaining a recording state according to the 10th embodiment of the present invention.

A 4-pass reciprocal recording method will be described below as the 10th embodiment of the present invention. This embodiment uses masks in units of 4×4 dot groups as well, and is characterized in that a sheet feed operation is performed by a ¼ print width between two adjacent scans upon recording of a predetermined area in four scans, and masks are exchanged in turn among colors in units of scans. FIG. 47 shows this state. In this case, one square pattern unit includes a 4×4 pixel group, each head consists of 16 nozzles, and a sheet feed operation is performed by a 4-nozzle width after each scan. In the respective scans, 4×4 masks which do not overlap each other are cyclically exchanged among colors. In this manner, since two or more colors are prevented from being recorded on a single pixel position in one scan, color nonuniformity caused by the head alignment order unique to the reciprocal recording method can be eliminated. As also shown in FIG. 47, since 4×4 dot groups recorded in the four different orders are uniformly distributed on each record area, no color nonuniformity occurs even when color-mixed images having any combinations of colors are recorded.

This embodiment for executing the 4-pass print method is effective for the above-mentioned time distance nonuniformity. In the 2-pass print method, since a predetermined area is completed by reciprocally scanning the carriage once, the print timing varies in units of sheet feed widths, and these different timings appear as time distance nonuniformity, thus causing an image defect. However, in the 4-pass print method like in this embodiment, since all areas are recorded by four forward and backward scans, print pixels recorded at a plurality of recording timings are present in each area, and hence, each area is not characterized by the record scan timing.

Furthermore, this embodiment is more effective not only for the time distance nonuniformity but also for density nonuniformity caused by nozzle variations as an original object to be solved by the divisional recording method than the above embodiment. This is because in the above embodiment, given color dots aligned in the main scan direction are printed by two nozzles, while in this embodiment, such color dots are printed by four nozzles, thus obtaining a smoother image.

As described above, when 4-pass recording operations are performed while cyclically exchanging thinning masks in units of 4×4 dot groups among colors, a smooth, high-quality image free from color nonuniformity and time distance nonuniformity can be obtained in the reciprocal print mode having a high throughput.

11th Embodiment

Figure 48:
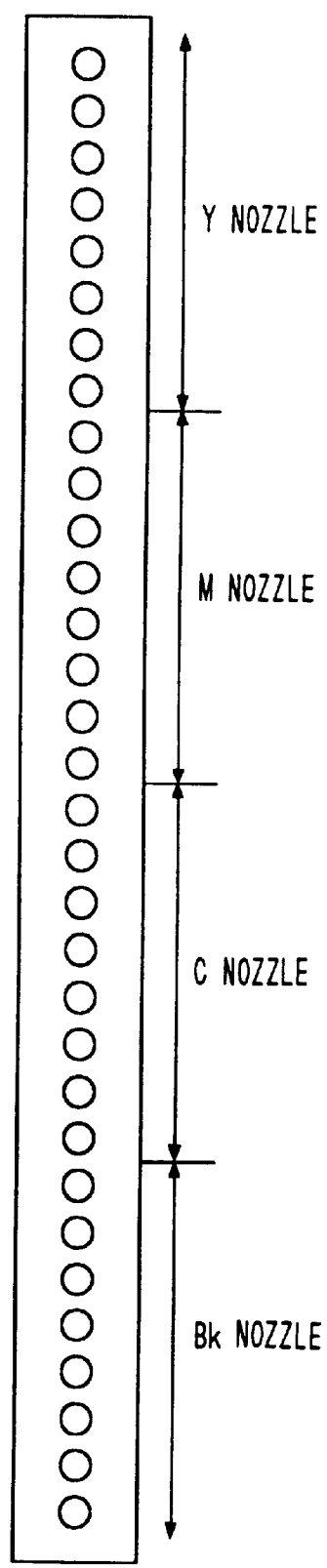
FIG. 48 is a view showing a recording head according to the 11th embodiment of the present invention.

A case will be described below as the 11th embodiment wherein the divisional recording method of the present invention is applied to a recording apparatus in which four color heads are aligned in the sub-scan direction. The arrangement of the main body is the same as that shown in FIG. 1, except for a recording head. In a recording head of this embodiment, recording nozzles for four colors are aligned in an equal direction in the order of black, cyan, magenta, and yellow, as shown in FIG. 48.

Figure 49:
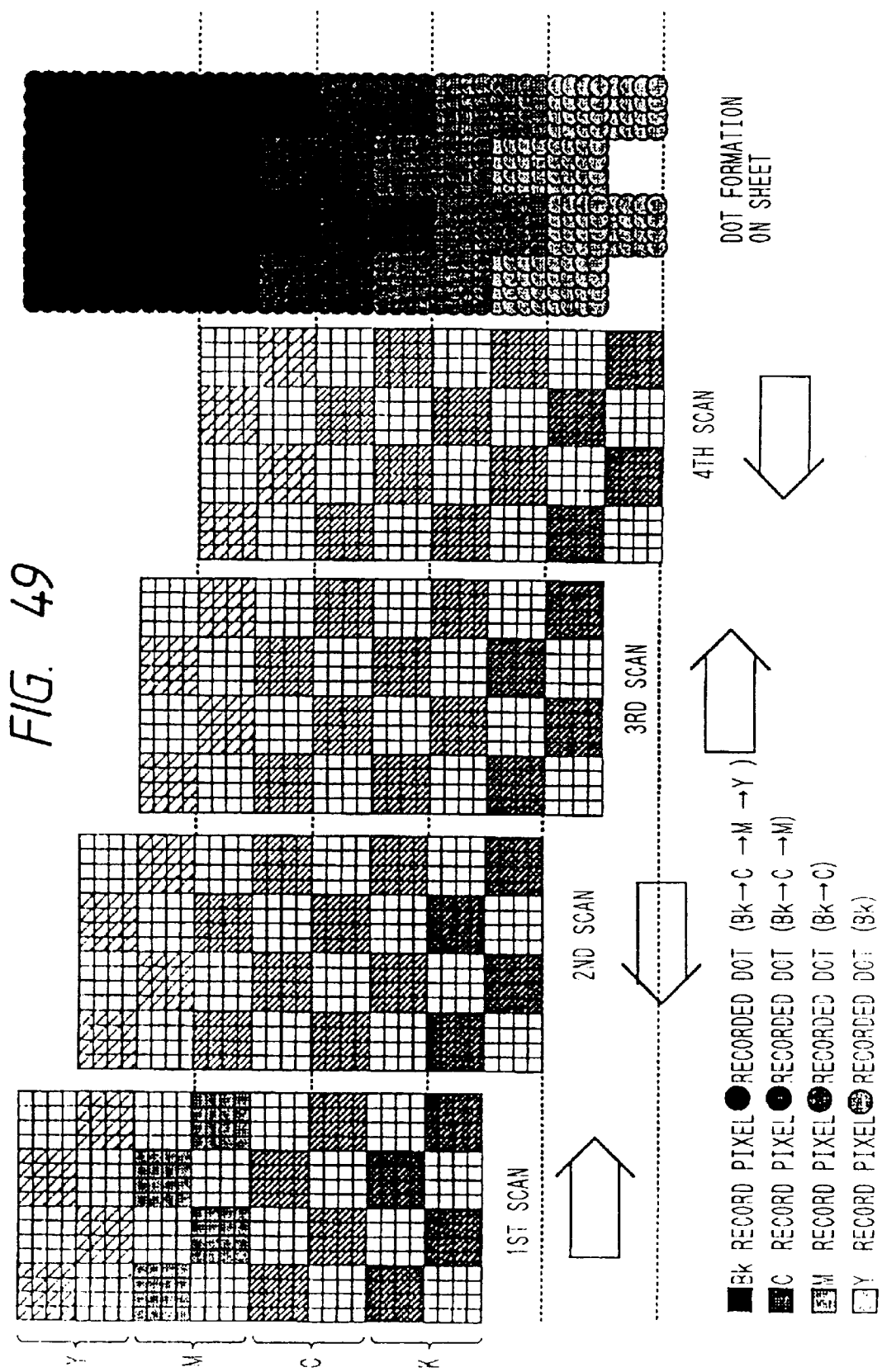
FIG. 49 is a view showing a recording state in the 11th embodiment.

FIG. 49 shows a recording state when the present invention is applied to the above-mentioned recording apparatus. After each scan, a sheet feed operation is performed by a width corresponding to half the total number of nozzles for one color, and a unit area is completed by eight scans. Although this recording apparatus performs bi-directional recording, when the head has the above-mentioned arrangement, color nonuniformity will not be caused by the ink landing order. However, even in the recording apparatus with this arrangement, the present invention can sufficiently exhibit its effects, i.e., an effect of removing time distance nonuniformity, an effect for nozzle nonuniformity by using thinning masks in units of 4×4 dot matrices described in the eighth embodiment.

In this embodiment, four color nozzle groups are arranged to have no gaps for the sake of simplicity. Even when a gap corresponding to a predetermined number of pixels is formed between two adjacent nozzle groups for the purpose of convenience of the nozzle arrangement, the same print method can be applied.

12th Embodiment

The 12th embodiment of the present invention will be described below. This embodiment can eliminate connection lines appearing in units of record sections more effectively than the above embodiments.

Figure 50:
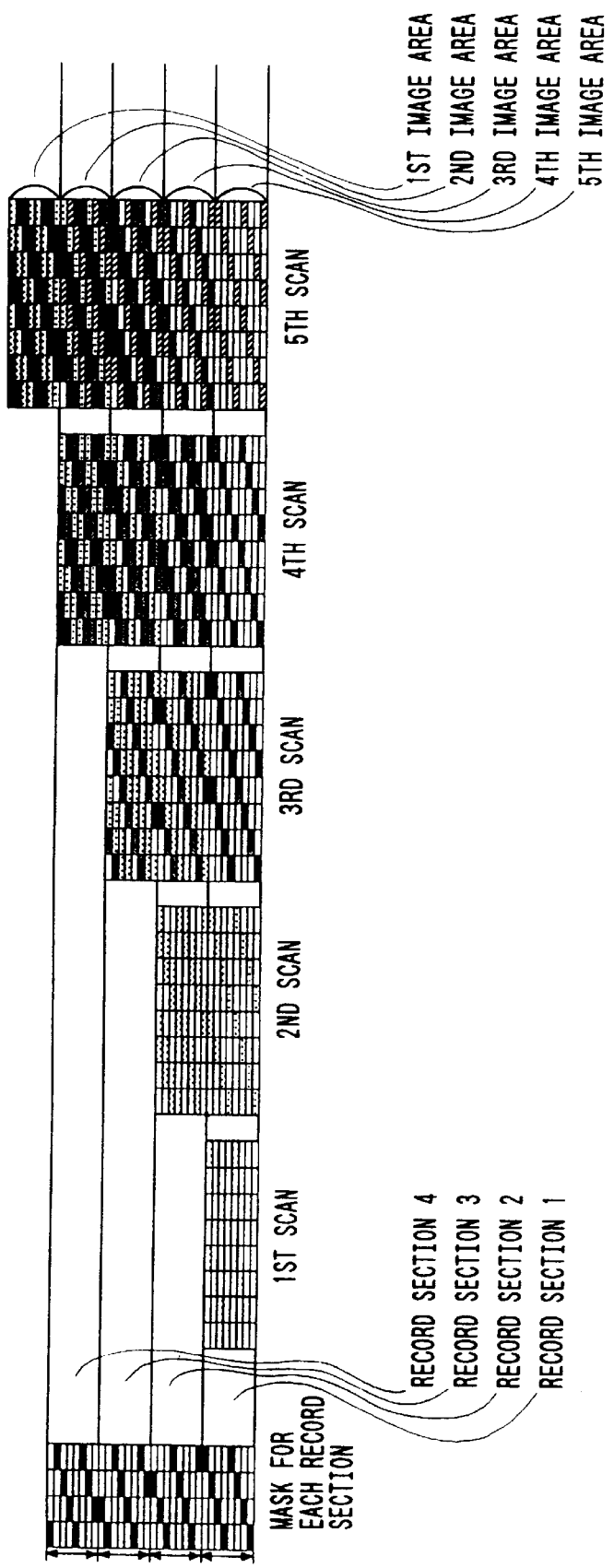
FIG. 50 is a view for explaining a recording state according to the 12th embodiment of the present invention.

The 12th embodiment will be described below. FIG. 50 shows a print state obtained when a recording method of this embodiment is executed using heads each having 32 nozzles. In this embodiment, a 1×4 pixel group for simultaneously recording four successive dots in the main scan direction is defined as one unit, and a small rectangle shown in FIG. 50 represents one pixel group. Each recording head having 32 nozzles is divided into four record sections each consisting of eight nozzles, and the nozzles in each section perform recording according to a mask shown at the left end of FIG. 50. In FIG. 50, pixel groups allowed to perform recording are painted in black, and the nozzles in each section repetitively perform print operations in the head main scan direction according to a mask having four pixel groups (16 pixels) as one period. When the respective record sections simultaneously perform recording in corresponding image areas in a single head record scan, a sheet is fed by a width of each record section (=image area width), and the next record scan is then executed. FIG. 50 shows recording states of the first to fifth scans in corresponding image areas, and represents pixel groups simultaneously recorded in each record scan by equal patterns. Referring to FIG. 50, in the first scan, pixel groups are recorded in a first image area to be joined in an oblique direction according to the mask of the first record section, and a sheet is then fed by one record section. Thereafter, the second scan is executed. In this scan, in the first image area, pixel groups are recorded to be stacked above the pixel groups recorded in the first scan, and in a second image area, pixel groups are recorded according to the mask of the first record section. In the first image area in the third scan, pixel groups are recorded to be stacked above those recorded in the second scan, and in the second and third image areas, pixel groups are recorded according to the masks of the corresponding record sections. The recording operations are similarly performed in the subsequent fourth and fifth scans. Upon completion of the fifth scan, the first and second image areas are completed. In this manner, in each image area, pixel groups are recorded first in the oblique direction, and based on these pixel groups, other pixel groups are always recorded to be stacked above these pixel groups in the subsequent record scans.

Figure 51:
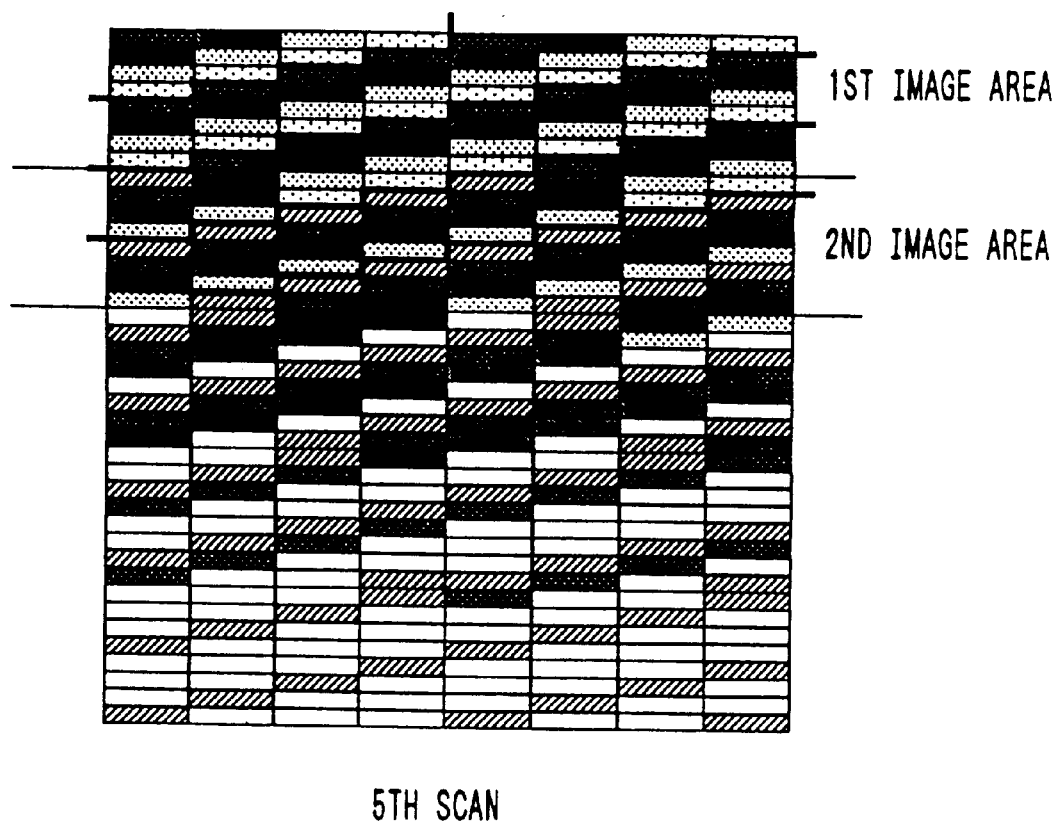
FIG. 51 is an enlarged view of the recording state of the 12th embodiment.
Figure 90A:
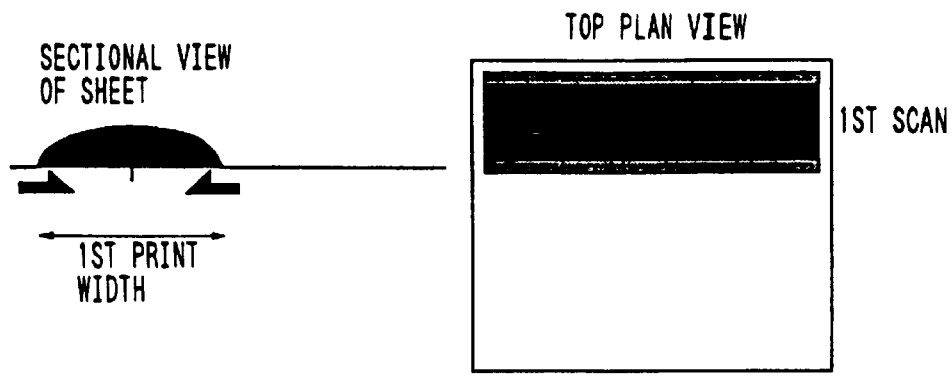
FIGS. 90A to 90C are views for explaining the principle of formation of connection lines.
Figure 90B:
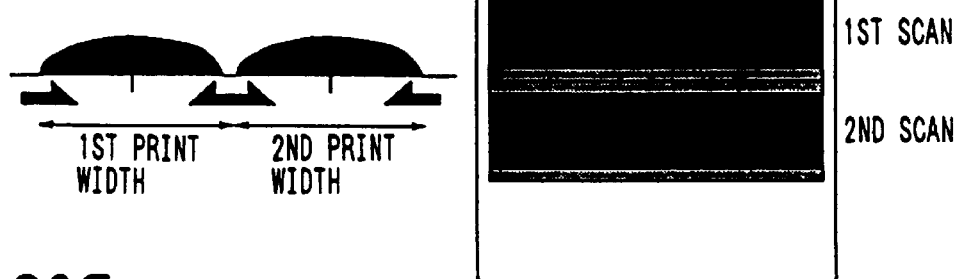
Figure 90C:
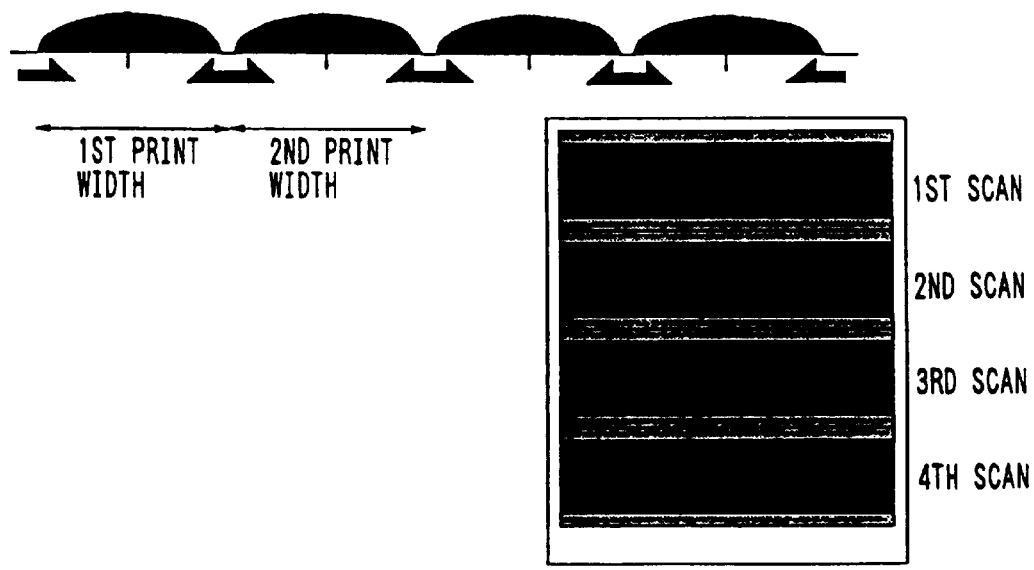
Figure 91A:
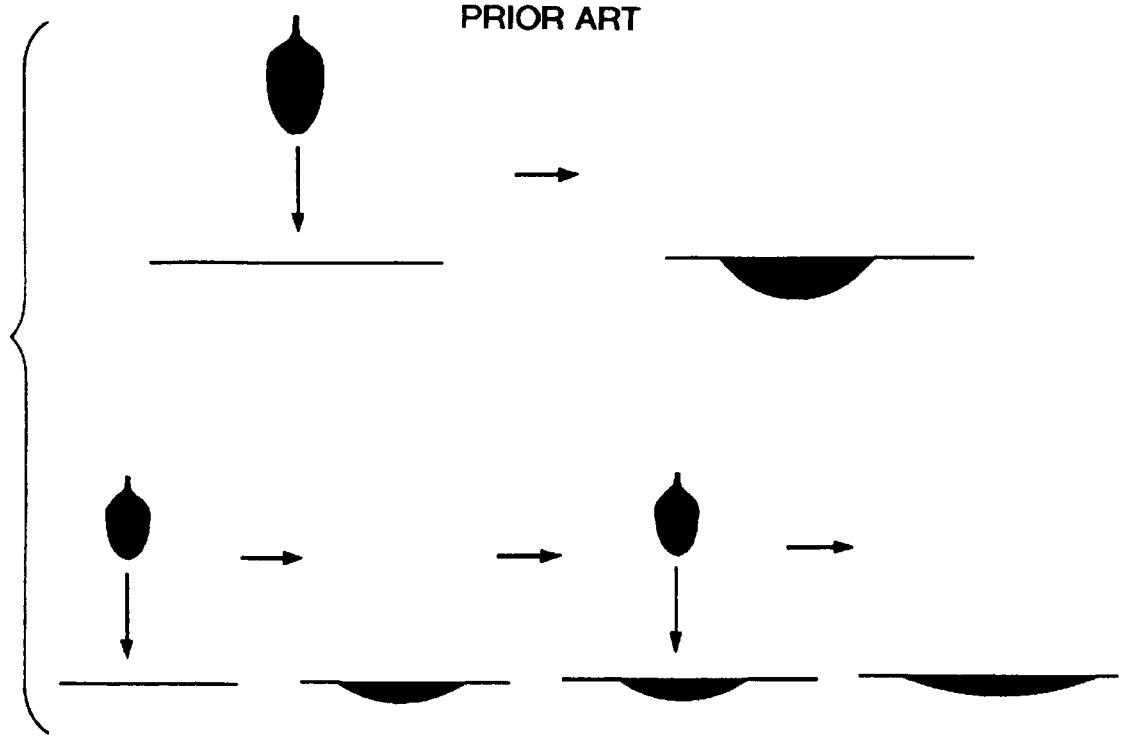
FIGS. 91A and 91B are views for explaining the principle of formation of connection lines on coated paper.
Figure 91B:
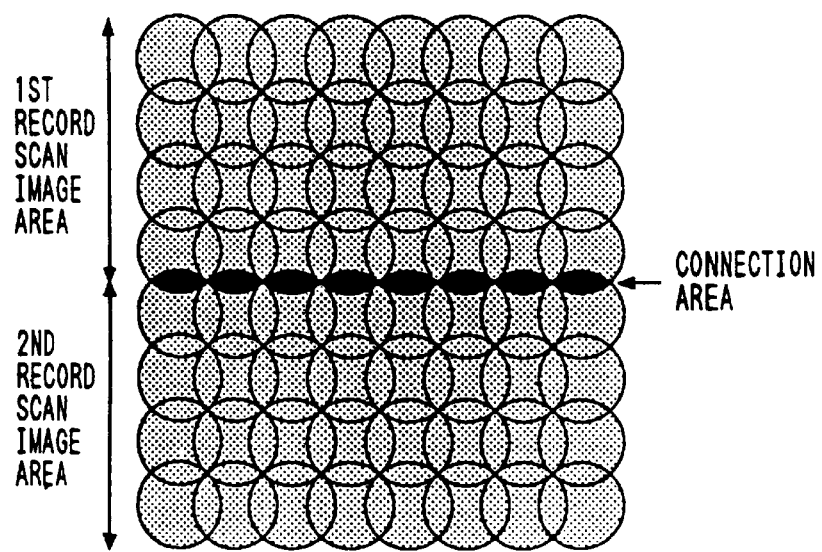

On TP paper, an ink drawing phenomenon in each record scan can occur in units of pixel groups. However, the pixel groups are always joined in the oblique direction beyond the record section width (sheet feed width). FIG. 51 is an enlarged view of a complete image after the fifth scan in FIG. 50. According to a phenomenon that has already been described above with reference to FIGS. 90 and 92, the ink drawing force always acts downward toward a pixel group recorded first by the first record section in each scan. Therefore, a portion where a connection line appears at the highest frequency is considered as a boundary indicated by a bold line between the pixel group recorded first by the first record section and the pixel group recorded last by the fourth record section, and this boundary appears stepwise in units of four pixels, as shown in FIG. 51. Since such an ink drawing force appears strongly but in small units at positions different from normal connection line positions in different directions, it does not cause an ink drawing phenomenon caused by a difference in degree of completion of recording unlike in the prior art, and connection lines indicated by main scan thin lines in FIG. 51 can be eliminated. On the other hand, the connection lines in the oblique direction are strong but small, and a plurality of lines appear at small pitches in each image area. Therefore, such connection lines are not almost sensed by the normal visual sense of man, and a smooth, high-quality image can be realized.

A satisfactory effect can also be obtained on coated paper. As described above, a connection line formed on the coated paper is a phenomenon occurring between dots overlaid in different record scans, and tends to appear when the time interval between two record scans is large. Therefore, on the coated paper, a high-density portion (connection line) appears on bold line portions in FIG. 51. Since a plurality of oblique connection lines appear in a direction different from a connection line, sheet feed connection lines can also be eliminated on the coated paper. When rest nonuniformity is to be especially prevented, it is effective to increase the size of the 1×4 pixel group used as the divisional record pixel group in this embodiment. Since the dot overlapping area in each pixel group is increased, a blank area which is left after each record scan is widened accordingly. Therefore, the dot overlapping area itself of dots recorded in different record scans is decreased, and rest nonuniformity can also be prevented.

Furthermore, in the arrangement for stacking pixel groups above previously recorded pixel groups in units of record scans, all pixel groups sandwiching a boundary portion therebetween are recorded in a single record scan, except for a portion where a pixel group recorded at an actual sheet feed position corresponds to an oblique connection line. Therefore, the ink drawing forces at the two sides of the boundary portion are balanced, and help to further eliminate a sheet feed connection line.

Figure 52:
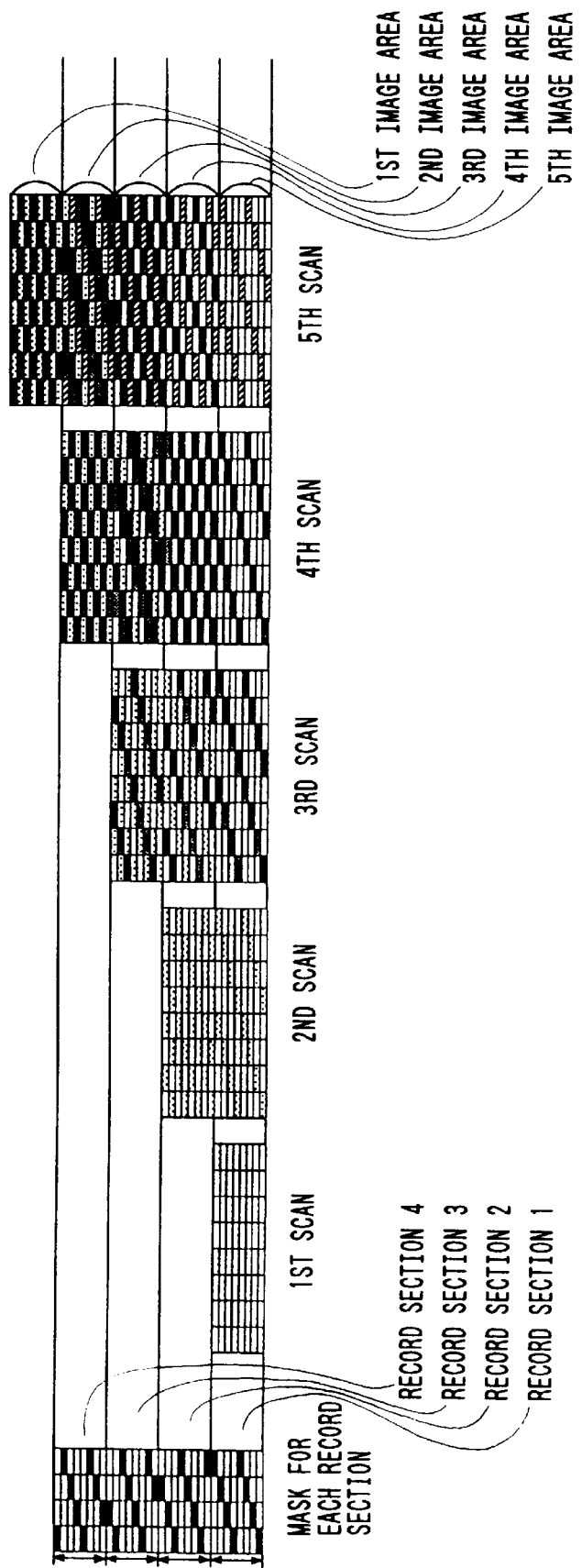
FIG. 52 is a view showing another recording state of the 12th embodiment.

As one arrangement of this embodiment, the arrangement for stacking pixel groups above previously recorded pixel groups along with record scans has been described with reference to FIGS. 50 and 51. However, the arrangement and effect of this embodiment are not limited to this. For example, as shown in FIG. 52, a mask arrangement in which pixel groups recorded upon completion of the record scan by the second record section are arranged at non-neighboring alternate positions may be adopted. In this case, in the fixed masks of the recording sections, the masks of the second and third record sections shown in FIG. 50 are exchanged. In this arrangement, as compared to the method of completing an image upward, since pixel groups sandwiching a sheet feed connection portion are not recorded simultaneously, the effect of removing the connection portion is slightly reduced. However, the same effect as described above can be obtained since thin connection portions are formed in the oblique direction. In particular, TP paper suffers from a beading phenomenon described previously with reference to FIG. 90, and this phenomenon is caused when ink dots, which draw each other, contact before they are completely absorbed. When such a beading phenomenon occurs seriously, pixel groups are preferably completed in a distributed state, as shown in FIG. 52. In particular, this method is effective for preventing beading when the ejection amount per dot is large or when the pixel density is high even if the ejection amount remains the same.

This embodiment has been described as a means effective for both a monochrome image and a color image by using fixed masks in correspondence with the record sections. However, when a color image, which is completed by a plurality of recording heads, is formed, different thinning masks may be used in units of colors. In this case, since the amounts of inks simultaneously recorded on a single pixel can be decreased, this embodiment is particularly effective for, e.g., TP paper when serious beading occurs. On coated paper or general paper, since a plurality of color inks are divisionally recorded a plurality of times, the densities of mixed colors can be increased.

When black is to be particularly emphasized while the arrangement of this embodiment is left unchanged, only black dots may be recorded, in a backward scan, on pixels which have been recorded in a forward scan.

Furthermore, in this embodiment, the recording head having 32 nozzles is divided into four record sections each consisting of eight nozzles, and the 4-pass print method has been described. This embodiment is also effective for various other heads as long as they have nozzles which can be equally divided into four record sections. For example, when a recording head having 64 nozzles is used, the nozzles are divided into four sections each consisting of 16 nozzles, and a record mask in each record section may be obtained by repeating the mask shown in FIG. 50 or 52 twice in the main scan direction in units of record sections. With this arrangement, the same effect as in this embodiment can be expected.

As a patent similar to the arrangement of this embodiment wherein a plurality of dots are recorded as a divisional record pixel group (1×4 pixels in this embodiment) in a single scan, U.S. Pat. No. 4,967,203, which has already been described in the prior art, is known. As disclosed in this patent, of pixels arranged on a sheet surface, several neighboring pixels (m×n pixels) are defined as one group (super pixel), so that a plurality of alternate non-neighboring groups are recorded in the first scan, and the remaining groups are recorded in the second scan. However, while an image to be recorded is limited to a multi-color image or a multi-gradation image, this patent describes a recording method using equal arrangement methods for all colors, and has as its object to accurately express a gradation level or color tone determined in each group. In contrast to this, in the arrangement of this embodiment, two pixels in each dot group have no relationship therebetween as an image, and are means for merely determining the print order.

As described above, according to this embodiment, in the arrangement wherein the recording head is equally divided into four record sections, and each image area is completed by four record scans using fixed masks corresponding to the record sections, the mask in each record section defines a plurality of pixel groups joined in the oblique directions in units of 1×4 pixel groups as divisional record pixel groups, and in the last record scan corresponding to the fourth pass of each image area, at least two divisional record pixel groups have already been completed at neighboring positions below each of all pixel groups to be recorded in this scan, thereby locally forming strong connection lines below these pixel groups, and eliminating sheet feed connection lines appearing in units of record section widths.

13th Embodiment

The 13th embodiment of the present invention will be described below. In this embodiment as well, the 4-pass divisional recording method is to be executed, and a 2×4 pixel group including two pixels in the sub-scan direction is used as the divisional record pixel group. Furthermore, in this embodiment, bi-directional record scans are executed to increase the print throughput.

Figure 53:
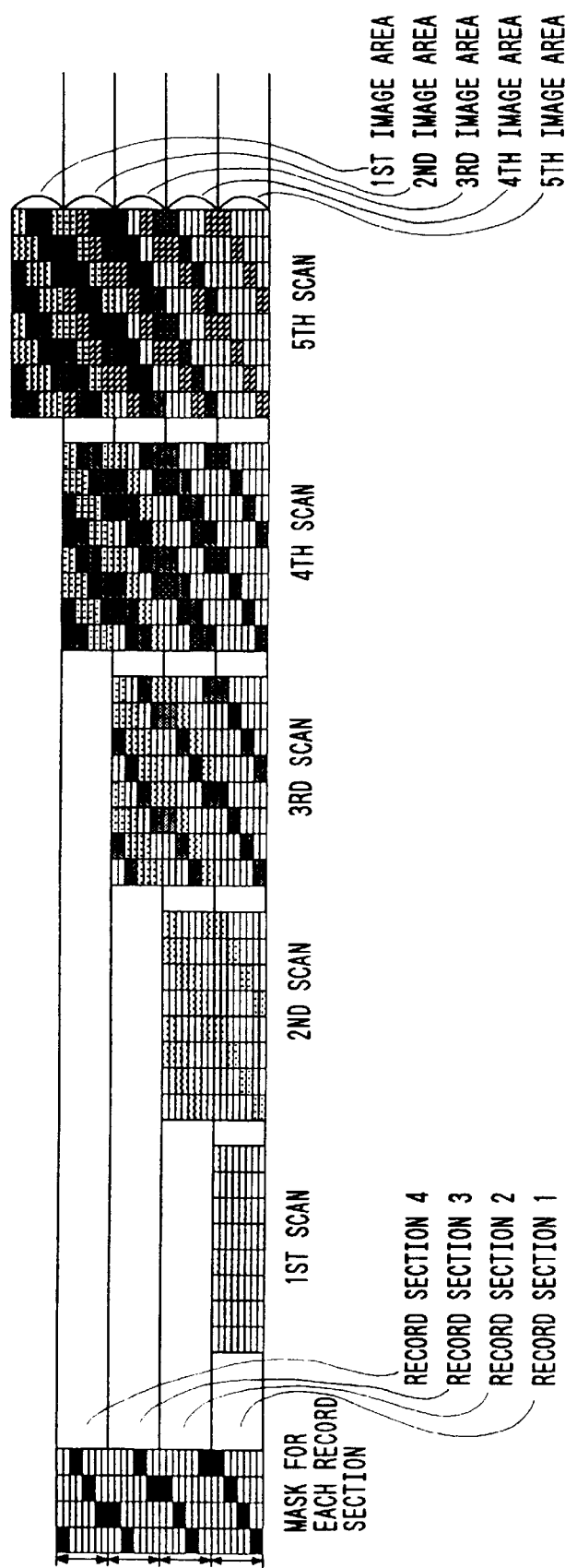
FIG. 53 is a view showing a recording state according to the 13th embodiment of the present invention.

FIG. 53 shows the recording state of this embodiment. An image is sequentially completed using fixed masks in record sections represented by first to fifth scans like in the 12th embodiment. In this embodiment, since the bi-directional print mode is executed, odd-number scans correspond to forward scans, and even-number scans correspond to backward scans.

As has already been described in the 12th embodiment, the use of such large pixel groups helps to prevent rest nonuniformity on coated paper and general paper. The large pixel groups can also prevent a color nonuniformity phenomenon unique to the bi-directional print mode in addition to the rest nonuniformity. The color nonuniformity will be briefly described below.

The bi-directional print mode is an effective means for increasing the throughput. When color heads are arranged parallel to the head main scan direction like in the recording apparatus shown in FIG. 1 used in the present invention, the ink landing order on a sheet surface is inevitably reversed between the forward and backward scans in association with the head arrangement. That is, the inks are printed in the order of black, cyan, magenta, and yellow in the forward scan, while the inks are printed in the order opposite to that described above in the backward scan. Such a difference between the ink landing orders causes the following image defect.

Figure 54A:
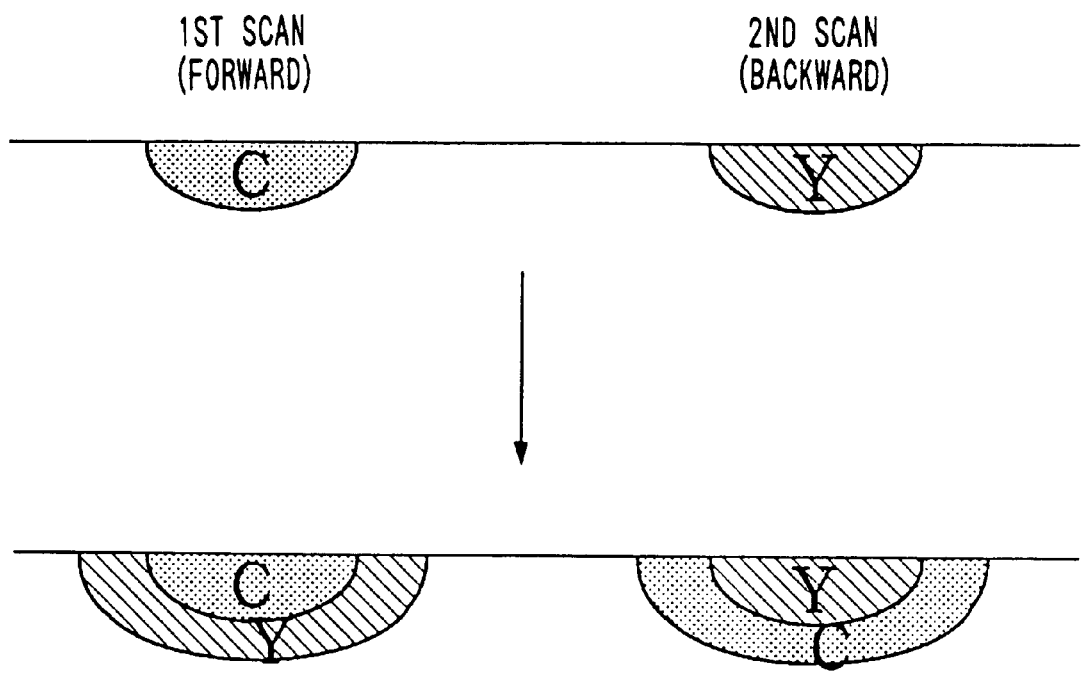
FIGS. 54A and 54B are explanatory views of a color nonuniformity phenomenon.
Figure 54B:
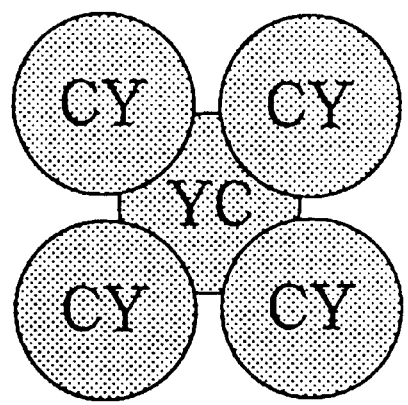

FIGS. 54A and 54B show the principle of color nonuniformity. FIGS. 54A and 54B exemplify a case wherein a green image obtained by mixing cyan and yellow is to be recorded by the conventional divisional recording method. Since the first scan is a forward print scan, ink dots land on a single pixel in the order of cyan and yellow. In this case, it is confirmed that the first recorded ink dot remains on the sheet surface portion, while the second landing ink dot sinks below the first dot in the direction perpendicular to the sheet surface. This phenomenon most typically appears on coated paper having a high absorption speed, and a similar tendency is observed more or less on general paper, TP paper, and the like. Therefore, pixels printed in the forward print scan form a cyanish green image, and pixels printed in the backward print scan form a yellowish green image. For this reason, the green images having different color tones are formed in the forward and backward scans (FIG. 54A).

When divisional recording is executed, pixels having these two color tones are arranged half by half. However, since each dot size is designed to extrude to the neighboring pixel positions, pixels to be recorded in the second scan are filled with already recorded extruding dots, and the strongest color tone in each image area is consequently determined by an ink color recorded first in the first scan (FIG. 54B).

Therefore, in the arrangement of this embodiment, when dots are recorded in units of 1×4 pixel groups in the 12th embodiment, dots considerably extrude from upper and lower pixel positions. As a result, a cyanish green image is obtained in the odd-numbered, i.e., first, third, and fifth image areas, while a yellowish green image is obtained in the even-numbered, i.e., second and fourth image areas. Since these two types of image areas having different color tones alternately appear in the sheet feed direction, they form color nonuniformity.

Figure 55A:
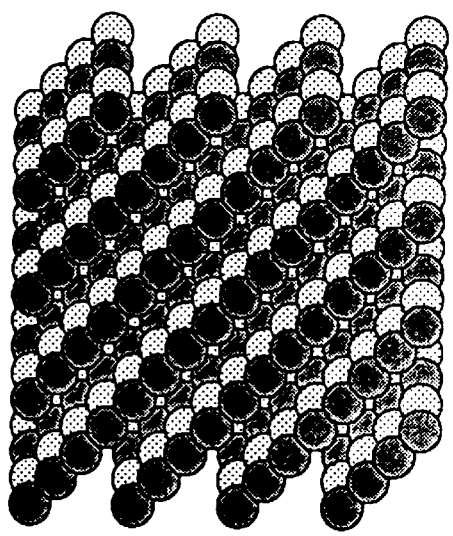
FIGS. 55A to 55C are views for explaining a difference in color nonuniformity phenomenon depending on the size of a divisional record pixel group.
Figure 55B:
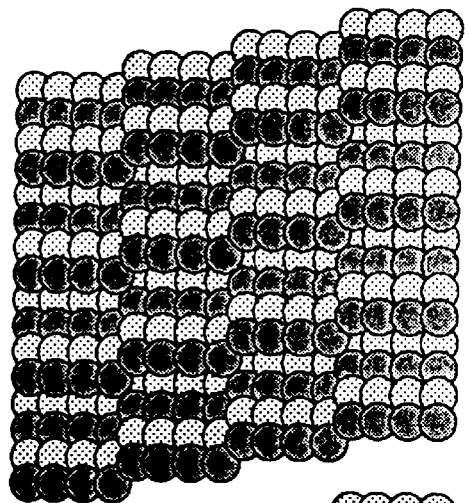
Figure 55C:
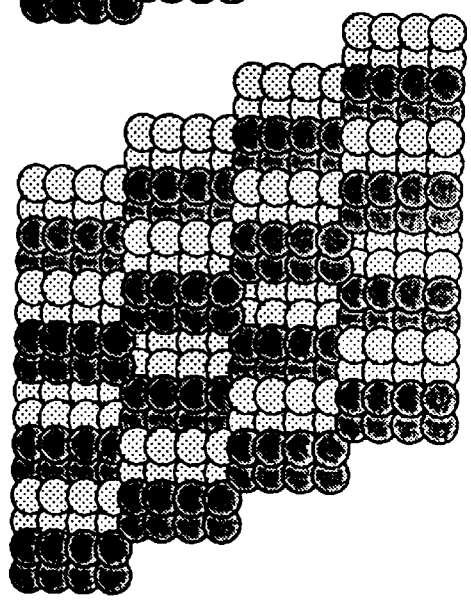

A 2×4 large divisional record pixel group used in this embodiment can prevent the above-mentioned defect to a satisfactory level. FIGS. 55A to 55C show arrangement (distribution) states of green dots having two different color tones obtained when 4-pass divisional recording is executed while changing the size of the divisional pixel group. In FIG. 55A, the divisional record pixel group consists of one pixel alone, in FIG. 55B, the pixel group consists of 1×4 pixels like in the 12th embodiment, and in FIG. 55C, the pixel group consists of 2×4 pixels of this embodiment. In this comparative example, since dots are recorded on coated paper, neighboring dots largely overlap each other, and each dot has a size about 1.6 times a pixel interval. Recording on an image area shown in each of FIGS. 55A to 55C is started with a forward scan, and the image area is subjected to recording according to the above-mentioned mask having the oblique arrangement in four forward and backward scans. As can be seen from FIGS. 55A to 55C, as the size of each divisional record pixel group is increased, areas having the color tone of the forward print scans and areas having the color tone of the backward print scans are gradually equalized. In the 12th embodiment (FIG. 55B) of the present invention, the number of yellowish areas printed in the backward print scans is increased to some extent as compared to the divisional print mode in units of dots (FIG. 55A). However, no pixel groups extending in the main scan direction can provide an effect for preventing ink extrusion in the sub-scan direction. In this embodiment, in order to obtain an effect for preventing ink extrusion in the sub-scan direction, a unit pixel group including two successive pixels in the sub-scan direction is used as the divisional record pixel group. Therefore, as shown in FIG. 55C, in this embodiment, even when the bi-directional print mode is executed, the color tones in the forward and backward scans can be almost equalized, and an image free from color nonuniformity can be obtained.

In this embodiment, the size of the divisional record pixel group is increased as compared to the 12th embodiment, and the bi-directional print mode is executed. However, an effect for removing connection lines obtained in this embodiment is substantially the same as that obtained by the 12th embodiment. Meanwhile, since the bi-directional print mode can be realized using the 2×4 divisional record pixel groups, as shown in FIG. 53, the method of this embodiment is more preferable in terms of the throughput.

As described above, the size of the divisional record pixel group is set to be as large as possible so as to prevent color nonuniformity among image areas. However, when the size of the pixel group is too large, color nonuniformity in units of pixel groups tends to become conspicuous in turn, and especially on coated paper, an image is roughened. On the other hand, on TP paper, since the number of ink dots to be simultaneously printed is increased, the beading phenomenon is worsened, and an image is deteriorated as well. Therefore, it is preferable to set the size of the divisional record pixel group according to recording conditions on each recording medium.

The influence, on the visual sense of man, of potential image defects such as the texture of coated paper or the beading phenomenon of TP paper varies depending on inks, ejection amounts, or a recording pixel density as well as recording media. Therefore, it is also preferable to independently set recording conditions capable of obtaining a required throughput or image quality in correspondence with recording media and print modes.

In this case, like in the above embodiments, it is preferable to be able to switch various print modes by designating, e.g., panel switches on the console/display unit 1211 (FIG. 3) according to image quality required by a user. FIG. 56 is a flow chart showing a print mode switching routine when such a system is introduced. In this case, a print control method is switched according to the types of recording media, and in particular, for TP paper, two modes are prepared depending on whether or not a black emphasis print is performed. For general paper which does not easily cause beading or texture, a bi-directional print mode using large divisional record pixel groups each consisting of 2×4 pixels is selected to increase the throughput. In contrast to this, for TP paper which easily causes beading, a one-directional print mode using 1×4 divisional record pixel groups is normally selected, and when a user wants to emphasis black, print control for recording only black dots in backward scans is also available. Furthermore, for coated paper, although the bi-directional print mode is not performed due to conspicuous texture, a one-directional print mode using 2×4 divisional record pixel groups is selected since it is particularly advantageous for rest nonuniformity.

As described above, according to this embodiment, in the arrangement wherein the recording head is equally divided into four record sections, and each image area is completed by four record scans using fixed masks corresponding to the record sections, the mask in each record section defines a plurality of pixel groups joined in the oblique directions in units of 2×4 pixel groups as divisional record pixel groups, and in the last record scan corresponding to the fourth pass of each image area, at least two divisional record pixel groups have already been completed at neighboring positions below each of all pixel groups to be recorded in this scan, thereby locally forming strong connection lines below these pixel groups, and eliminating sheet feed connection lines appearing in units of record section widths.

14th Embodiment

The 14th embodiment of the present invention will be described below. This embodiment exemplifies a 3-divisional print mode using 1×2 divisional record pixel groups. FIG. 57 shows the print state of this embodiment like in the 12th and 13th embodiments. In this embodiment, a recording head having 27 nozzles is used, and is equally divided into three sections each consisting of nine nozzles. Although the number of nozzles to be used of the recording head is small, the throughput can be increased as compared to the 12th and 13th embodiments. In FIG. 50 or 53, only an image corresponding to an 8-nozzle width is completed upon completion of the fourth scan, while in this embodiment, an image corresponding to an 18-nozzle width is completed. Therefore, this embodiment can increase the throughput twice those in the 12th and 13th embodiment.

Of course, in this embodiment, bi-directional print scans may be executed like in the 13th embodiment, and in this case, the throughput can be almost doubled. The effect of this embodiment can be achieved even when a 32-nozzle head used in the 12th or 13th embodiment is used as long as the number of nozzles to be used is selected in correspondence with this embodiment.

Furthermore, in this embodiment, the 1×2 divisional record pixel group, which is shorter than that in the above embodiments in the horizontal direction (main scan direction of the recording head), is used. Such a small pixel group can provide a more satisfactory effect for preventing beading on TP paper or texture on coated paper although it has a small effect for preventing rest nonuniformity on coated paper or general paper or for color nonuniformity in the bi-directional print mode.

Upon practicing of the present invention in this manner, when the number of record divisions is decreased, the throughput can be increased, and the size of each divisional record pixel group can be decreased to some extent to obtain high image quality. However, in order to realize the effect for preventing connection lines according to the present invention, it has already been confirmed that the recording head must be divided into at least three sections, and the divisional record pixel group requires at least two pixels in the main scan direction. The reason for these requirements will be explained below.

A table shown in FIG. 58 shows estimation results of quality of connection lines when dots are recorded on TP paper while the number of record divisions is set to be 2 and 3, and the divisional record pixel group size is changed from 1×1 to 1×4. As is understood from this table, in order to obtain the effect of the present invention, the number of record divisions requires to be at least 3, and the divisional record pixel group requires at least two pixels in the main scan direction.

As has already been described in the description of the conventional divisional recording (FIGS. 92A to 92C), the recording method in the uppermost row of the table has a bad estimation result. This is because the difference between degrees of print completion of image areas causes a drawing phenomenon of ink dots at the boundary portion. The principal effect of the present invention is obtained in such a manner that the process of completing recording, i.e., the state of the ink drawing force at a boundary portion between image areas is equalized to that in other areas as much as possible. In the two-divisional recording method, which completes a unit print area by two record scans, the difference between degrees of print completion of image areas becomes too large, and it is difficult to realize the above effect without causing other image defects.

In the present invention, in order to minimize the influence of the ink drawing force at the boundary portion, small ink drawing forces are uniformly generated at portions other than the boundary portion. Since this ink drawing force must be generated strongly in the sub-scan direction (sheet feed direction), new record pixel groups landing in each record scan are preferably elongated in the main scan direction. In order to cause the already landed pixel groups to strongly draw the new landing pixel groups, their contact portion is preferably elongated in a direction perpendicular to the direction of the drawing force. Therefore, when a small divisional record pixel group in units of dots such as a 1×1 pixel group is used, the recorded dots are equally influenced in both the main scan direction and the sub-scan direction, and become very unstable. In this case, apparently, the effect for preventing connection lines cannot be expected.

This embodiment realizes the above-mentioned conditions within a minimum required range. According to this embodiment, high-throughput recording which minimizes texture and beading can be achieved while providing a satisfactory effect for preventing connection lines.

15th Embodiment

The 15th embodiment of the present invention will be described below. In this embodiment, a 32-nozzle head is used, and 4-divisional recording is executed like in the 12th and 13th embodiments. However, in this embodiment, in place of equally dividing the recording head into four record sections, a record mask (4×16 pixels) for one record section is simultaneously applied to all record sections. In order to achieve the complementary relationship between the corresponding record scans, the record mask is rewritten in units of record scans, and four different record masks are sequentially used. In this manner, the capacity of a register for the record mask in the recording apparatus main body can be reduced to ¼.

Figure 59:
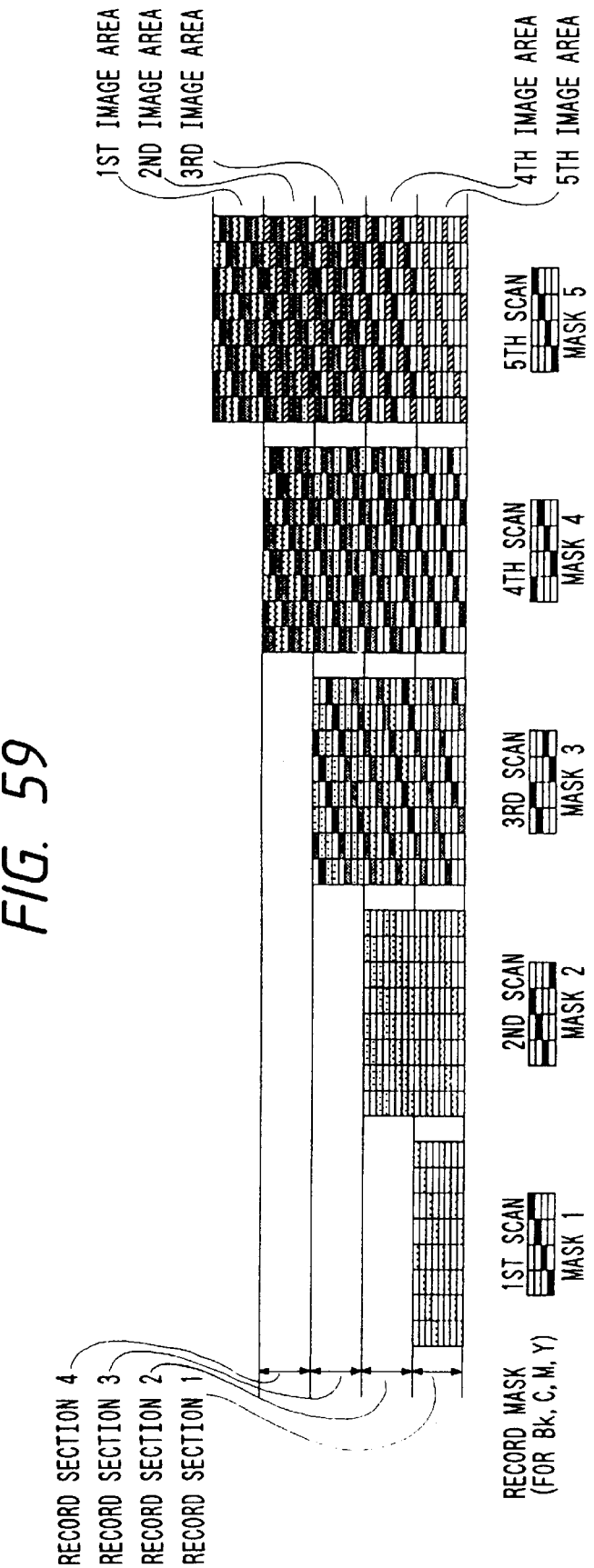
FIG. 59 is a view showing a recording state according to the 15th embodiment of the present invention.

FIG. 59 shows the print state of this embodiment like in the above embodiments. As described above, in this embodiment, since the record mask is converted in units of record scans, a single record section uses different arrangements of record pixel groups in units of scans.

Figure 60:
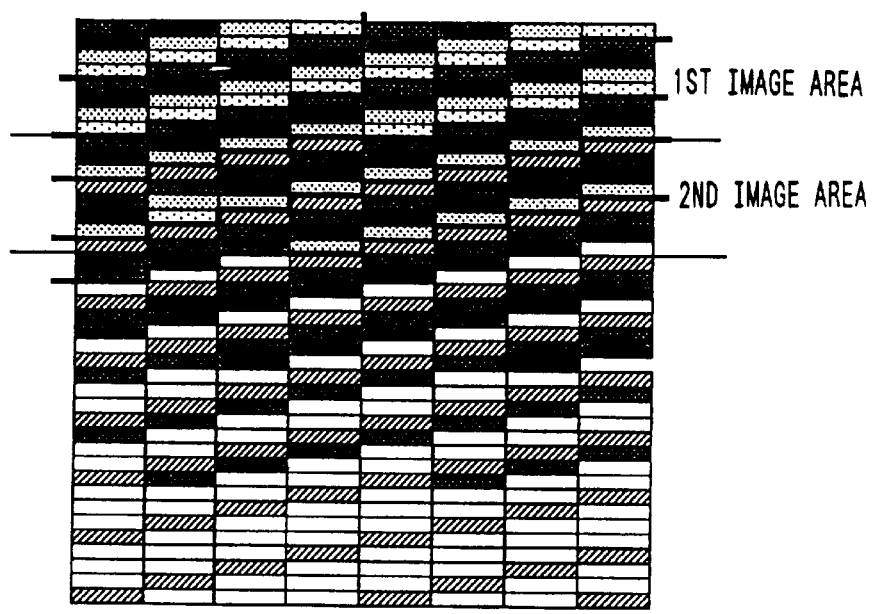
FIG. 60 is an enlarged view of the recording state of the 15th embodiment.

FIG. 60 illustrates connection lines by bold lines in first and second image areas upon completion of the fifth scan like in FIG. 51 of the 12th embodiment. In FIG. 60, connection lines each having a length twice that of a normal connection line are formed at positions corresponding in number to sheet feed connection portions. In this manner, the effect for preventing connection lines is slightly impaired since stepwise connection lines are irregularly formed at a sheet feed portion as compared to the 12th embodiment in which the recording head is divided into sections. However, since the arrangement of the present invention is practiced by the above-mentioned arrangement, the effect for preventing connection lines can be realized.

Furthermore, in this embodiment, as described above, since the capacity of the register for the record mask is ¼ that of the 12th embodiment, the present invention can be realized using a mask register having the same capacity as that of the 12th embodiment even when different record masks are used in correspondence with the four colors. For example, when serious beading occurs on TP paper, and two or more ink dots must not be caused to land on a single pixel, if the above-mentioned arrangement can be practiced, ink dots can land at different positions in units of colors.

When the above-mentioned different record masks in units of colors are used, the black emphasis mode for TP paper can be realized without executing an independent record scan. This arrangement will be described below with reference to FIG. 61. FIG. 61 shows a black recording state in this embodiment. At this time, assume that other color dots are recorded according to FIG. 59 described above. Referring to FIG. 61, each black record pixel group consists of 2×4 pixels twice that for other colors, and in the record mask to be converted in units of record scans, the record pixel group larger by one pixel width in the sub-scan direction than that for other colors is circulated upward. Therefore, upon completion of the last record scan, black dots are recorded twice on all pixels at a duty of 200%. With this arrangement, even when recording is completed at a duty (50%) equal to the 2-divisional recording mode, the ink drawing forces acting between two each adjacent pixel groups appear in the same manner as in the above embodiments, and small connection lines can be formed stepwise on the entire image area. Therefore, the effect for preventing connection lines can be similarly obtained.

Figure 62:
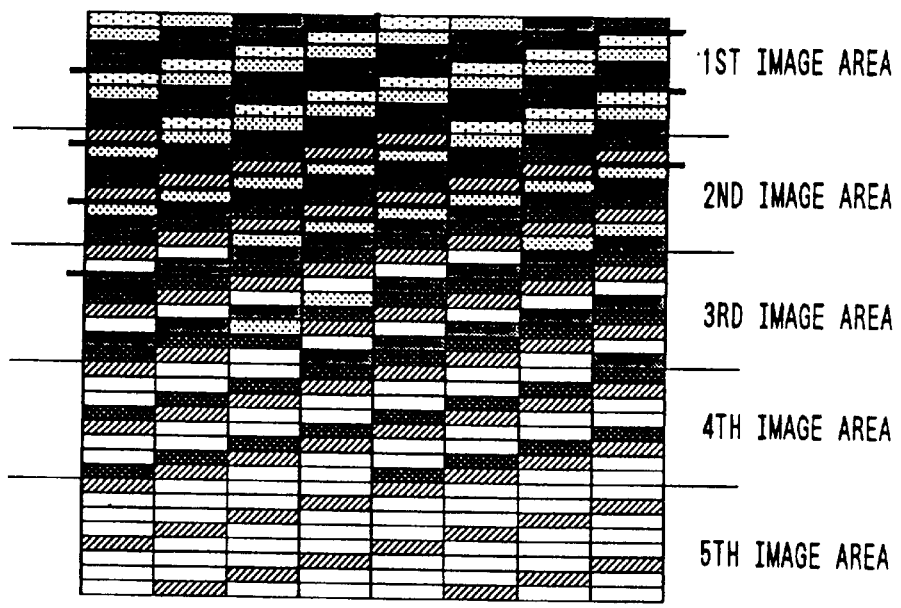
FIG. 62 is a view showing another recording state of the 15th embodiment.

In the 12th and subsequent embodiments including this embodiment, the recording pixel groups are recorded to be in contact with the previously recorded pixel groups in the upward direction (sheet feed direction) along with the progress of all record scans. This arrangement has an effect for generating an ink drawing force of a connection portion, which appears uniformly, in a direction opposite to the sheet feed connection portion. The ink drawing force between two adjacent record pixel groups appears in such a manner that a new landing record pixel group is drawn by the already landed record pixel group. Therefore, in contrast to the sheet feed connection line which is formed when ink dots are drawn upward due to a difference between the degrees of completion of recording, ink dots are preferably-drawn downward in connection portions formed on the entire area according to the present invention. However, the arrangement of the present invention is not limited to this. For example, the effect of the present invention can be realized when image areas are completed by forming record pixel groups to be in contact with previously recorded pixel groups in the downward direction (a direction opposite to the sheet feed direction). FIG. 62 shows connection lines formed when such an arrangement is adopted. As can be seen from FIG. 62, the number of connection lines at the sheet feed positions is decreased as compared to a case wherein an image area is completed upward in FIG. 60. Which one of these two different arrangements can satisfactorily prevent connection lines depends on recording media or ink characteristics. Therefore, a better arrangement should be selected for each application.

As described above, according to this embodiment, in the arrangement wherein four different record masks each obtained by arranging 4×16 unit masks on the entire section of a recording head are prepared to achieve the complementary relationship between the corresponding masks, and image areas are completed by circulating these four masks in four record scans, the mask in each record section defines a plurality of pixel groups joined in oblique directions in units of 1×4 pixel groups as divisional record pixel groups, and in the last record scan corresponding to the fourth pass of each image area, at least two divisional record pixel groups have already been completed at neighboring positions below each of all pixel groups recorded in this scan, thereby locally forming strong connection lines below these pixel groups, and eliminating sheet feed connection lines appearing in units of record section widths.

16th Embodiment

The 16th embodiment of the present invention will be described below. In the above embodiments, the color print mode has been described. This embodiment exemplifies an arrangement for recording a monochrome image, and the ink ejection amount per dot is about twice that of the above embodiments. In the print arrangement of this embodiment, the same divisional record pixel group and record mask as those in the 12th embodiment are used, and an image is formed in the same print state shown in FIGS. 50 and 51. However, since this embodiment forms a monochrome image which does not suffer from the image defects such as color nonuniformity, texture, and the like described in the 13th embodiment, the bi-directional print mode can be executed.

17th Embodiment

In order to eliminate connection line nonuniformity, dots at the end portions of image areas on a recording medium may be printed in a later scan.

Figure 63A:
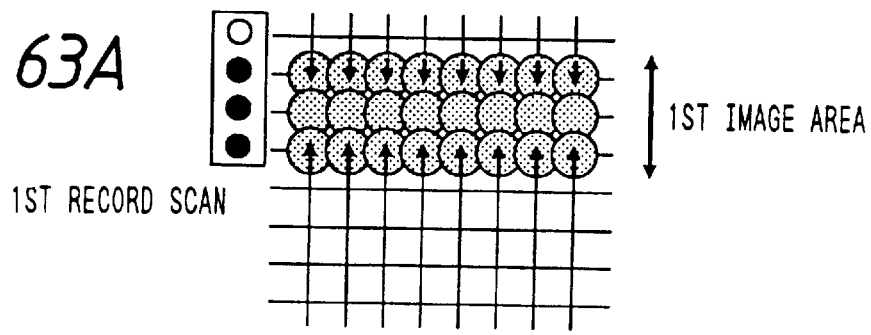
FIGS. 63A to 63D are views for explaining a recording state according to the 17th embodiment of the present invention.
Figure 63B:
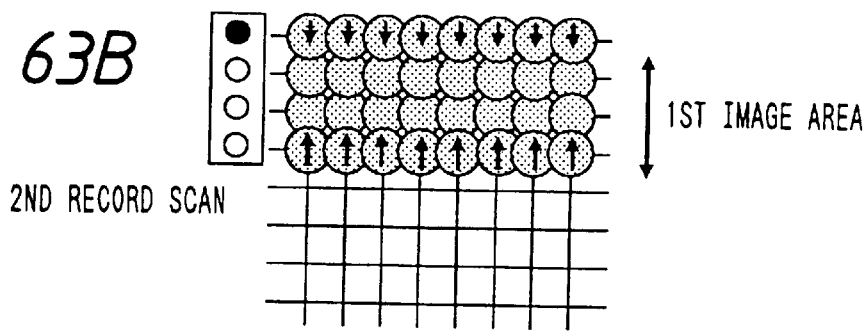
Figure 63C:
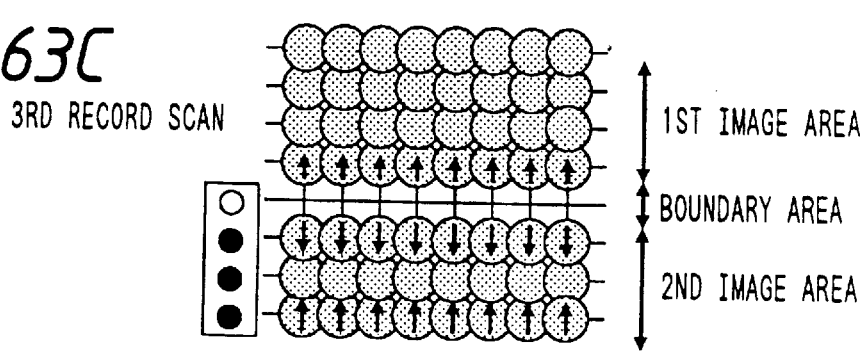
Figure 63D:
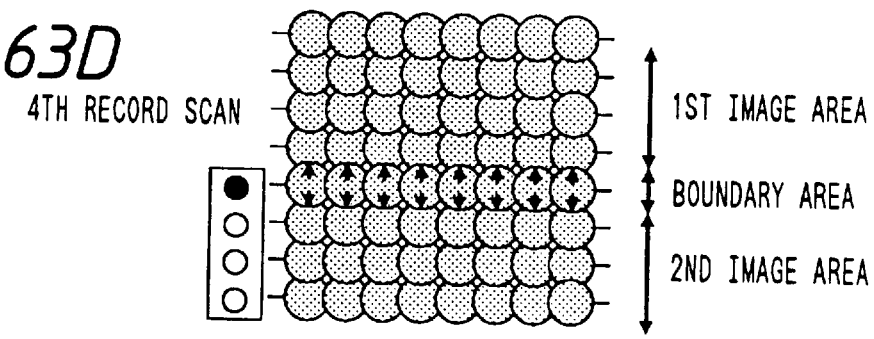

The 17th embodiment of the present invention will be described below. FIGS. 63A to 63D exemplify a-case wherein the recording method of this embodiment is practiced using a 4-nozzle head. FIGS. 63A to 63D are used for explaining processes of recording two image areas to sandwich a boundary area having a one-pixel width in association with drawing forces. Since this embodiment provides a basic example of the present invention, a divisional print mode for nozzle variations is not particularly performed. Referring to FIGS. 63A to 63D, in the first record scan, lower three nozzles record dots on corresponding pixel arrays to leave an uppermost pixel array having a one-pixel width in the recording direction (FIG. 63A). In the second record scan, the uppermost nozzle records dots on the uppermost pixel array, which is not recorded in the first record scan, at the same recording head position as in the first record scan, thus completing the first image area (FIG. 63B). In this state, ink drawing forces act, as shown in FIG. 63B, in the first image area, as has already been described above. In the third record scan, a sheet is fed by a head width, and dots are recorded on a second image area using the lower three nozzles again. On the second image area, ink drawing forces as that acting in the first image area upon completion of the second record scan are generated. At this time, since the first and second image areas are independently completed to be separated from each other by the boundary area having a one-pixel width, the ink drawing forces of these areas do not influence each other (FIG. 63C). The last fourth record scan is executed at the same head position as that of the third record scan, and dots are recorded on the one-pixel width portion between the first and second image areas which have already been completed. Since the two image areas are already fixed to some extent, and the ink drawing forces of the two areas are almost equally stabilized, dots recorded on the boundary pixel positions can be stabilized at their landing positions. Therefore, the ink droplets at the end portions of the image areas can be prevented from being drawn to one image area.

Figure 64A:
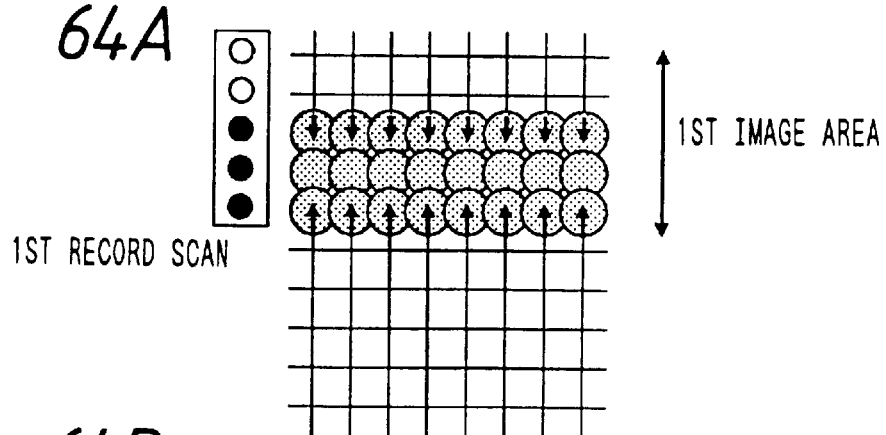
FIGS. 64A to 64D are views for explaining the recording state of the 17th embodiment.
Figure 64B:
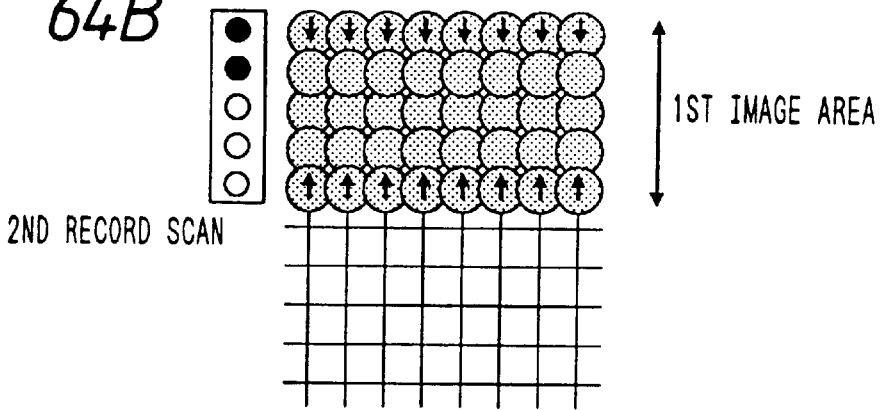
Figure 64C:
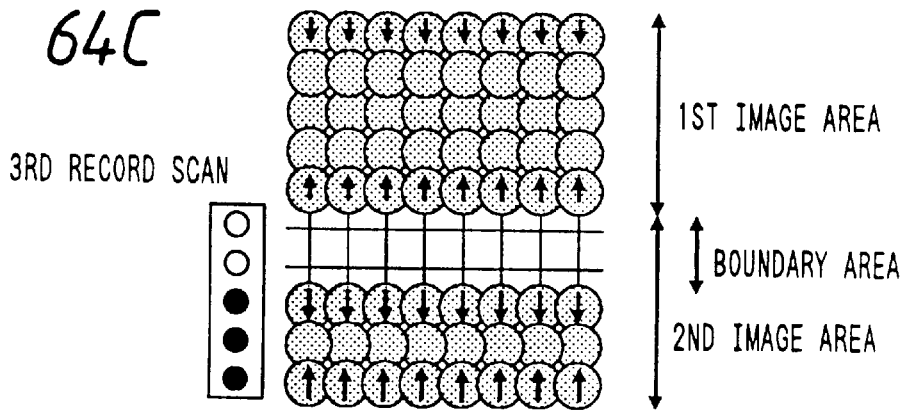
Figure 64D:
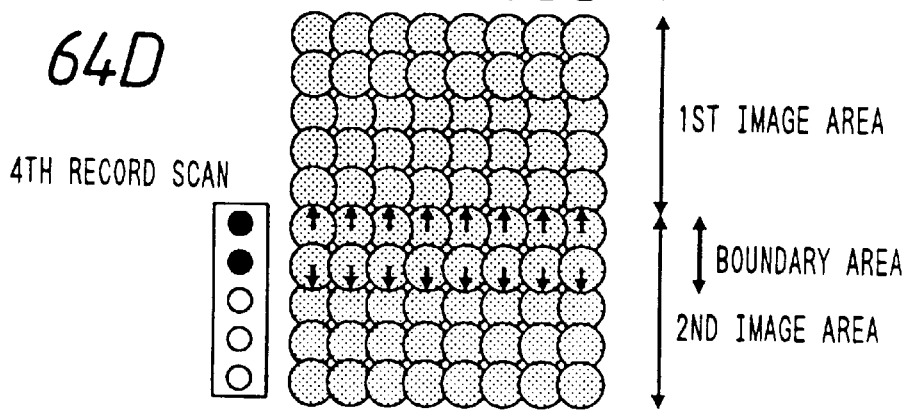

In the above description, the pixel area for forming the boundary area is fixed to have a one-pixel width. However, the pixel width is not limited to this. For example, when the same recording method as described above is executed using a 5-nozzle head shown in FIGS. 64A to 64D, a boundary area may have a two-pixel width, as shown in FIG. 64C, thus obtaining substantially the same effect as described above.

In FIGS. 64A to 64D, the upper 2-pixel width section of the 5-nozzle head is used for defining a boundary area, and dots are recorded by alternately using record sections of 3- and 2-nozzle widths. In this manner, as long as the pixel width of the boundary area falls within a certain width range, a good image can be obtained. In this case, in order to obtain the effect of the present invention, when dots are recorded on the boundary portion of the second image area, the ink drawing forces acting here from the two sides must overcome internal affinity forces, and be as uniform as possible. Therefore, the second image area except for the boundary portion must have ink drawing forces which can overcome the ink affinity forces in the boundary area, and must have a pixel width at least larger than that of the boundary area.

As described above, according to this embodiment, the record scan of the boundary portion of each image area is independently performed after the record scan of another area, thus preventing connection lines on a recording medium such as TP paper having a low ink absorption speed.

18th Embodiment

Figure 65:
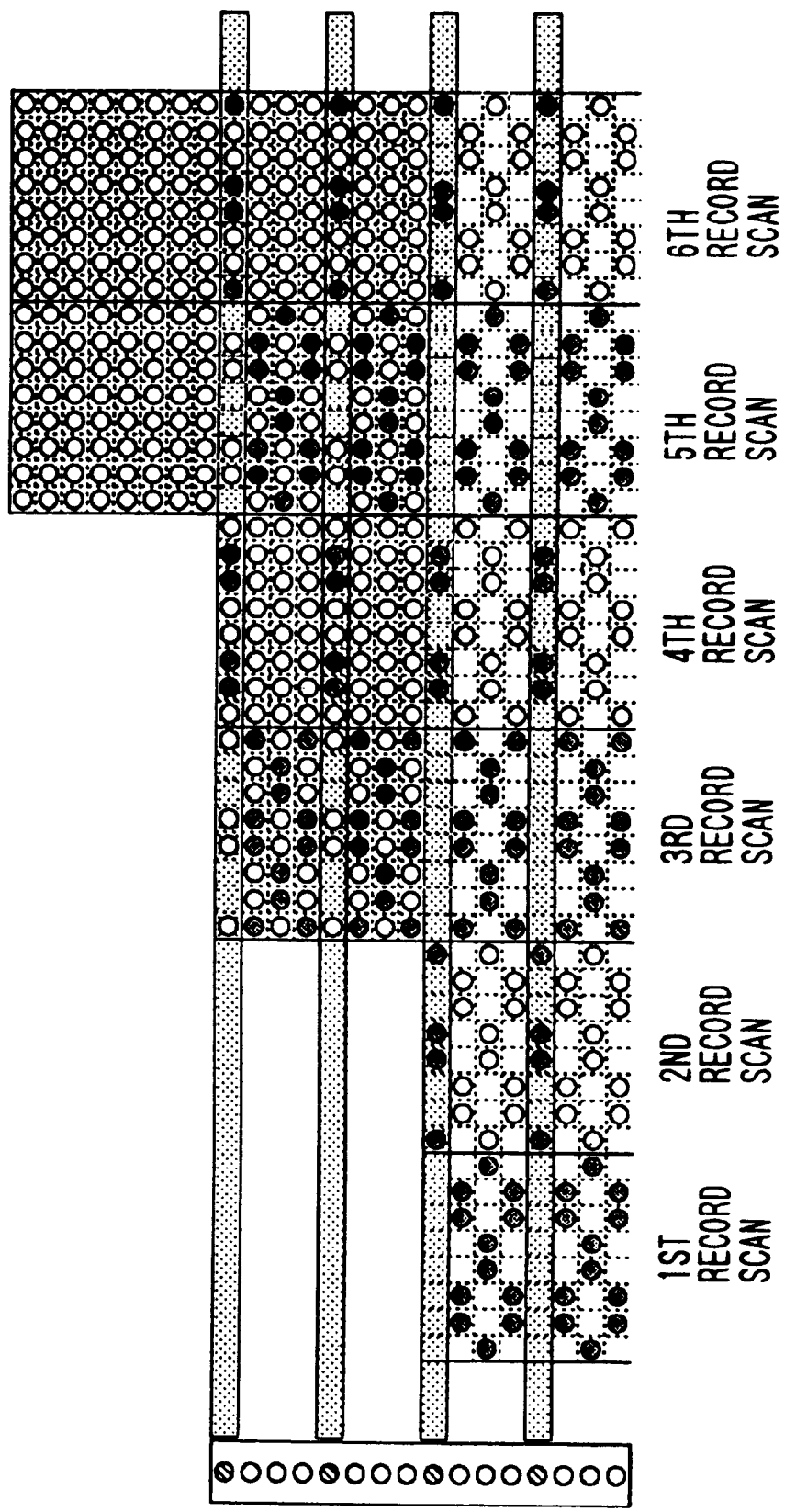
FIG. 65 is a view for explaining a recording state according to the 18th embodiment of the present invention.
Figure 67:
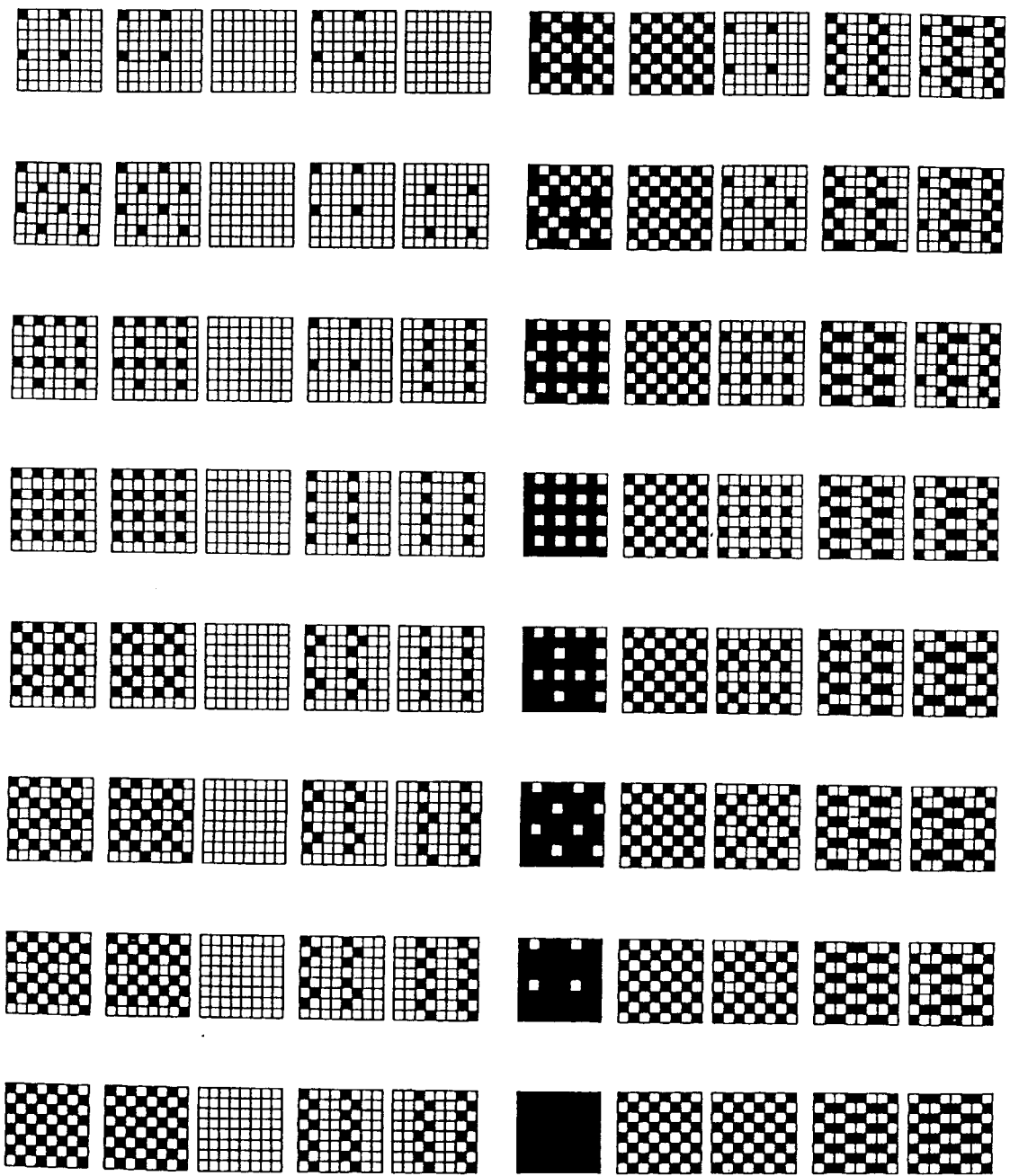
FIG. 67 is a view for explaining the effect of a thinning mask in the 17th embodiment.

The 18th embodiment of the present invention will be described below. FIG. 65 shows a print state of this embodiment when recording is executed using a 16-nozzle head. In this embodiment, a checker thinning mask is used as one unit for simultaneously recording two successive dots in the main scan direction. The simultaneous printing of these two dots helps to resist the ink affinity forces in the sheet feed direction by intentionally generating ink affinity forces between the two dots in a direction different from that in a connection portion. Furthermore, it can be confirmed that the mask of this embodiment can always equally divide the number of record pixels of each of general halftone patterns shown in FIG. 67 into two scans as compared to a conventional checker mask. FIG. 67 shows print states in two scans obtained when conventional checker and reverse checker mask patterns are used for print data obtained by a binarization method called a Bayer type dither method, and also shows print states in two scans obtained when the mask patterns of this embodiment are used for the print data. When an arrangement for divisional recording is adopted, data must be divided into two record scans as equally as possible so as to obtain the effect of the present invention. On a recording medium such as TP paper having a low absorption speed, a beading state largely varies depending on the number of dots recorded in each scan. Therefore, when the two record scans have a large difference between their numbers of dots like in the conventional checker mask, image areas having different beading states alternately appear, and nonuniformity occurs in units of sheet feed width. Therefore, this embodiment positively uses this mask.

As an arrangement similar to a group consisting of a plurality of dots, U.S. Pat. No. 4,967,203, which has already been described in reference to the prior art, is known. As disclosed in this patent, of pixels arranged on a sheet surface, several neighboring pixels (m×n pixels) are defined as one group (super pixel), so that a plurality of alternate non-neighboring groups are recorded in the first scan, and the remaining groups are recorded in the second scan. However, while an image to be recorded is limited to a multi-color image or a multi-gradation image, this patent describes a recording method using equal arrangement methods for all colors, and has as its object to accurately express a gradation level or color tone determined in each group. In contrast to this, in the arrangement of this embodiment, two pixels in each dot group have no relationship associated with an image therebetween, and are means for merely determining the print order.

Referring back to FIG. 65, in this embodiment, of all nozzles aligned in the head, only nozzles at every fifth position from the start nozzle in the sheet feed direction are subjected to recording as a start group in a scan different from that of the other nozzle group. These two scans are always continuously performed, and the record scan of the start group is performed after the record scan of the other nozzle group. No sheet feed scan is executed between these two scans, and the sheet feed scan is executed once per two record scans. The effect of this arrangement will be described below with reference to FIGS. 66A to 66E.

Figure 92A:
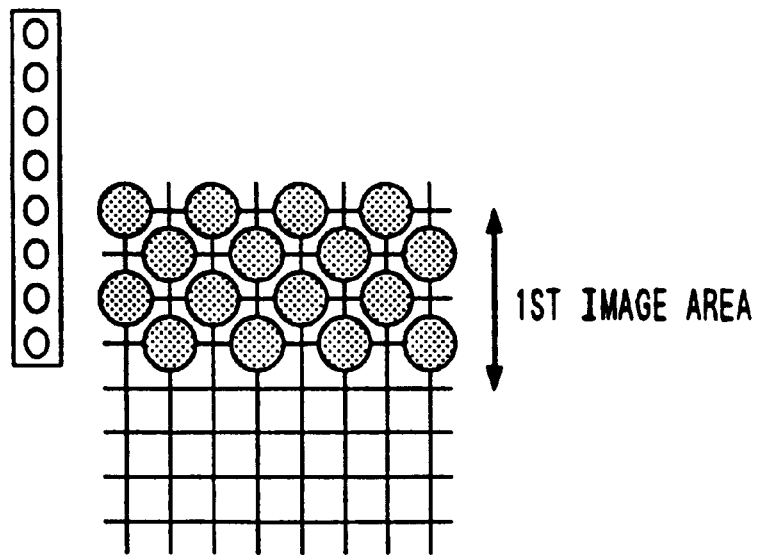
FIGS. 92A to 92C are views for explaining the principle of formation of connection lines in 2-pass divisional recording.
Figure 92B:
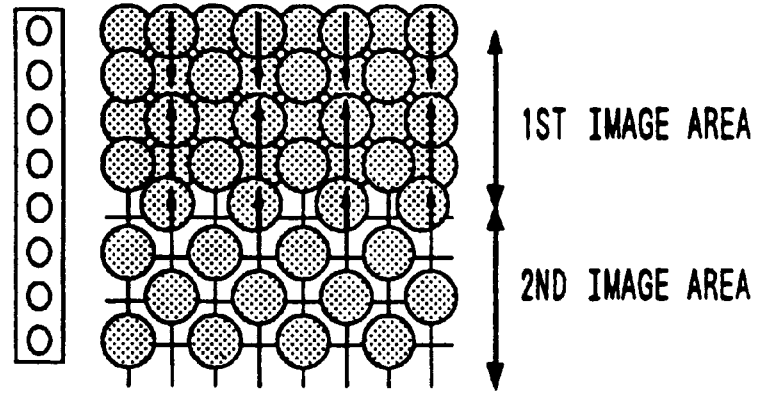
Figure 92C:
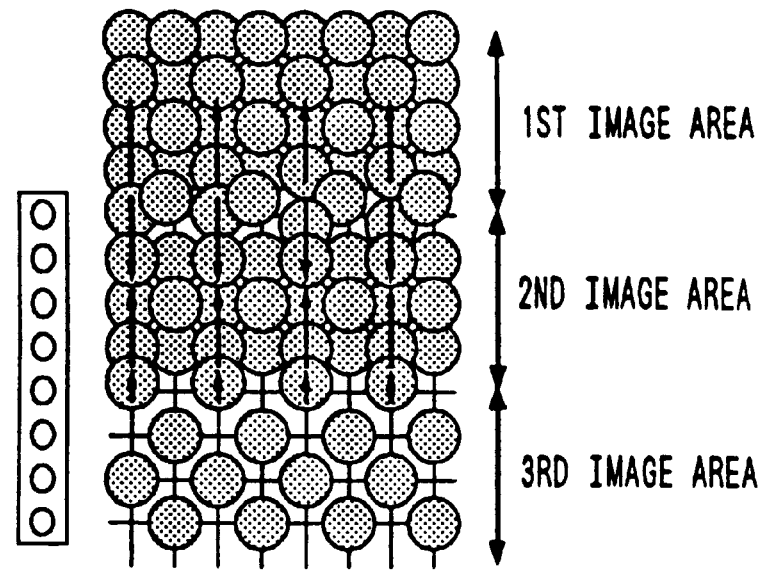

FIGS. 66A to 66E partially show FIG. 65, in particular, a connection portion, and express the effect for preventing connection lines of this embodiment upon comparison with FIGS. 92A to 92C of the prior art. FIG. 66A shows a recording state after the second record section is completed. In this process, dots are recorded on half the first image area. After the sheet feed operation, in the third record scan, a nozzle at the position corresponding to a connection portion of the second image area whose degree of completion is low does not perform recording (FIG. 66B). Therefore, even when strong ink drawing forces are generated toward the center of the first image area, they do not influence ink droplets on the second image area unlike in the prior art. The next fourth record scan is performed at the same head position as the third record scan. In this scan, dots are recorded on positions half a pixel array of the boundary portion (FIG. 66C). At this time, since the ink droplets printed in the first image area in the third record scan are fixed to some extent, the ink drawing forces acting toward the center of the first image area are considerably weakened from those in the third record scan. Therefore, the ink droplets recorded on the boundary portion in this scan can be fixed without being displaced from their real landing positions. The fifth record scan is performed after the sheet feed scan, and at this time, the nozzle corresponding to the boundary portion does not perform recording (FIG. 66D). In this record scan, the two areas sandwiching the boundary portion therebetween are completed, and the conditions of the two side areas with respect to several ink dots located at the boundary portion are almost stabilized. In the sixth record scan, the sheet feed scan is not performed, and the remaining boundary pixel array of the second image area is completed (FIG. 66E). Since the states of ink droplets landing on two sides of this pixel array are almost equivalent to each other, the ink drawing forces are almost equivalently balanced, and dots recorded on this boundary pixel array can be stably fixed at their landing positions. In this manner, the fundamental principle of the present invention, i.e., this embodiment, is to complete a boundary portion between two image areas having different record completion timings after the states of the two image areas on the two sides of the boundary area are equalized to have high degrees of completion of recording, or after the two image areas are fixed, if possible. This embodiment also includes an effect obtained due to an increase in recording time since the number of record scans is basically increased as compared to FIGS. 92A to 92C. However, it has already been confirmed that the effect for preventing connection lines equivalent to that of this embodiment cannot be obtained even when simple divisional recording including four record scans equal to those of this embodiment or eight record scans is performed.

The above-mentioned effect or the principle for preventing connection lines has already been confirmed by the present inventors. The effect will be described below.

Figure 68A:
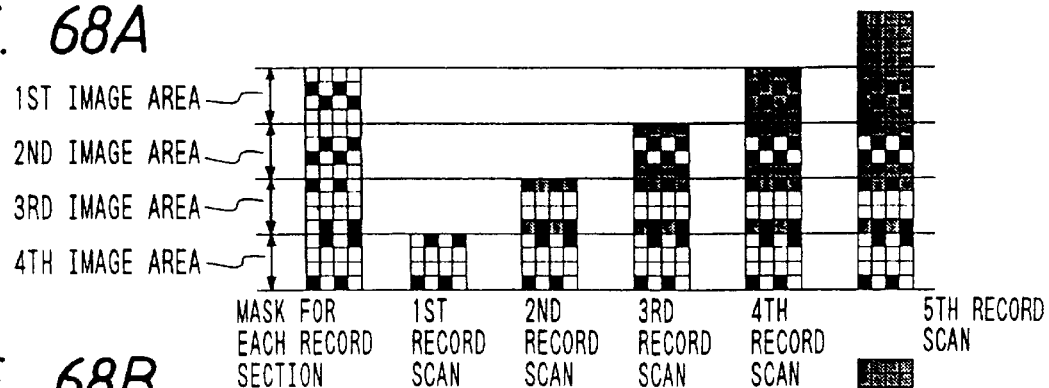
FIGS. 68A to 68D are views for explaining a recording state according to the 21st embodiment of the present invention.
Figure 68B:
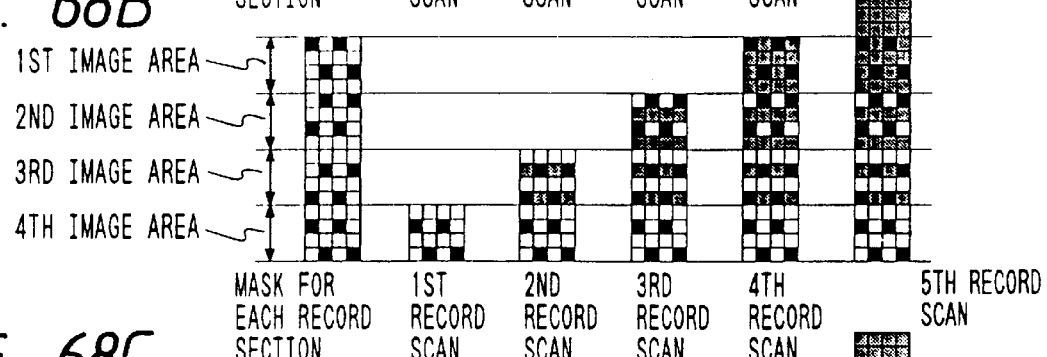
Figure 68C:
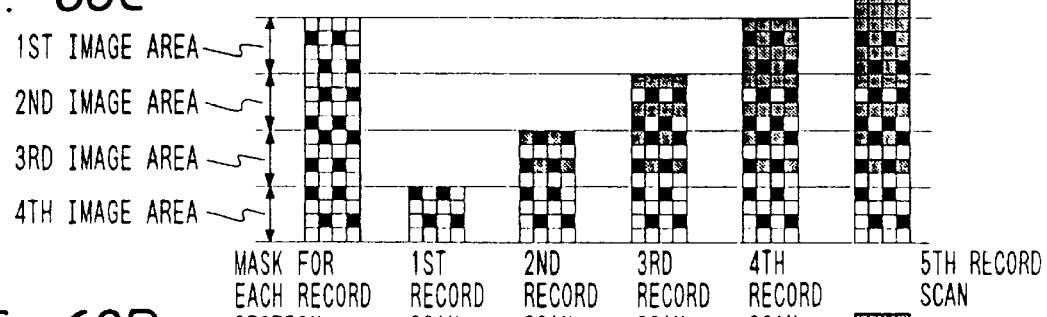
Figure 68D:
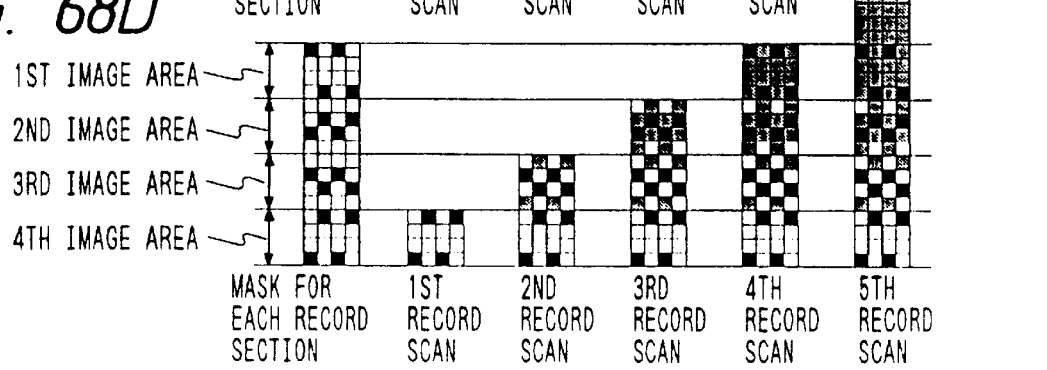

FIGS. 68A to 68D show four different divisional recording methods, each of which completes a single image area in four record scans. Although an embodiment of a 4-pass divisional recording method will be described in detail later as the 20th embodiment, comparative examinations for clarifying the principle of the present invention will be briefly described here. A head having 16 nozzles is equally divided into four record sections, and each record section always performs recording using a corresponding fixed mask illustrated at the left end. States of recorded images according to the corresponding masks are illustrated in units of scans at the right-hand side of the mask pattern. In each scan, a black-painted pixel indicates a pixel to be recorded in the corresponding record scan, and a gray pixel indicates a pixel recorded in the previous scan. In FIG. 68A, the boundary portions of image areas corresponding to a connection portion are completed in the first and second scans, and the remaining portions of the image areas are recorded in the third and fourth scans. In FIG. 68B, a boundary portion at the trailing end side in the sheet feed direction is completed in the first and second scans, and a boundary portion at the leading end side is completed in the third and fourth scans. Contrary to FIG. 68B, in FIG. 68C, a boundary portion at the leading end side is completed in the first and second scans, and a boundary portion at the trailing end side is completed in the third and fourth scans. In FIG. 68D, dots are formed in a checker pattern on the entire area up to the second scan. Thereafter, in the third scan, the area except for the boundary portions is completed, and in the fourth scan, the boundary portions at the two ends are completed. According to the above-mentioned actual recording methods using four different masks, it is confirmed that images obtained by the methods shown in FIGS. 68B and 68D are good at almost the same level, while images formed by the methods shown in FIGS. 68A and 68C are considerably deteriorated in terms of connection lines.

From the above-mentioned results, the following fact can be confirmed and verified. That is, "at a boundary portion between two image areas, a boundary pixel array of the area having a lower degree of completion is preferably completed in the last record scan of the image area". More specifically, "recording of a boundary portion of an image area, which causes a difference in ink amount (degree of completion of recording) during printing, is preferably performed in the last record scan in which two image areas on the two sides of the boundary portion are completed, and reach equal degrees of completion (100%)". In FIG. 68C, although the boundary pixel portion of the image area having a higher degree of completion is completed first, recording of the image area contacting the boundary pixel portion and having a lower degree of completion is not ended yet in this scan. Therefore, as is understood from the above description, since this area must be subjected to another recording operation in a scan after the boundary portion is recorded, a good image cannot be obtained by the recording method shown in FIG. 68C.

In this embodiment (FIG. 65), the start nozzle in the sheet feed direction and nozzles at every fifth positions from the start nozzle are record-scanned at the same timing. This assumes, for example, a case wherein the driving timings of nozzles are divided into four groups at every four nozzles, and nozzles in each block are driven at an equal driving timing. With this driving method, this embodiment can be realized by exchanging driving control of one block including the start nozzle with other nozzles without executing fine driving control in units of nozzles. However, if driving control for always setting the timing of only the start nozzle in the sheet feed direction to be different from those of the remaining nozzles can be realized, such an arrangement may be adopted. In this case, since the pixel array on the boundary portion can be completely independent of other pixels, the drawing forces with other ink droplets to be recorded simultaneously can be completely shielded, and a still high-quality image can be expected.

As described above, upon execution of divisional recording, several nozzles including the start nozzle in the sheet feed direction are separated from other nozzles, and perform recording on an image area in a scan in which the print duty of other nozzles is 0 after the record scans of other nozzles are ended, thus obtaining a high-quality image free from density nonuniformity caused by nozzle variations, beading, blurring at boundaries between different colors, and sheet feed connection lines.

19th Embodiment

Figure 69:
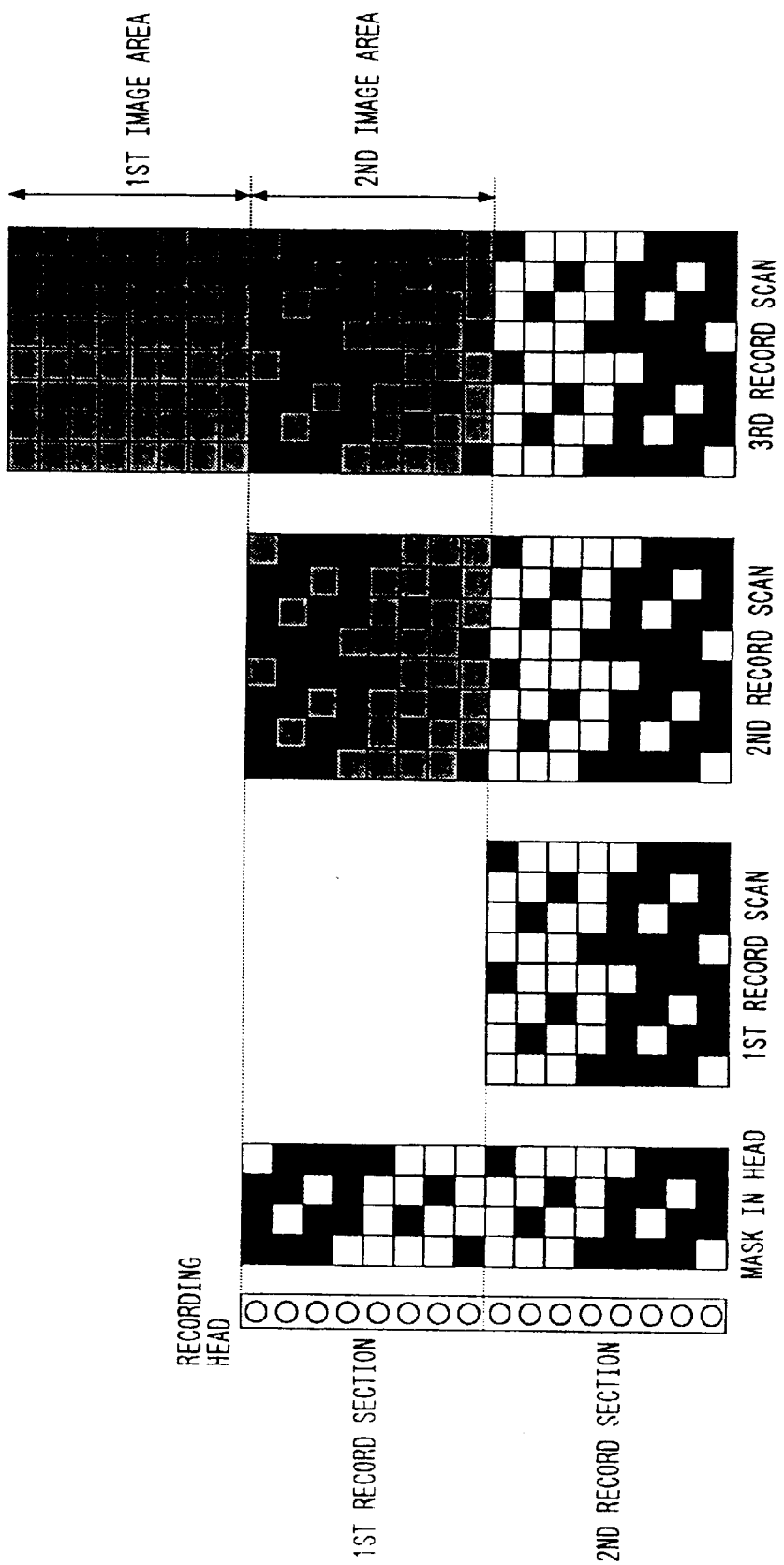
FIG. 69 is a view for explaining a recording state according to the 19th embodiment of the present invention.

The 19th embodiment of the present invention will be described below. This embodiment also exemplifies a 2-pass divisional recording method. However, unlike in the 17th embodiment, a sheet feed scan is always performed between two each record scans. Nozzles aligned in a head are equally divided into two record sections, and each section always uses an identical thinning mask. FIG. 69 shows the recording states of this embodiment. A 16-nozzle head illustrated at the left end of FIG. 69 is divided into two sections, as shown in FIG. 69. A mask illustrated at the right-hand side of the head corresponds to the nozzles, and the nozzles perform recording according to this mask in any scan. Patterns illustrated at the right-hand side of the mask represent the image recording states in the respective record scans. In each pattern, a black-painted pixel indicates a pixel to be recorded in the corresponding record scan, and a gray pixel indicates a pixel already recorded in the previous scan.

Referring to FIG. 69, of boundary pixel arrays of two image areas sandwiching a sheet feed connection portion indicated by a dotted line, while four pixel arrays of the area having the higher degree of completion (first image area) are already completed in the second record scan, four pixel arrays of the area having the lower degree of completion (second image area) are completed at a print duty of ¾ in the last third scan. In the second image area, the second record scan as the first scan of this image area is performed at a print duty of ½ the entire area. At this time, the four pixel arrays contacting the boundary of the first image area are recorded at a duty of ¼ the entire area. In contrast to this, in the third scan as the second scan of the second image area, pixels ½ the entire area are also recorded. However, the four pixel arrays contacting the first image area have a print duty of ¾ the entire area.

According to this embodiment, the pixel arrays are not equally divided in the nozzle main scan direction. Therefore, as compared to the normal divisional recording method like in the 17th embodiment, nozzle variations cannot be easily eliminated. However, since recording is performed using other nozzles at a duty of ¼, the effect of the divisional recording method is not completely lost. In addition, in consideration of the fact that two adjacent image areas are preferably independently recorded when they have different degrees of completion, since the second scan of this embodiment has a smaller number of dots in a boundary portion having a 4-pixel width than the fourth scan of the 17th embodiment, a good image with less connection lines can be expected.

20th Embodiment

Figure 70:
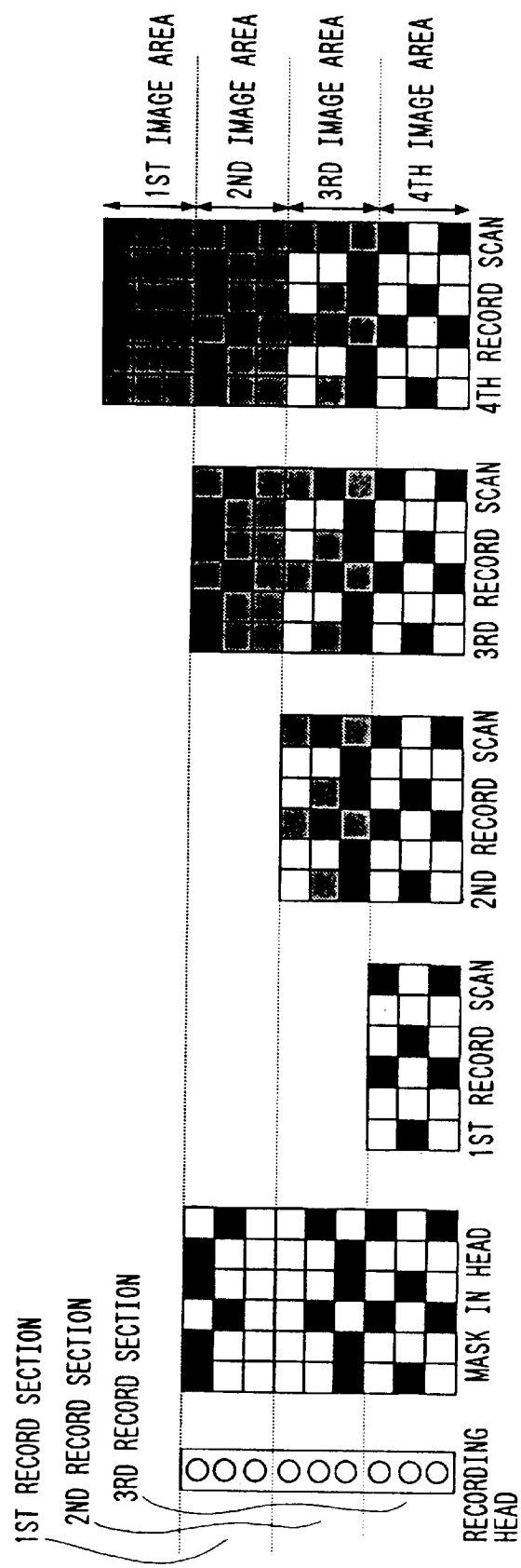
FIG. 70 is a view for explaining a recording state according to the 20th embodiment of the present invention.
Figure 74A:
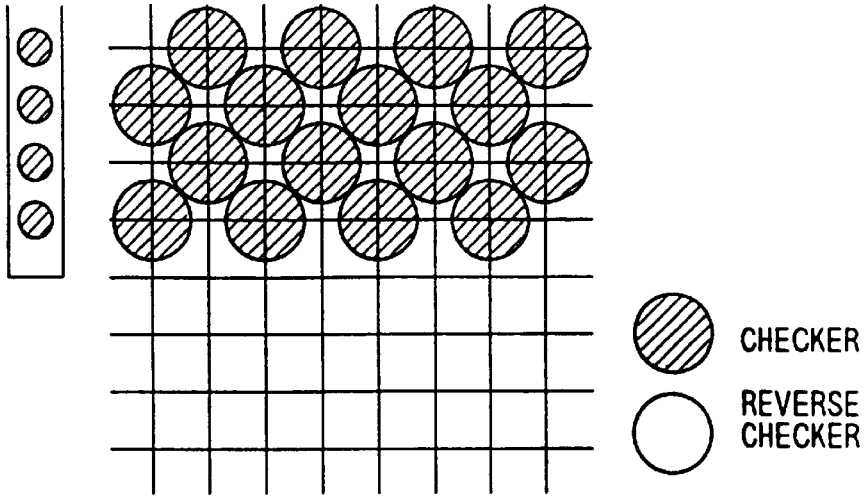
FIGS. 74A to 74C are views showing a print state by the divisional recording.
Figure 74B:
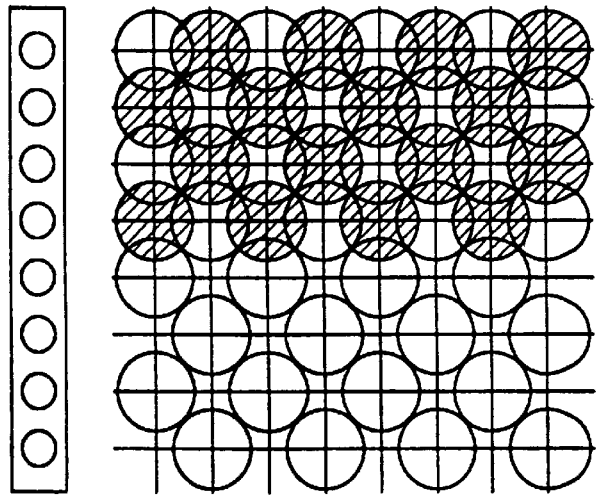
Figure 74C:
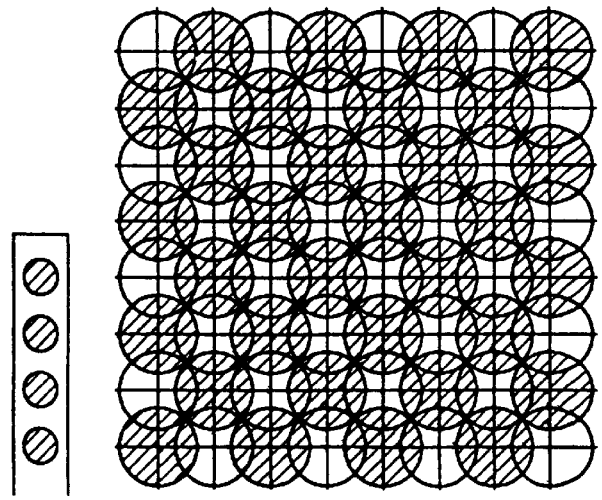
Figure 75:
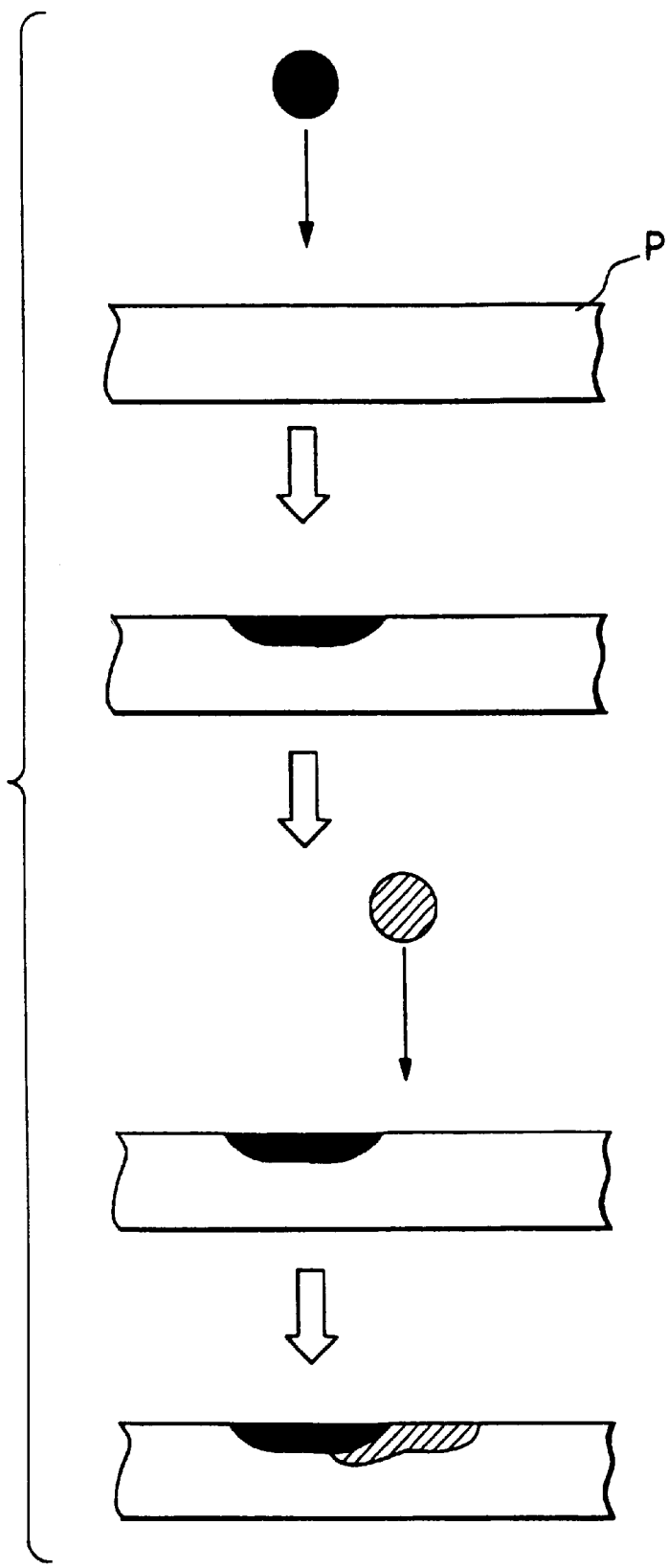
FIG. 75 is a view showing an ink absorbing state on a sheet surface.

The 20th embodiment as a developed recording method of the above embodiment will be described below. FIG. 70 shows image formation states of this embodiment like in the above embodiment. In this embodiment, three head record scans are performed for a unit image area, and a series of nozzles used in recording of the head are equally divided into three record sections. Like in the 18th embodiment, each record section always uses a fixed thinning mask, and a sheet feed scan by a ⅓ head width is performed between two each record scans. In this embodiment as well, substantially the same effect as in the 18th embodiment can be obtained. Since the mask of this embodiment has a period of three pixels in the main scan direction, it is not easily synchronized with binary image data which is normally input to have a period of an integer multiple of 2, and can record image data at any duty using two different groups of nozzles. As compared to the 19th embodiment, since a unit image area is completed by three record scans at a ⅓ print duty, a better result can be expected for blurring at boundaries between different colors on TP paper.

21st Embodiment

Furthermore, a 4-pass divisional recording method will be described below as the 21st embodiment. In the 18th embodiment, the 4-pass divisional recording methods have already been described with reference to FIGS. 68A to 68D, and the methods shown in FIGS. 68B and 68D have been confirmed to provide good images. In both the methods shown in FIGS. 68B and 68D, the boundary portion, on the first image area side, of the second image area is recorded in the fifth scan, thus ending all record scans of the second image area. In both the methods, the print duty to the second image area is ¼, and the print duty of the boundary portion with the first image area is ½. A difference between these two methods appears in the first to third scans. In FIG. 68B, in the second scan, pixel arrays on which recording has been completed, and pixel arrays which is not subjected to recording at all, alternately appear. In FIG. 68D, upon completion of the second scan, dots are recorded in a checker pattern on the entire image area, and thereafter, a two-pixel width area other than the connection portion is completed in the third scan. In FIG. 68B, the boundary portion with the first image area is completed in the last two scans, while in FIG. 68D, recording on pixels ½ the boundary portion is completed in the first scan. According to the above-mentioned theory, the method shown in FIG. 68B which completes the boundary portion in the last record scan is considered to be better than the method shown in FIG. 68D. However, in FIG. 68D, since a two-pixel width line has already been formed in the second area in the third scan, a large ink line is formed by ink affinity forces of these pixels in advance in the direction parallel to a connection line so as to increase the frequency of lines in the main scan direction, thus obtaining the effect for eliminating connection lines.

In the embodiments of the present invention, in particular, an ink jet type recording apparatus for performing recording by forming flying ink droplets by utilizing heat energy, of ink jet recording systems has been exemplified. As to its representative construction and principle, for example, one practiced by use of the basic principle disclosed in, for instance, U.S. Pat. Nos. 4,723,129 and 4,740,796 is preferred. The above system is applicable to either one of the so-called on-demand type and the continuous type. Particularly, the case of the on-demand type is effective because, by applying at least one driving signal which gives rapid temperature elevation exceeding nucleate boiling corresponding to the recording information on electrothermal converting elements arranged in a range corresponding to the sheet or liquid channels holding liquid (ink), a heat energy is generated by the electrothermal converting elements to effect film boiling on the heat acting surface of the recording head, and consequently the bubbles within the liquid (ink) can be formed in correspondence to the driving signals one by one. By discharging the liquid (ink) through a discharge port by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in accordance with response characteristics.

As the driving signals of such pulse shapes, the signals as disclosed in U.S. Pat. Nos. 4,463,359 and 4,345,262 are suitable. Further excellent recording can be performed by using the conditions described in U.S. Pat. No. 4,313,124 of the invention concerning the temperature elevation rate of the above-mentioned heat acting surface.

As a construction of the recording head, in addition to the combined construction of a discharging orifice, a liquid channel, and an electrothermal converting element (linear liquid channel or right angle liquid channel) as disclosed in the above specifications, the construction by use of U.S. Pat. Nos. 4,558,333 and 4,459,600 disclosing the construction having the heat acting portion arranged in the flexed region is also included in the invention.

The present invention can be also effectively constructed as disclosed in Japanese Laid-Open Patent Application No. 59-123670 which discloses the construction using a slit common to a plurality of electrothermal converting elements as a discharging portion of the electrothermal converting element or Japanese Laid-Open Patent Application No. 59-138461 which discloses the construction having the opening for absorbing a pressure wave of a heat energy corresponding to the discharging portion.

Further, as a recording head of the full line type having a length corresponding to the maximum width of a recording medium which can be recorded by the recording apparatus, either the construction which satisfies its length by a combination of a plurality of recording heads as disclosed in the above specifications or the construction as a single recording head which has integratedly been formed can be used.

In addition, the invention is effective for a recording head of the freely exchangeable chip type which enables electrical connection to the main device or supply of ink from the main device by being mounted onto the main device, or for the case by use of a recording head of the cartridge type provided integratedly on the recording head itself.

It is also preferable to add a restoration means for the recording head, preliminary auxiliary means, and the like because the effect of the invention can be further stabilized. Specific examples of them may include, for the recording head, capping means, cleaning means, pressurization or aspiration means, and electrothermal converting elements or another heating element or preliminary heating means according to a combination of them. It is also effective for performing a stable recording to realize the preliminary mode which executes the discharging separately from the recording.

In the embodiments of the present invention, an ink is described as a liquid. Alternatively, the present invention may employ an ink which is solidified at room temperature or less, and is softened or liquefied at room temperature, or an ink, which is liquefied upon application of a use recording signal since it is a general practice to perform temperature control of the ink itself within a range between 30° C. and 70° C. in an ink jet system so that the ink viscosity can fall within a stable ejection range.

In addition, a temperature rise caused by heat energy may be prevented by positively utilizing the temperature rise as energy for a change in state from a solid state to a liquid state of the ink, or an ink which is solidified in a non-use state for the purpose of preventing evaporation of the ink may be used. In any case, the present invention can be applied to a case wherein an ink, which can be liquefied by heat energy such as an ink which is liquefied upon application of heat energy according to a recording signal, and is ejected in a liquid state, an ink which begins to be solidified when it reaches a recording medium, or the like may be used. In this case, an ink may be held in a liquid or solid state in recess portions or through holes of a porous sheet, as described in Japanese Laid-Open Patent Application No. 54-56847 or 60-71260, and the porous sheet may be arranged to oppose electrothermal converting elements. In the present invention, the above-mentioned film boiling system is most effective for the above-mentioned inks.

Moreover, the recording apparatus of the present invention may be used as an integrated or separate image output terminal of an information processing equipment such as a wordprocessor, a computer, or the like, or a copying machine as a combination of the recording apparatus, a reader, and the like, or a facsimile apparatus having a transmission/reception function.

The present invention is not limited to an ink jet system utilizing heat energy, but can also be applied to an ink jet system utilizing, e.g., a piezo element.

What is claimed is:

1. An ink jet recording method for recording a color image by executing record scans by reciprocally moving recording means, on which a plurality of recording element arrays for ejecting inks of different colors are arranged, relative to a recording medium in an alignment direction of said plurality of recording element arrays, each of the plurality of recording element arrays including a plurality of recording element groups, said method comprising the steps of:

performing a first record scan of the reciprocal scans to record thinned images of a plurality of colors including a specific color on a predetermined area of the recording medium by using predetermined recording element groups;

performing relative movement between the recording means and the recording medium, after the first record scan, in a direction different from the alignment direction; and performing a second record scan of the reciprocal scans in a direction opposite to that of the first record scan to record a thinned image of only the specific color recorded in the first record scan, on the predetermined area by using a recording element group different from the predetermined recording element groups used in the first record scan;

performing a third record scan of the reciprocal scans to record thinned images of a plurality of colors including the specific color on the predetermined area of the recording medium by using recording element groups different from those used in the first and second record scans, said thinned images recorded in the first record scan and said thinned images recorded in the third record scan having a mutually complementary relationship;

performing relative movement between the recording means and the recording medium, after the third record scan, in a direction different from the alignment direction; and performing a forth record scan of the reciprocal scans in a direction opposite to that of the third record scan to record a thinned image of only the specific color recorded in the third record scan, on the predetermined area by using a recording element group different from the recording element groups used in the first, second and third record scans.

2. A method according to claim 1, further comprising the step of moving the recording medium by a width according to a record width after said second record scan.

3. A method according to claim 1, wherein a plurality of record scans are performed on a predetermined area to record an image, and thinning images are recorded in the record scans according to complementary thinning arrangements.

4. A method according to claim 2, wherein thinning images of the plurality of colors according to the thinning arrangements are recorded in the first record scan of the reciprocal record scans, and a thinning image of only the specific color is recorded in the second record scan of the reciprocal record scans.

5. A method according to claim 4, further comprising, the step of moving the recording medium by a width according to a record width after said first and said second record scans.

6. A method according to claim 5, wherein the record width is smaller than a width corresponding to the recording element array.

7. A method according to any one of claims 1 to 4, wherein the specific color is black.

8. A method according to any one of claims 1 to 6, wherein the recording element generates heat energy, and causes a change in state in the ink by the heat energy, thereby ejecting the ink.

* * * * *

UNITED STATES PATENT AND TRADEMARK OFFICE
CERTIFICATE OF CORRECTION

PATENT NO. : 6,130,685
DATED : October 10, 2000
INVENTOR(S) : Miyuki Matsubara et al.

It is certified that error appears in the above-identified patent and that said Letters Patent is hereby corrected as shown below:

<u>Drawings,</u>
<u>Sheet 57 of 90,</u>
Fig. 58, "UNSATISFACTORY" should read -- UNSATISFIABLE --.

<u>Column 4,</u>
Line 62, "dot s" should read -- dots --.

<u>Column 17,</u>
Line 34, "plurality" should read -- plurality of --.

<u>Column 18,</u>
Line 28, "corresponding-to" should read -- corresponding to --.

<u>Column 21,</u>
Line 27, "mass" should read -- mask --.

<u>Column 26,</u>
Line 26, "corresponding-to" should read -- corresponding to --.

<u>Column 33,</u>
Line 28, "thee" should read -- the --.

<u>Column 34,</u>
Line 56, "inbalance" should read -- imbalance --.

<u>Column 37,</u>
Line 28, "$T=0.56+|10.2\cos(h_1+168)|$" should read -- $T=0.56+|0.2\cos(h_1+168)|$ --;
Line 44, "Under" should read -- under --;
Line 50, "dot recorded." should read -- recorded dot. --.

<u>Column 42,</u>
Line 44, "is." should read -- is --.

<u>Column 53,</u>
Line 16, "preferably-drawn" should read -- preferably drawn --.

<u>Column 54,</u>
Line 2, "a-case" should read -- a case --.

UNITED STATES PATENT AND TRADEMARK OFFICE
CERTIFICATE OF CORRECTION

PATENT NO. : 6,130,685
DATED : October 10, 2000
INVENTOR(S) : Miyuki Matsubara et al.

It is certified that error appears in the above-identified patent and that said Letters Patent is hereby corrected as shown below:

Column 59,
Line 12, "is" should read -- are --.

Column 60,
Line 4, "be also" should read -- also be --.

Column 61,
Line 25, "and" should be deleted.

Signed and Sealed this

Thirteenth Day of November, 2001

Attest:

*Nicholas P. Godici*

NICHOLAS P. GODICI
*Attesting Officer*    *Acting Director of the United States Patent and Trademark Office*